(12) United States Patent
Van Straten

(10) Patent No.: US 11,754,275 B2
(45) Date of Patent: Sep. 12, 2023

(54) OPTICAL FACE PROTECTION APPARATUS AND FACE PROTECTION APPARATUS

(71) Applicant: Van Straten Enterprises, Inc., Chassell, MI (US)

(72) Inventor: George A. Van Straten, Chassell, MI (US)

(73) Assignee: Van Straten Enterprises, Inc., Chassell, MI (US)

( * ) Notice: Subject to any disclaimer, the term of this patent is extended or adjusted under 35 U.S.C. 154(b) by 0 days.

(21) Appl. No.: 17/562,929

(22) Filed: Dec. 27, 2021

(65) Prior Publication Data

US 2022/0120429 A1    Apr. 21, 2022

Related U.S. Application Data

(63) Continuation of application No. 16/858,623, filed on Apr. 25, 2020, now Pat. No. 11,231,171.
(Continued)

(51) Int. Cl.
| | |
|---|---|
| *F21V 29/90* | (2015.01) |
| *F21S 45/60* | (2018.01) |
| *H05B 3/12* | (2006.01) |
| *F21V 29/87* | (2015.01) |
| *H05B 3/18* | (2006.01) |
| *F21V 29/85* | (2015.01) |

(Continued)

(52) U.S. Cl.
CPC ............ *F21V 29/90* (2015.01); *B60Q 1/0017* (2013.01); *F21S 45/60* (2018.01); *F21V 29/86* (2015.01); *F21V 29/87* (2015.01); *H05B 3/12* (2013.01); *H05B 3/18* (2013.01); *H05B 3/56* (2013.01); *B60Q 1/04* (2013.01)

(58) Field of Classification Search
CPC .......... F21V 29/90; F21V 29/86; F21V 29/87; F21S 45/60; B60Q 1/0017; B60Q 1/04; H05B 3/12; H05B 3/18; H05B 3/56
See application file for complete search history.

(56) References Cited

U.S. PATENT DOCUMENTS

| | | |
|---|---|---|
| 4,208,570 A | 6/1980 | Rynard |
| 4,728,775 A | 3/1988 | Van Straten |

(Continued)

FOREIGN PATENT DOCUMENTS

| | | |
|---|---|---|
| GB | 783097 | 9/1957 |
| WO | WO 2015/106024 | 7/2015 |

(Continued)

OTHER PUBLICATIONS

U.S. Appl. No. 13/972,762, filed Aug. 21, 2013; G. Van Straten.
(Continued)

*Primary Examiner* — Bao Q Truong
(74) *Attorney, Agent, or Firm* — Keith D. Grzelak; Wells St. John P.S.

(57) ABSTRACT

An optical face protection apparatus is provided having a support body, at least one lens and an elongate heating element. The support body is configured to be supported on a user. The at least one lens is carried by the support body and is configured to hold the at least one lens over an eye facial region of a user. The elongate heating element has an elongate tube and a heat source provided in the tube, carried by the body and configured to traverse an expansive surface area of the at least one lens.

25 Claims, 63 Drawing Sheets

Related U.S. Application Data

(60) Provisional application No. 62/958,625, filed on Jan. 8, 2020, provisional application No. 62/939,509, filed on Nov. 22, 2019, provisional application No. 62/896,414, filed on Sep. 5, 2019, provisional application No. 62/849,020, filed on May 16, 2019, provisional application No. 62/848,480, filed on May 15, 2019, provisional application No. 62/839,367, filed on Apr. 26, 2019.

(51) Int. Cl.
*B60Q 1/00* (2006.01)
*H05B 3/56* (2006.01)
*B60Q 1/04* (2006.01)

(56) References Cited

U.S. PATENT DOCUMENTS

| | | | |
|---|---|---|---|
| 4,868,929 A | 9/1989 | Curcio | |
| 5,363,153 A * | 11/1994 | Bailiff | G02C 11/00 351/158 |
| 5,368,654 A | 11/1994 | Bergevin | |
| 5,459,533 A | 10/1995 | McCooeye et al. | |
| 6,058,718 A | 5/2000 | Forsberg et al. | |
| 6,283,656 B1 | 9/2001 | Jiang | |
| 6,601,983 B1 | 8/2003 | Runfola et al. | |
| 6,902,287 B2 | 6/2005 | Taylor | |
| 7,262,388 B2 | 8/2007 | Moreth et al. | |
| 7,281,811 B2 | 10/2007 | Thuot Rann et al. | |
| 8,109,264 B1 | 2/2012 | Murray | |
| 8,314,559 B1 | 11/2012 | Helms et al. | |
| 8,399,805 B2 | 3/2013 | Biddell | |
| 9,605,880 B2 | 3/2017 | Van Straten | |
| 9,623,790 B2 | 4/2017 | Van Straten | |
| 9,726,362 B2 | 8/2017 | Rosen et al. | |
| 10,046,692 B2 | 8/2018 | Van Straten | |
| 10,272,818 B2 | 4/2019 | Van Straten | |
| 2009/0025125 A1* | 1/2009 | Jou | B63C 11/12 2/435 |
| 2009/0086188 A1 | 4/2009 | Onojima | |
| 2009/0151057 A1 | 6/2009 | Lebel et al. | |
| 2009/0289656 A1 | 11/2009 | Matsumoto | |
| 2010/0006554 A1 | 1/2010 | Inoue et al. | |
| 2010/0008099 A1 | 1/2010 | Inoue et al. | |
| 2011/0228529 A1 | 9/2011 | Patel et al. | |
| 2012/0193338 A1 | 8/2012 | Sullivan et al. | |
| 2012/0201031 A1 | 8/2012 | Marley | |
| 2012/0005856 A1 | 12/2012 | Jones | |
| 2013/0043234 A1 | 2/2013 | Tsai et al. | |
| 2013/0114279 A1 | 5/2013 | Marley | |
| 2014/0184075 A1 | 7/2014 | Ter-Hovhanissian | |
| 2015/0055363 A1 | 2/2015 | Van Straten | |
| 2015/0055944 A1 | 2/2015 | Van Straten | |
| 2015/0204533 A1 | 7/2015 | Rosen et al. | |
| 2015/0286073 A1 | 10/2015 | Blum | |
| 2016/0070120 A1* | 3/2016 | Cornelius | A61F 9/029 219/211 |
| 2016/0075823 A1 | 3/2016 | Imazato et al. | |
| 2016/0109088 A1 | 4/2016 | Orr et al. | |
| 2016/0209022 A1 | 7/2016 | Cai et al. | |
| 2016/0215952 A1 | 7/2016 | Dunn et al. | |
| 2016/0363286 A1 | 12/2016 | Deering | |
| 2017/0143546 A1* | 5/2017 | O'Malley | A61F 9/029 |
| 2017/0175971 A1 | 6/2017 | Tai | |
| 2018/0000648 A1* | 1/2018 | McCulloch | H05B 3/06 |
| 2019/0000674 A1* | 1/2019 | Bouchard Fortin | A42B 3/042 |
| 2019/0017676 A1 | 1/2019 | Van Straten | |
| 2019/0176680 A1 | 6/2019 | Van Straten | |

FOREIGN PATENT DOCUMENTS

WO  WO PCT/US2018/41887  1/2019
WO  WO PCT/US20/029988  10/2020

OTHER PUBLICATIONS

U.S. Appl. No. 61/868,522, filed Aug. 21, 2013; G. Van Straten.
U.S. Appl. No. 62/037,430, filed Aug. 14, 2014; G. Van Straten.
U.S. Appl. No. 62/135,060, filed Mar. 18, 2015; G. Van Straten.
U.S. Appl. No. 63/140,157, filed Jan. 21, 2021; G. Van Straten.

* cited by examiner

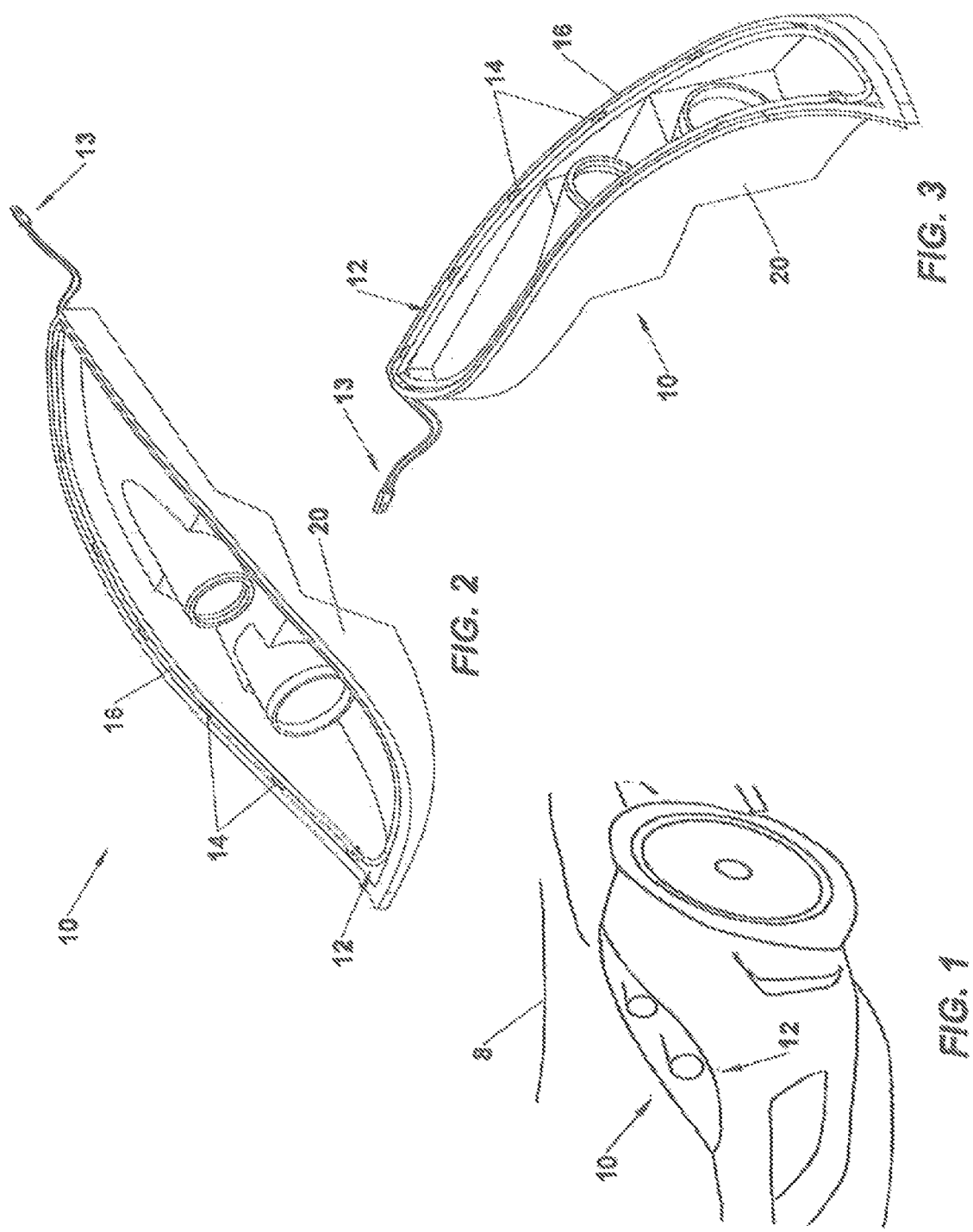

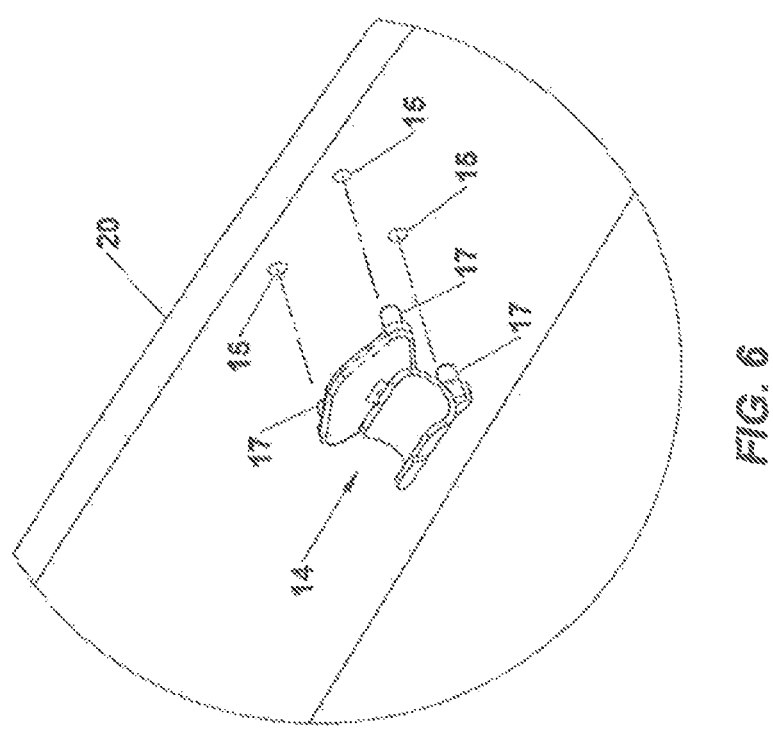
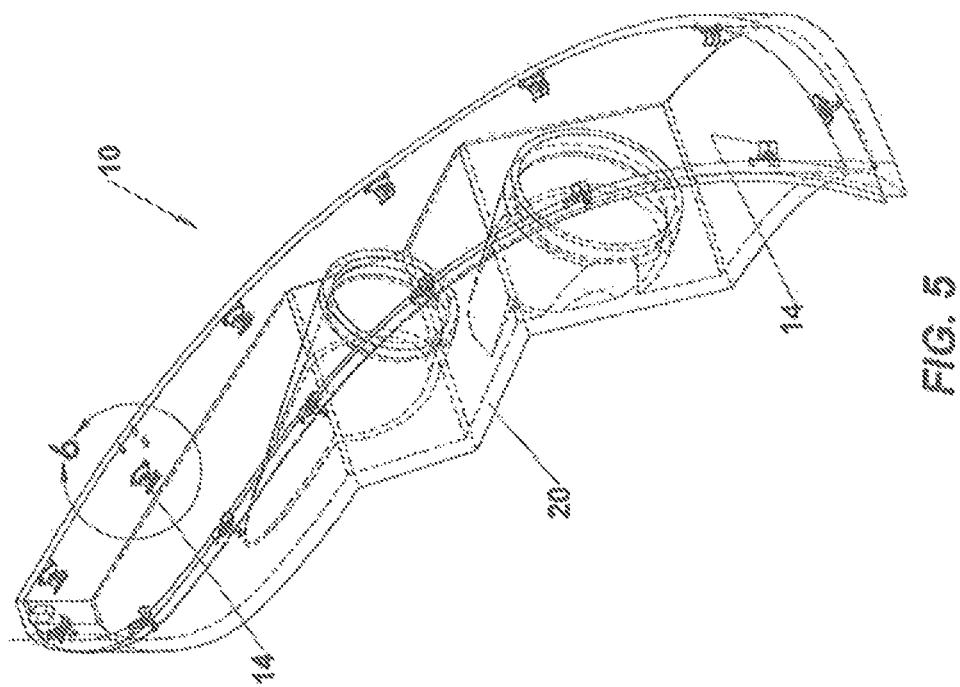

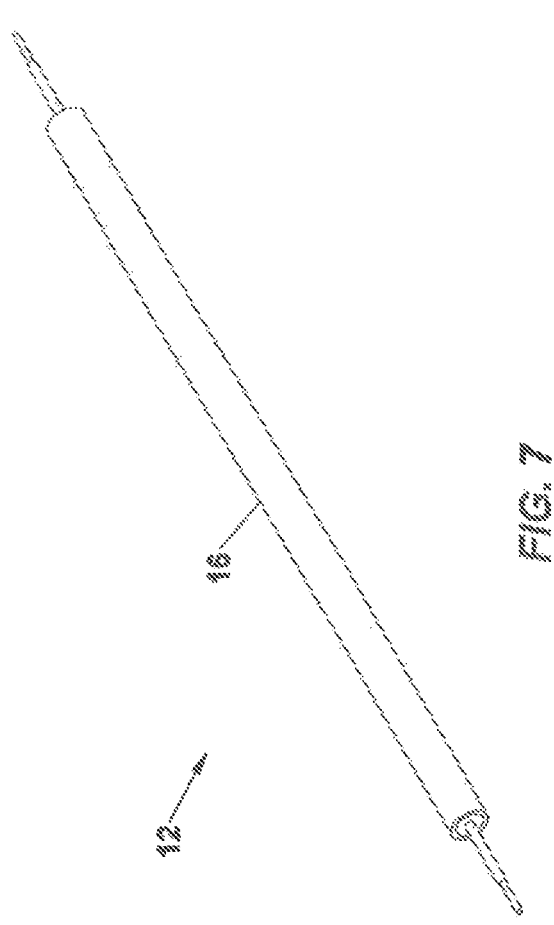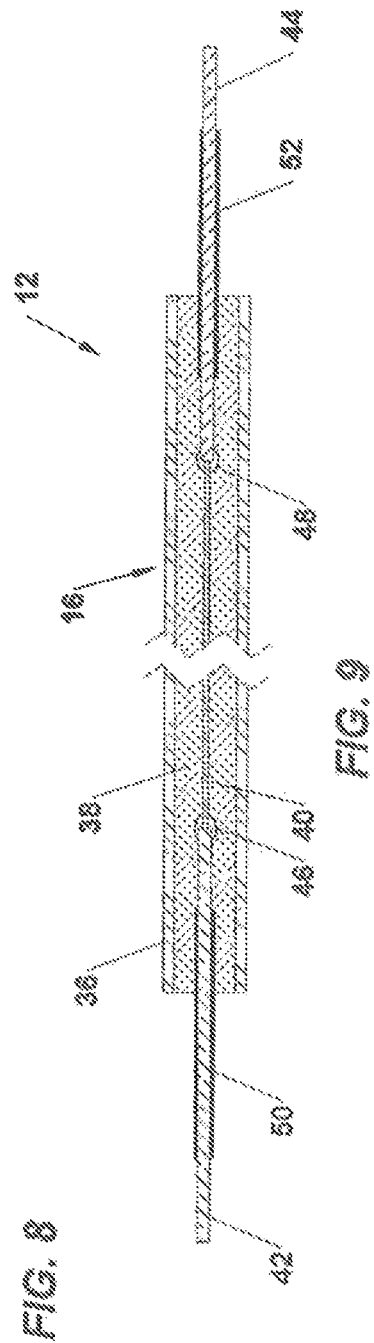

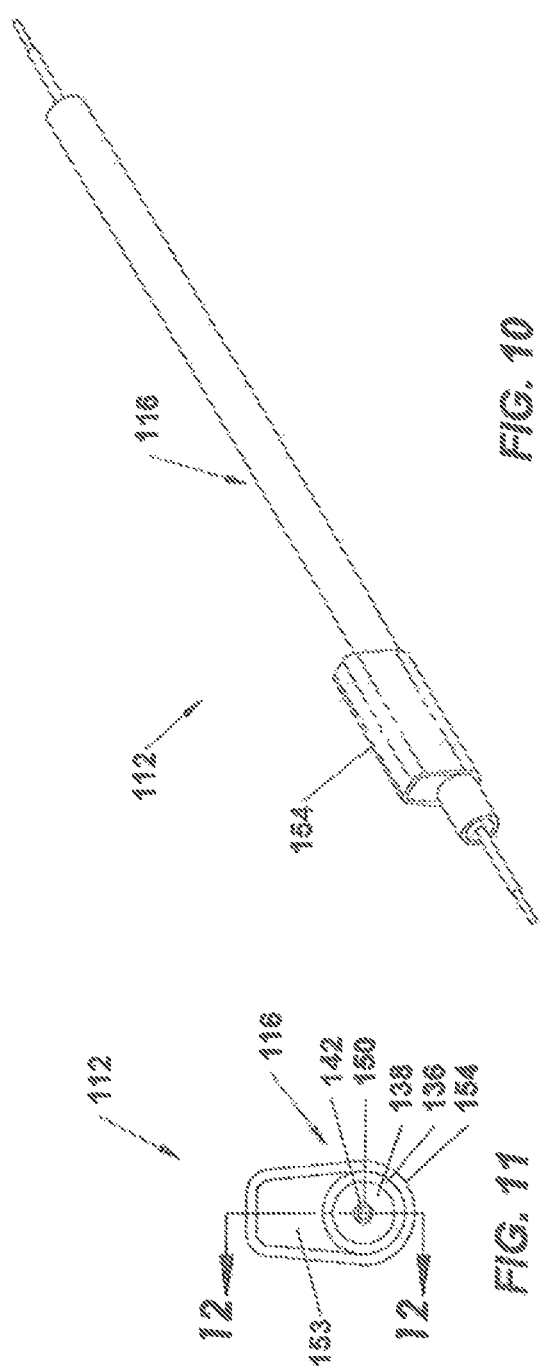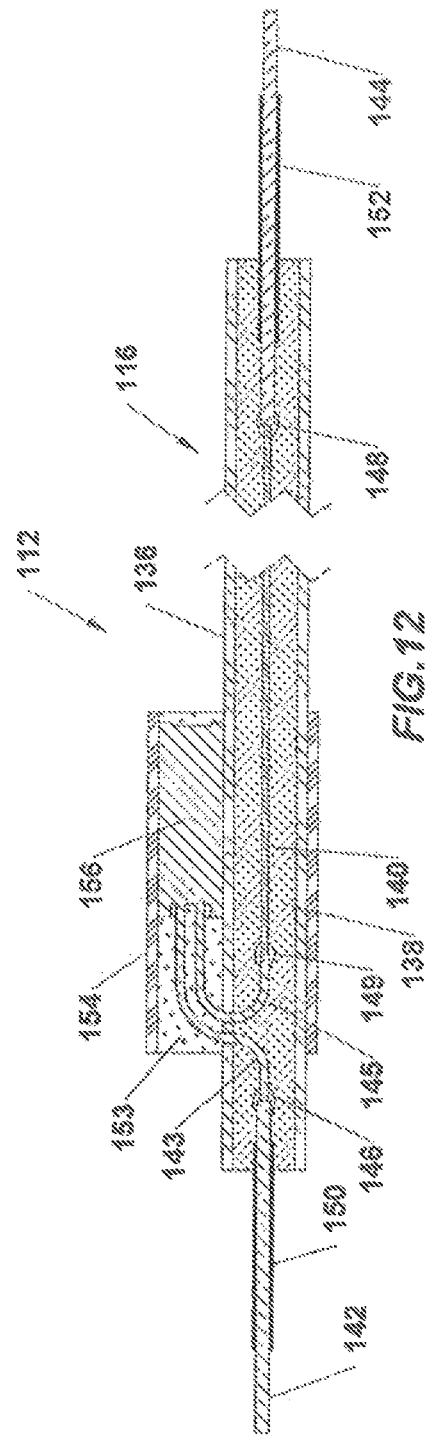

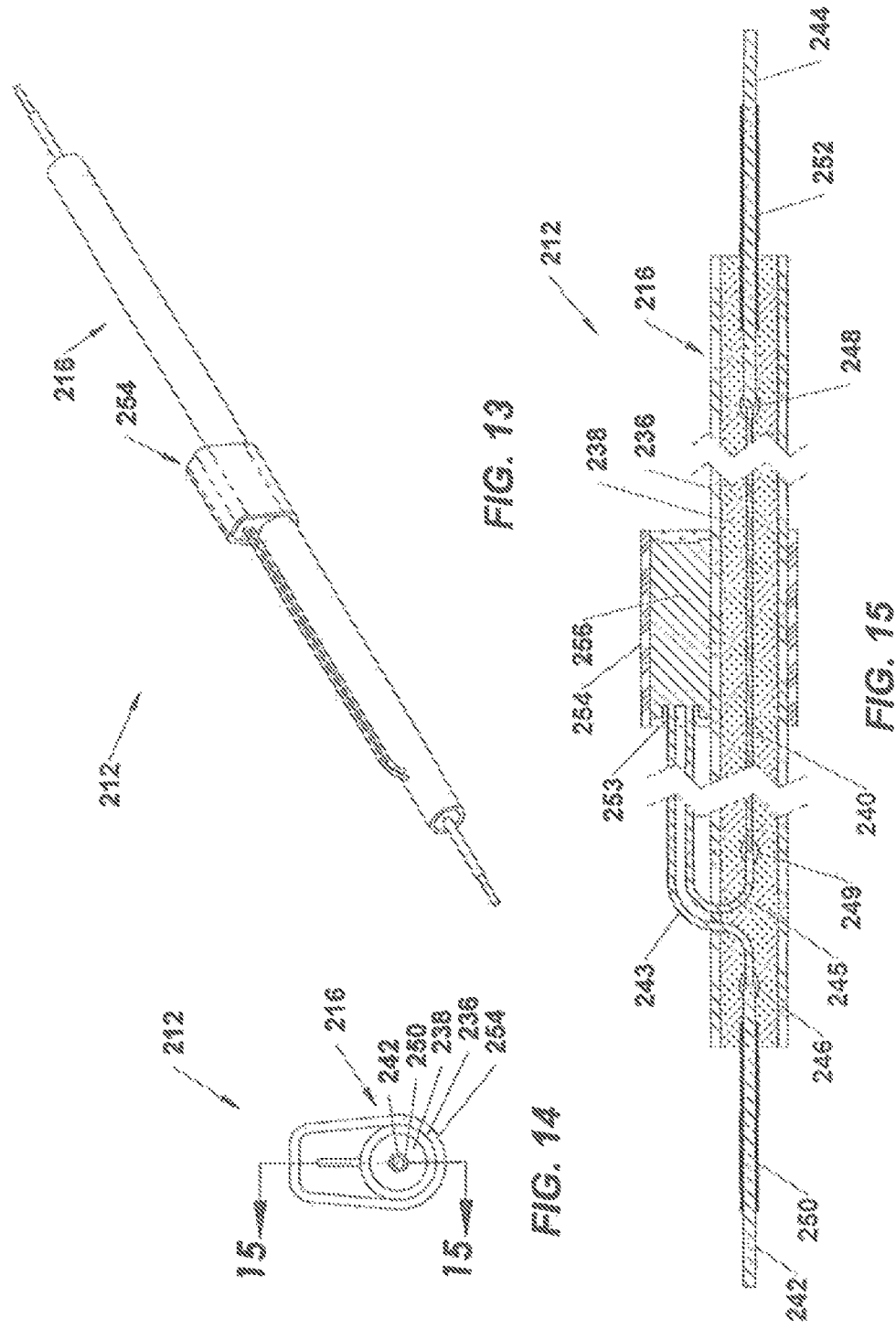

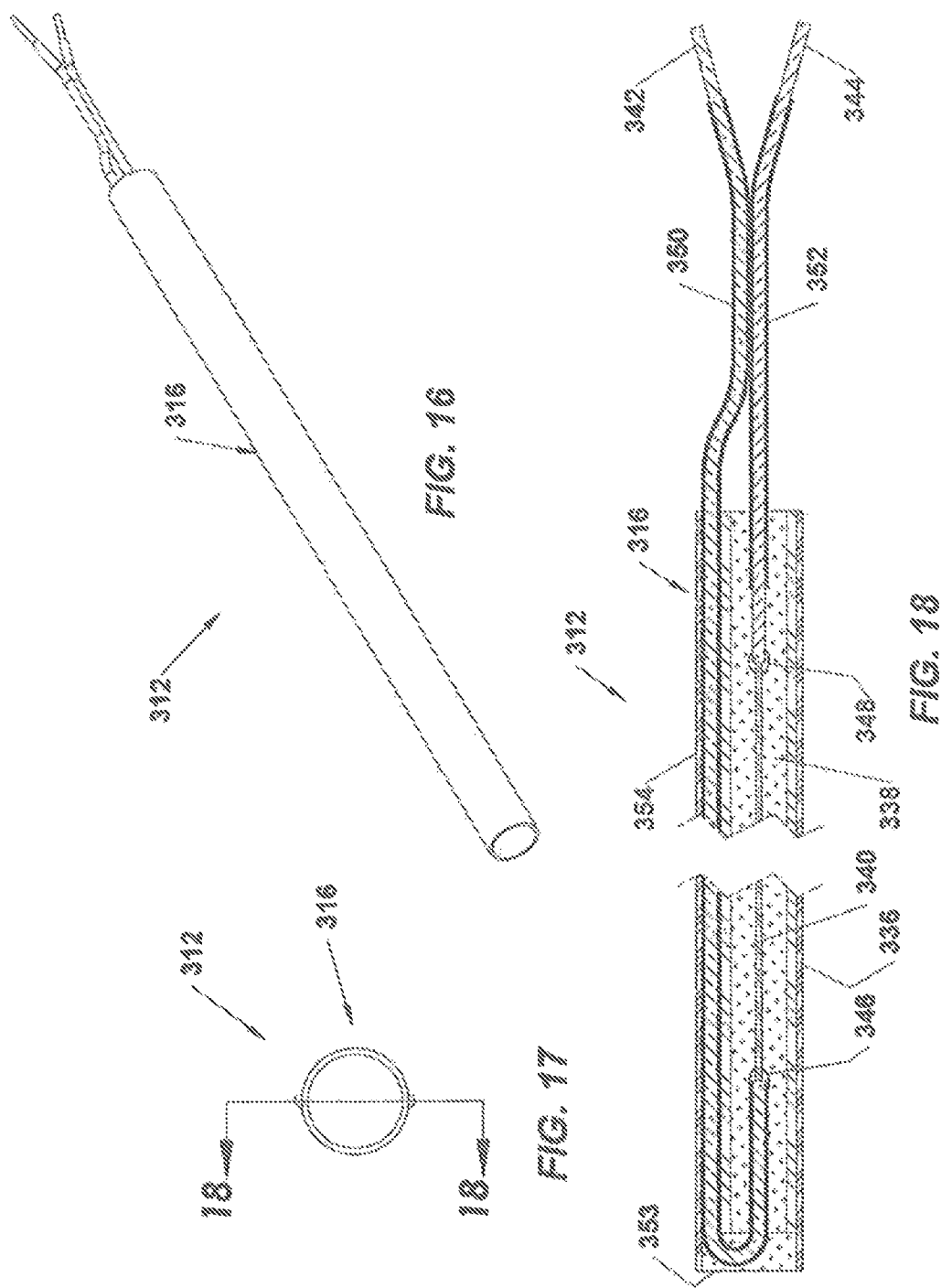

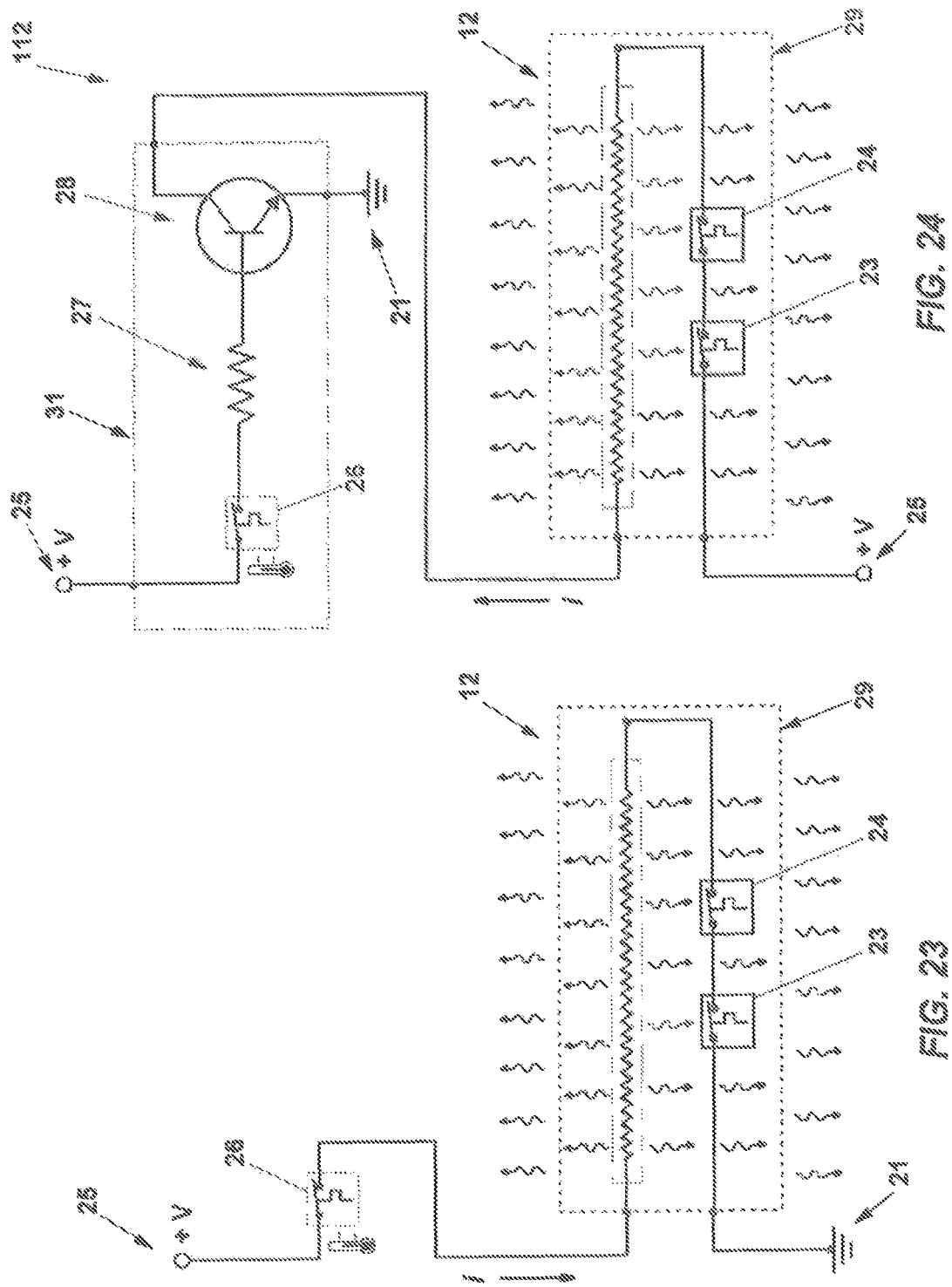

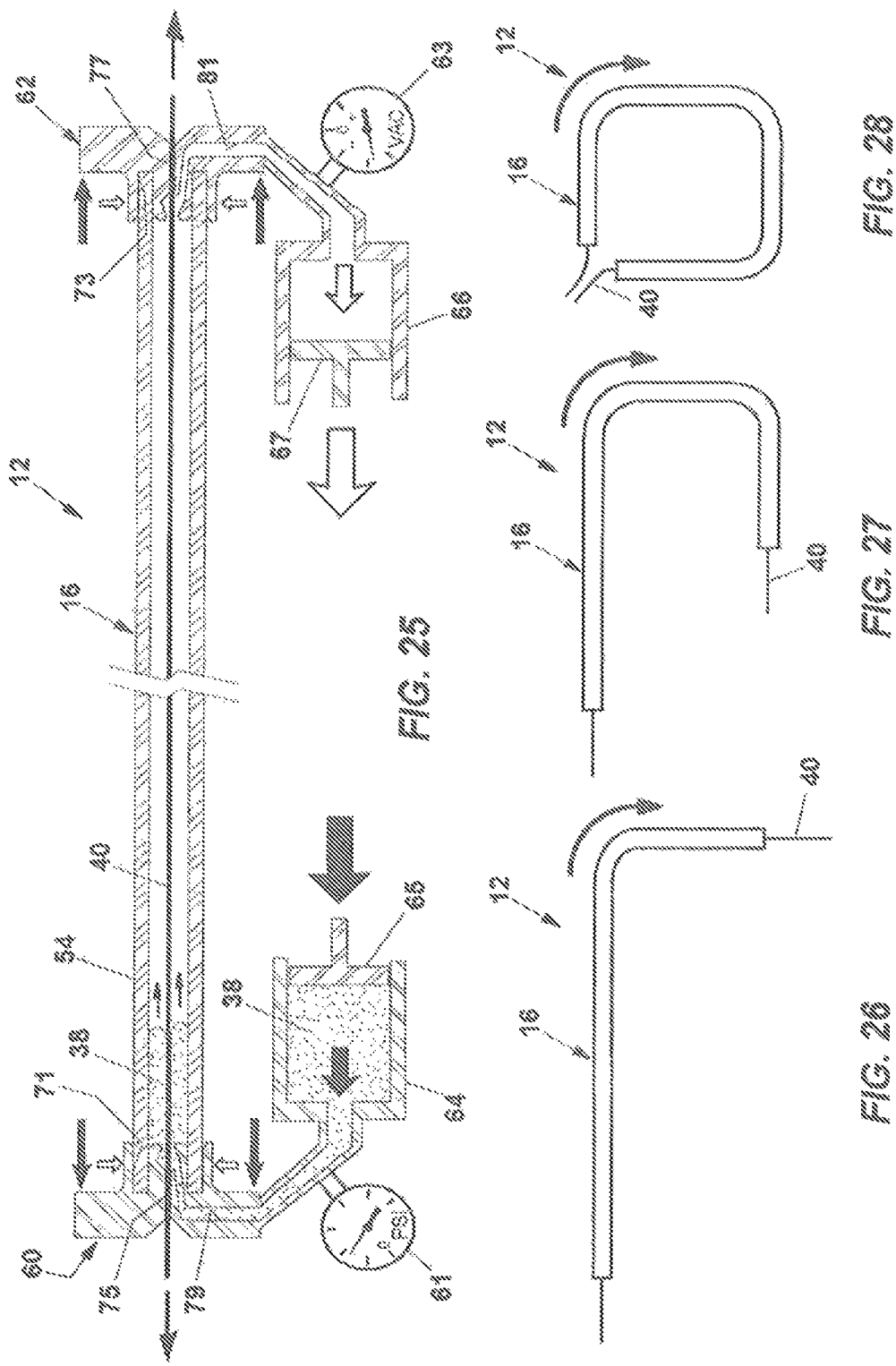

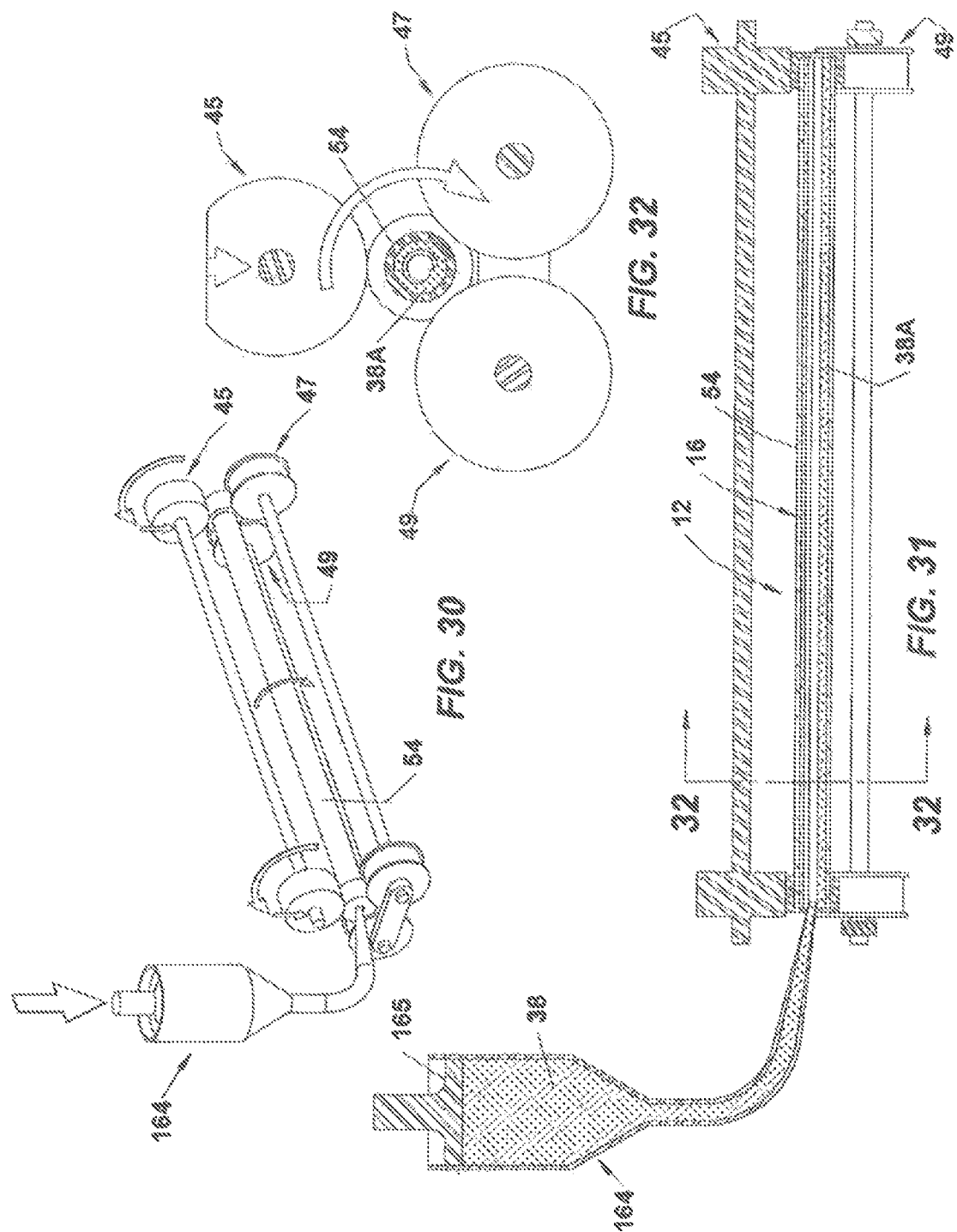

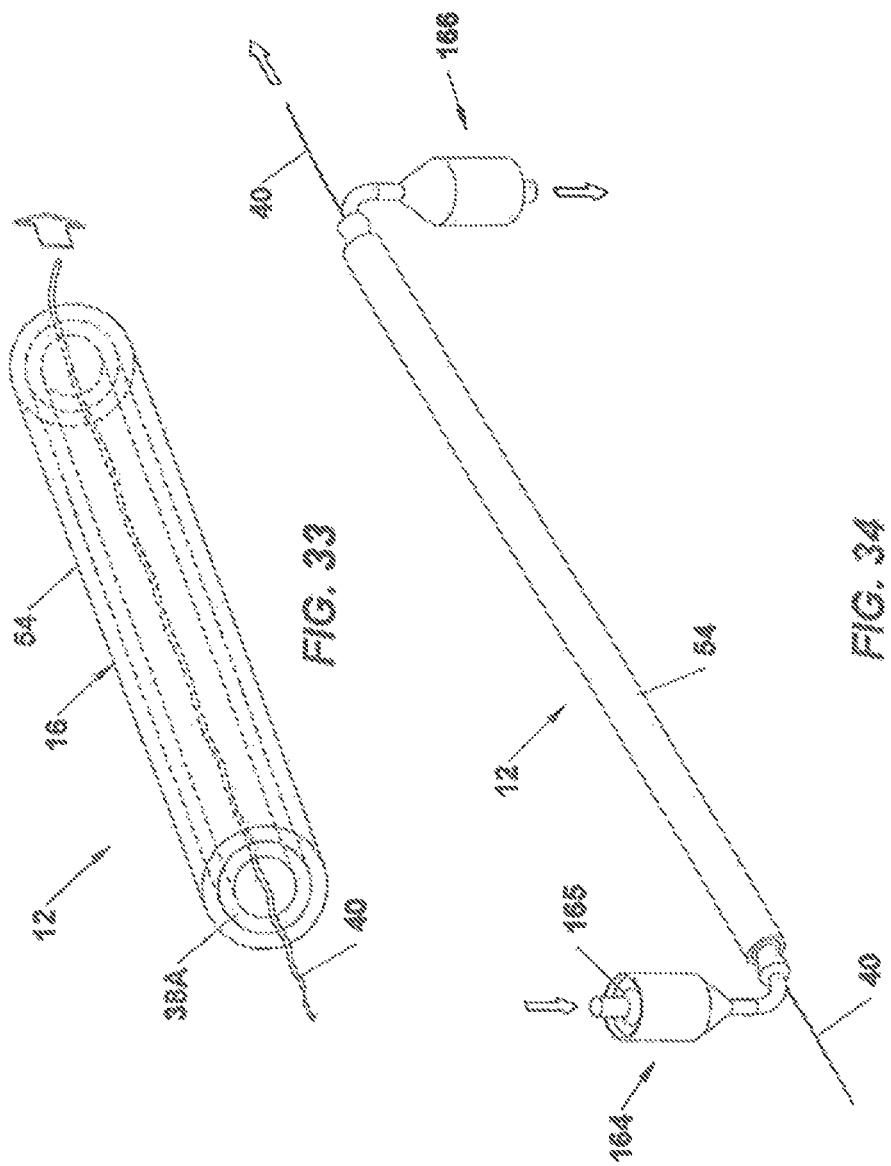

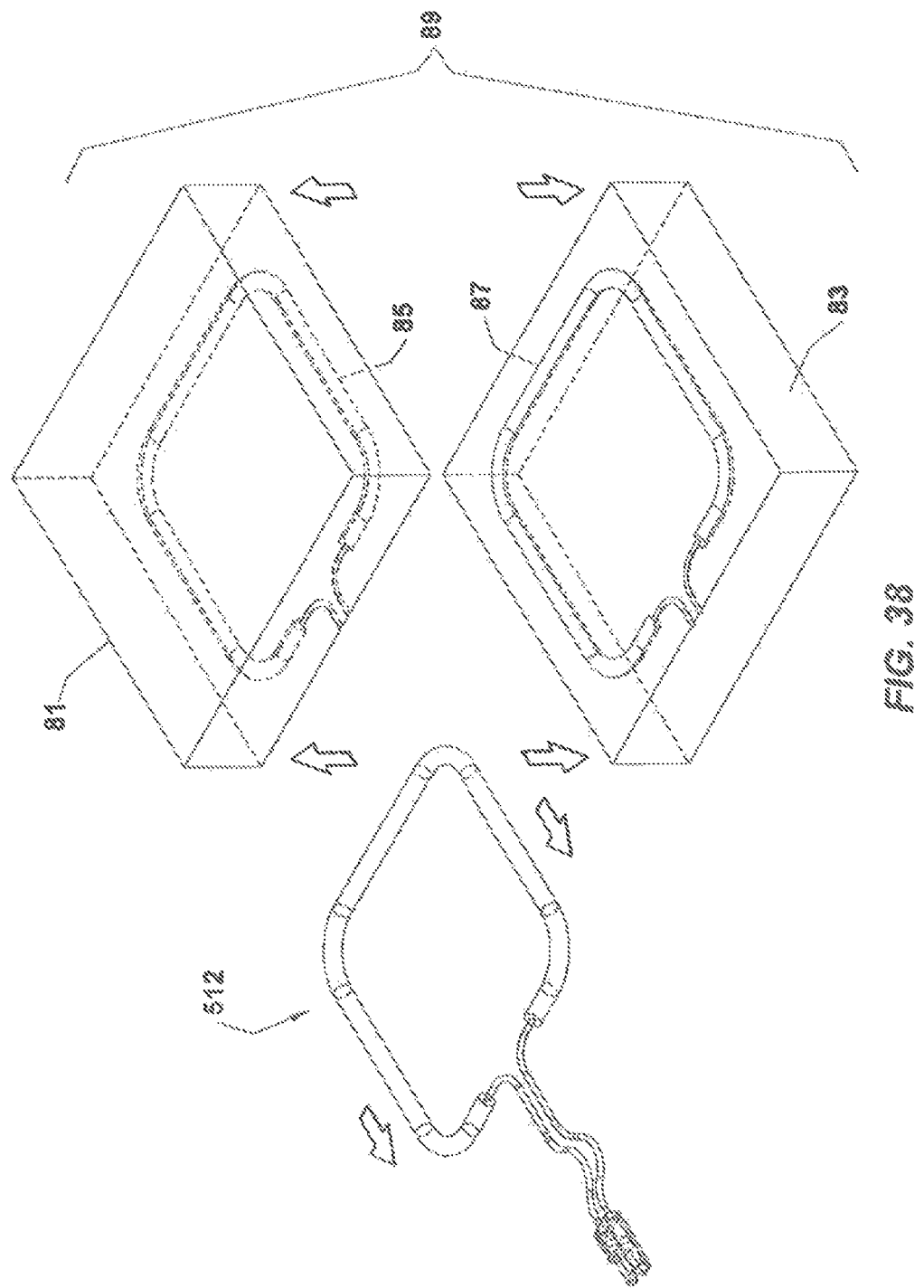

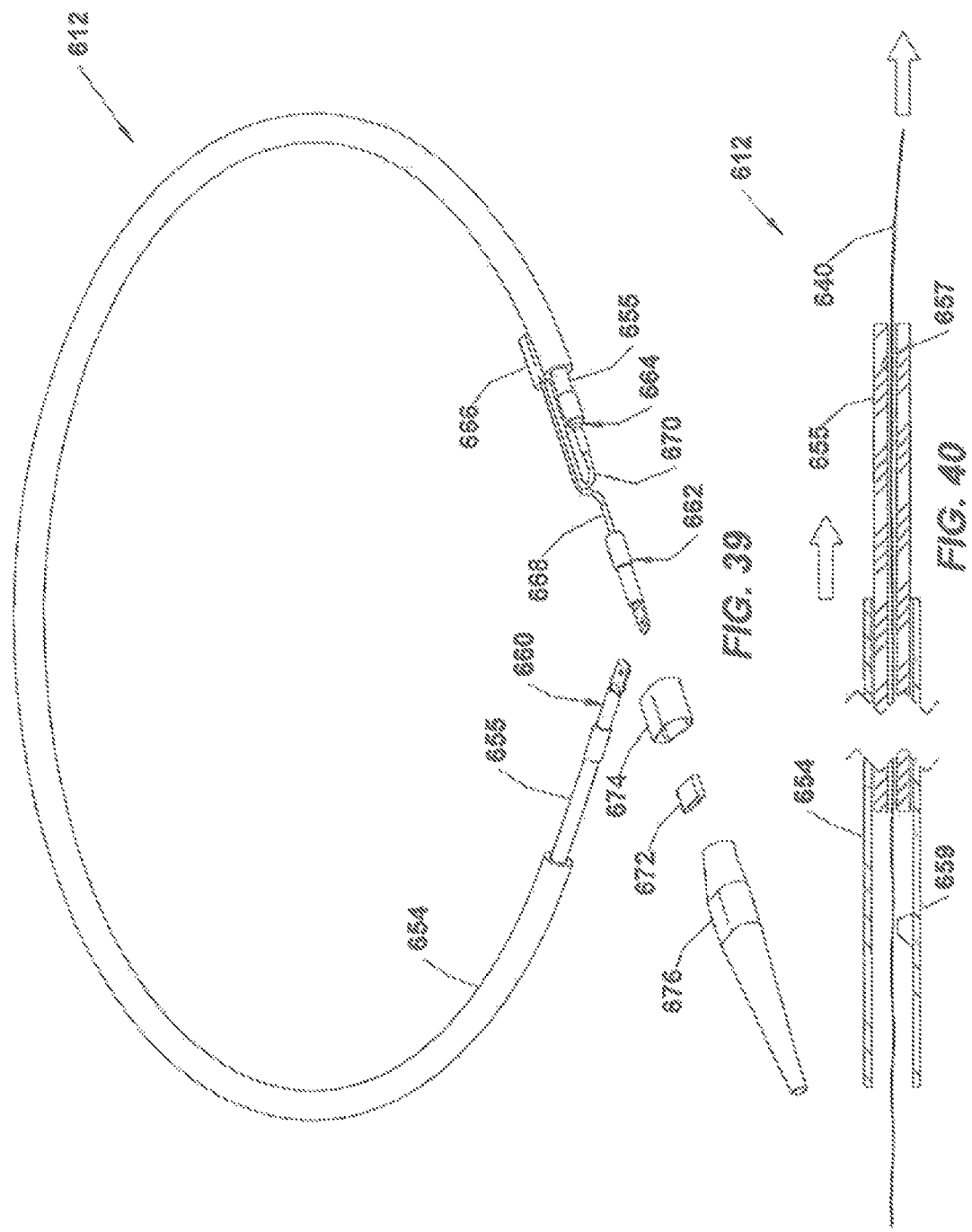

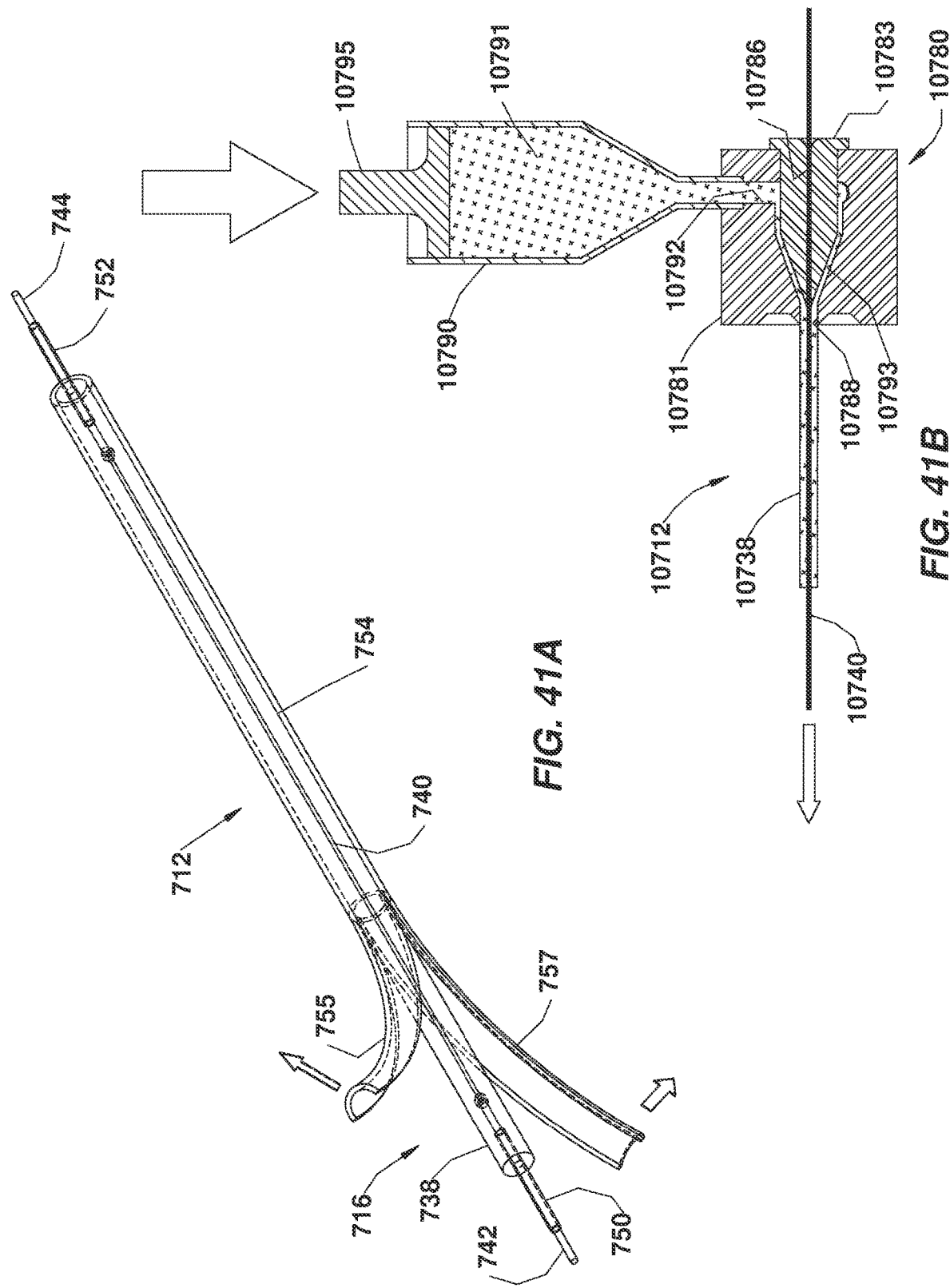

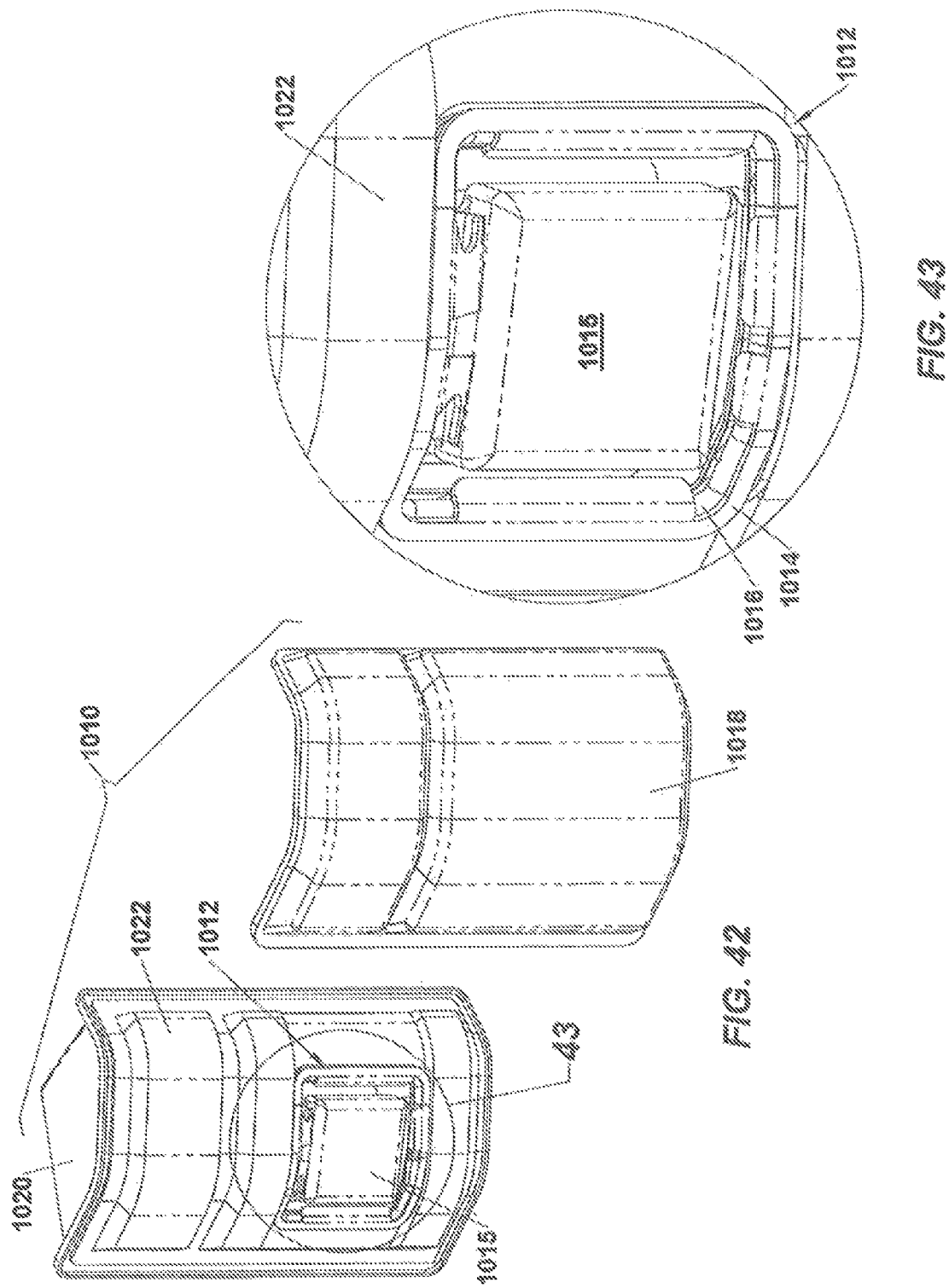

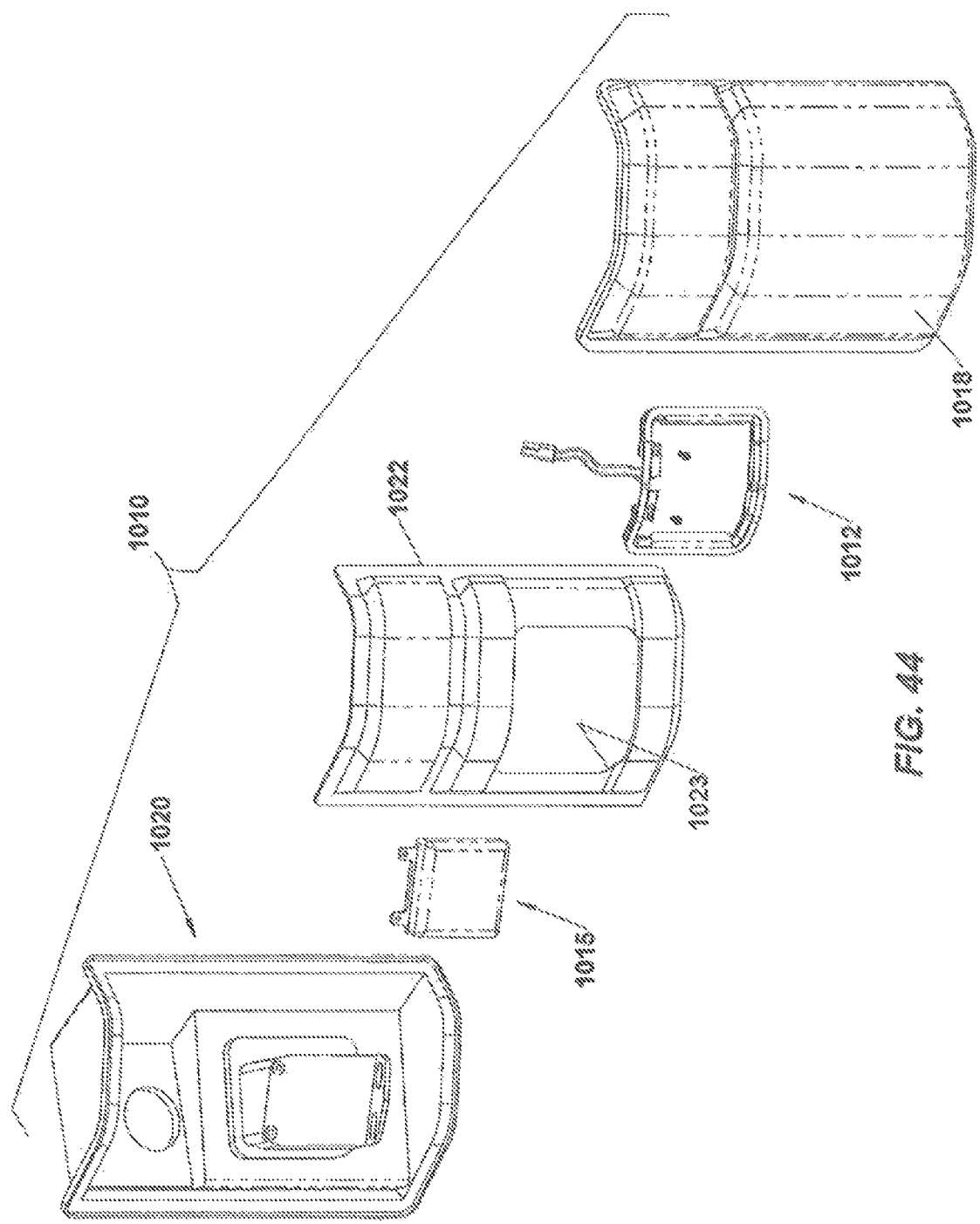

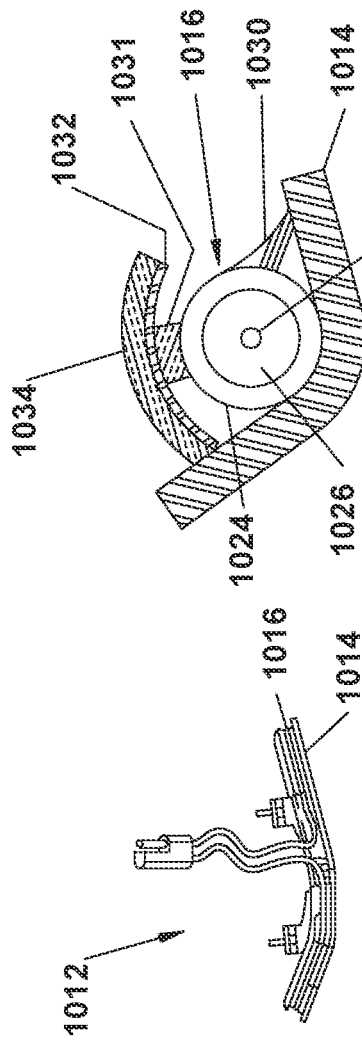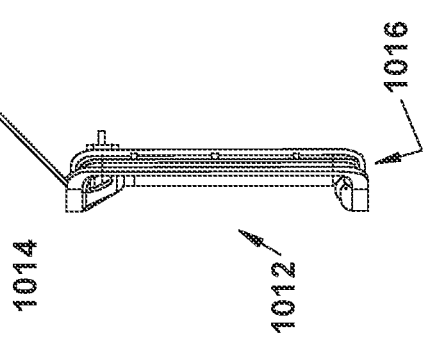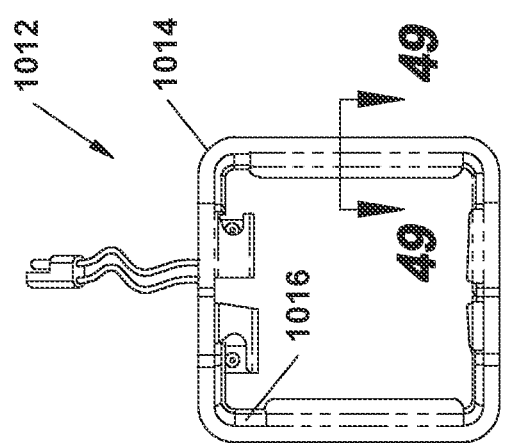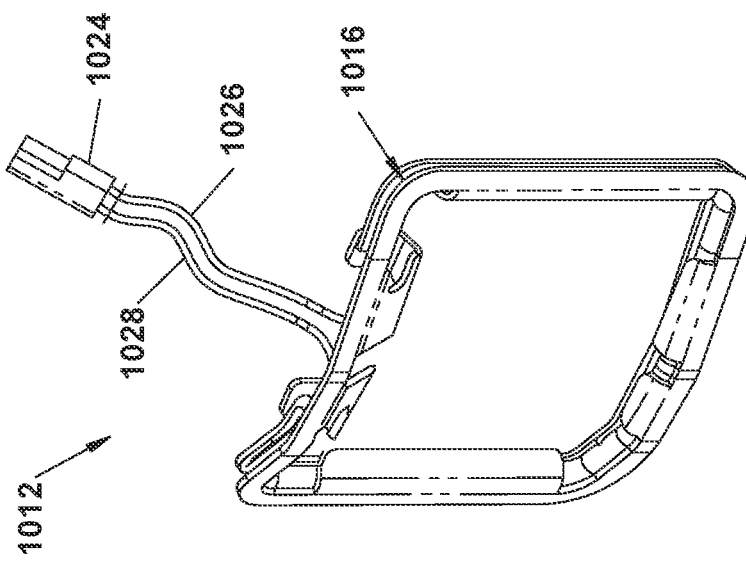

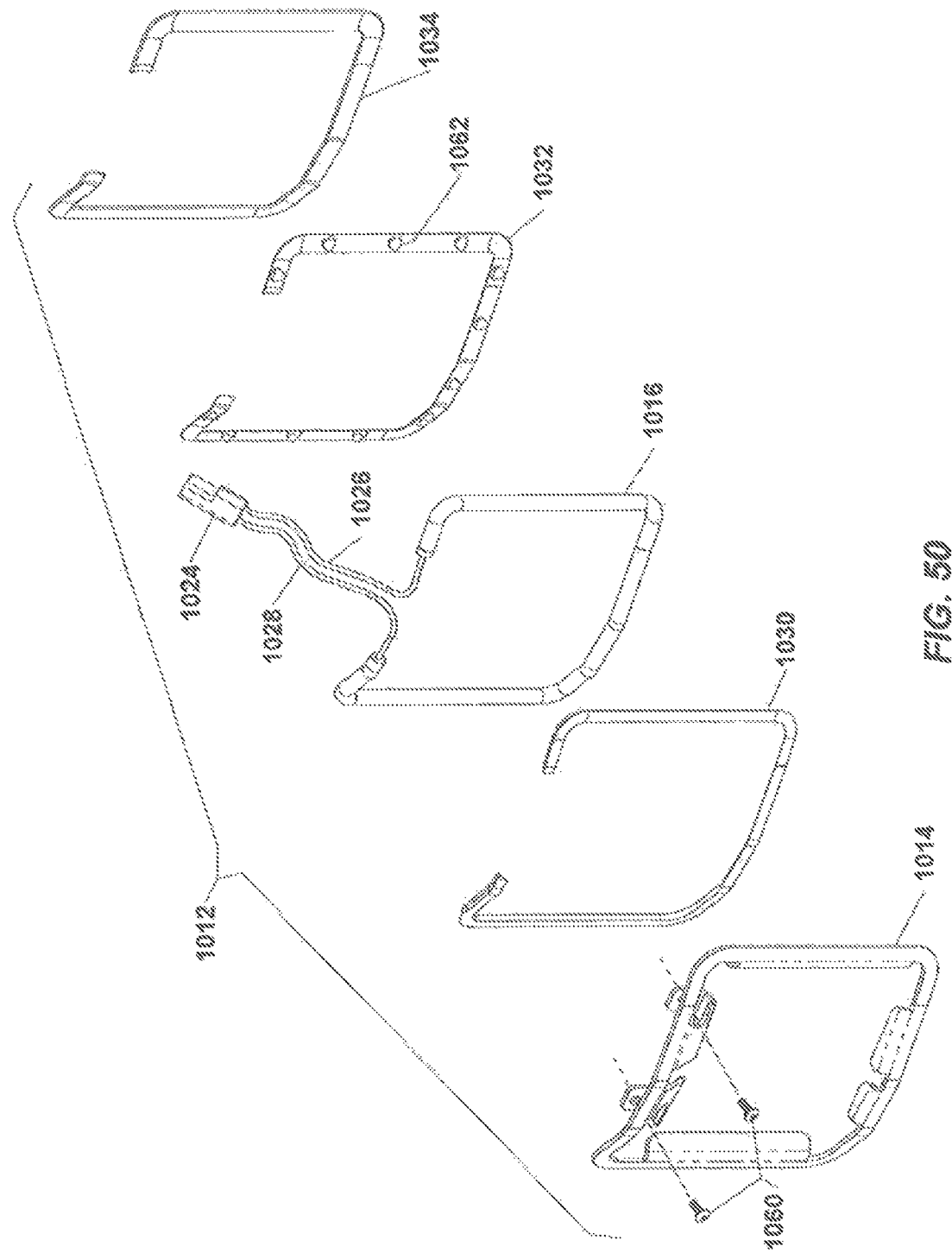

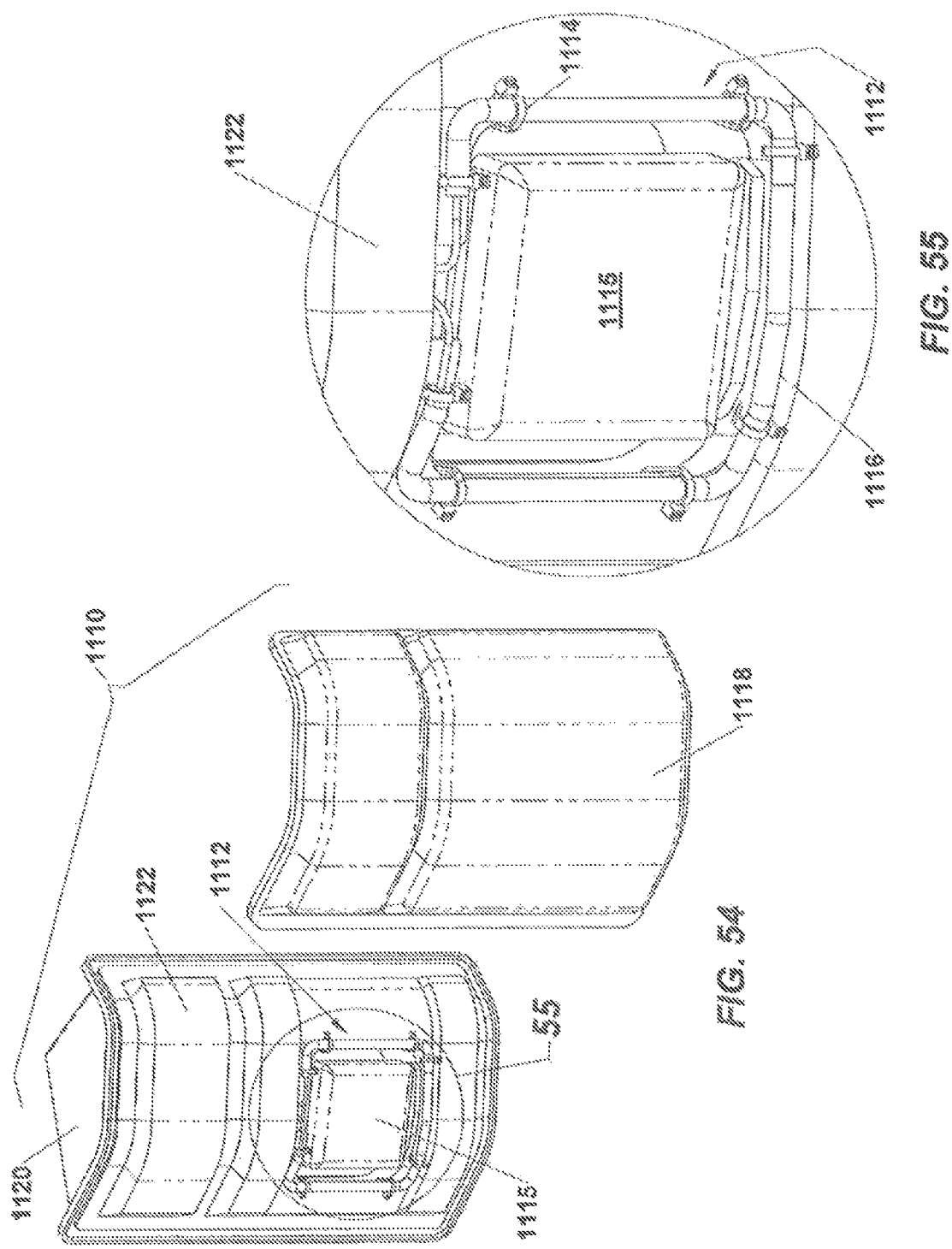

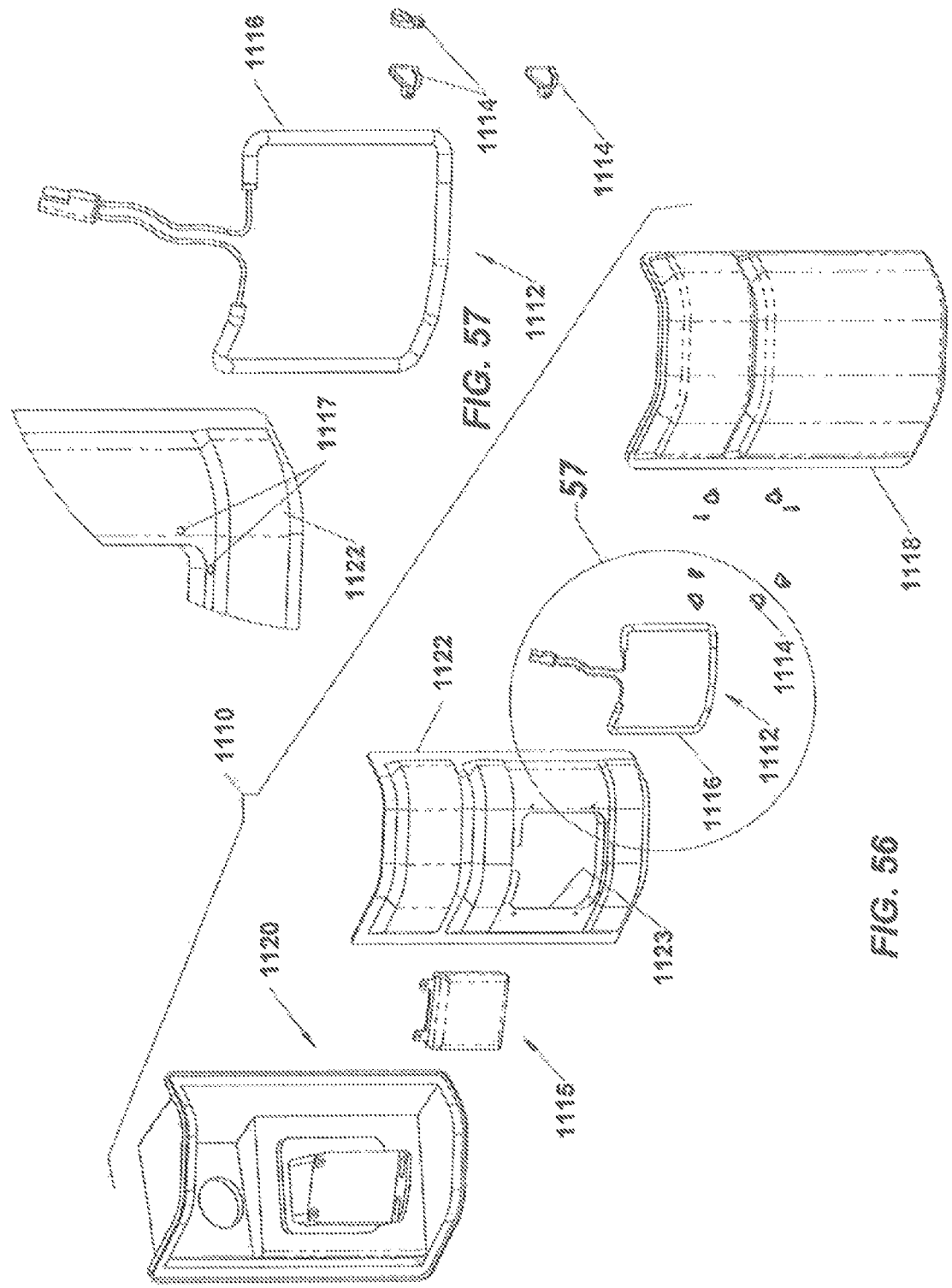

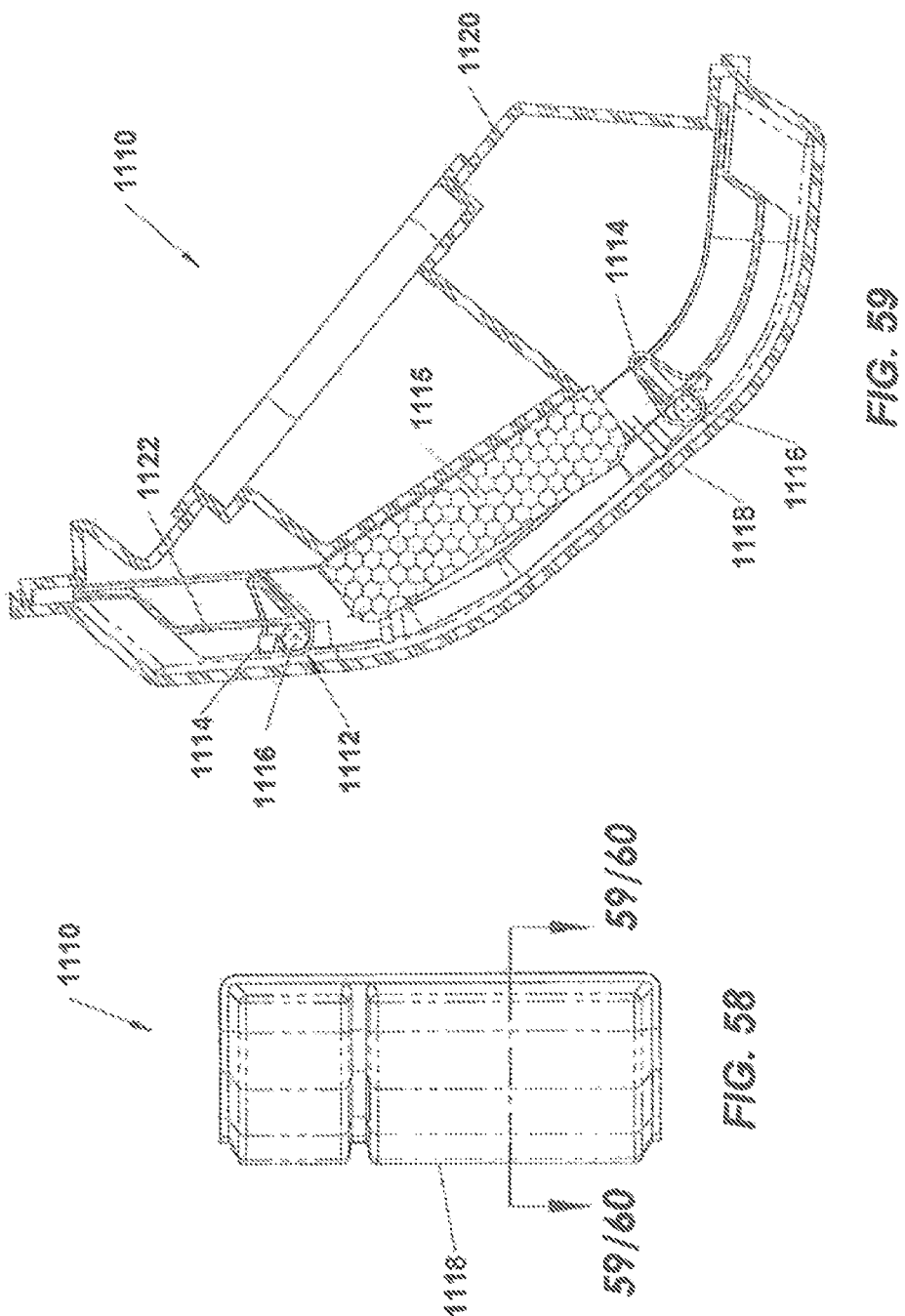

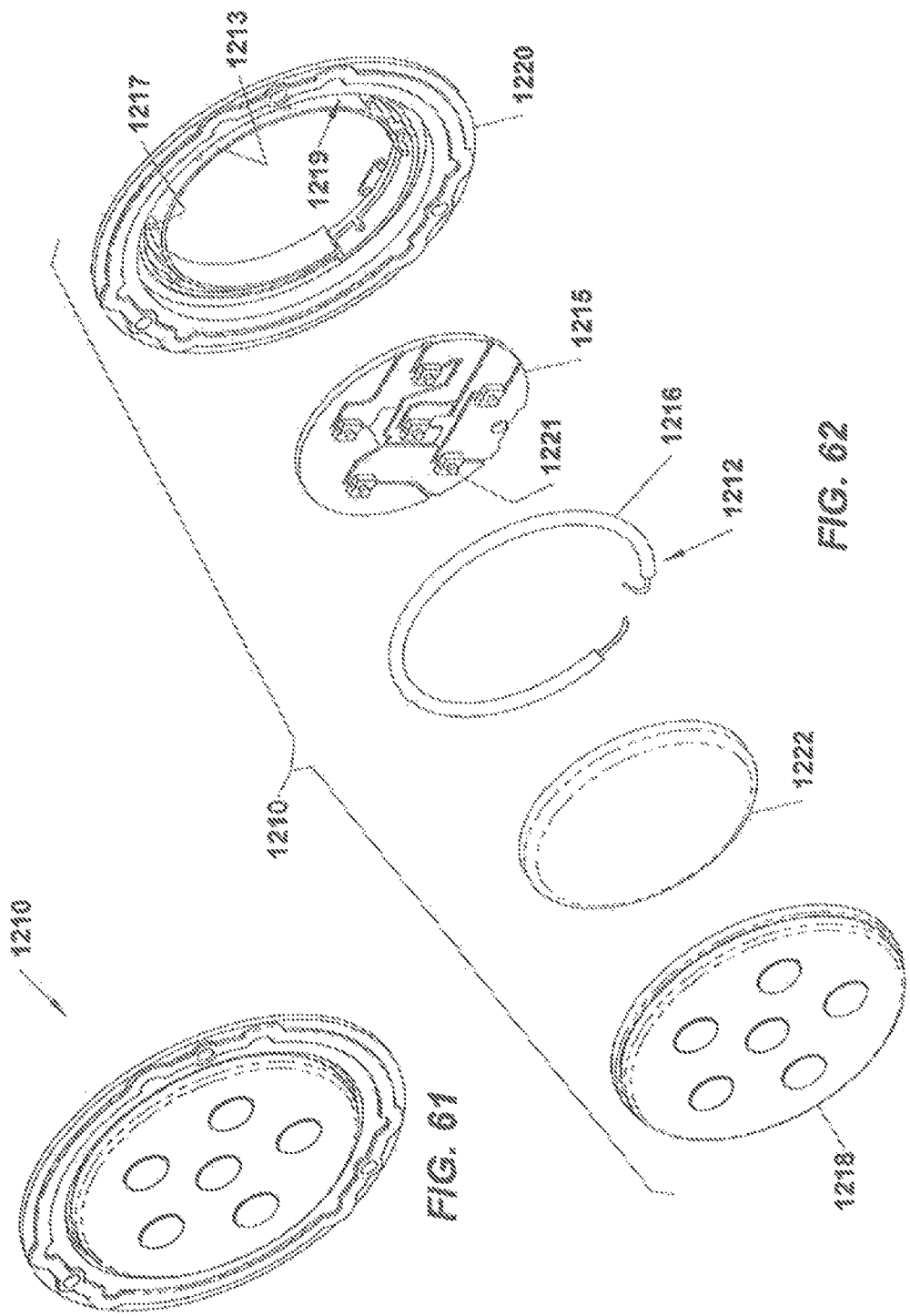

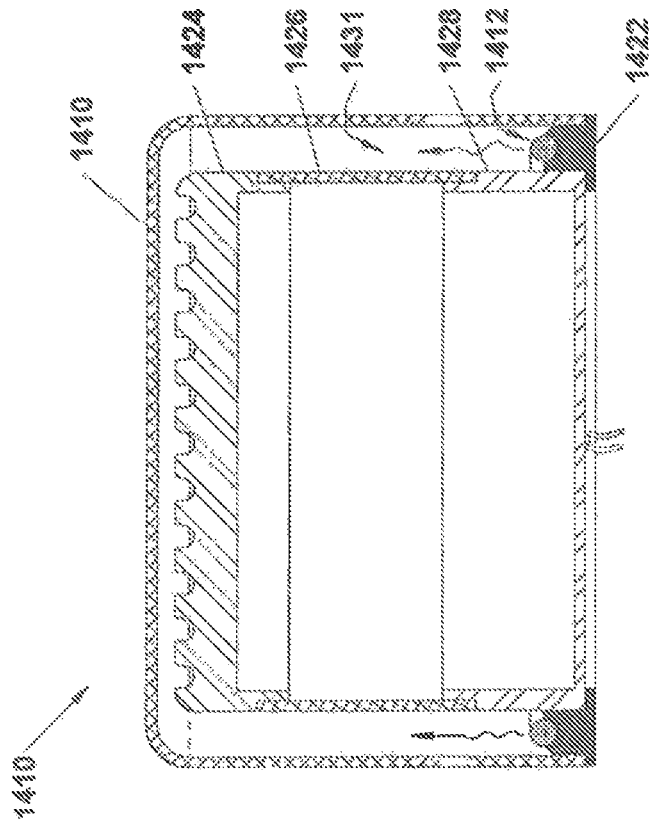
FIG. 70
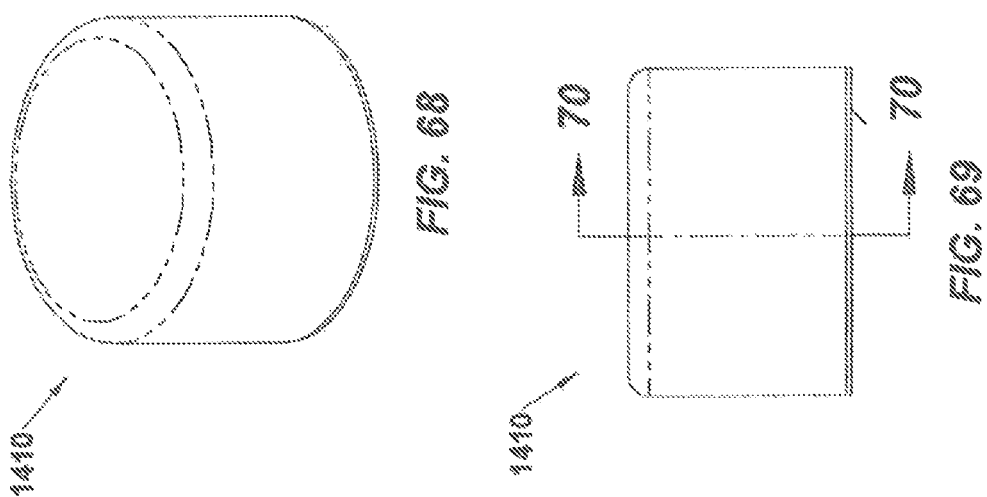
FIG. 68
FIG. 69

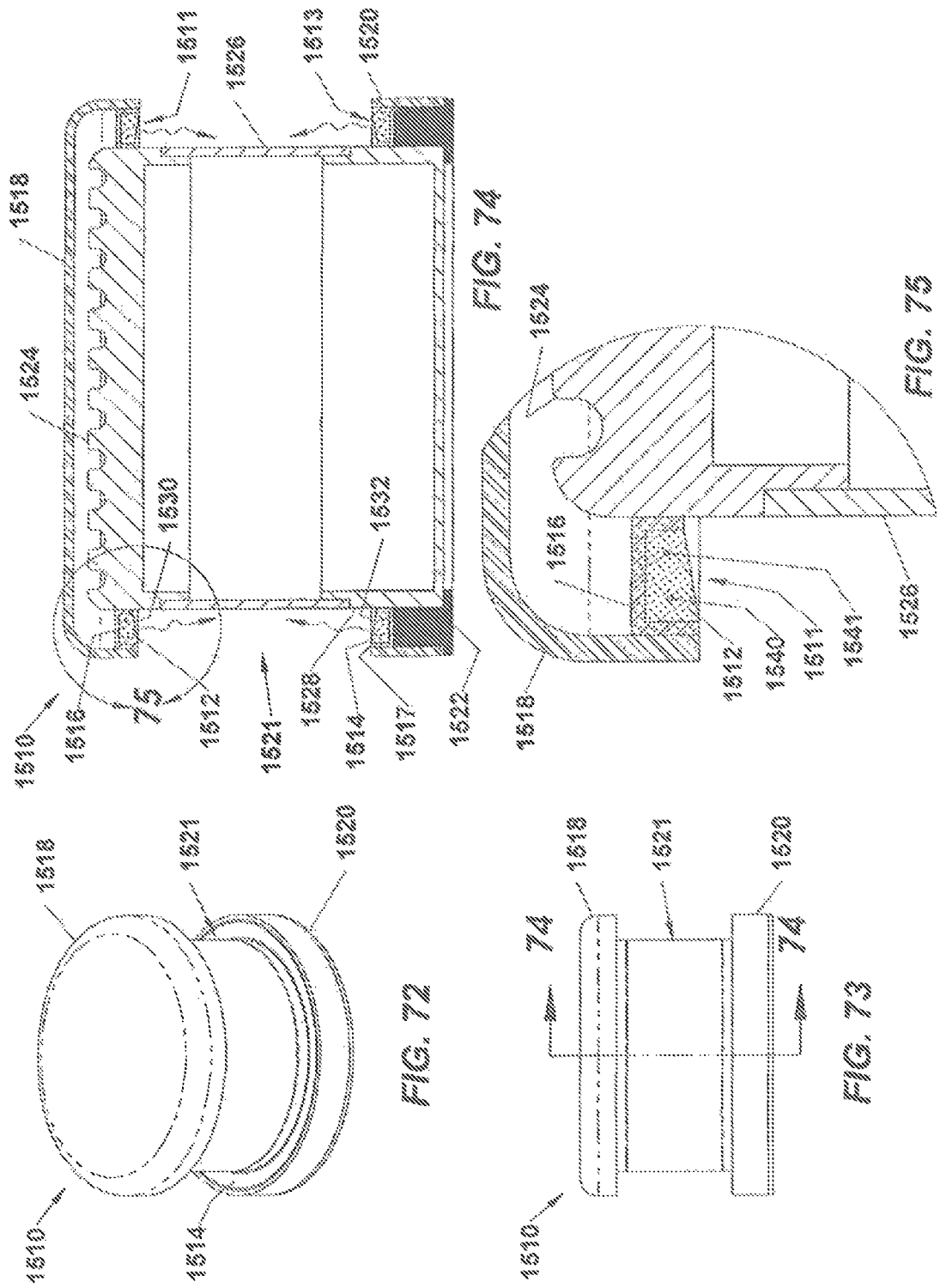

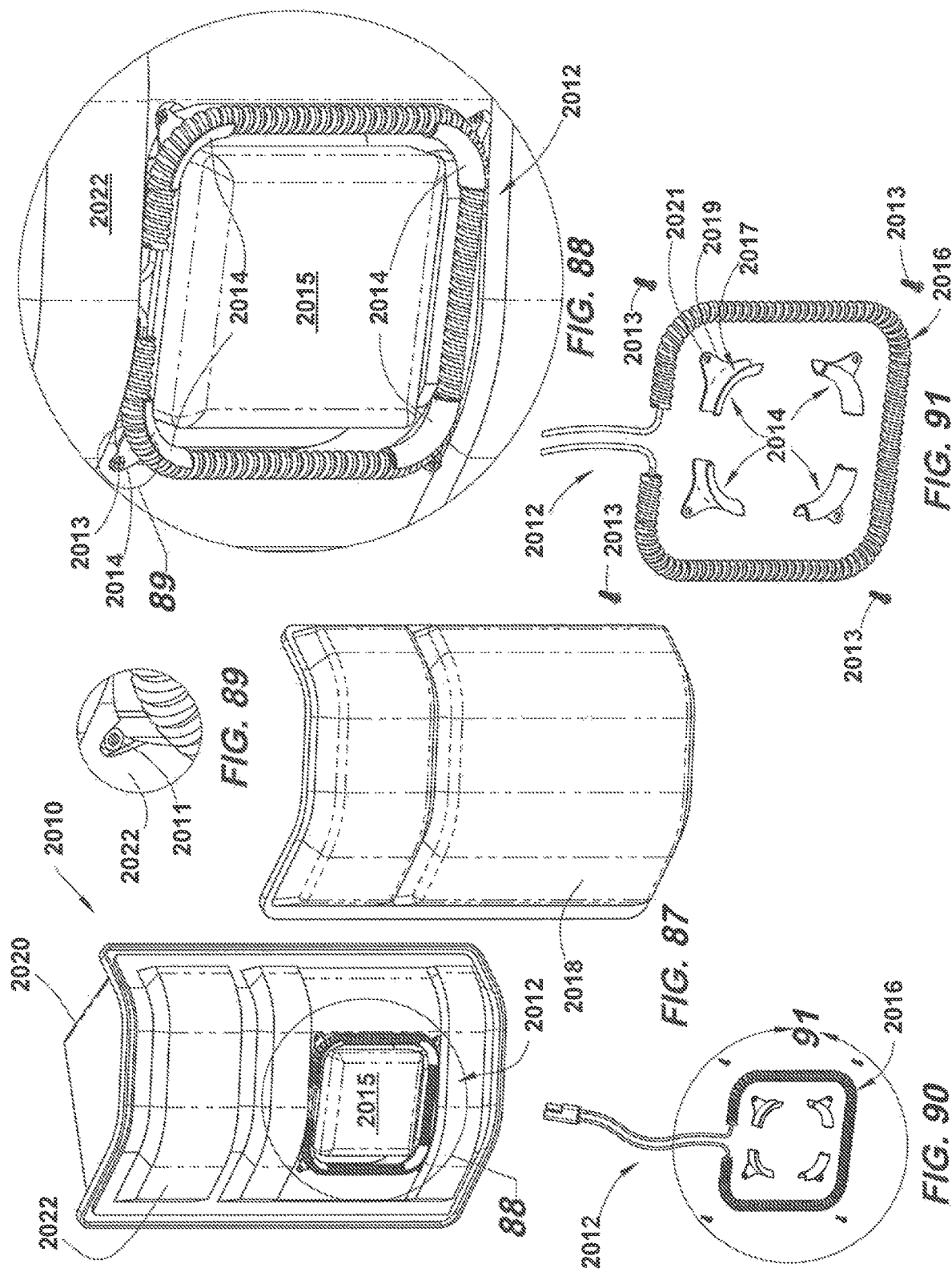

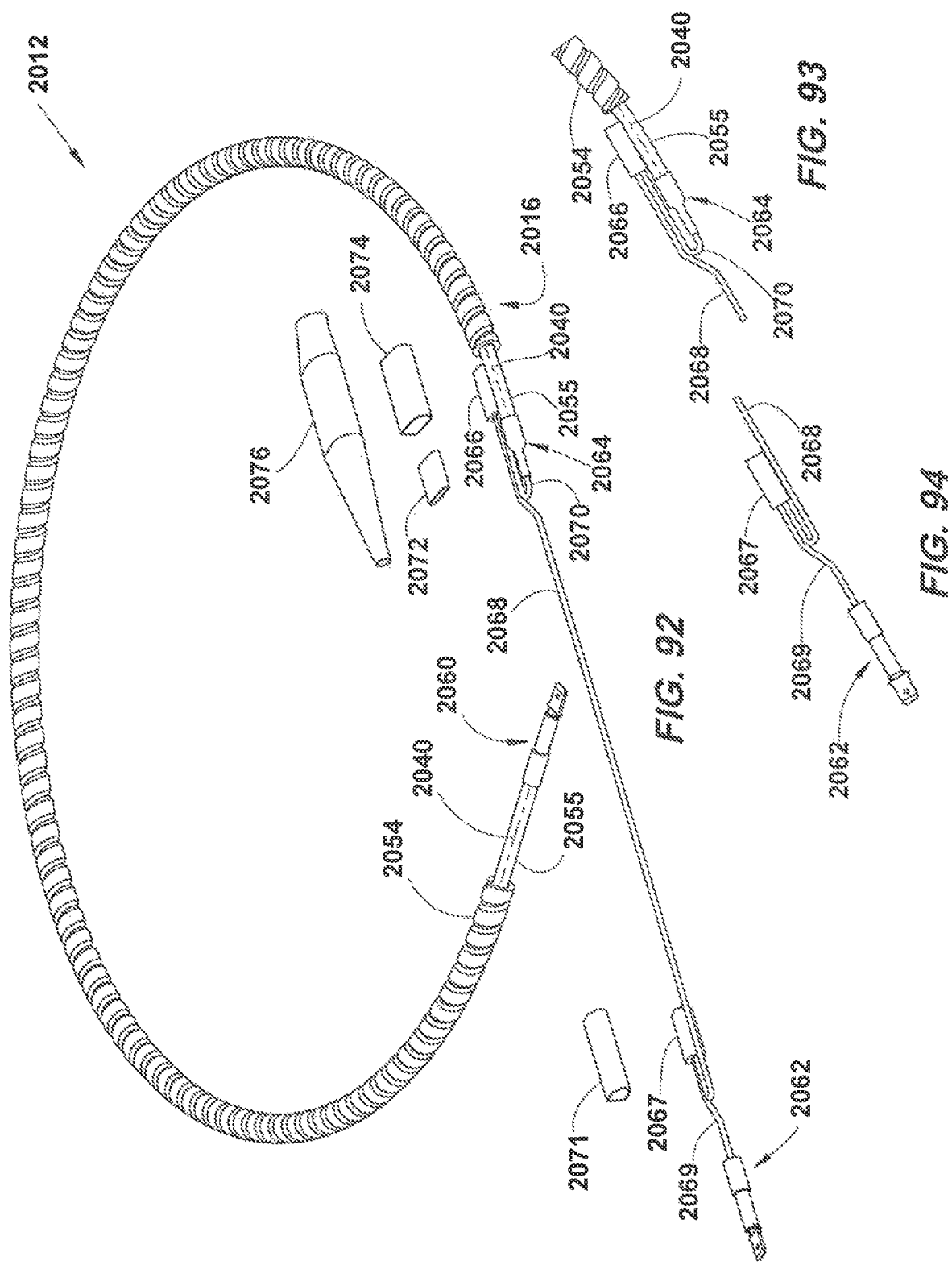

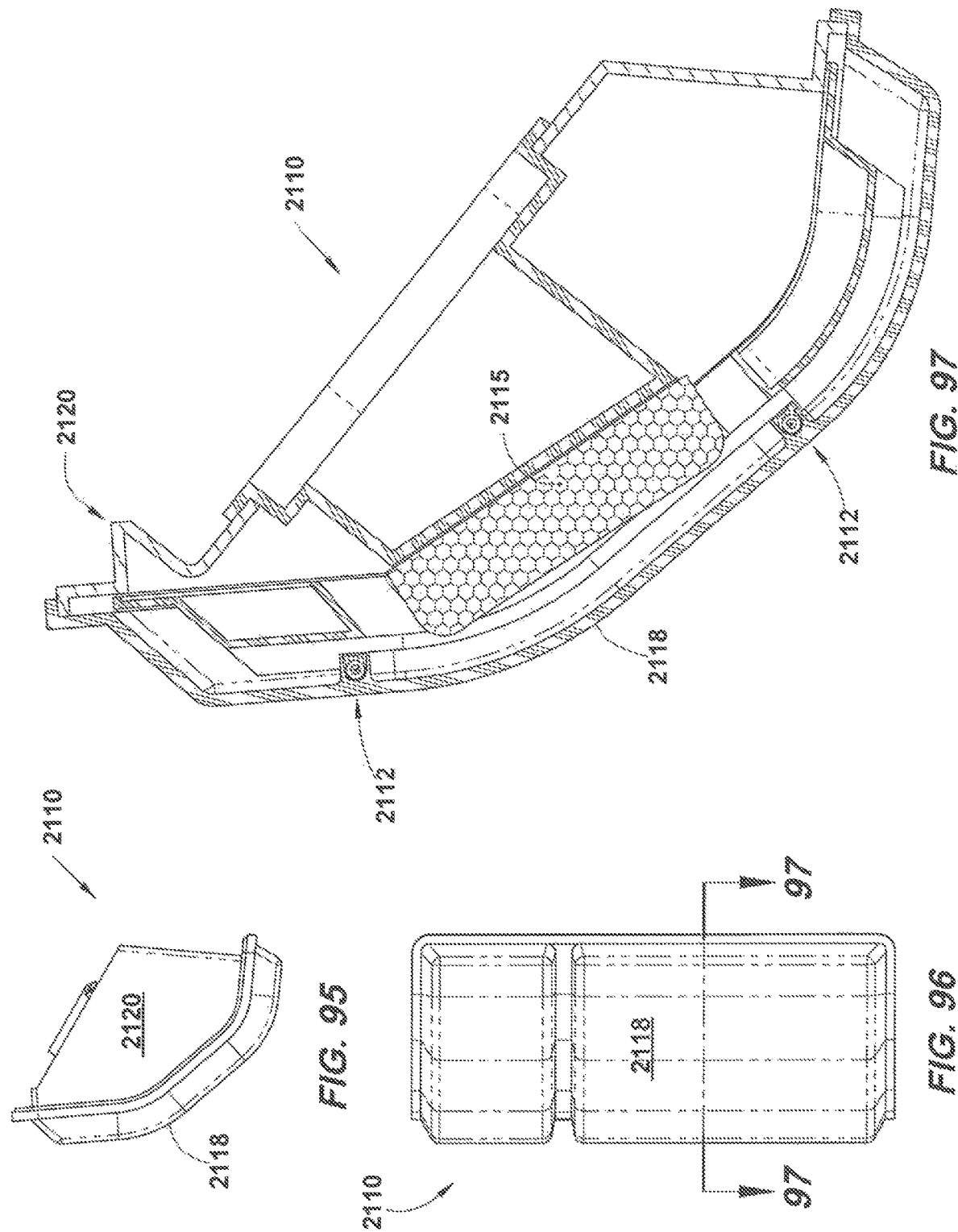

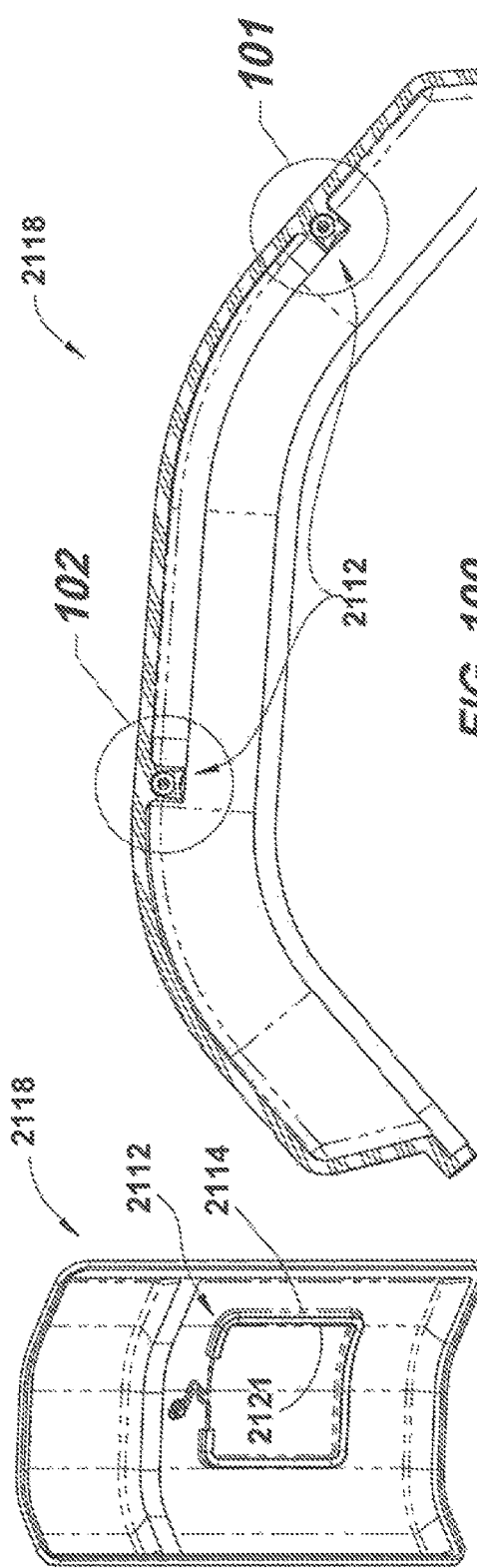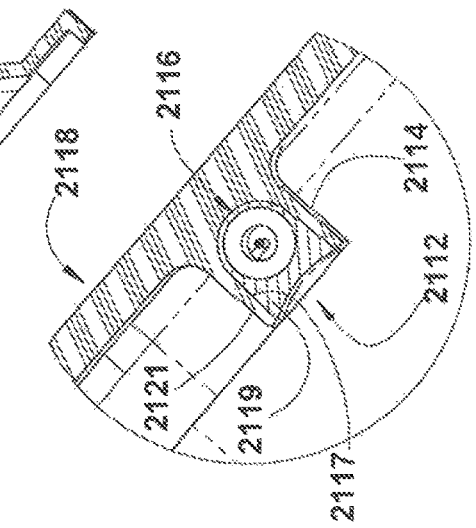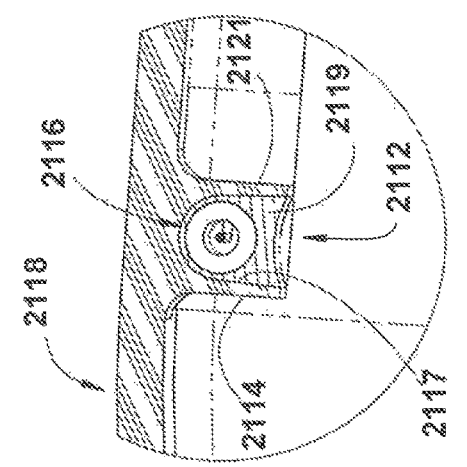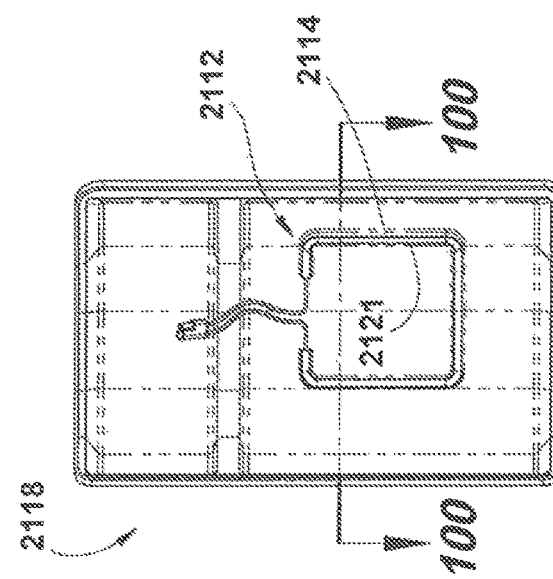

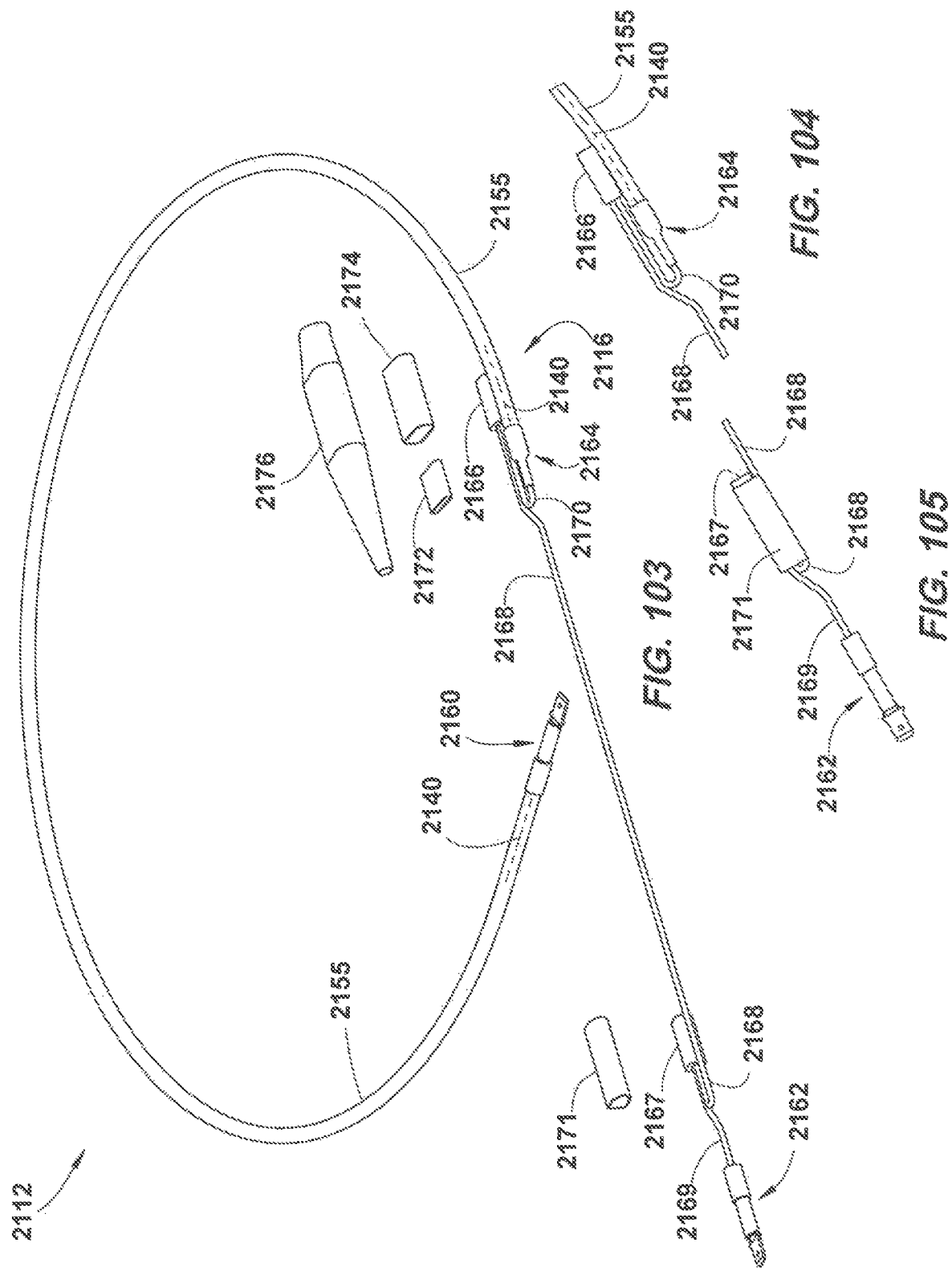

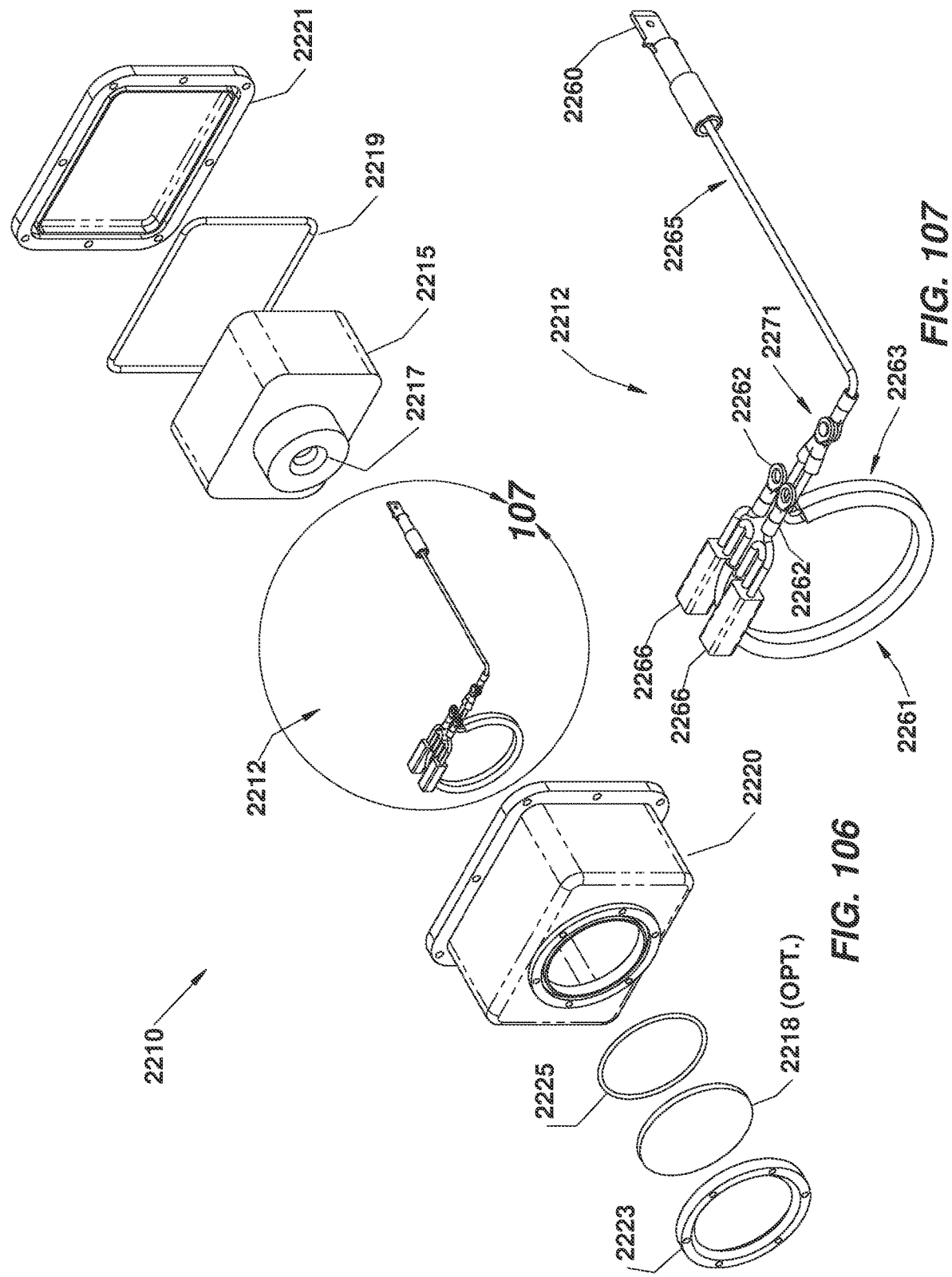

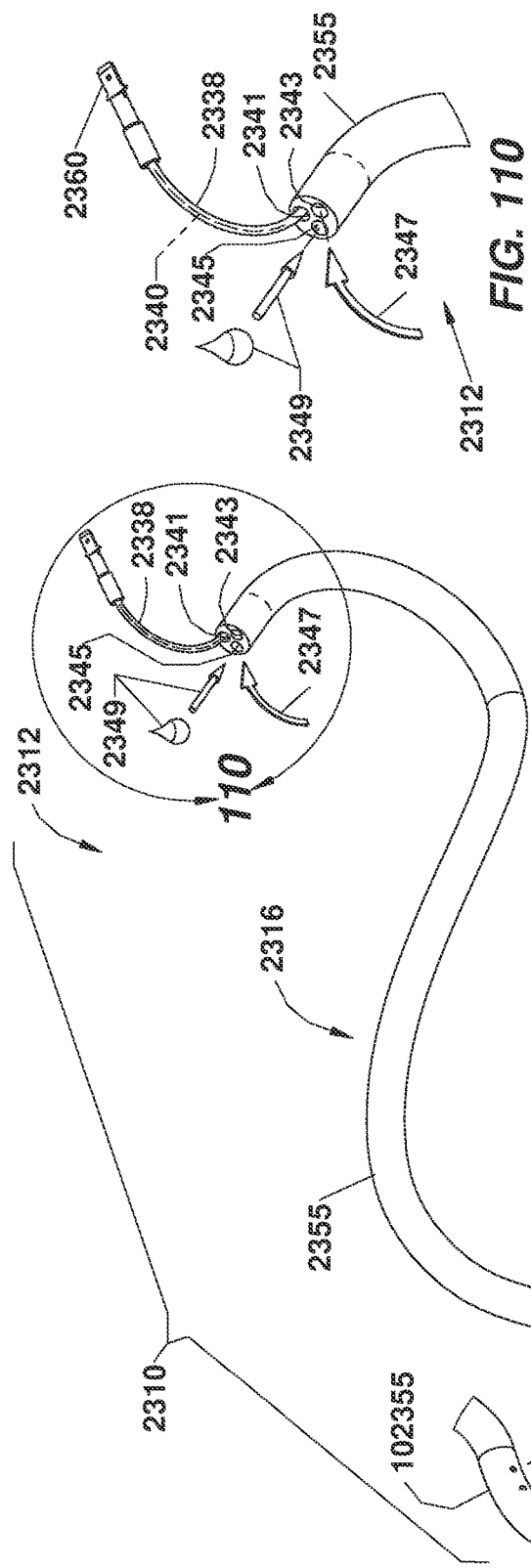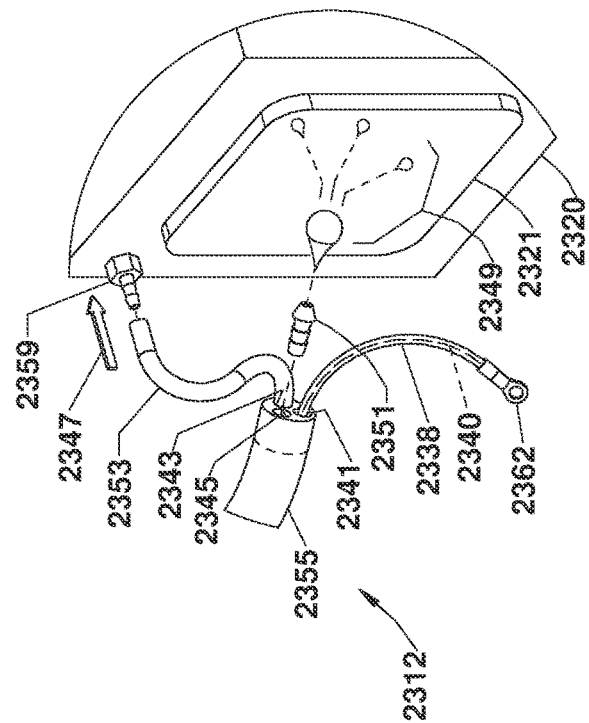
FIG. 109
FIG. 110
FIG. 111

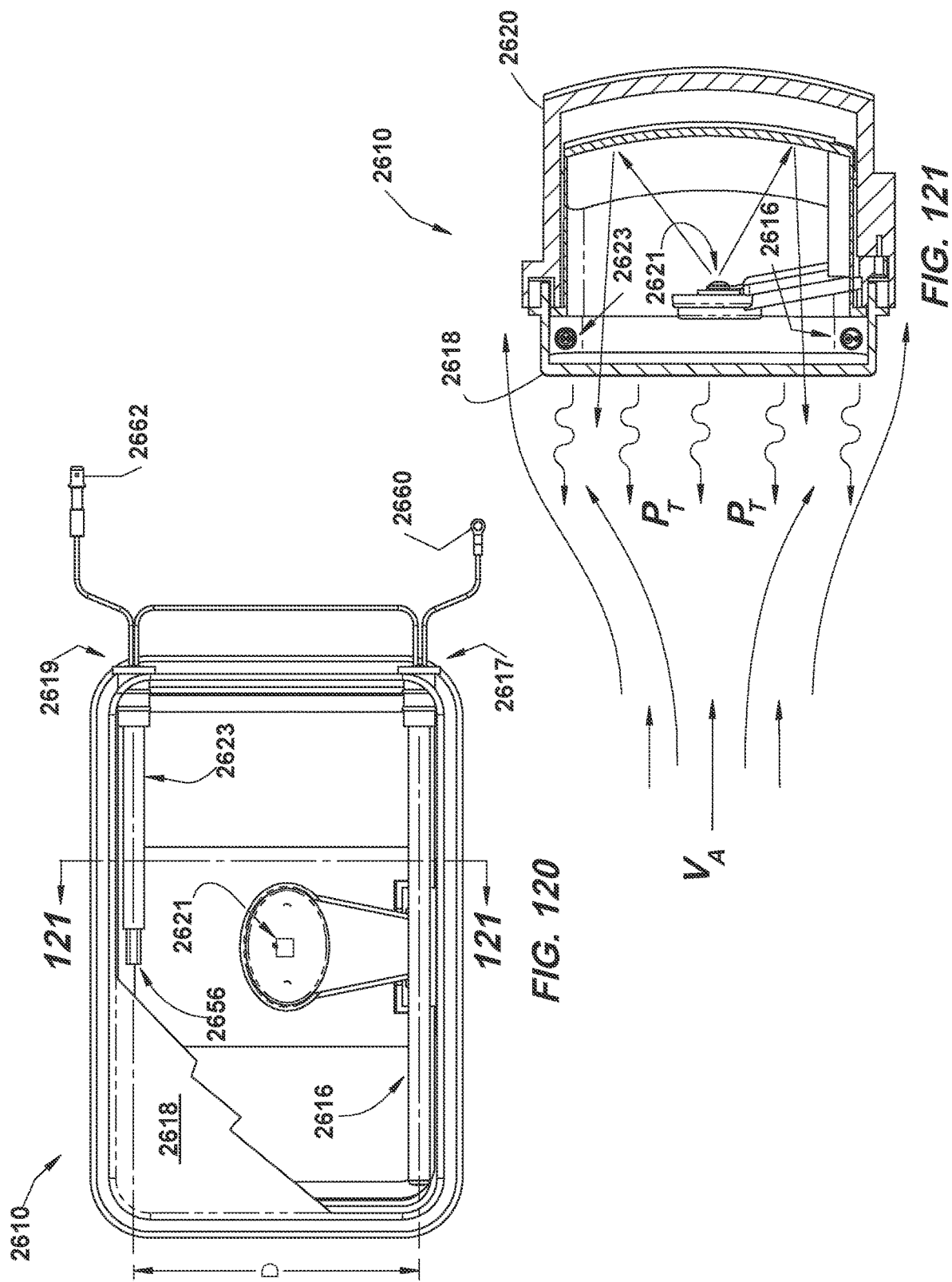

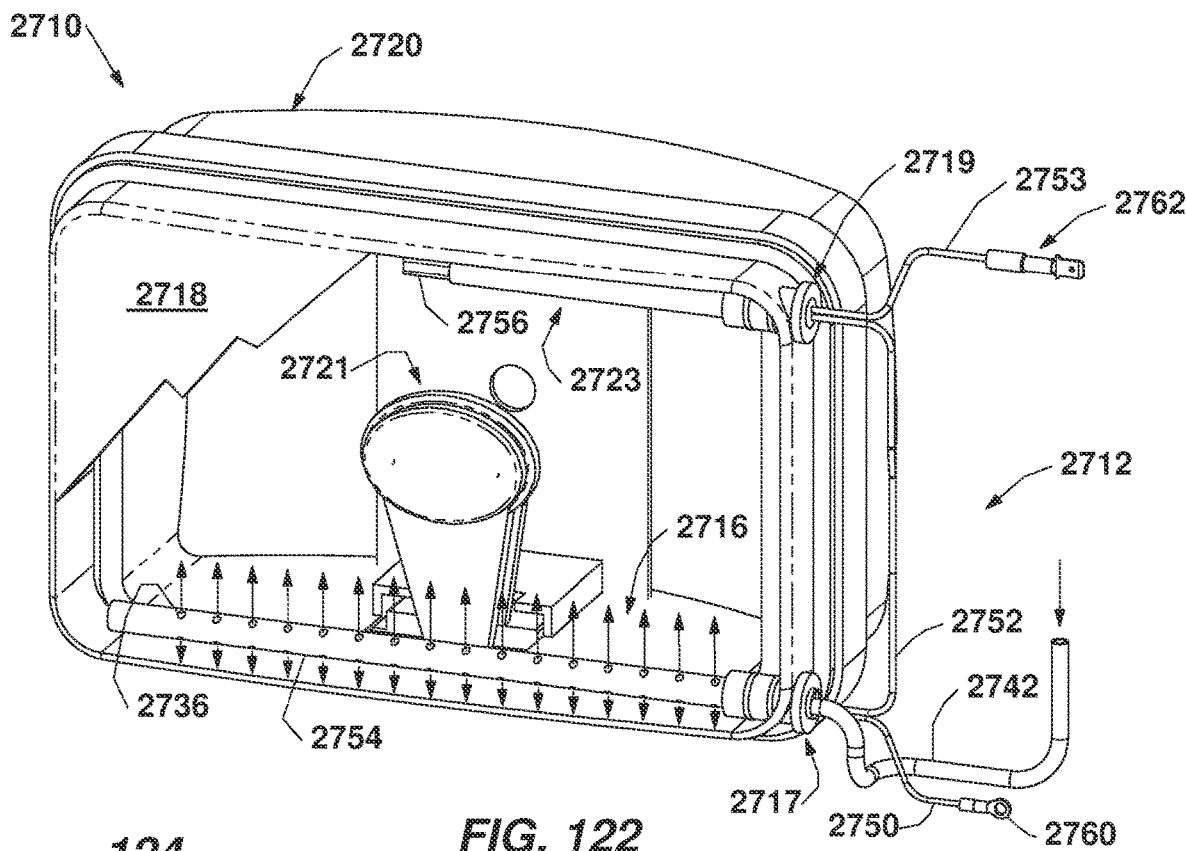
FIG. 122
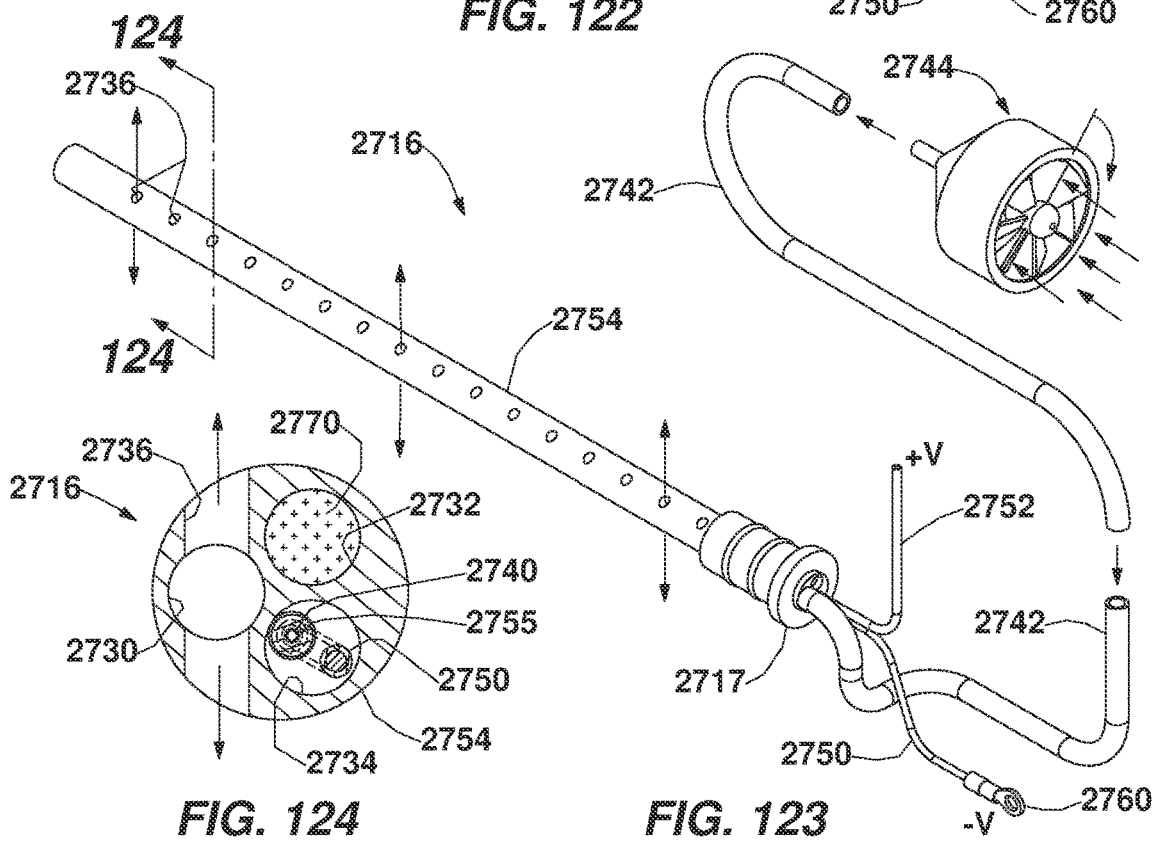
FIG. 124
FIG. 123

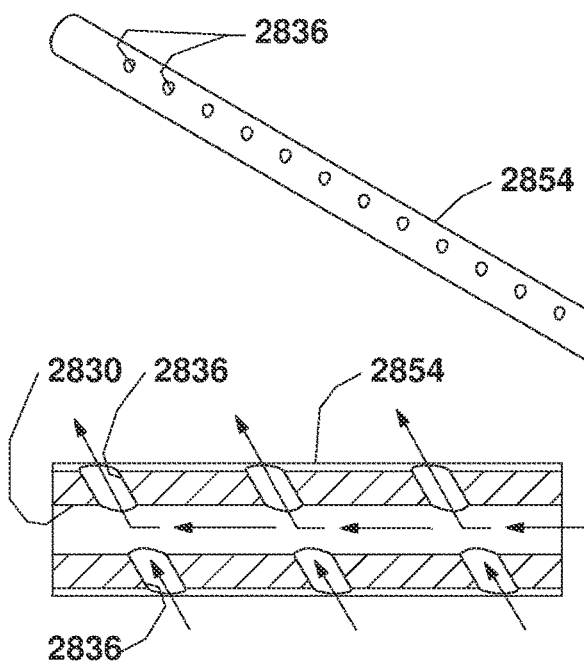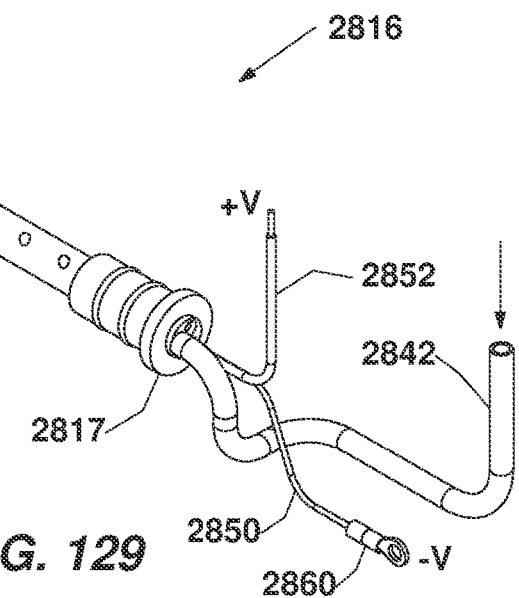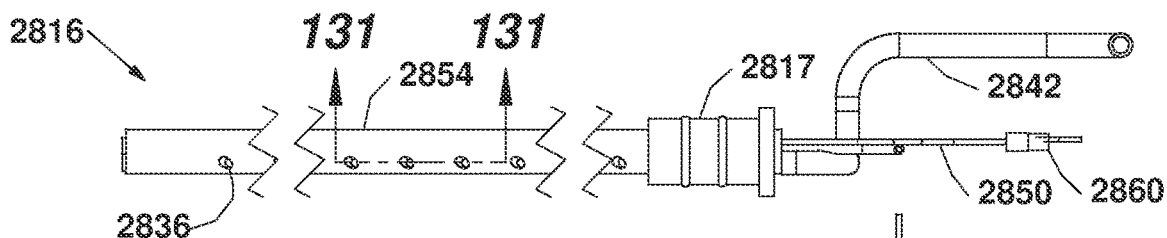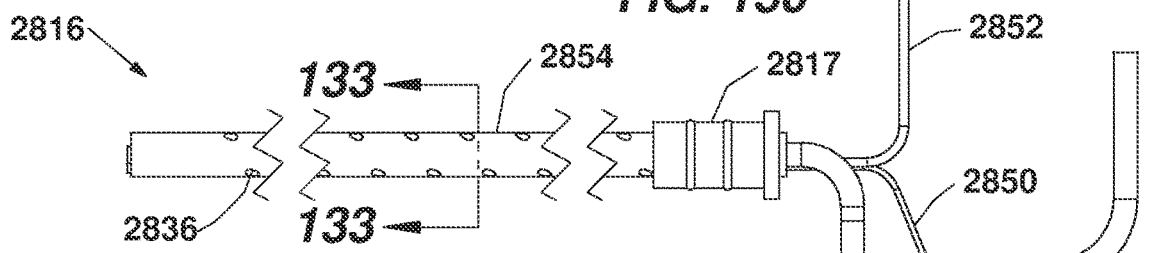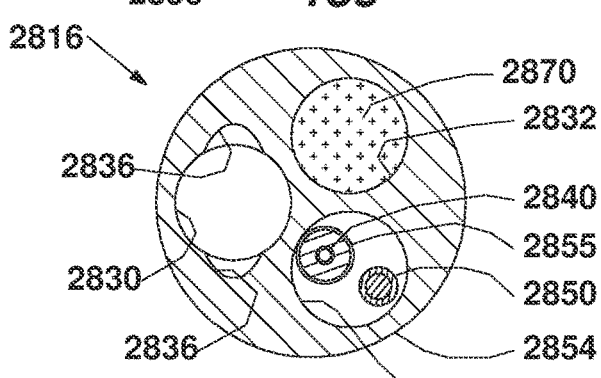
FIG. 131
FIG. 129
FIG. 130
FIG. 132
FIG. 133

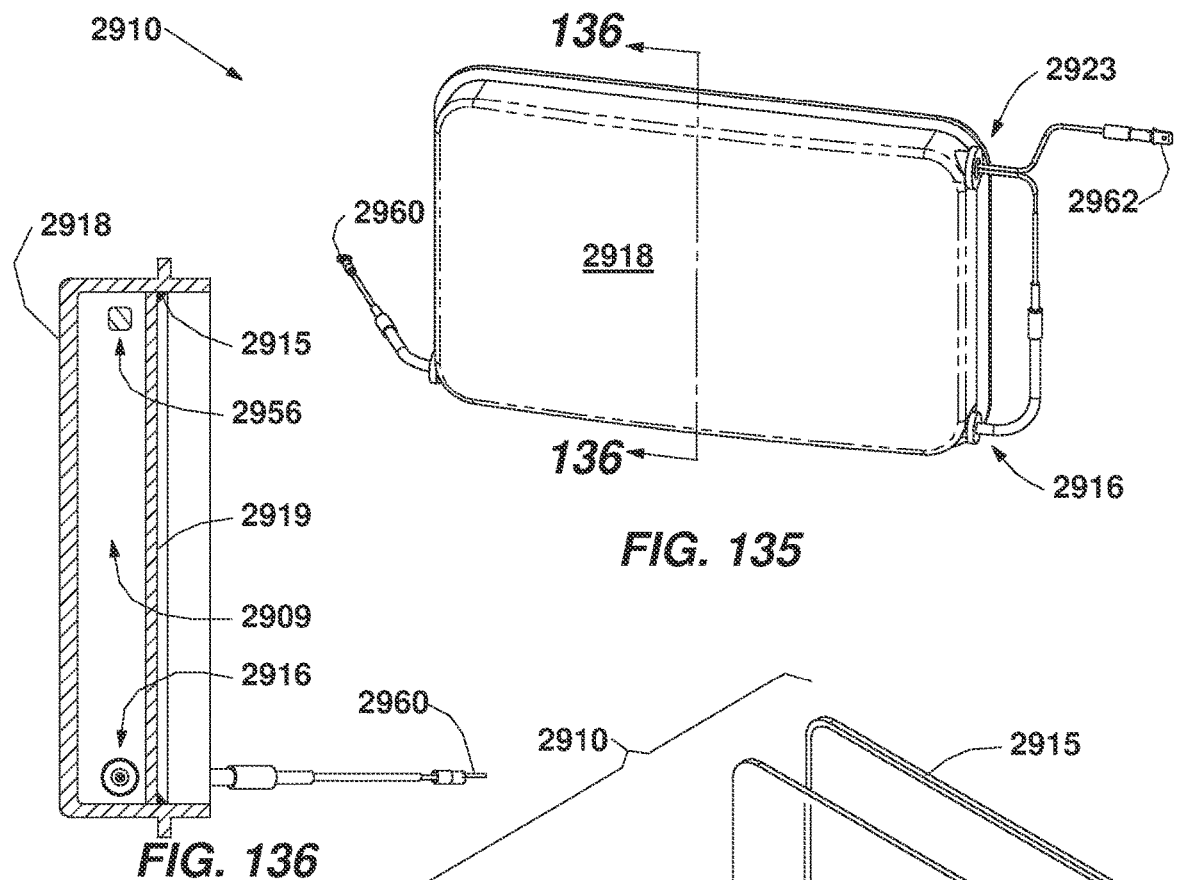
FIG. 135
FIG. 136
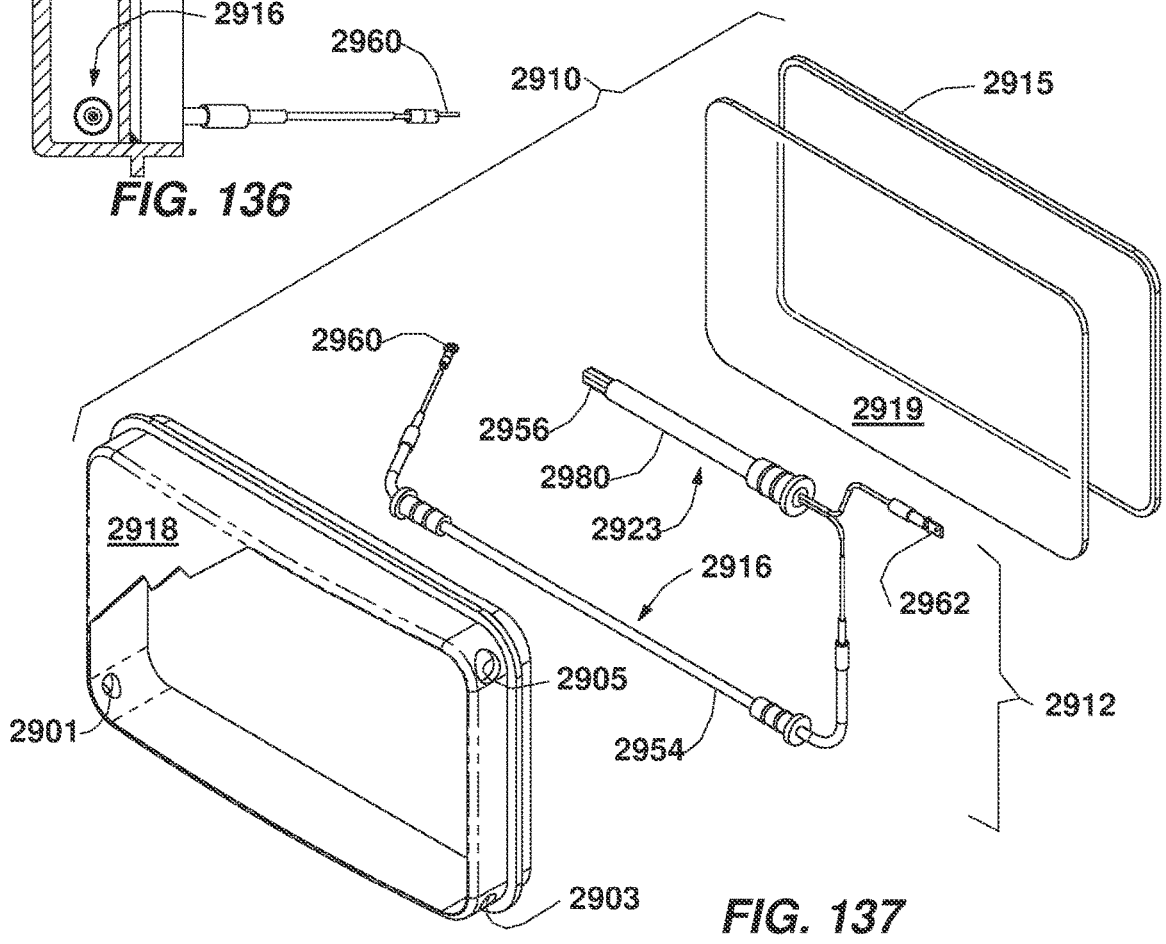
FIG. 137

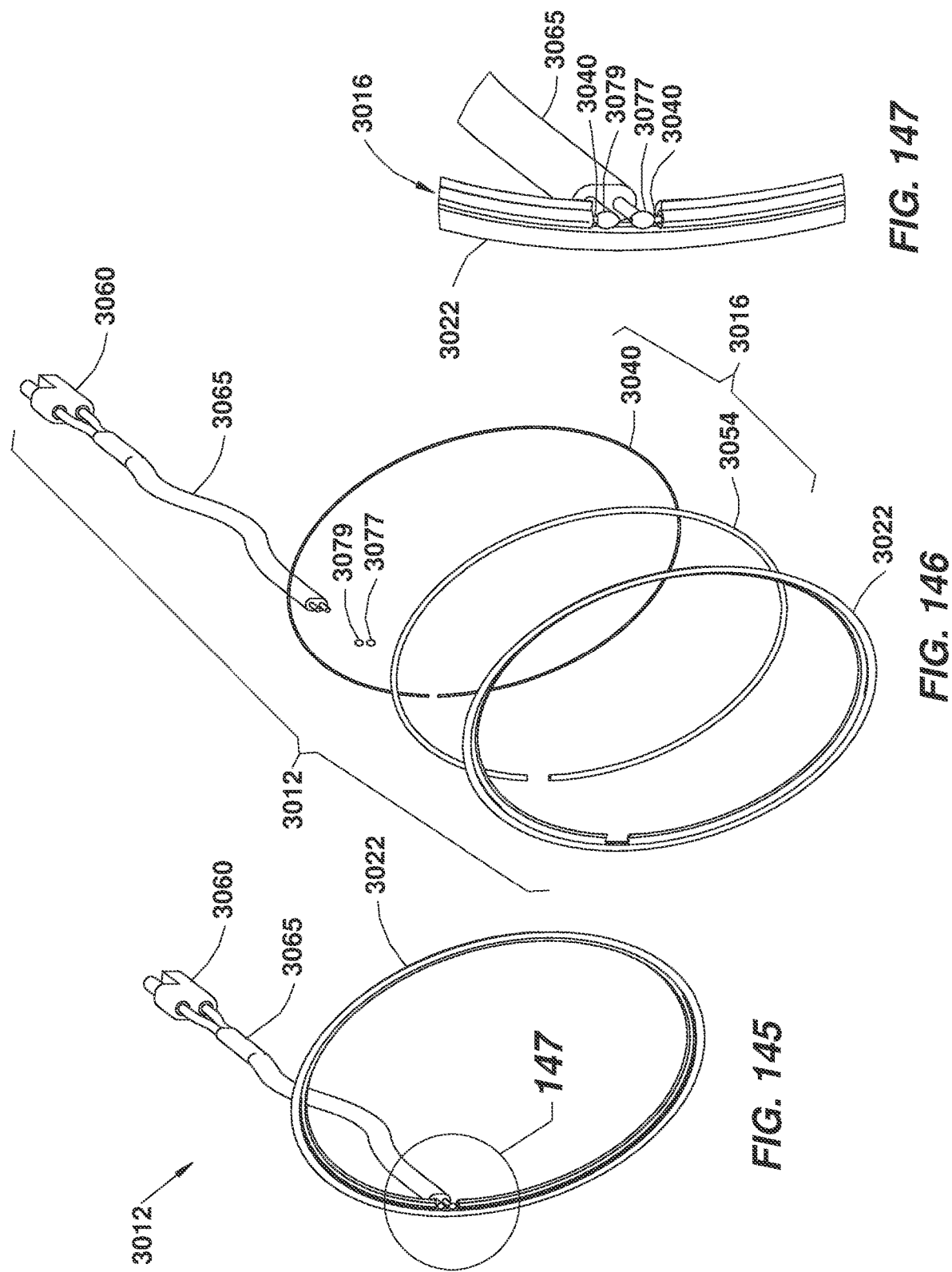

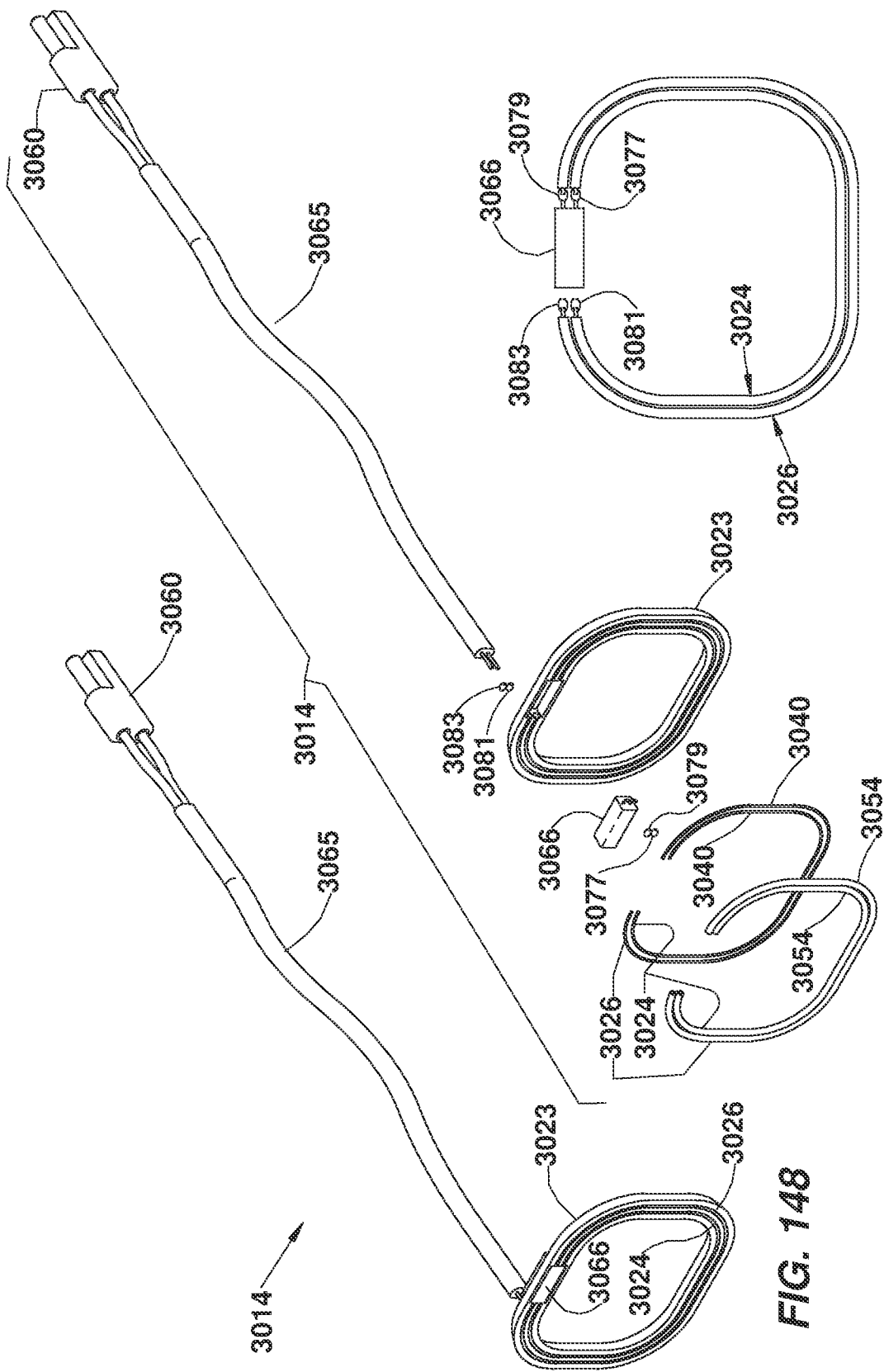

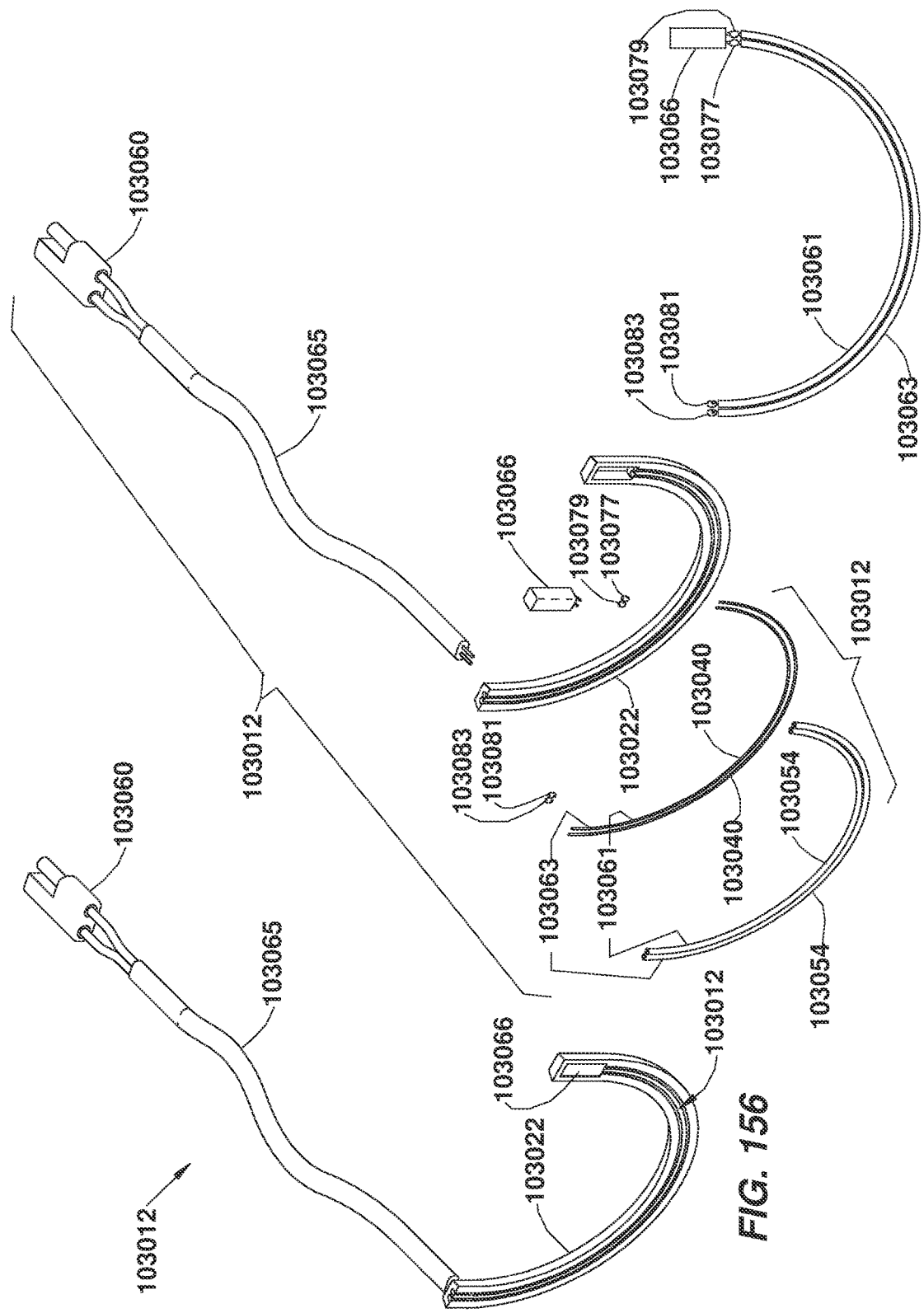

OPTICAL FACE PROTECTION APPARATUS AND FACE PROTECTION APPARATUS

CROSS REFERENCE TO RELATED APPLICATIONS

This patent application claims priority to and the benefit of U.S. Provisional Patent Application Ser. No. 62/839,367 filed Apr. 26, 2019, entitled "Electromagnetic Illuminator Heater and Emitter Heater"; U.S. Provisional Patent Application Ser. No. 62/848,480 filed May 15, 2019, entitled "Electromagnetic Illuminator Heater and Emitter Heater"; U.S. Provisional Patent Application Ser. No. 62/849,020 filed May 16, 2019, entitled "Electromagnetic Illuminator Heater and Emitter Heater"; U.S. Provisional Patent Application Ser. No. 62/896,414 filed Sep. 5, 2019, entitled "Electromagnetic Illuminator Heater and Emitter Heater"; U.S. Provisional Patent Application Ser. No. 62/939,509 filed Nov. 22, 2019, entitled "Electromagnetic Illuminator Heater and Emitter Heater"; and U.S. Provisional Patent Application Ser. No. 62/958,625 filed Jan. 8, 2020, entitled "Electromagnetic Illuminator Heater and Emitter Heater", the entirety of each of which is incorporated by reference herein.

TECHNICAL FIELD

This disclosure pertains to heaters for components and systems. More particularly, this disclosure relates to improved heaters, apparatus and methods for providing heat and for melting snow and ice and removing condensation from panels, covers, or lenses of electromagnetic illuminators and illumination assemblies, such as emitters and detectors for autonomous vehicles including radar and Lidar and light assemblies for both mobile and stationary applications, as well as for stationary and mobile applications on structures, and heating air or fluids for medical or other devices.

BACKGROUND OF THE INVENTION

Techniques are known for heating a light transmissive portion, or lens of a vehicle illumination system. One technique involves providing a resistance heating wire on a back surface of a cover element, or lens provided over a vehicle light to generate heat. The recent adoption of light emitting diode (LED) lighting systems, which generate very little heat compared to the historical and long-accepted use of incandescent filament bulb light sources, greatly increases the problem of snow and ice accumulating on the outer lens of such a lighting system, as well as condensate (liquid and frozen solid form) accumulating on the inner lens. Other systems use resistance wires to heat a lens or a window, but such systems intrude on the lens and interfere in electromagnetic wave transmission through the lens. Secondly such wires do not have a large surface area or a large thermal mass which reduces effectiveness in certain applications. Further, such wires are electrically conductive and they must be electrically insulated from contact with any other electrically conductive objects in order to prevent any shock risk. Finally, resistance wire heating elements, such as Nichrome wire, can generate excessive temperatures that might damage or degrade the surrounding local environment, such as melting or degrading integrity of a plastic vehicle lens. This problem is further exacerbated because such wires are typically wound into coils to generate more heat and when such a resistance wire is formed into curves and sharp bends, as the inner radius of the bend generates much higher temperatures due to the construction of such resistive heating wires, such as Nichrome wire. Therefore, there exists a need to mitigate such undesirable high temperature peaks generated by resistance heating wires as heat sources when used in proximity with plastic and lower temperature melting point materials.

Heat transfer solely by convection of the contained atmospheric gas within LED light housings can be slow or insufficient to deliver heat to the light transmissive portion, or lens to adequately and/or efficiently prevent or remove condensation, both frozen and liquid, that is otherwise occluding the lens. When the occlusion of any light transmissive vehicle lens does occur, a variety of potential and ongoing safety compromises and concerns may readily arise with any vehicle. This can significantly increase the likelihood of serious accidents, which can endanger the well-being and lives of countless numbers of people. Furthermore, this can create an increased risk to vehicles and property of all kinds. Accordingly, further improvements are needed to better prevent removal of ice, snow and condensation and effectively enable removal of ice, snow and condensation from lenses of lights and vehicle illumination systems. This is especially important because of the recent and rapid adoption of LED light sources among nearly all types of vehicles which tend to not generate much heat during light production compared to traditional incandescent lights. A similar problem is found when incorporating radar and LIDAR into autonomous vehicles as the emitters and detectors can be negatively affected by such ice, snow and condensation.

SUMMARY OF THE INVENTION

A heater is provided for rendering an electromagnetic wave transmission portion of a housing or assembly to be capable of transmitting electromagnetic waves even when condensate, moisture, ice, snow and frost can interfere with transmission of electromagnetic waves from an emitter, or transmitter through the electromagnetic wave transmission portion outside of the housing or assembly and also to a detector. Such heater electrically insulates the heater from external objects and has a large thermal mass and a large heat exchange outer surface over that provided merely by a resistance heater wire. In one case the electromagnetic wave transmission portion is a lens, an another is a radar housing cover, in yet another it is a laser lens. By heating the electromagnetic wave transmission portion, accumulation of snow, ice, or vapor is mitigated or eliminated from a surface of the portion, thereby enabling electromagnetic waves to transmit through the portion. Applications include lamps and bulbs on conveyance devices, radar systems and housings, LIDAR systems and housings, and can including applications on vehicles, boats, planes, and trains, as well as sedentary structures, such as lamp posts, street lights, railroad crossing markers and lights, and airport ground and runway lighting systems.

Tubular heaters provided a circuitous or elongate path of heater tube/rod that delivers either an open or a closed elongate structure. Electrically conductive wire is electrically insulated by encapsulation in electrically insulated, thermally transmissive material. An outer tube combined with an inner material provides large thermal mass with large outer surface area (radiation surface/conduction surface/convection surface) compared to small, thin wire. Tube heaters are readily shaped to encompass real estate within light, radar, and Lidar housings having complex geometries. Such designs often require many discrete heaters to properly mitigate condensate occlusion of a lens. Compound housings have many individual chambers each with a dedicated light or sensor. In extreme cases, elongate housings cover entire rear sections of vehicles. and such elongate heater tubes distribute heat deliver over a large area.

According to one aspect, an electromagnetic illuminator heater is provided having a heat generating wire and an elongate encasement of thermally transmissive, temperature mitigating, and electrically insulative material. The material encompasses the elongate heating wire.

According to another aspect, a heater is provided having a resistive elongate heating element and a thermally transmissive, peak temperature mitigating, and electrically insulative material. The material encompasses the resistive elongate heating element.

According to even another aspect, an electromagnetic illuminator heater is provided having an elongate heating element and a tubular encasement. The elongate tubular encasement envelopes the elongate heating element imparted with structural integrity sufficient to retain the element in a desired geometry.

According to another aspect, an electromagnetic illuminator heater is provided having a circuit of heat generating resistance wire and an outer elongate encasement. The outer elongate encasement of thermally transmissive and electrically insulative material encompasses the elongate heating wire and is configured in a geometry that substantially follows an outer periphery of an electromagnetic wave transmissible portion of one of an electromagnetic emitter and a detector and substantially circumscribes one of the electromagnetic emitter and the electromagnetic detector.

According to yet another aspect, an electromagnetic illuminator heater is provided having a wire-form heating element, a flexible tubular containment, and a thermally conductive and electrically insulative resin. The flexible tubular containment envelopes the wire-form heating element. The thermally conductive and electrically insulative resin is interposed within the tubular containment and is configured to retain the tubular containment into a desired geometric shape when the resin is cured.

According to yet even another aspect, an electromagnetic illuminator heater assembly is provided having a housing, a wall portion, and an elongate tubular heater. The housing includes an electromagnetic wave transmission portion forming an enclosure configured to contain an electromagnetic wave source. The wall portion is associated with the housing. The elongate tubular heater has a wire-form heating element, a flexible tubular containment enveloping the wire-form heating element, and a resin infused liquid material interposed within the tubular containment while the tubular containment is provided in a desired geometric shape and cured to retain the desired geometric shape.

BRIEF DESCRIPTION OF THE DRAWINGS

Preferred embodiments of the disclosure are described below with reference to the following accompanying drawings.

FIG. 1 is a partial perspective view from above of a passenger vehicle having an electromagnetic illuminator in the form of a headlight assembly with an elongate heating element.

FIG. 2 is an enlarged perspective view from above and outboard of the headlight assembly and elongate heating element of FIG. 1 with lens removed.

FIG. 3 is another enlarged perspective view from above and inboard of the heated headlight assembly of FIG. 2 with the lens removed.

FIG. 5 is a simplified partial phantom and perspective view of the housing for the light assembly of FIG. 4.

FIG. 6 is an enlarged perspective view of one exemplary support clip for affixing an elongate heater to the light assembly housing of FIG. 5.

FIG. 7 is a perspective view of an elongate heating element shown in a linear form, but capable of being formed into any desired three-dimensional shape.

FIG. 8 is a left end view of the elongate heating element of FIG. 7.

FIG. 9 is a vertical centerline sectional view of the elongate heating element taken along line 9-9 of FIG. 8.

FIG. 10 is a perspective view of an alternate elongate heating element shown in a linear form, but capable of being formed into any desired three-dimensional shape.

FIG. 11 is a left end view of the elongate heating element of FIG. 10.

FIG. 12 is a vertical centerline sectional view of the elongate heating element taken along line 12-12 of FIG. 11.

FIG. 13 is a perspective view of another alternate elongate heating element shown in a linear form, but capable of being formed into any desired three-dimensional shape.

FIG. 14 is a left end view of the elongate heating element of FIG. 13.

FIG. 15 is a vertical centerline sectional view of the elongate heating element taken along line 15-15 of FIG. 14.

FIG. 16 is a perspective view of another alternate elongate heating element shown in a linear form, but capable of being formed into any desired three-dimensional shape.

FIG. 17 is a left end view of the elongate heating element of FIG. 16.

FIG. 18 is a vertical centerline sectional view of the elongate heating element taken along line 18-18 of FIG. 17.

FIG. 23 is a schematic circuit diagram illustrating one exemplary implementation of power control circuitry for delivering electrical power to an elongate heating element.

FIG. 24 is a schematic circuit diagram illustrating another exemplary implementation of power control circuitry for delivering electrical power to an elongate heating element and including an npn power transistor.

FIG. 25 is a simplified vertical centerline sectional view of one technique for producing an elongate heating element having a centered heat generating wire carried centrally of an elongate thermally conductive body, or tube according to a first step where a central heating wire and forming tube are placed in tension to coaxially align the heating wire within the outer tube when injecting and forming the elongate heating tube element.

FIG. 26 is a second step for shaping the elongate heating element of FIG. 25 by forming a first right angle bend prior to complete curing of the injected thermally conductive material.

FIG. 27 is a second step for shaping the elongate heating element of FIG. 26 showing the forming of a second right angle bend prior to complete curing of the injected thermally conductive material.

FIG. 28 is a third step for shaping the elongate heating element of FIG. 26 showing the forming of a third right angle bend prior to complete curing of the injected thermally conductive material and resulting in a square elongate heating element.

FIG. 30 is a simplified perspective view of yet another tubular wall coating technique and apparatus for producing an elongate heating element having a centered heat generating wire carried centrally of an elongate thermally conductive body, or tube according to a two-step process where an inner flowable and curable thermally conductive material is injected and oscillated to coaxially coat an inner surface of an outer tube and a heating wire is subsequently (after curing) inserted into the resulting bore after which additional thermally conductive, flowable and curable material is injected within the bore to affix the heating wire therein in thermally conductive relation.

FIG. 31 is a simplified vertical centerline sectional view of the technique and apparatus of FIG. 30 after coating the inner bore and prior to injecting additional flowable and curable thermally conductive material within the bore to entrap the heating wire coaxially therein.

FIG. 32 is a vertical sectional view of the technique and apparatus of FIG. 31 taken along line 32-32 of FIG. 31.

FIG. 33 is a simplified perspective view of a coated tubular wall for an elongate heating element with a heating wire positioned in-place prior to adding a second layer of thermally conductive material.

FIG. 34 is a vertical sectional view taken along line 34-34 of FIG. 33 showing the coated tubular wall just prior to injecting the second, inner layer of thermally conductive, flowable and curable material is injected within the bore using differential pressure to affix the heating wire therein in thermally conductive relation.

FIG. 38 is a simplified perspective view of yet even another technique for producing an elongate heating element using a pair of mating molds and having a centered heat generating wire carried centrally of an elongate thermally conductive body, or tube where a central heating wire is carried coaxially within a length of forming tube using a plurality of spaced-apart hat spacers (not shown) in the mold surfaces in order to coaxially align the heating wire within the outer tube when injecting and forming the elongate heating tube element while injecting thermally conductive, flowable and curable material within the bore using differential pressure.

FIG. 39 is a simplified perspective view of yet another heating element and a technique for producing an elongate heating element using a centered heat generating wire carried centrally within a bore of a pre-formed elongate thermally conductive body, or tube where a central heating wire is carried coaxially within a length of tube by inserting the wire in loose-fit within a slightly larger bore in the tube in order to coaxially align the heating wire within the tube.

FIG. 40 is a vertical centerline sectional view of the elongate heating element taken along line 40-40 of FIG. 39.

FIG. 41A is a simplified perspective view of an even further technique for producing an elongate heating element using a peel-away or removable outer tube, or forming tube to mold a heating wire within a body of thermally conductive, flowable and curable material injected within the bore using differential pressure according to one of the techniques provided above in FIGS. 1-41.

FIG. 41B is a simplified vertical sectional view of another technique for producing an elongate heating element using an extruder die to coat an electrically resistive heating wire with a high temperature plastic, or PTFE outer coating that is electrically insulative, thermally insulative, flexible, and heat resistant.

FIG. 42 is a partially exploded perspective view of a tail light assembly having a radar unit and an array of LED lighting assemblies with the lens removed from the housing and showing a heater having an elongate heating element that encompasses a target area to surround a radar or light emitter.

FIG. 43 is an enlarged perspective view of the heated radar unit of FIG. 42 taken from the encircled region 43 of FIG. 42.

FIG. 44 is a fully exploded perspective view of the tail light assembly of FIG. 42 and further showing the heater.

FIG. 45 is a perspective view from above of the heater of FIGS. 42-44 showing one elongate heating element configured in a frame member to encompass a rectangular radar unit within a vehicle rear light housing.

FIG. 46 is a front elevational view of the heater of FIG. 45.

FIG. 47 is a right side view of the heater of FIG. 45.

FIG. 48 is a plan view from above of the heater of FIG. 45.

FIG. 49 is a vertical sectional view of the heater assembly taken along line 49-49 of FIG. 46.

FIG. 50 is an exploded perspective view from above of a frame member of the heater assembly of FIG. 45 showing one elongate heating element support frame configured to support the elongate heating element of FIGS. 45-49 so as to encompass a rectangular radar unit within a vehicle light housing.

FIG. 54 is a partially exploded perspective view of a tail light assembly having a radar unit and an array of LED lighting assemblies with the lens removed from the housing and showing an alternative design heater over that shown in FIG. 42 and having an elongate heating element affixed to a heater frame using discrete ties, or straps to affix the elongate heater element to the frame and encompass a target area to surround a radar or light emitter.

FIG. 55 is an enlarged perspective view of the heated radar unit of FIG. 55 taken from the encircled region 55 of FIG. 54.

FIG. 56 is a fully exploded perspective view of the tail light assembly of FIG. 54 and further showing the heater.

FIG. 57 is an enlarged view of the heater taken from encircled region 57 of FIG. 56.

FIG. 58 is a right-side view of the tail light assembly of FIG. 54.

FIG. 59 is a horizontal sectional view of the tail light assembly of FIG. 56 taken along line 59-59 of FIG. 58.

FIG. 61 is a perspective view of a heated tail light assembly having an array of LED lighting assemblies and having a heater with an elongate heating element that encircles the entire LED board in a circular configuration so as to encompass a target area to surround an electromagnetic, or light emitter.

FIG. 62 is an exploded perspective view of the heated tail light assembly of FIG. 61 showing the circular elongate heating element, or heater within the housing assembly.

FIG. 68 is a perspective view of a heated Lidar housing assembly of FIG. 67.

FIG. 69 is a side view of the heated Lidar assembly of FIG. 68.

FIG. 70 is a vertical centerline sectional view taken along line 70-70 of FIG. 69 of the heated Lidar housing assembly.

FIG. 72 is a perspective view of a heated Lidar housing assembly of FIG. 71.

FIG. 73 is a side view of the heated Lidar assembly of FIG. 72.

FIG. 74 is a vertical centerline sectional view taken along line 74-74 of FIG. 73 of the heated Lidar housing assembly.

FIG. 75 is an enlarged partial view taken from the encircled region 75 of FIG. 74.

FIG. 87 is a partially exploded perspective view of a tail light assembly having a radar unit and an array of LED lighting assemblies with the lens removed from the housing and showing a further alternative design heater over that shown in FIG. 54 and having an elongate heating element affixed to a light middle lens using discrete brackets to affix the elongate heater element to the frame and encompass a target area to surround a radar or light emitter.

FIG. 88 is an enlarged perspective view of the heated radar unit of FIG. 87 taken from the encircled region 88 of FIG. 87.

FIG. 89 is an enlarged perspective view of a corner mounting portion of the mid-housing and heater assembly with the heater support bracket and mounting screw removed from the encircled region 89 of FIG. 88.

FIG. 90 is a partially exploded perspective view of the heater of FIGS. 87 and 88.

FIG. 91 is an enlarged perspective view of the heater of FIG. 90 taken from encircled region 91 of FIG. 90.

FIG. 92 is a simplified perspective view of yet even another heating element and a technique for producing an elongate heating element using a centered heat generating wire carried centrally within a bore of a pre-formed elongate thermally conductive body, or tube placed coaxially within another outer tube with a helical outer surface where a central heating wire is carried coaxially within a length of the tubes by inserting the wire in loose-fit within a slightly larger bore in the inner tube in order to coaxially align the heating wire within the inner tube and the outer tube.

FIG. 93 is an enlarged partial perspective view further illustrating the heater tube thermistor of FIG. 93.

FIG. 94 is an enlarged partial perspective view further illustrating the ambient temperature thermistor and second male connector of FIG. 93.

FIG. 95 is a plan view of yet another heated tail light assembly having a radar unit and an array of LED lighting assemblies with the lens removed from the housing and showing an even further alternative design lens heater over that shown in FIG. 87 and having an elongate heating element affixed to an inner surface of a lens in a receiving groove to encompass a target area and surround a radar or light emitter.

FIG. 96 is a vertical side view of the heated tail light assembly of FIG. 95.

FIG. 97 is horizontal sectional view of the heated tail light assembly of FIGS. 95-95 and taken along line 97-97 of FIG. 96.

FIG. 98 is a perspective review of an inner surface of the outer lens of FIGS. 95-97 showing the installed lens heater.

FIG. 99 is a vertical inside view of the outer lens of FIG. 98.

FIG. 100 is a horizontal sectional view of the outer lens of FIGS. 95-99 taken along line 100-100 of FIG. 99.

FIG. 101 is a sectional view of the lens and heater taken from the encircled region 101 of FIG. 100.

FIG. 102 is a sectional view of the lens and heater taken from the encircled region 102 of FIG. 100.

FIG. 103 is simplified perspective view of the heating element, or heater of FIGS. 95-102 having a central heating wire provided coaxially within a single PTFE tube and having temperature sensors.

FIG. 104 is an enlarged partial perspective view of a first temperature sensor or thermistor of FIG. 103 for detecting heater output temperature.

FIG. 105 is an enlarged partial perspective view of a second temperature sensor or thermistor of FIG. 103 for detecting ambient temperature.

FIG. 106 is an exploded perspective view of a heated camera system for removing moisture and/or condensate from a camera lens.

FIG. 107 is an enlarged perspective view of the encircled region 107 of FIG. 106 showing the heater assembly.

FIG. 109 is a perspective view of a fluid heater assembly having an elongate heating element with an elongate resistance heating wire and a plurality of elongate fluid flow passages configured to heat and deliver windshield washer fluid and air, respectively, to a housing having an electromagnetic transmissive portion, such as an optical lens.

FIG. 110 is an enlarged entrance end view of the heating element taken from encircled region 110 of FIG. 109.

FIG. 111 is an enlarged exit end view of the heating element taken from encircled region 111 of FIG. 109.

FIG. 118 is a vertical sectional view of the elongate heater assembly taken along line 118-118 of FIG. 117.

FIG. 119 is a vertical sectional of the temperature switch taken along line 119-119 of FIG. 117.

FIG. 120 is vertical front view of the headlight assembly and heat source of FIG. 117.

FIG. 121 is a vertical sectional view of the headlight assembly and heat source of FIG. 120 taken along line 121-121 of FIG. 120 and showing airflow and heat transfer relative to the headlight assembly caused by vehicle motion.

FIG. 122 is perspective view partially broken away from above of yet another headlight assembly and heat source having an elongate heater assembly and a separate temperature switch. having vertical heat convection ports and an air delivery source.

FIG. 123 is a perspective view from above of the elongate heater assembly of the heat source for the headlight assembly of FIG. 122 showing the vertical heat convection ports and the air delivery source.

FIG. 124 is a vertical sectional view of the elongate heater assembly taken along line 123-123 of FIG. 122 and showing the vertical heat convection ports.

FIG. 125 is a perspective view from above of yet even another headlight assembly and heat source similar to that depicted in FIGS. 122-124. but further including an inner lens configured behind the outer lens to provide a reduced-volume heated lens chamber and a positive air pressure source for the heat source with a plurality of vertically angled heat convection ports.

FIG. 126 is a vertical sectional view of the headlight assembly and heat source taken along line 126-126 of FIG. 125 and showing airflow and heat transfer within the headlight assembly.

FIG. 127 is an enlarged sectional view taken through encircled region 127 of FIG. 126 showing the heater rod.

FIG. 128 is an enlarged sectional view taken through encircled region 128 of FIG. 126 showing the heat sensor.

FIG. 129 is a perspective view from above of the elongate heater assembly of the heat source for the headlight assembly of FIG. 125 showing the vertically angled heat convection ports and the air delivery source.

FIG. 130 is a plan view from above of the elongate heater assembly of FIG. 129 and showing the angled heat convection ports.

FIG. 131 is a vertical sectional view of the elongate heater assembly taken along line 131-131 of FIG. 130.

FIG. 132 is a front view of the elongate heater assembly of FIG. 130 and further showing the angled heat convection ports.

FIG. 133 is a vertical sectional view of the elongate heater assembly taken along line 133-133 of FIG. 132 and showing the angled heat convection ports.

Figure 134:
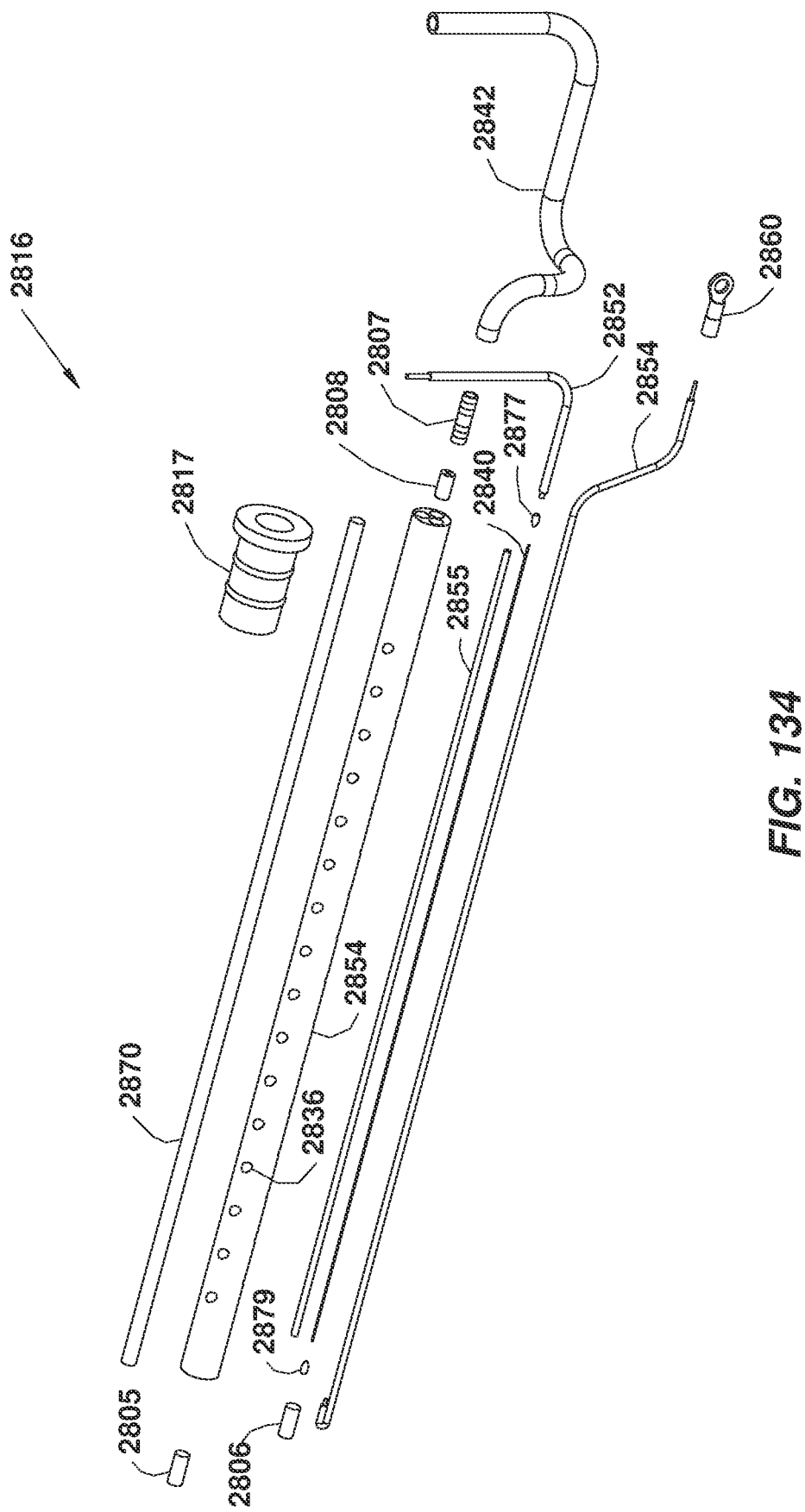

FIG. 134 is an exploded perspective view of the elongate heater assembly of FIGS. 125-133.

FIG. 135 is a perspective view from above of a heated lens assembly for a vehicle light assembly suitable for use optionally on the light housing of FIG. 122.

FIG. 136 is a vertical sectional view taken along line 136-136 of FIG. 135 showing the heater and sensor assembly within the lens assembly.

FIG. 137 is an exploded perspective and partially broken away view from above of the heated lens assembly of FIG. 135 showing the heater and sensor assembly.

Figures 138, 139:
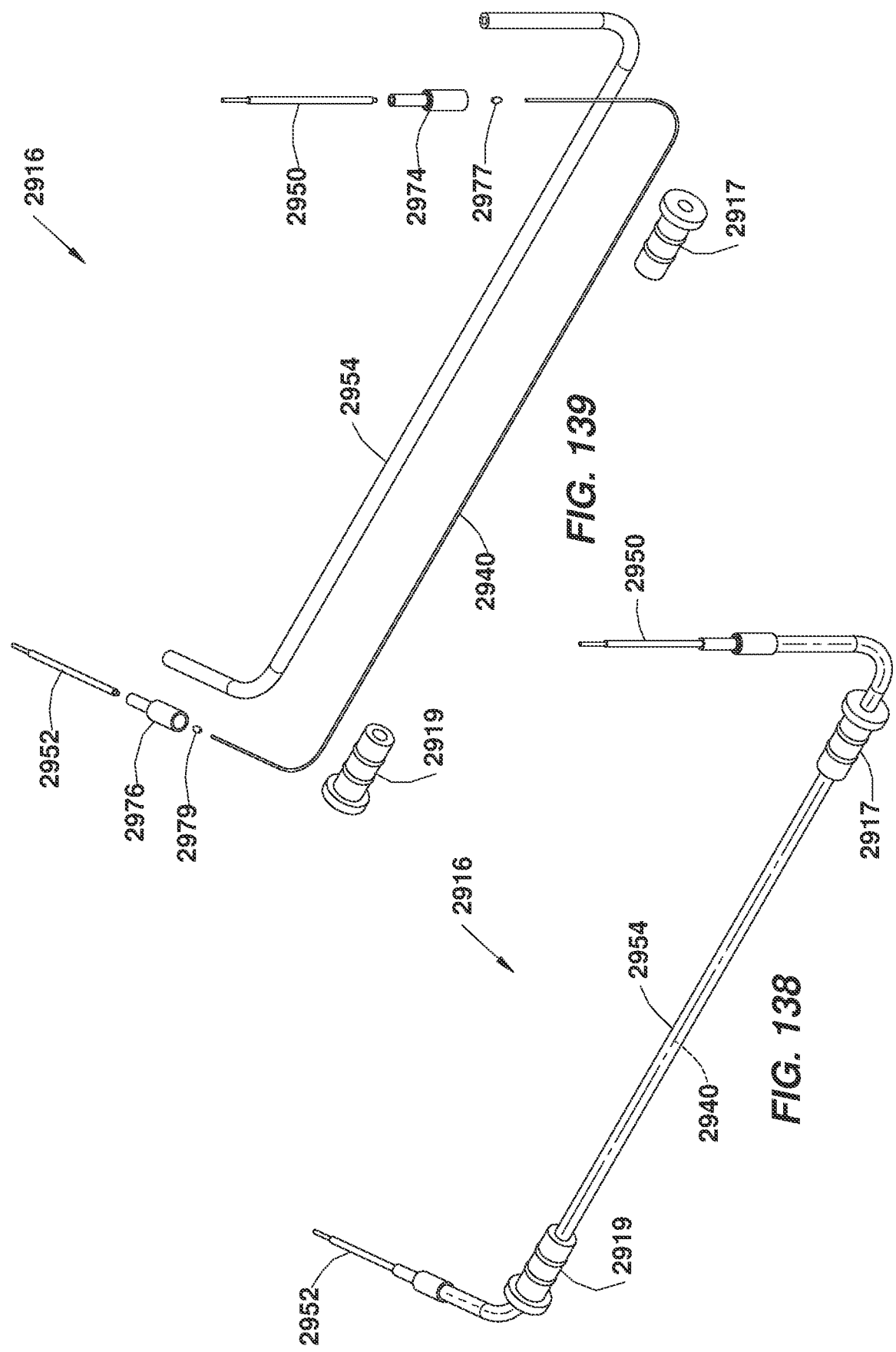

FIG. 138 is a perspective view from above of the elongate heater assembly of FIGS. 135-137.

FIG. 139 is an exploded perspective view from above of the elongate heater assembly of FIG. 138.

Figure 140:
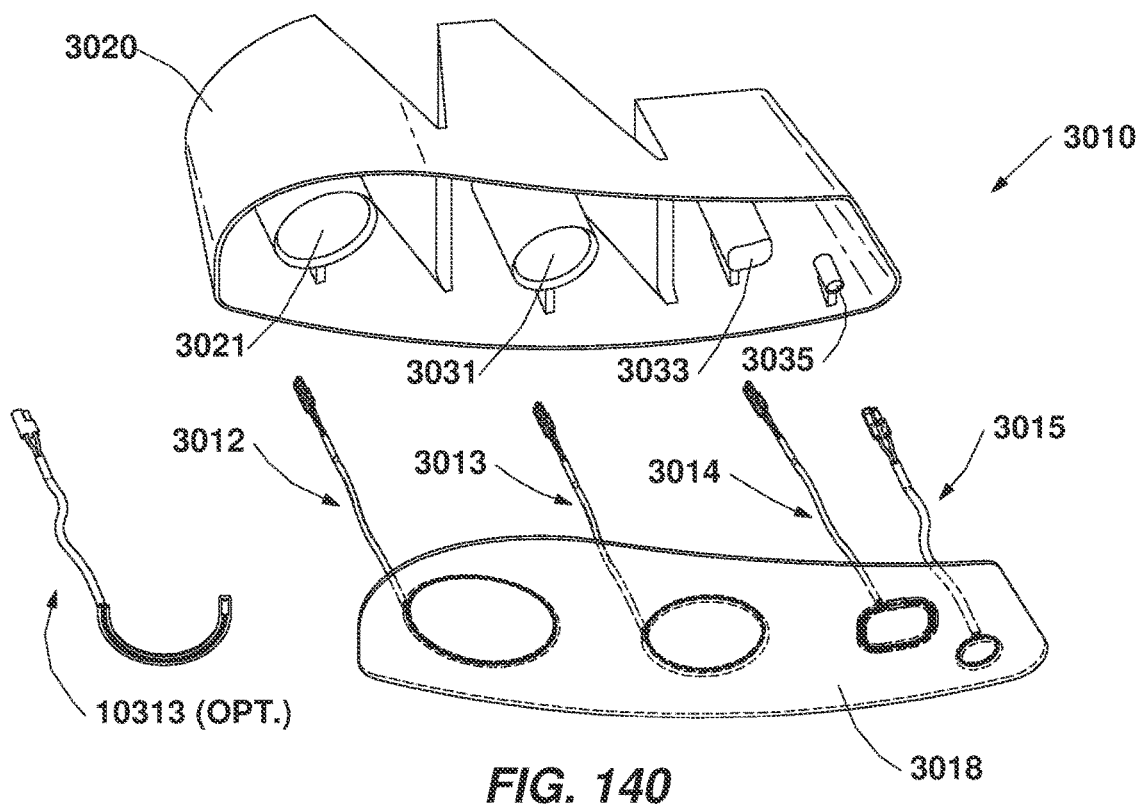

FIG. 140 is an exploded perspective view from above of a vehicle headlight assembly having an array of spaced-apart discrete region elongate, encircling heater assemblies and further showing one optional semi-circular heater assembly.

Figure 141:
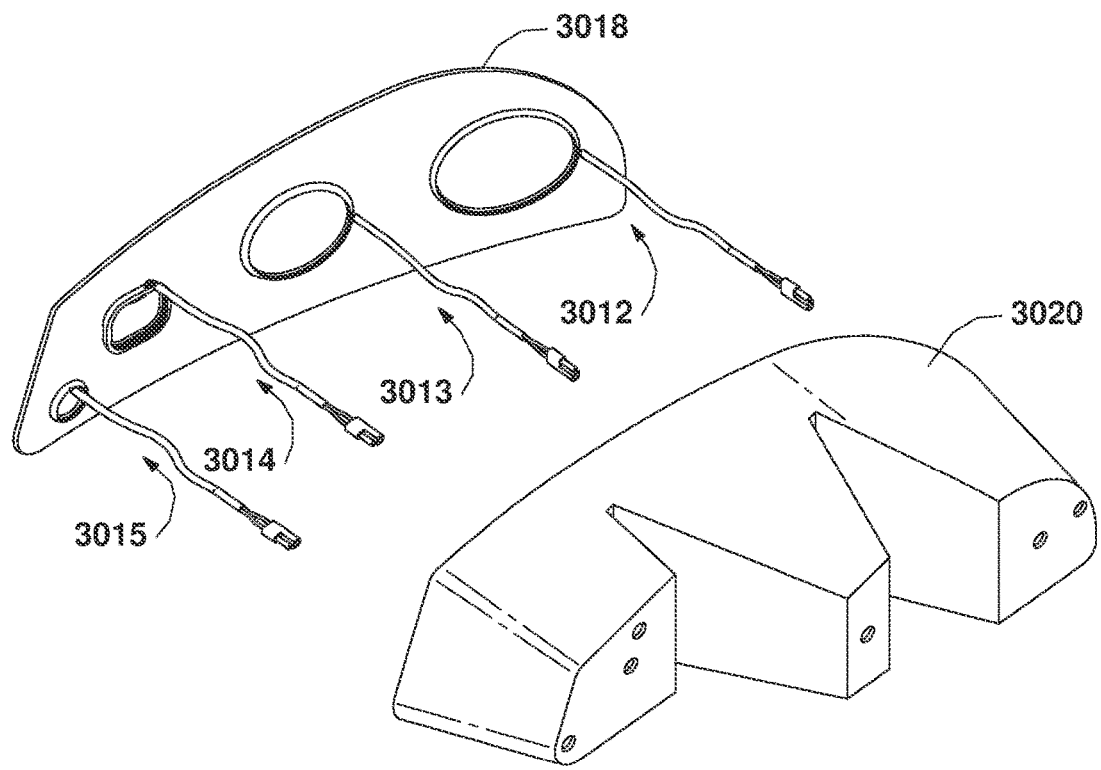

FIG. 141 is a perspective view from above and behind of the vehicle headlight assembly of FIG. 140 further showing the array of elongate, encircling heater assemblies.

Figure 142:
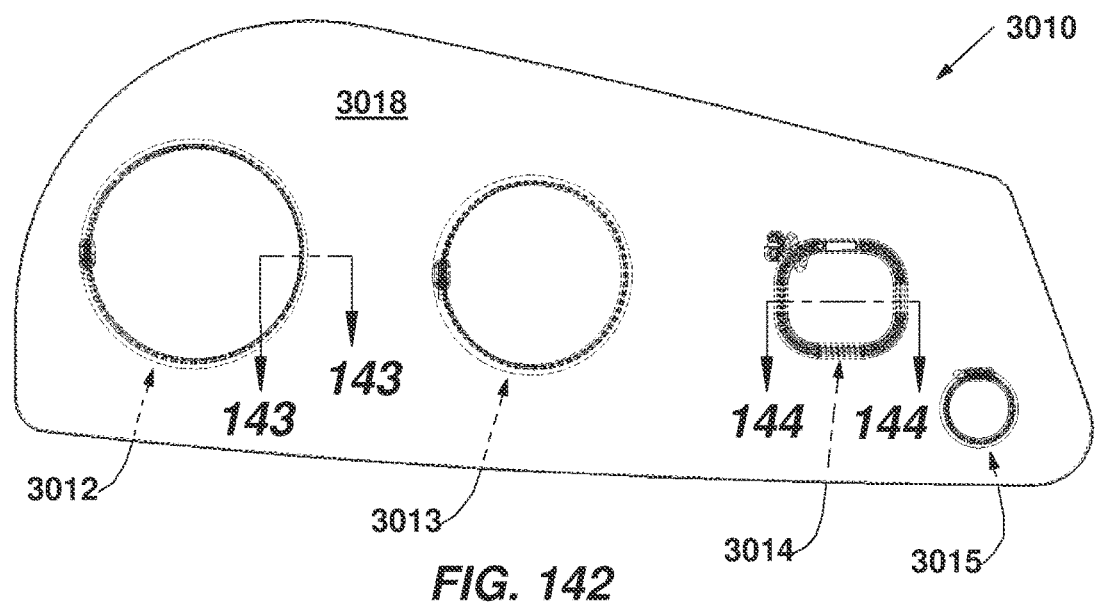

FIG. 142 is a front view of the lens and array of heater assemblies of FIGS. 140-141.

Figure 143:
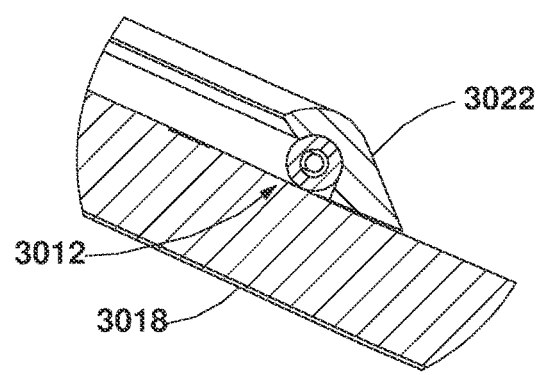

FIG. 143 is a local encircled sectional view of one heater assembly taken from a local encircled section taken along line 143-143 of FIG. 142.

Figure 144:
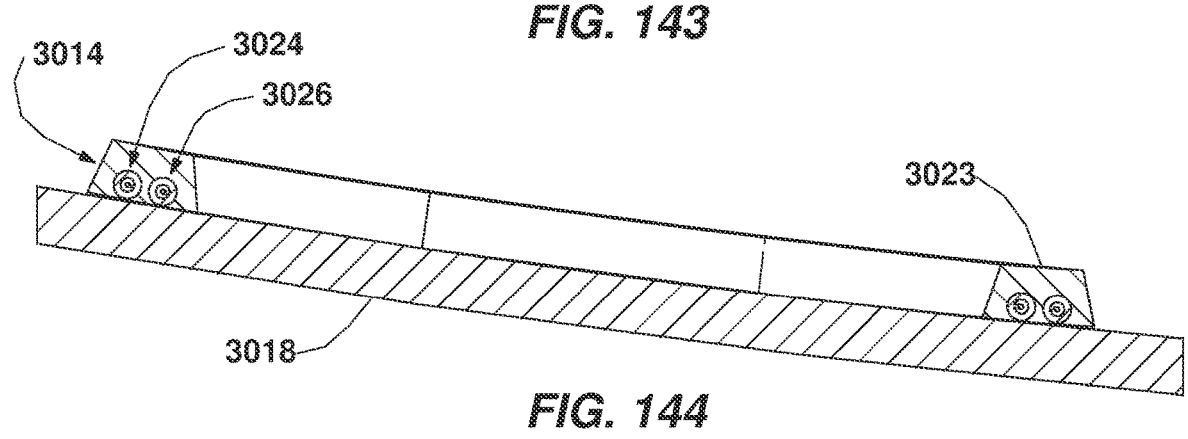

FIG. 144 is a local encircled sectional view of another heater assembly taken from an encircled section taken along line 144-144 of FIG. 142

FIG. 145 is a perspective view from above of the heater assembly of FIG. 143.

FIG. 146 is an exploded perspective view from above of the heater assembly of FIG. 145.

FIG. 147 is an enlarged partial perspective view from the encircled region 147 of FIG. 145.

FIG. 148 is a perspective view from above of the heater assembly of FIG. 144.

FIG. 149 is an exploded perspective view from above of the heater assembly of FIG. 148

FIG. 150 is an end view of the elongate, encircling heater of the heater assembly of FIGS. 148-149.

Figure 151:
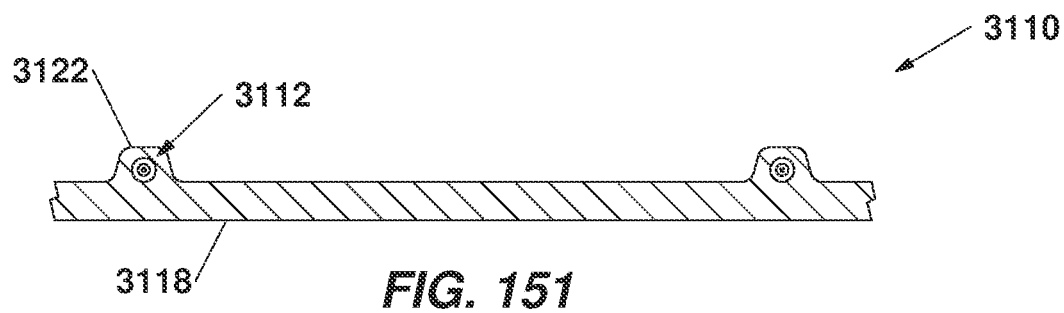

FIG. 151 is a vertical sectional view through a simplified heated lens used with a vehicle or structure for a light, radar, lidar, camera or other electromagnetic emitter and/or detector assembly showing a first construction with an integrally molded elongate heater assembly molded within an integral ring of the lens.

Figure 152:
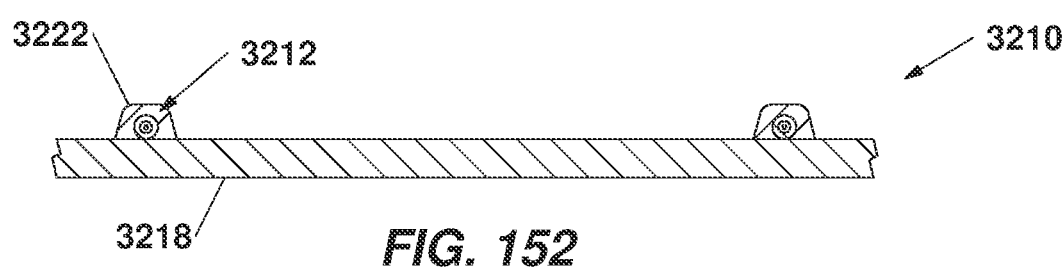

FIG. 152 is an alternate simplified heated lens over that shown in FIG. 151 with a heater retention ring that is adhesively bonded or fastened to the lens.

Figure 153:
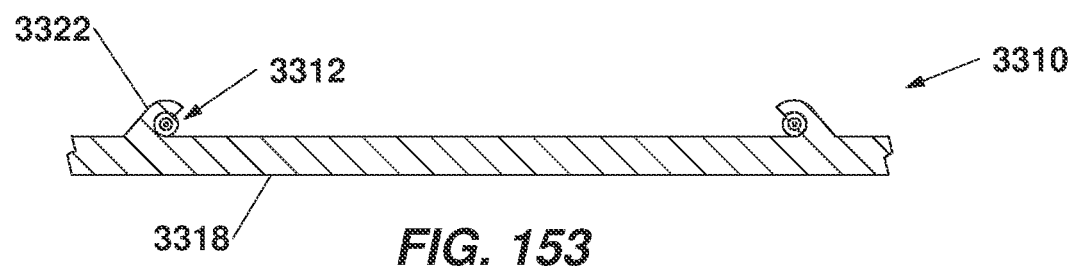

FIG. 153 is another alternative simplified heater lens similar to that shown in FIG. 143, but having the heater retention ring integrally molded with the lens.

Figure 154:
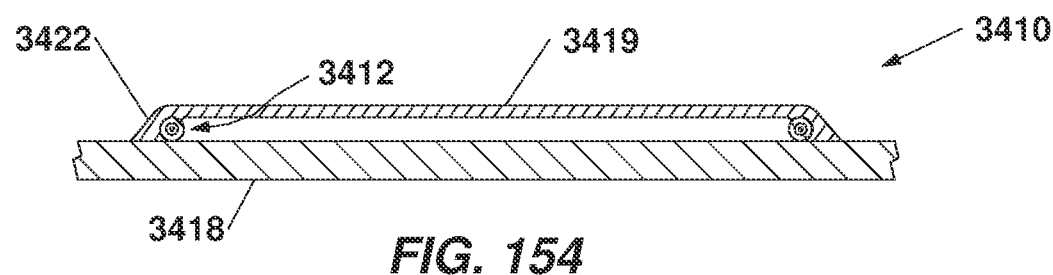

FIG. 154 is even another alternative simplified heater lens similar to that shown in FIGS. 143 and 153 with a heater retention ring is integrally formed with an inner lens that is adhesively or mechanical affixed, or fastened to the lens.

Figure 155:
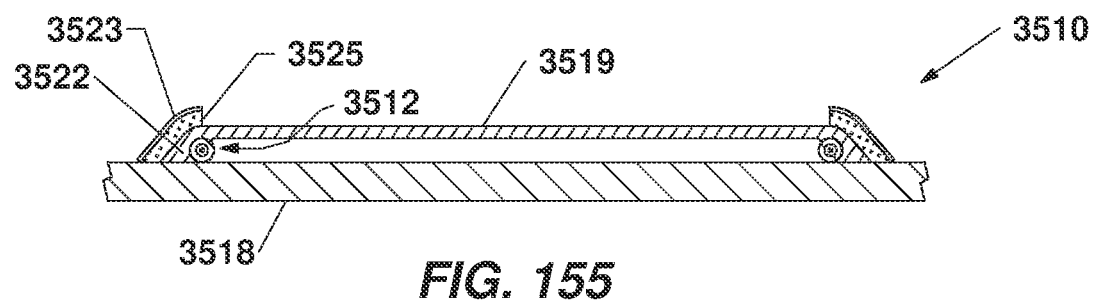

FIG. 155 is yet even another alternative simplified heater lens similar to FIG. 154, but with the addition of a foil heat reflector about the heater retention ring.

FIG. 156 is a perspective view of the optional semi-circular heater assembly of FIG. 140

FIG. 157 is an exploded perspective view of the heater assembly of FIG. 157.

FIG. 158 is an end view of the heater for the heater assembly of FIG. 156.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

LED (light emitting diodes) light enclosures for on-road or off-road use are non-heated lights. Similar light enclosure for other vehicle, vessels, trains, airplanes, and navigation lights for land, sea, and air navigation also use LED light enclosures that generate very little, if no, heat. Finally, LIDAR and radar units for autonomous vehicles have a similar problem when exposed to moisture, frost, and snow conditions. A series of temperature controlled heated light and LIDAR assemblies are shown variously below in FIGS. 1-80. These lights, radar, and LIDAR assemblies are independently controlled environments configured to ensure a constant temperature on the surface of the lens. Guaranteeing no ice or fog build up on the inside or outside of the lens allows for clarity even in the coldest climates. An adaptable heating system is used to perform this task. Similarly, radar units are being installed on vehicles within light housings and behind bumpers, panels and facias in order to help blind spot evaluation and to provide input to autonomous vehicle navigation. Ice, fog, moisture and frost can interfere with such radar systems and a similar need to mitigate or remove condensate exists for radar systems. Even further, laser systems such as LIDAR have optical interference issues with such forms of occlusion.

FIG. 1 is a partial perspective view from above of a passenger vehicle 8 having an electromagnetic illuminator in the form of a headlight assembly 10 with a heater assembly 12.

FIG. 2 is an enlarged perspective view from above and outboard of the headlight assembly 10 including the elongate heating element 16 of the heater assembly 12 of FIG. 1 with the lens removed and affixed to the housing 20. An array of heating element mounting clips 14 are affixed to housing 20 at spaced-apart discrete locations to secure elongate heating element about an outer periphery of housing 20 where a vehicle lens (not shown) is affixed. Optionally, elongate heating element 16 can be affixed about an elongate segment or an entire periphery of a lens opening for housing using a one or more receiving grooves in housing 20.

FIG. 3 is another enlarged perspective view from above and inboard of the heated headlight assembly 10 of FIG. 2 with the lens removed and showing elongate heating element 16 of heater 12 affixed at spaced-apart discrete locations along an upper edge of housing 20 using individual plastic carrier clips 14.

As shown in FIGS. 1-3, elongate heater 10 is a closed-loop heater formed from a single continuation rope or tube of heated thermal mass that closes on itself at electrically terminal ends that form an electrical connector for coupling with a vehicle wiring harness and power supply. However, it is understood the "elongate" heater can take on any form of heater element having a closed loop, open loop, helical coil, intermittent serial heated segments, or other suitable form of heating strip that delivers heat along a traversed path or region using one or more resistance heating elements, or wires (such as a Nichrome wire) embedded or enveloped by an elongate heat conducting thermal mass that also increases outer surface area so as to enhance heat transfer to a surrounding environment by way of one or more of conduction, convection and radiation. For example, increasing outer surface area of such a heater for a thermal mass having favorable emissivity on the outer surface will increase radiant heat transfer to a surrounding environment.

Figure 4:
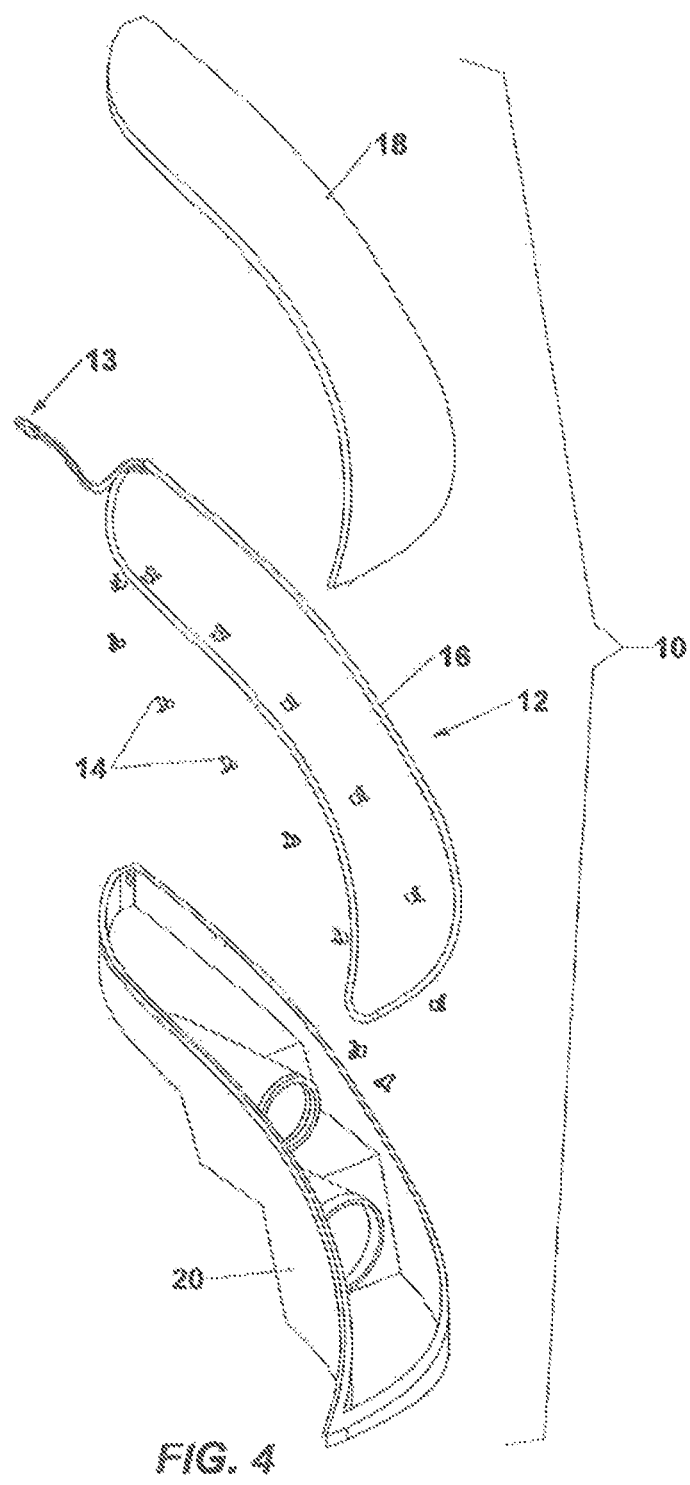
FIG. 4 is an exploded perspective view from above of the heated headlight assembly of FIG. 3.

FIG. 4 is an exploded perspective view from above of the heated headlight assembly 10 of FIG. 3 showing optically transmissive lens 18, heater 12 and housing 20. A spaced apart array of high temperature plastic mounting, or carrier clips 14 are affixed to housing 20 in spaced apart relation to secure elongate heater tube 16 to housing 20. Opposed ends of heater 12 come together in electrically insulated relation where the heater 12 closed into a loop and forms a two-conductor electrical connector 13 configured to mate and de-mate with a vehicle wiring harness (not shown).

FIG. 5 is a simplified partial phantom and perspective view of the housing 20 for the light assembly 10 of FIG. 4 and showing mounting of individual heater support clips 14 on housing 20. Clips 20 are affixed at discrete spaced-apart locations along an inner wall of housing 20. Optionally, clips 20 can be directly molded into housing 20. Further optionally, one or more receiving grooves can be in-molded into an inner or edge wall of housing 20.

FIG. 6 is an enlarged perspective view of one exemplary elongate heater support clip 14 configured to affix an elongate heater (not shown) to the light assembly housing 20 of FIG. 5 using an array of bores 15 formed in an inner wall of housing 20 and integrally formed plastic weld studs 17 integrally formed on the support clip 14. More particularly, studs 17 insert into bores 15 in assembly where they are then entrapped by heating and mushrooming a terminal end to trap each stud 17 into each bore 15. Optionally, each stud 17 can be affixed or bonded with adhesive within each respective bore 15.

FIG. 7 is a perspective view of an elongate heating element 16 of heater 12 shown in a linear form, but capable of being formed into any desired three-dimensional shape into any of a number of linear, arcuate, angular, or encircling heater assemblies as shown variously in the drawings herein. It is understood that electrical connectors (not shown) are affixed in electrical connection with each end of heating element 16 in order to connector heater 12 to a vehicle wiring harness and power supply.

FIG. 8 is a left end view of the elongate heating element 16 of FIG. 7 showing in simplified linear form one exemplary heater assembly 12 comprising a linear elongate heater tube 16 having a plastic outer tube 36, such as a polytetrafluoroethylene (PTFE) high temperature tube, a cured high temperature thermally transmissive and electrically insulative filler material 38, and a captured heater wiring assembly showing in an end view as lead 42. One exemplary filler material 38 is a two-part liquid resin part number EP1200-Black that is commercially available from Ellsworth Adhesives, Resin Lab, W129 10825 Washington Dr, Germantown, Wis. 53022. It is also understood that leads 42 and 44 are further electrically connector to a wiring harness via further electrically conductive leads (not shown) and or one or more electrical connectors (not shown).

FIG. 9 is a vertical centerline sectional view of the elongate heating element 16 of heater 12 taken along sectional line 9-9 of FIG. 8 and further showing the outer tube 36, cured filler material 38, and a Nichrome heating wire 40, such as Nichrome-60 wire (NiCr60 Type Alloy 675 Nickel Chrome Alloy), that heats the material 38 and tube 36 to deliver heat via an outer cylindrical surface of tube 36 to an exterior environment using one or more of conduction, convection and radiation. Such tube 38 can also be made of any other high temperature material including metal tubing as material 38 is electrically non-conductive. In one case, tube 38 has a high emissivity outer surface, such as a flat black ceramic or other high emissivity coating or exterior surface (not shown).

As shown in FIG. 9, heating wire 40 is connected via solder connections 46 and 48 to electrically conductive power leads 42 and 44, respectively. Electrically insulative shrink wrap tubing 50 and 52 is provided about leads 42 and 44 where they exit tube 36 at each end to provide flexible insulation of leads 42 and 44 when leads 42 and 44 comprise stranded copper wire to provide insulation and strain relief.

Although shown in the shape of a round cross-sectional tube, heater 12 can be configured with a heating element having any suitable cross-sectional shape including round, oval, square, rectangular, triangular, hexagonal, octagonal, or any other suitable shape that increases thermal mass and outer surface area over that of the electrically conductive internal resistance heating wire, and provides electrical insulation of the wire relative to an external environment. Even further, heater 12 can be formed with an outer tube having a helical, spiral, longitudinally ribbed, radially ribbed, or other undulating outer surface.

FIG. 10 is a perspective view of one alternate elongate heating element 116 shown in a linear form, but capable of being formed into any desired three-dimensional shape into any of a number of linear, arcuate, or encircling heater assemblies as shown variously in the drawings herein, including open and closed elongate heating structures, and branching heating structures. Heater 112 includes elongate heating element 116 and an end portion enlarged plastic electrically insulative housing 154.

FIG. 11 is a left end view showing in simplified linear form one exemplary heater assembly 112 comprising a linear elongate heater tube 116 having a plastic outer tube 136, such as a PTFE high temperature tube, a cured high temperature thermally transmissive (conductive, convective and radiant) and electrically insulative filler material 138 and a captured heater wiring assembly showing lead 142 encircled by electrically insulative shrink wrap tubing 150. Housing 116 comprises a plastic tube 154 that encircles one end portion of tube 136 and is filled at both ends with curable electrically insulative epoxy potting material 153. Although shown in a flattened tubular shape, tube 154 can optionally be a cylindrical tube or any other suitable shape to encompass and contain components therein.

FIG. 12 is a vertical centerline sectional view of the elongate heating element 116 of heater 112 taken along line 12-12 of FIG. 11 and further showing the outer tube 136, cured filler material 138, and a Nichrome heating wire 140 that heats the material 138 and tube 136 to deliver heat via an outer cylindrical surface of tube 136 to an exterior environment using one or more of conduction, convection and radiation. Such tube 136 can also be made of any other high temperature material including metal tubing as material 138 is electrically non-conductive and insulates electrically conductive heating wire 140 from contact with any external conductive foreign object and from tube 136. In one case, tube 136 has a high emissivity outer surface, such as a flat black ceramic coating (not shown). Optionally, and tube comprising material that maximizes thermal heat transfer to an exterior environment by an optimal combination of one or more of conduction, convection, and radiation can be used for constructing tube 136.

As shown in FIG. 12, heating wire 140 is connected (directly or indirectly through thermistor 156) via solder connections 146, 148, and 149 to electrically conductive power leads 142, 144, and 145, respectively. Electrically insulative shrink wrap tubing 150 and 152 are provided about leads 142 and 144 where they exit tube 136 at each end to provide flexible insulation of leads 142 and 144 when leads 142 and 144 comprise stranded copper wire to provide insulation and strain relief. Electrically conductive leads 143 and 145 electrically couple with a thermistor 156 encased in electrically insulative curable epoxy material 153 within tube 154 and to tube 136. Leads 142 and 144 are further electrically connected with a vehicle wiring harness and/or electrical connector (not shown).

FIG. 13 is a perspective view of another alternate elongate heating element 212 shown in a linear form, but capable of being formed into any desired three-dimensional shape into any of a number of linear, arcuate, or encircling heater assemblies as shown variously in the drawings herein, including open and closed elongate heating structures, and branching heating structures. Heater 212 includes elongate heating element 216 and a medial portion enlarged plastic electrically insulative housing 254.

FIG. 14 is a left end view of the elongate heating element 212 of FIG. 13 comprising a linear elongate heater tube 216 having a plastic outer tube 236, such as a PTFE high temperature tube, a cured high temperature thermally transmissive (conductive, convective and radiant) and electrically insulative filler material 238 and a captured heater wiring assembly showing lead 242 encircled by electrically insulative shrink wrap tubing 250. Housing 116 comprises a plastic tube 254 that encircles a mid-portion of tube 236 and is filled at both ends with curable electrically insulative epoxy potting material 153. Although shown in a flattened tubular shape, tube 254 can optionally be a cylindrical tube or any other suitable shape to encompass and contain components therein.

FIG. 15 is a vertical centerline sectional view of the elongate heating element 212 taken along line 15-15 of FIG. 14 comprising an elongate heater tube 216 and further showing the outer tube 236, cured filler material 238, and a Nichrome heating wire 240 that heats the material 238 and tube 236 to deliver heat via an outer cylindrical surface of tube 236 to an exterior environment using one or more of conduction, convection and radiation. Such tube 236 can also be made of any other high temperature material including metal tubing as material 238 is electrically non-conductive and insulates electrically conductive heating wire 240 from contact with any external conductive foreign object and from tube 236. In one case, tube 236 has a high emissivity outer surface, such as a flat black ceramic coating (not shown). Optionally, tube 236 can comprise any material that maximizes thermal heat transfer to an exterior environment by an optimal combination of one or more of conduction, convection, and radiation can be used for constructing tube 236.

As shown in FIG. 15, heating wire 240 is connected (directly or indirectly through a thermistor 256) via solder connections 246, 248, and 249 to electrically conductive power leads 242, 243, 244, and 245, respectively. Electrically insulative shrink wrap tubing 250 and 252 are provided about leads 242 and 244 where they exit tube 236 at each end to provide flexible insulation of leads 242 and 244 when leads 242 and 244 comprise stranded copper wire to provide insulation and strain relief. Electrically conductive leads 243 and 245 electrically couple with a thermistor 256 encased in electrically insulative curable epoxy material 253 within tube 254 and to tube 236. Leads 242 and 244 are further electrically connected with a vehicle wiring harness and/or electrical connector (not shown).

FIG. 16 is a perspective view of yet another alternate elongate heating element 312 shown in a linear form, but capable of being formed into any desired three-dimensional shape into any of a number of linear, arcuate, or encircling heater assemblies as shown variously in the drawings herein, including open and closed elongate heating structures, and branching heating structures. Heater 312 includes elongate heating element 316.

FIG. 17 is a left end view of the elongate heating element 312 of FIG. 16. comprising a linear elongate heater tube.

FIG. 18 is a vertical centerline sectional view of the elongate heating element 312 taken along line 18-18 of FIG. 17 comprising an elongate heater tube 316 and further showing an outer tube 354, an inner tube 336, cured filler material 338 and 353 within both tubes 354 and 336, respectively, and a Nichrome heating wire 340 that heats the material 338 and tube 336 to deliver heat via an outer cylindrical surface of tube 336 to additional material 353 placed between inner tube 336 and outer tube 354 and to an exterior environment using one or more of conduction, convection and radiation. Such tubes 336 and 354 can also be made of any other high temperature material including metal tubing as material 338 is electrically non-conductive and insulates electrically conductive heating wire 340 from contact with any external conductive foreign object and from tube 336. In one case, tube 336 has a high emissivity outer surface, such as a flat black ceramic coating (not shown). Optionally, tube 354 can comprise any material that maximizes thermal heat transfer to an exterior environment by an optimal combination of one or more of conduction, convection, and radiation can be used for constructing tube 336.

As shown in FIG. 18, heating wire 340 is connected via solder connections 246 and 248 to electrically conductive power leads 342 and 344, respectively. Electrically insulative shrink wrap tubing 350 and 352 are provided about leads 342 and 344 where they exit tube 336 at each end to provide flexible insulation of leads 342 and 344 when leads 342 and 344 comprise stranded copper wire to provide insulation and strain relief. Lead 342 is folded over externally of tube 336 and folded along an outside of tuber 336 and further encased in electrically insulative curable epoxy material 353 within tube 354. Leads 342 and 344 are further electrically connected with a vehicle wiring harness and/or electrical connector (not shown).

Figure 19:
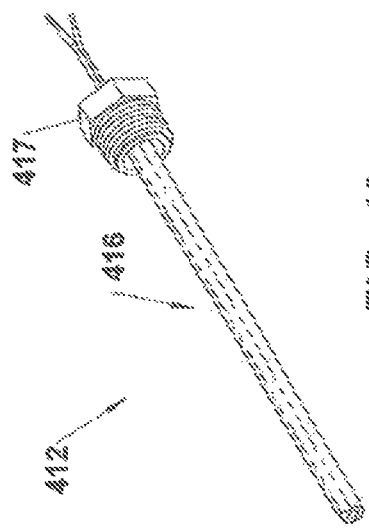
FIG. 19 is a perspective view of another alternate elongate heating element shown in a linear form, but capable of being formed into any desired three-dimensional shape.

FIG. 19 is a perspective view of yet even another alternate elongate heating element 412 shown in a linear form, but capable of being formed into any desired three-dimensional into any of a number of linear, arcuate, or encircling heater assemblies as shown variously in the drawings herein, including open and closed elongate heating structures, and branching heating structures. Heater 412 includes elongate heating element 416 extended from and supported by a threaded plug support 417.

Figure 20:
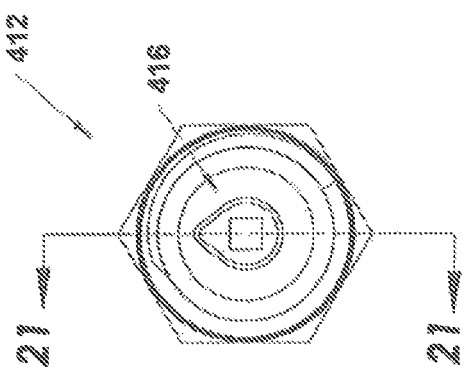
FIG. 20 is a left end view of the elongate heating element of FIG. 19.

FIG. 20 is a left end view of the elongate heating element 412 of FIG. 19 including elongate heating element 416.

Figure 21:
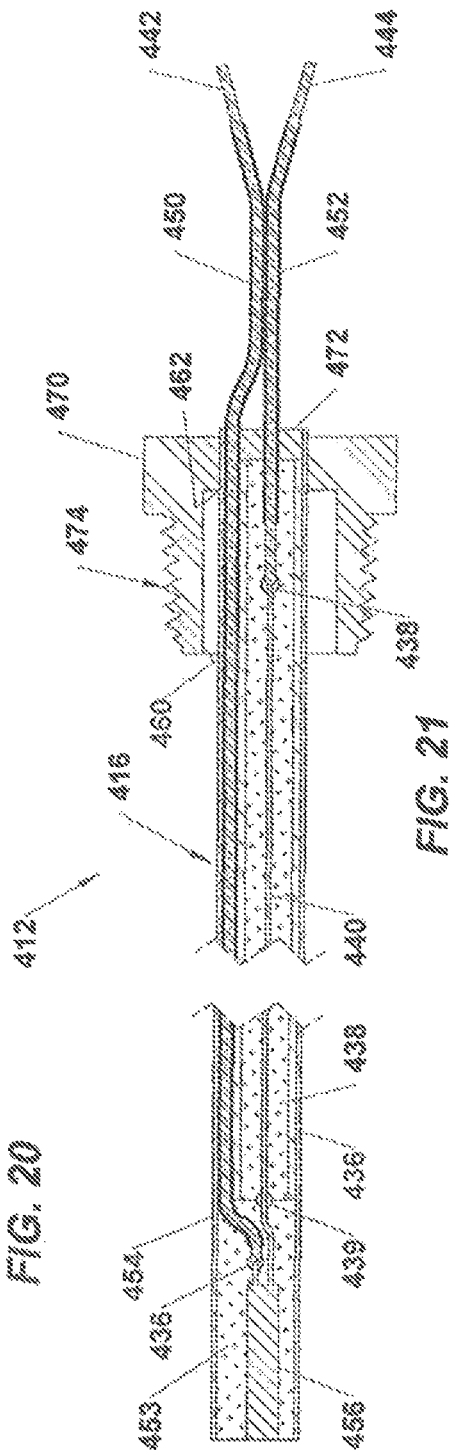
FIG. 21 is a vertical centerline sectional view of the elongate heating element taken along line 21-21 of FIG. 20.

FIG. 21 is a vertical centerline sectional view of the elongate heating element 412 taken along line 21-21 of FIG. 20 comprising an elongate heater tube 416 and further showing an outer tube 454, an inner tube 436, cured filler material 438 within both tubes 454 and 436, and a Nichrome heating wire 440 that heats the material 438 and tube 436 to deliver heat via an outer cylindrical surface of tube 436 to additional material 453 placed outside of inner tube 436 and between inner tube 436 and outer tuber 454 and further to deliver heat to an exterior environment using one or more of conduction, convection and radiation. Such tubes 436 and 454 can also be made of any other high temperature material including metal tubing as material 438 and 453 is thermally transmissive and electrically non-conductive and insulates electrically conductive heating wire 440 from contact with any external conductive foreign object and from tube 436. In one case, tube 454 has a high emissivity outer surface, such as a flat black ceramic coating (not shown). Optionally, tube 454 can comprise any material that maximizes thermal heat transfer to an exterior environment by an optimal combination of one or more of conduction, convection, and radiation can be used for constructing tube 436. A plug base 470 having a threaded male portion 474, an inner bore 460, and a reduced-diameter bore 462 receives elongate heater tube 416 in press-fit and an end plug 472 fits into bore 462 and has two ports to provide exit for leads 442 and 444.

As shown in FIG. 21, heating wire 440 is connected (directly or indirectly through a thermistor 456) via solder connections 436 and 439 to electrically conductive power lead 442. An opposite end of heating wire 440 is electrically connected to lead 44 with a solder connection 438. Electrically insulative shrink wrap tubing 450 and 452 are provided about leads 342 and 344 where they exit tube 336 at each end to provide flexible insulation of leads 442 and 444 when leads 442 and 444 comprise stranded copper wire to provide insulation and strain relief. Lead 442 is carried along an outside of tube 436 and further encased in electrically insulative curable epoxy material 453 within tube 454. Leads 442 and 444 are further electrically connected with a vehicle wiring harness and/or electrical connector (not shown).

Figure 22:
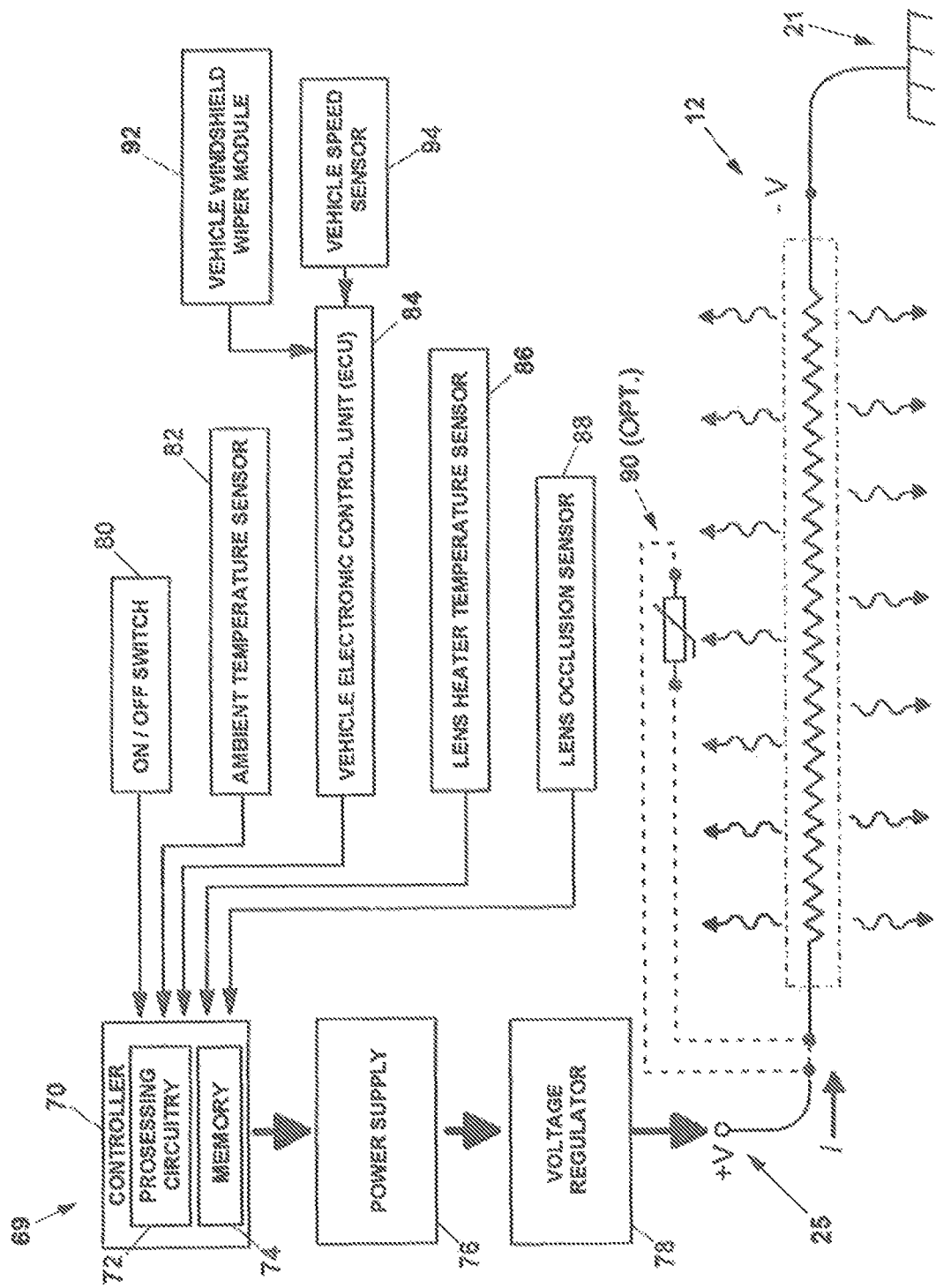
FIG. 22 is a functional block diagram of a control system for controlling heat delivery from an elongate heating element for an electromagnetic illuminator, such as a vehicle light assembly or radar unit.

FIG. 22 is a functional block diagram of a control system 70 for controlling heat delivery from an elongate heating element for an electromagnetic illuminator, such as a vehicle light assembly or radar unit. Such control system 70 can be used with any of the heating configurations used herein in FIGS. 1-75. More particularly, control system 70 controls operation of an elongate heater assembly 12, such as a lens heater, that receives power from a power supply 76 through a voltage regulator 78 in response to input signals received from an on/off switch 80, an ambient temperature sensor 82, a vehicle electronic control unit (ECU) 84, a device (or lens) heater temperature sensor 86, a device (or lens) occlusion sensor 88, a vehicle windshield wiper control 92, and a vehicle speed sensor 94. Optionally, voltage regulator 78 can be incorporated within power supply 76. Further operational control can be imparted using an optional thermistor 90 in-line and in thermally conductive communication with elongate heater 12 which will provide over-heating protection and/or heater regulation. Heater control system 70 includes a controller 71 having processing circuitry 72 and memory 74. Optionally, thermistor 90 can be replaced with a bimetallic temperature switch.

In operation, control system 70 receives input signals from switch 80, sensor 82, windshield wiper control unit 92, ECU 84, sensor 86, and sensor 88 and determines under which specific conditions to apply power from power supply 76 via voltage regulator 78 to heater 12.

FIG. 23 is a schematic circuit diagram illustrating one exemplary implementation of power control circuitry 22 for delivering electrical power to an elongate heating element 12. According to such implementation, a thermostat 23 is configured in series with a thermal protection switch 24 and elongate heater 12. Thermostat 23 is configured to trigger current flow in response to a detected normal temperature operating range requiring condensate mitigation, such as at or below freezing where frost, snow, or ice might occlude a lens. Thermal protection switch 24 is normally closed and is configured to interrupt current flow to elongate heater 12 by cutting off current flow in the event of a maximum temperature overload condition such as from a malfunction. In addition, an enabling temperature thermistor, or temperature-controlled switch 26 is also provided between a voltage source 25 and a ground 21 configured to turn on current flow when ambient air temperature is detected below a threshold temperature level, such as at or below 40 degrees Fahrenheit (4.4 degrees Celsius). In one case, a bimetallic temperature switch can be used in place of thermal protection switch 24 and/or thermostat 23. A layer, or bed 29 of thermally conductive potting material is provided to place thermostat 23 and thermal protection switch 24 in thermally conductive communication with elongate heater 12.

FIG. 24 is a schematic circuit diagram illustrating another exemplary implementation of power control circuitry 122 for delivering electrical power to an elongate heating element 12 and including an NPN power transistor 28. According to such alternative implementation, thermostat 23 is configured in series with thermal protection switch 24 and elongate heater 12 to trigger current flow in response to a detected normal temperature operating range requiring condensate mitigation, such as at or below freezing where frost, snow, or ice might occlude a lens. Thermal protection switch 24 is configured to interrupt current flow to elongate heater 12 to cut off current flow in the event of a maximum temperature overload condition such as from a malfunction. In addition, an enabling temperature thermistor, or temperature-controlled switch 26 is also provided between a voltage source 25 and a ground 21 configured to turn on current flow when ambient air temperature is detected below a threshold temperature level, such as at or below 40 degrees Fahrenheit (4.4 degrees Celsius). Furthermore, a bias resistor 27 and an NPN power transistor are provided to deliver higher current levels to elongate heater 12 for conditions that required greater heat output. A layer, or bed 29 of thermally conductive potting material is provided to place thermostat 23 and thermal protection switch 24 in thermally conductive communication with elongate heater 12. A circuit board 31 is optionally provided for carrying switch 26, biasing resistor 27, and NPN power transistor 31. It is understood that NPN power transistor 28 and biasing resistor 27 may be optionally replaced by other solid state power switching components or other devices, including mechanical relays.

FIG. 25 is a simplified vertical centerline sectional view of one technique for producing an elongate heating element 12, such as heating element 12 of FIGS. 1-9 or heating element 1012 in FIG. 50, having a centered heat generating wire 40 carried centrally of an elongate thermally conductive body, or tube 54 according to a first step where central heating wire 40 and forming tube 54 are placed in tension to coaxially align the heating wire 40 centrally within the outer tube 54 when injecting and forming the elongate heating tube element. More particularly, a fluid material pump assembly 60 is affixed coaxially at one end of tube 54 into a circumferential bore 71 and a fluid material vacuum assembly is affixed coaxially at another opposed end of tube 54 into a circumferential bore 73. A circumferential collar on each assembly 60 and 62 is clamped with ring clamps (not shown) onto each end of tube 54. Assemblies 60 and 62 are then urged apart mechanically to stretch tube 54 into a linear shape while wire 40 is similarly tensions by an external wire tensioning device (not shown), such as a winding drum and an end clamp as wire 40 passes out the center of each assembly 60 and 62 via respective wire ports 75 and 77. Assembly 60 includes a continuous fluid passage 79 extending from a supply chamber 64 of flowable and curable heat transfer material 38. A piston on assembly 65 is used to urge or pump material 38 through port 79 and into tube 54 where it flows toward assembly 62. Additionally or alternatively, assembly 62 includes a continuous fluid passage 81 extending from a vacuum supply chamber 66 that imparts a vacuum (measured by a vacuum gauge 63) when a piston 67 is retracted in a corresponding cylindrical bore of chamber 66. In this way, one or both of a pressurized flow (measured by a pressure gauge 61) of material 38 and a vacuum draw of such flowable material (uncured) is used to fill an inner bore of tube 54 to entrap wire 40 centrally of tube 54 without touching an inner wall of tube 54 while wire is under tension in tube 54 during at least an initial curing stage. If heater 12 is desired to be linear, then the process is complete and assemblies 60 and 62 are removed. If not, assemblies 60 and 62 are removed when material 38 is partially cured and then the sequential steps of FIGS. 26-28 are followed in order to impart a desired geometry to heating element 12. In this manner, an elongate heater tube 16 is formed into any desired fully cured geometric shape, such as a square, circle, oval, or any open-loop or closed-loops shape including L-shapes, U-shapes, or linear configurations.

FIG. 26 is a first optional step for shaping the elongate heating element 12 of FIG. 25 when the inner material is partially cured and still somewhat flexible by forming a first right angle bend prior to complete curing of the injected thermally conductive material while maintaining resistive heating wire 40 coaxially within the resulting elongate heater tube 16.

FIG. 27 is a second optional step for shaping the elongate heating element 12 of FIG. 26 showing the forming of a second right angle bend prior to complete curing of the injected thermally conductive material while maintaining resistive heating wire 40 coaxially within the resulting elongate heater tube 16.

FIG. 28 is a third step for shaping the elongate heating element 12 of FIG. 26 showing the forming of a third right angle bend prior to complete curing of the injected thermally conductive material and resulting in a square elongate heating element while maintaining resistive heating wire 40 coaxially within the resulting elongate heater tube 16. In this final position, heater tube 16 forms a generally square configuration suitable for use in the design depicted in FIG. 50 but it is understood that any geometric shape can be similarly realized by changing the bend angles and radiuses of the steps taken in FIGS. 26-28.

Figure 29:
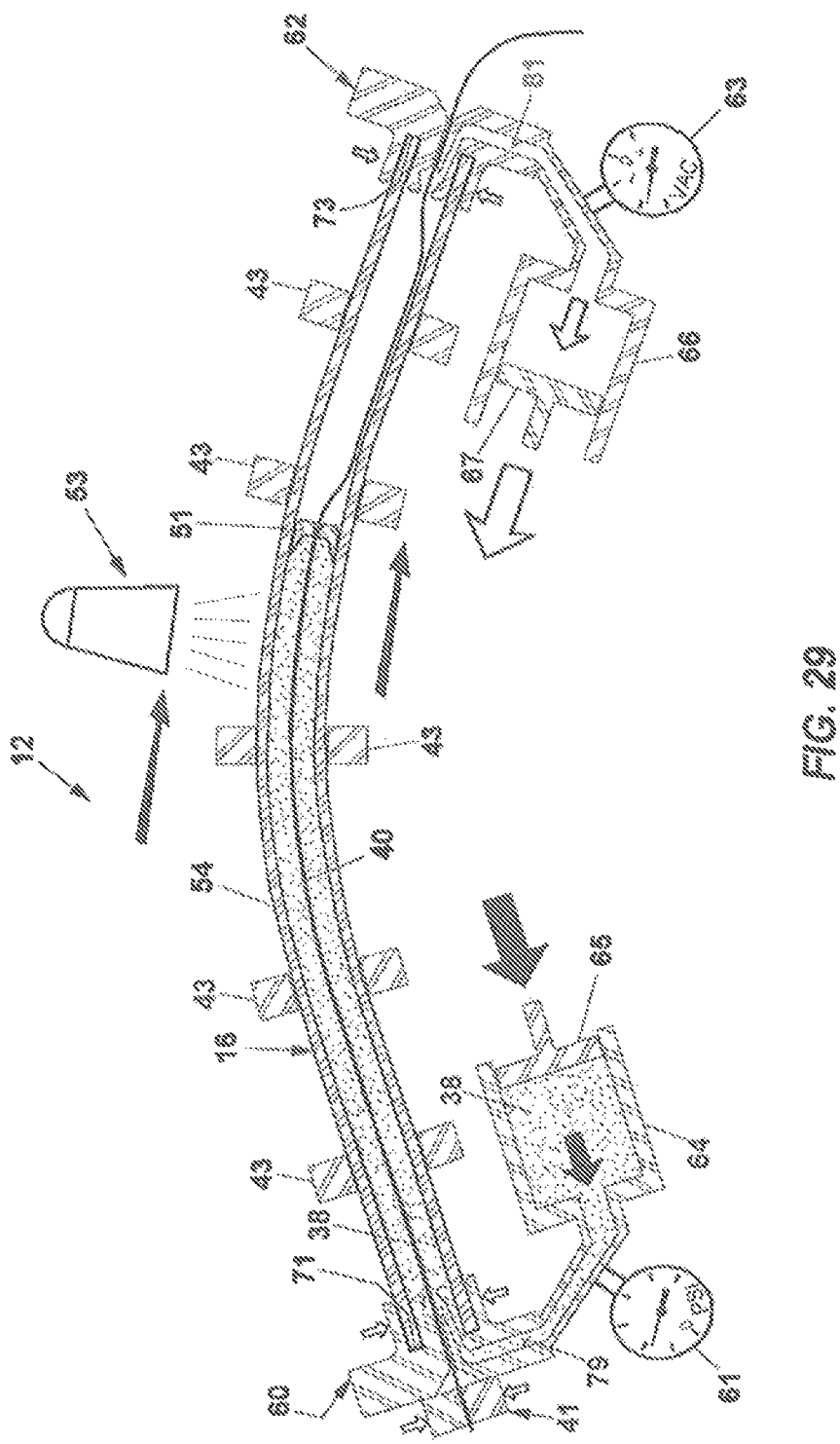
FIG. 29 is a simplified vertical centerline sectional view of another technique for producing an elongate heating element having a centered heat generating wire carried centrally of an elongate thermally conductive body, or tube according to a forming step where a central heating wire is centered coaxially within an outer tube as thermally conductive flowable and curable material is injected within the tube and a piston plunger is advanced along the tube as material is injected and drawn with differential pressure, centering the heating wire within the outer tube embedded in the curing thermally conductive material.

FIG. 29 is a simplified vertical centerline sectional view of another technique for producing an elongate heating element 12 having a centered heat generating wire 40 carried centrally of an elongate thermally conductive body, or tube 54 according to a forming step where central heating wire 40 is centered coaxially within outer tube 54 as thermally transmissive, flowable, and curable material 38 is injected within tube 54 and a piston body 51 is advanced along the tube responsive to pressure from material flow as material 38 is injected and drawn with differential pressure, centering the heating wire 40 within the outer tube 54 embedded in the curing thermally conductive material 54. A frame-supported array of support collars 43 hold tube 54 in a desirable three-dimensional shape during injection and curing of material 38 within tube 54.

As shown in FIG. 29, pump assembly 60 and vacuum assembly 62 are constructed in the same manner as described in FIG. 25. Pump assembly 60 includes a continuous fluid passage 79 extending from a supply chamber 64 of flowable and curable heat transfer material 38. A piston 65 on assembly 60 is used to urge or pump material 38 through port 79 under pressure (measured by pressure gauge 61) and into tube 54 where it flows toward assembly 62. Additionally or alternatively, assembly 62 includes a continuous fluid passage 81 extending from a vacuum supply chamber 66 that imparts a vacuum (measured by a vacuum gauge 63) when a piston 67 is retracted in a corresponding cylindrical bore of chamber 66. In this way, one or both of a pressurized flow (measured by a pressure gauge 61) of material 38 and a vacuum draw of such flowable material (uncured) is used to fill an inner bore of tube 54 to entrap wire 40 centrally of tube 54, guided by piston body 51, without touching an inner wall of tube 54 while wire is under tension in tube 54 during at least an initial curing stage. Piston body 51 is driven by forward motion of flowable material 38 and maintains wire 40 coaxially within an inner wall of tube 54 and viscosity of material 38 maintains wire centrally of tube 54 in electrically isolated relation from tube 54 as material 38 is preferably electrically insulative and thermally transmissive (one or more of conduction, convection and radiation). A two-piece pair of semi-circular clamps form a clamp assembly 41 configured to grip and hold wire 40 to impart tension as piston body 51 migrates towards assembly 62. After forming, tube 54 is unclamped from within circumferential bores 71 and 73 in assemblies 60 and 62 and they are removed from each end, freeing the resulting elongate heater tube 16 provided by heater assembly 12.

FIGS. 30-34 illustrate a two-stage process for coating an inner wall of a heater assembly 12, inserting a heater wire within the coated inner wall, and filling a remainder coaxial void about the wire with further material to entrap the wire somewhat coaxially within the tube and electrically insulate the inner wire from the outer tube.

FIG. 30 is a simplified perspective view of a tubular wall coating technique and apparatus for producing an elongate heating element having a centered heat generating wire carried centrally of an elongate thermally conductive body, or tube according to a two-step process where an inner flowable and curable thermally conductive material is injected from a supply tank, or chamber 164 (containing fluent and curable thermally transmissive material) and oscillated between three co-acting roller assemblies 45, 47, and 49 to coaxially coat an inner surface of an outer tube 54 and a heating wire is subsequently (after curing of the inner coating) inserted into the resulting bore after which additional thermally conductive, flowable and curable material is injected within the bore to affix the heating wire therein in thermally conductive relation.

FIG. 31 is a simplified vertical centerline sectional view of the technique and apparatus of FIG. 30 after coating the inner bore of tube 54 with coaxial layer 38A and prior to injecting additional flowable and curable thermally conductive material within the bore to entrap the heating wire coaxially therein. More particularly, fluent source chamber 164 contains fluent and curable thermally transmissive material 38 and a piston 165 is used to urge and flow material 38 into an inner bore of tube 54 as tube 54 is rotated by coaction of roller assemblies 45, 47, and 49 to impart rotation of tube 54 and distribute fluent material 38 as a coaxial layer 38A coating an inner wall of tube 54. Each roller assembly 45, 47 (see FIG. 30) and 49 includes a pair of follower wheels at opposed ends having a grippy outer surface that grips and engages an outer surface of tuber 54 to impart corresponding rotation to tuber 54 that helps coat and distribute layer 38A within tube 54 until cured into place. Additionally or optionally, tube 54 can also be oscillated back and forth in an axial direction to further distribute material 38 to uniformly form coating 38A. Tube 54 forms part of heater assembly 12 in the form of elongate heater tube 16.

FIG. 32 is a vertical sectional view of the technique and apparatus of FIGS. 30-32 taken along line 32-32 of FIG. 31 during the coating step depicted in FIG. 31. More particularly, Material 38 is urged from chamber 164 via displacement of piston 165 and into tube 54 to form coaxial coating 38A as tube 54 is rotated by roller assemblies 45, 47 and 49 to impart rotation of tube 54 and distribute fluent material 38 as coaxial layer 38A coating an inner wall of tube 54.

FIG. 33 is a simplified perspective view of a tube 54 having an internal coating of electrically insulating and thermally transmissive material 38A for an elongate heating element, or heater assembly 12 with a heating wire 40 positioned in-place prior to adding a second layer of thermally conductive material within material layer 38A. The inner bore of tube 54 is coated with a cured (or partially cured) coaxial layer 38A and an additional flowable and curable thermally transmissive material core is then inserted into the resulting inner bore, as shown in FIG. 34. Coaxial resistance heating wire 40 is inserted, then tensioned, within inner layer 38A, after which additional material 38 (see FIG. 31) is injected therein (see FIG. 34) to entrap wire 40 coaxially within tube 54.

FIG. 34 is a vertical sectional view taken along line 34-34 of FIG. 33 showing the tube 54 of heater assembly 12 after receiving the coating in FIG. 33 and just prior to injecting the second, inner coaxial core of thermally conductive, flowable and curable material therein to trap wire 40 coaxially within tube 54 of heater assembly 12. Additional electrically insulating and thermally transmissive material 38 (see FIG. 31) is injected within the bore inside of coated tube 54 using differential pressure to affix the heating wire 40 therein in thermally transmissive relation. Differential pressure is generated by using one or both of a supply chamber 164 of flowable and curable heat transfer material 38 and a vacuum supply chamber 166 that imparts a vacuum within tube 54 to draw material from supply chamber 64.

Figures 35, 36, 37:
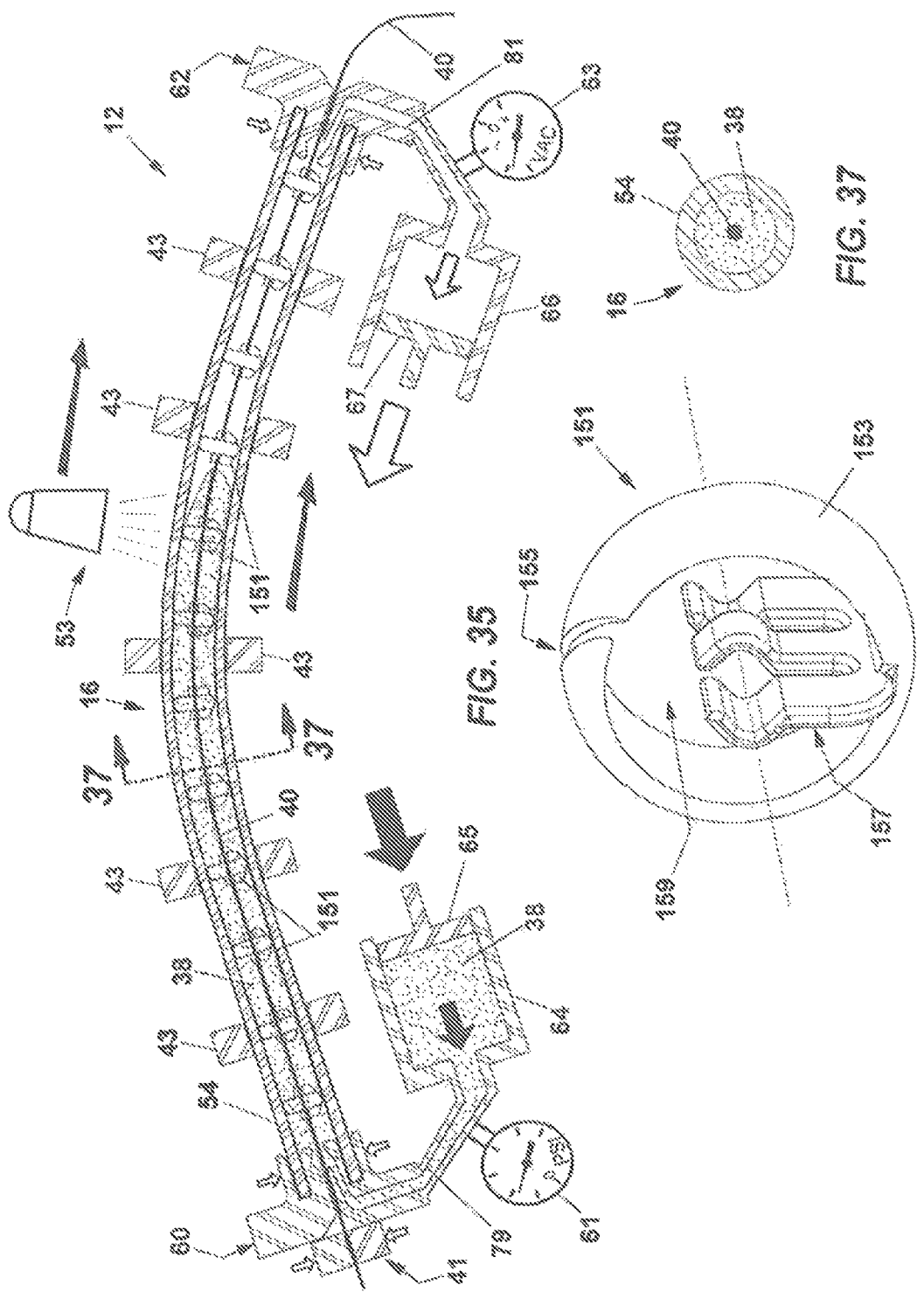
FIG. 35 is a simplified vertical centerline sectional view of even one more technique for producing an elongate heating element having a centered heat generating wire carried centrally of an elongate thermally conductive body, or tube where a central heating wire is carried coaxially within a length of forming tube using a plurality of spaced-apart hat spacers in order to coaxially align the heating wire within the outer tube when injecting and forming the elongate heating tube element while injecting thermally conductive, flowable and curable material within the bore using differential pressure.
FIG. 36 is an enlarged perspective view of one heating wire alignment hat of FIG. 33 that is thermally conductive and electrically non-conductive.
FIG. 37 is a cross-sectional view of the resulting elongate heating element taken along line 37-37 of FIG. 35.

FIG. 35 is a simplified vertical centerline sectional view of even one more alternative technique for producing an elongate heating element 12 having a heat generating resistance wire 40 carried centrally of an elongate thermally conductive body, or tube 54 where a central heating wire is carried coaxially within a length of forming tube 54 using a plurality of spaced-apart ring-shaped spacers 151 in order to coaxially align the heating wire 40 within the outer tube 54 when injecting and forming the elongate heating tube element 12 while injecting thermally conductive, flowable and curable material 38 within the bore using differential pressure. A frame-supported array of support collars 43 hold tube 54 in a desirable three-dimensional shape during injection and curing of material 38 within tube 54.

As shown in FIG. 35, pump assembly 60 and vacuum assembly 62 are constructed in the same manner as described in FIGS. 25 and 29. Pump assembly 60 includes a continuous fluid passage 79 extending from a supply chamber 64 of flowable and curable heat transfer material 38. A piston 65 on assembly 60 is used to urge or pump material 38 through port 79 under pressure (measured by pressure gauge 61) and into tube 54 where it flows toward assembly 62. Additionally or alternatively, assembly 62 includes a continuous fluid passage 81 extending from a vacuum supply chamber 66 that imparts a vacuum (measured by a vacuum gauge 63) when a piston 67 is retracted in a corresponding cylindrical bore of chamber 66. In this way, one or both of a pressurized flow (measured by a pressure gauge 61) of material 38 and a vacuum draw of such flowable material (uncured) is used to fill an inner bore of tube 54 to entrap wire 40 centrally of tube 54, guided by piston body 51, without touching an inner wall of tube 54 while wire is under tension in tube 54 during at least an initial curing stage. Individual ring-shaped spacers 151 affixed to discrete spaced-apart locations along wire 40 coaxially within an inner wall of tube 54 and material 38 flows through each spacer 151 and centrally of tube 54 to support wire 40 in electrically isolated relation from tube 54 as material 38 is preferably electrically insulative and thermally transmissive (one or more of conduction, convection and radiation). Spacers 151 are each constructed from an electrically insulative and thermally transmissive material. A two-piece pair of semi-circular clamps form a clamp assembly 41 configured to grip and hold wire 40 to prevent migration of wire 40 and spacers 151 towards assembly 62. After forming, infrared energy is used to cure material 38 from one or more infrared lamps 53, after which tube 54 is unclamped from within circumferential bores 71 and 73 in assemblies 60 and 62 and from support collars 43 and they are removed from each end, freeing the resulting elongate heater tube 16 provided by heater assembly 12.

FIG. 36 is an enlarged perspective view of one heating wire alignment ring-shaped spacer 151 of FIG. 33 that is thermally conductive and electrically insulative. More particularly, spacer 151 has a cylindrical outer ring portion 153 with a diagonal slit 155 that enables assembly onto heating wire 40 (see FIG. 35). An integrally formed fork, or spring clamp assembly 157 extends from outer ring portion 153 towards a coaxial location within ring portion 153 to retain such wire at a coaxial location within ring portion 153 and within tube 54 (of FIG. 35). Spring clamp assembly 157 includes three flexible clamp fingers, two outer fingers configured to oppose in inner finger to grip a section of heater wire to hold spacer 151 at a desired location along such wire while inserting the wire and spacers within tube 54, and during injection of fluent material 38 therein and there through. Central bore 159 in spacer 151 enables flow of such fluent material 38 during such step.

FIG. 37 is a cross-sectional view of the resulting elongate heater tube 16 taken along line 37-37 of FIG. 35. More particularly, tube 54 is shown filled with material 38 with wire 40 supported and entrapped (after curing) coaxially within tube 54.

FIG. 38 is a simplified perspective view of yet even another technique for producing an elongate heating element 512 using a mold assembly 89 comprising a pair of mating molds 81 and 83 and having a centered resistance heat generating wire carried centrally of an elongate thermally conductive body, or tube (similar to that shown in FIGS. 1-37) where a central heating wire is carried coaxially within a length of electrically insulative and thermally transmissive (conductive, convective, and radiant) using a plurality of spaced-apart hat spacers (not shown, but similar to spacers 151 of FIG. 36) in the female mold surfaces 85 and 87 in order to coaxially align the heating wire within the outer tube when injecting and forming the elongate heating tube element while injecting thermally conductive, flowable and curable material within the bore using differential pressure.

FIG. 39 is a simplified perspective view of yet another elongate heater tube and technique for producing an elongate heating element 612 using a centered resistive heat-generating wire 640 (see FIG. 4) carried centrally within a bore of a pre-formed elongate thermally conductive and electrically insulative inner tubular body, or tube 655 having a first outer diameter where a central heating wire 640 is carried coaxially within a length of outer tube 655 by inserting the wire in loose-fit within a second thermally conductive and electrically insulative body, or tube 654 having an inner diameter larger than the outer diameter of tube 655 in order to substantially coaxially support the heating wire within tube 654. Optionally, any one of the thermally transmissive materials can be injected within inner tube 655 about wire 640 according to one or more of the techniques and configurations previously disclosed with reference to FIGS. 7-21 and 25-38.

More particularly, elongate heating element 612 is shaped in a circular form having a sealed crimp and solder male connector 660 and 662 affixed at either end to wire 640 (see FIG. 40) and wire 668. Wire 668 is soldered to a first conductive lead on a thermistor 666. Wire 670 is soldered to a second conductive lead on thermistor 666 and folded over and electrically connected via a second sealed crimp and solder wire connector 664 to wire 640 (see FIG. 40). Connectors 660, 662 and 664 each contain solder and an outer heat shrink tube that electrically couples together connectors and/or wires. A resin coated fiberglass sleeve, or insulating tube 674 is provided over thermistor 66 and outer tube 654 to hold thermistor in proximate heat communication with tube 654, while a plastic shrink tube 672 is provided over insulated wires 668 and 670 to hold the folded over configuration and keep thermistor 666 adjacent to tube 654. Finally, a heat shrink tube 676 is affixed atop the resulting assembly and heat shrunk thereover, exposing male plug of connector 662 and protecting and securing together the remaining internal components.

According to one construction, inner tube 655 comprises an item #0000014194 PTFE extruded cylindrical cross-section black-RoHS tube having a 1/16" inner diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to one construction, outer tube 654 comprises an item #0000165338 PTFE extruded cylindrical cross-section black-RoHS tube having a 5/16" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to one construction, connectors 660 and 662 are respectively part numbers 07009729 and 07009726 sealed crimp and solder connectors with 0.250" spade size manufactured by Power Phase and Distributed by Fastenal, 2001 Theurer Blvd., Winona, Minn. 55987.

According to one construction, connector 664 is a sealed crimp and solder connector for end butt joining wires part number 07009714 manufactured by Power Phase and Distributed by Fastenal Company, 2001 Theurer Blvd., Winona, Minn. 55987.

According to one construction, thermistor 666 is a model number MA201 P+060F temperature switch manufactured by Portage Electrical Products, Inc., 7700 Freedom Ave NW, North Canton, Ohio. 44720. Optionally, a model number MA195+060F from Portage Electrical Products can also be used.

According to one construction, heat shrink tube 672 is part no 58655 heavy wall adhesive-lined black sealed heavy wall tubing, 8-1 AWG manufactured by Power Phase and distributed by Fastenal, 2001 Theurer Blvd., Winona, Minn. 55987.

According to one construction, heat shrink tube 676 is a similar heavy wall adhesive-lined black sealed heavy wall tubing manufactured by Power Phase and distributed by Fastenal Company, 2001 Theurer Blvd., Winona, Minn. 55987.

According to one construction, resin coated fiberglass sleeve is a 3/8" diameter black segment or braided sleeve manufactured and sold as a braided sleeving product under the trade name Insultherm by Techflex, Inc., 104 Demarest Road, Sparta, N.J. 07871.

FIG. 40 is a vertical centerline sectional view of the elongate heating element 612 taken along line 40-40 of FIG. 39. More particularly, wire 640 is pushed or pulled through inner tube 655 and outer tube 654 is then pulled over inner tube 655 and wire 640.

FIG. 41A is a simplified perspective view of an even further technique for producing an elongate heating assembly 712 forming a heater tuber, or element 716 using a peel-away or removable outer tube, or removable mold 754 to mold a heating wire 740 within a body of thermally conductive, flowable and curable material 738 injected within tube 754 using differential pressure according to one of the techniques provided above with reference to FIGS. 1-40. As shown, tuber 754 can be a paper tube, plastic tube, or any other tube capable of being separated from cured material 38 after a forming operation, such as providing a pair of semi-cylindrical half-tubes 755 and 757 that separate along longitudinal score lines to peel away from resulting elongate heater tube 716. A shrink-wrap tube 750 and 752 is secured over respective solder connections (not shown) that connect conductive leads 742 and 744 to resistive heating wire 740.

FIG. 41B is a simplified vertical sectional view of another apparatus and method for producing an elongate heating element 10712 using an extruder die assembly 10780 to coat an electrically resistive heating wire 10740 with a high temperature plastic, or PTFE outer coating, or cover tube 10738 that is electrically insulative, thermally insulative, flexible, and heat resistant. Tube 10738, according to one construction, comprises a polytetrafluoroethylene (PTFE) tube that transfers heat from wire 10740 as a resistive load when current is supplied from a 12V+ power source (not shown) from a vehicle wiring harness (not shown).

Extruder die assembly 10780 of FIG. 41B comprises a die body 10781 receiving a center tapered core 10783 which is supported (and threaded internally) coaxially within die body 10781 to form a frustoconical gap 10793 that tapers down to terminate in a cylindrical end bore 10788 that defines an outer diameter for cover tube 10738 formed by molten material extruded from die assembly 10780 about wire 10740. A central bore 10786 in plug 10783 is sized to receive wire 10740 as it is drawn forward under tension (by a wire puller or take-up mandrel) while molten material 10791 is extruded over wire 10740. Optionally or additionally, bore 10786 can be sized to allow passage of lead wires and end solder connections similar to conductive lead 744 and shrink wrap connector (and solder joint) 752 (see FIG. 41A). A cylindrical and end-tapered reservoir 10790 of a reservoir assembly 10799 contains a supply of molten, or semi-liquid material 10791, such as PTFE and a piston 10795 is urged into reservoir 10790 to pressurize and deliver molten material 10791 into cylindrical feed outlet 10792 into frustoconical gap 10793 as wire 10740 is drawn through die assembly 10780, leaving cover 10738 about wire 10740.

FIG. 42 is an exploded perspective view of a vehicle tail light assembly 1010 having a radar unit 1015 and an array of LED lighting assemblies within a housing 20 having an electromagnetic wave lens, or transmissive portion 1018 removed from the housing 20 and showing a heater assembly 12 having an elongate heating element 1016 (see FIG. 45) that encompasses a target area to surround a radar 15 or light emitter, according to one construction. An inner lens member 1022 also affixes to housing 1020 to form assembly 10. Lens 1018 is transmissive to both radar and visible light electromagnetic waves. A further light transmissive inner lens, or transmissive portion 10. Radar unit 1015 extends within an aperture 1023 in inner lens, or panel 1022 (see FIG. 44) and behind outer lens, or panel 1018. Optionally, radar unit 1015 and heater 1012 can be provide within any housing and/or behind any body panel of a vehicle that has a radar transmissible portion, or lens, such as behind a plastic or composite vehicle bumper.

FIG. 43 is an enlarged perspective view from above with an outer lens cover 1018 removed of the heater 1012 and radar unit 1015 within the housing 1020 of the vehicle tail light assembly 1010.

FIG. 44 is a fully exploded perspective view of the tail light assembly 1010 of FIG. 42 and further showing the heater assembly 1012 relative to the housing 1020, the aperture 1023 in inner lens 1022 and relative to heater assembly 1012 and outer lens 1018.

FIG. 45 is a perspective view from above of the heater of FIGS. 42-44 showing one elongate heating element 1016 configured in a frame member 1014 of heater assembly 1012 to encompass a rectangular radar unit 1015 (see FIG. 44) within a vehicle rear light housing 1020 (see FIG. 44). Insulated power supply leads 1026 and 1028 from heater tube 1016 terminate in an electrical connector 1024 configure to mate electrically in sealing relation with a complementary connector on a vehicle wiring system to supply power to heater element 1016. According to one construction, frame 1014 is formed from thermally conductive material, such as aluminum. A front face of frame can have a high emissivity finish, or coating such as a flat black ceramic coating that enhances radiant heat transfer from a front surface of frame 1014 onto an electromagnetically transmissive cover, or lens.

FIG. 46 is a front elevational view of the heater 1012 of FIG. 45 showing the general rectangular, or square shape of frame 1014 and elongate heating tube 1016.

FIG. 47 is a right side view of the heater 1012 of FIG. 46 showing elongate heater tube 1016 carried within a circumferential groove within frame 1014.

FIG. 48 is a plan view from above of the heater 1012 of FIG. 44 showing in further detail how elongate heater tube 1016 is carried within a circumferential outer groove of frame 1014.

FIG. 49 is a vertical sectional view of the heater assembly 1012 taken along line 47-47 of FIG. 46. According to one construction, flexible tube 1024 comprises a single layer segment of medical plastic tubing, such as PTFE tubing. A thermally conductive and electrically insulative curable fluid material 1026 is used to fill the tube (after which it is cured and hardened) and entrap a resistive wire heater 1028, such as a heat generating resistance wire, for example, a Nichrome wire, within tube 1024. A vacuum (or differential pressure) can be used to pull material 1026, in a liquid or fluid state, within tube 1024 where it is held in a desired shape before curing to impart structural stability to the resulting assembly. According to one construction, material 1026 is an EP1200 black adhesive from Ellsworth Adhesives, W129 N10825 Washington Drive, P.O. Box 1002, Germantown, Wis. 53022-8202 United States. Other suitable epoxies, filled epoxies, or other curable fluidic materials that are thermally conductive and electrically insulative can also be used. Furthermore, tubing 1024 can have a high emissivity outer coating, such as a flat black coating or a ceramic coating to increase radiant heat transfer from heater 1012 to a lens or covering in front of a vehicle mounted radar unit. In one case, elongate heating element, or tube 1016 is adhesively affixed with a thermally conductive adhesive 1030 within a groove in frame 1014 and a layer 1034 of thermal insulative material such as foam or fiberglass is provided behind heater element 1016 and a front reflective layer 1032 (such as aluminum) is provided proximate element 1016 to reflect forward any radiant heat. Layers 1034 and 1032 are adhesively affixed onto tube 1016 and/or frame 1014 with a high temperature adhesive 1031, such as a silicon adhesive.

Mounting bracket 1014 is formed from a thermally conductive material, such as aluminum and preferably has a high emissivity front surface coating, such as a flat black ceramic coating, or black anodizing to increase radiant heat transfer from such front surface to a target lens or cover where heat needs to be delivered in order to mitigate condensate build-up.

FIG. 50 is an exploded perspective view from above of heater assembly 1012 of FIG. 44 showing one elongate heating element 1016 and support frame 1014 configured to support the elongate heating element 1016 of FIGS. 45-49 so as to encompass a rectangular radar unit within a vehicle light housing. A strip of thermally conductive adhesive 1030 is provided between frame 1014 and heater 1016. A shiny aluminum foil heat shield 1032 and a foam insulating shield are also adhesively affixed to a back side of heater 1016 against frame 1014. Elongate heating element 1016 is constructed using one of the techniques shown above with reference to FIGS. 7-21 and 25-41, generally having a Nichrome heating wire embedded or inserted within a tubular outer non-electrically conductive and thermally transmissive tube that increases thermal mass, outer surface area, and enables the realization of a large high emissivity outer surface to maximize radiant heat transfer from the resulting larger thermal mass. One suitable encasement material is Loctite AA 3761, a light cured adhesive available from Loctite, a division of Henkel Corporation, One Henkel Way, Rocky Hill, Conn. 06067 United States.

Figure 51:
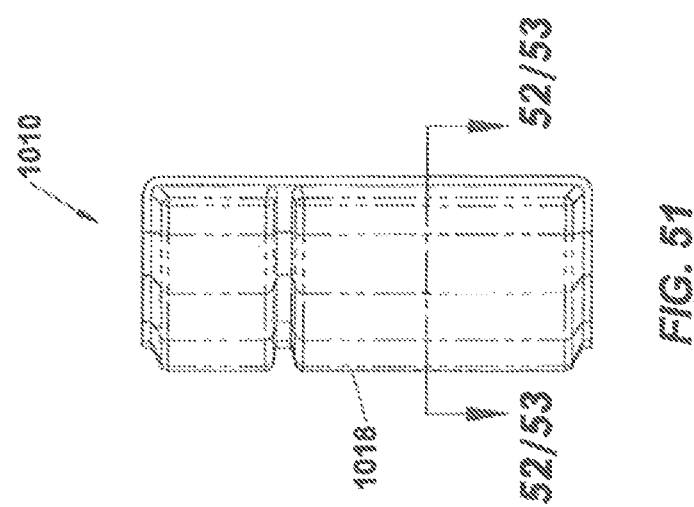
FIG. 51 is a right-side view of the tail light assembly of FIG. 42.

FIG. 51 is a right-side view of the tail light assembly 1010 of FIG. 42 showing the outer lens 1018.

Figure 52:
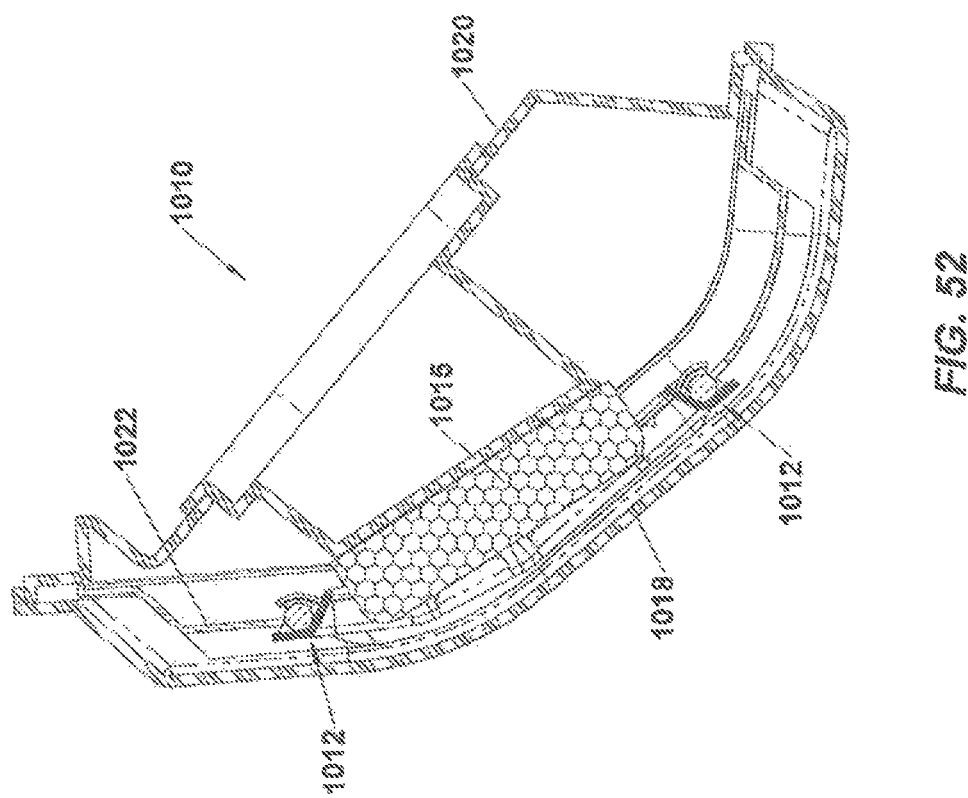
FIG. 52 is a horizontal sectional view of the tail light assembly of FIG. 51 taken along line 52-52 of FIG. 51.

FIG. 52 is a horizontal sectional view of the tail light assembly 1010 of FIG. 51 taken along line 52-52 of FIG. 51. More particularly, inner lens 1022 is shown encompassing radar unit 1015 behind outer lens 1018 and affixed to housing 1020. Heater unit 1012 encircles radar unit 1015 and is supported by housing 1020 in a location that maximizes heat transfer, and particularly radiant heat transfer to an inner surface of outer lens 1018. Lens 1018 is transmissive for radar electromagnetic waves and heat from heater assembly 1012 assists to reduce and remove snow, moisture, frost and any form of precipitation that might otherwise occlude radar unit 1015 from sending and receiving radar signs that are used by the vehicle to monitor and calculate position of the vehicle relative to known physical surroundings especially when implementing autonomous vehicle controls.

Figure 53:
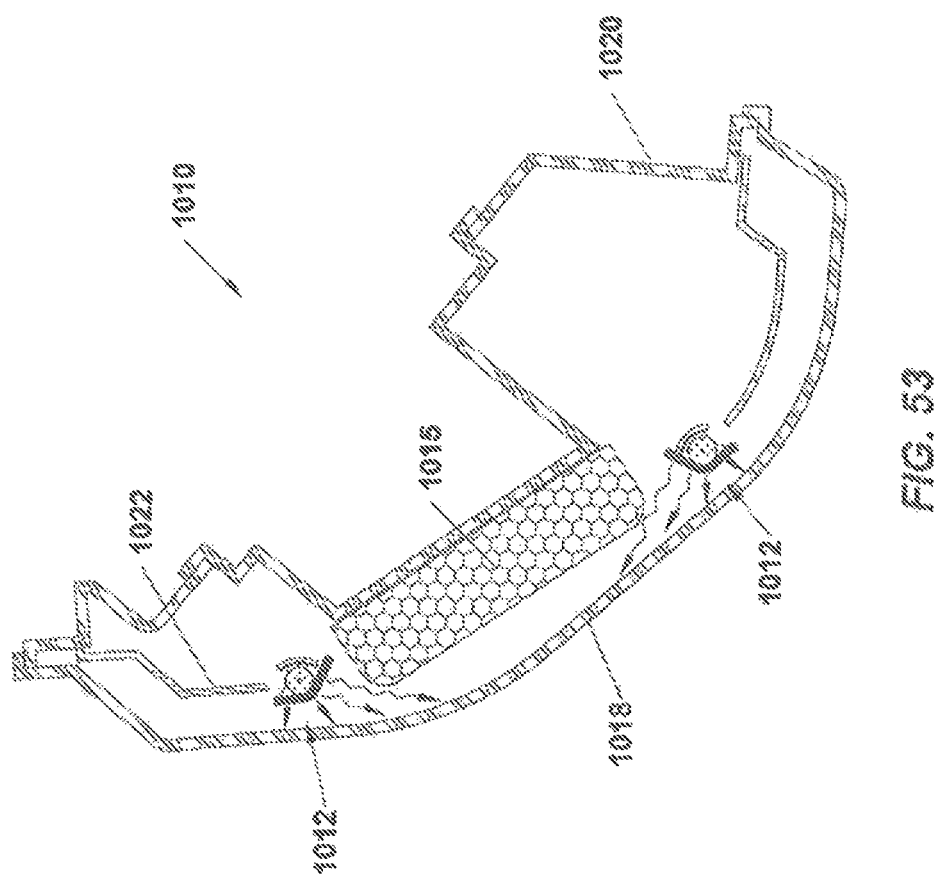
FIG. 53 is a horizontal sectional view of the tail light assembly corresponding with the view of FIG. 52 and showing radiant heat transfer from the heater to an inner surface of the lens.

FIG. 53 is a horizontal sectional view of the tail light assembly 1010 corresponding with the view of FIG. 52 and showing radiant heat transfer from the heater 1012 to an inner surface of the lens 1018 that clears outer lens 1018 of any occlusion from precipitation. Heater 1012 is supported within inner panel, or lens 1022 by housing 1020.

FIG. 54 is a partially exploded perspective view of a tail light assembly 1110 having a radar unit 1115 and an array of LED lighting assemblies provided beneath an inner lens 1122 with the outer lens 1118 removed from the housing 1120 and showing an alternative design heater 1112 over that shown in FIG. 42 and having an elongate heating element 1116 (see FIG. 55) affixed to inner lens 1122 (through apertures) using discrete ties, or straps 1114 (see FIG. 55) to affix the elongate heater element to encompass a target area about the radar unit 1115, or optionally about a light emitter.

FIG. 55 is an enlarged perspective view of the heated radar unit 1115 of FIG. 55 taken from the encircled region 53 of FIG. 52 showing the affixation of heating element 1116 of the heater assembly 12 to inner lens 1122 using an array of spaced-apart discrete clips or locking ties 1114 extending about a periphery of heating element 1116.

FIG. 56 is a fully exploded perspective view of the tail light assembly 1110 of FIG. 54 and further showing the heater assembly 1112 with the curved, generally rectangular elongate heater tube 1116 affixed with a plurality of plastic clips, or Nylon cable ties about radar aperture 1123 in inner lens 1122. Inner lens 1122 is affixed to an outer periphery of housing 1120 and radar unit 1115 seats within substantially rectangular aperture 1123, beneath outer lens 118 which is further affixed about an outer periphery to housing 1120, in assembly.

FIG. 57 is an enlarged view of the heater assembly 1112 taken from encircled region 57 of FIG. 56 and depicting the relationship of elongate heater tube 1116 and cable ties 1116 which secure heater tube 1116 about a periphery to individual apertures, or bores 1117 in inner lens 1122, providing a support frame for heater assembly 1112 to a light assembly 1110 (see FIG. 56).

FIG. 58 is a right-side view of the tail light assembly 1110 of FIG. 54 showing outer lens 1118 in side elevational view.

FIG. 59 is a horizontal sectional view of the tail light assembly 1110 of FIG. 58 taken along line 59-59 of FIG. 58 and showing securement of heater assembly 12 using individual cable ties 1114 secured about elongate heater tube 1116 to inner lens 1122. Inner lens 1122 is rigidly secured to housing 1120 along with radar unit 1115, after which outer lens 1118 is secured to housing 1120, and housing 1120 is rigidly secured to a vehicle frame using a plurality of fasteners (not shown).

Figure 60:
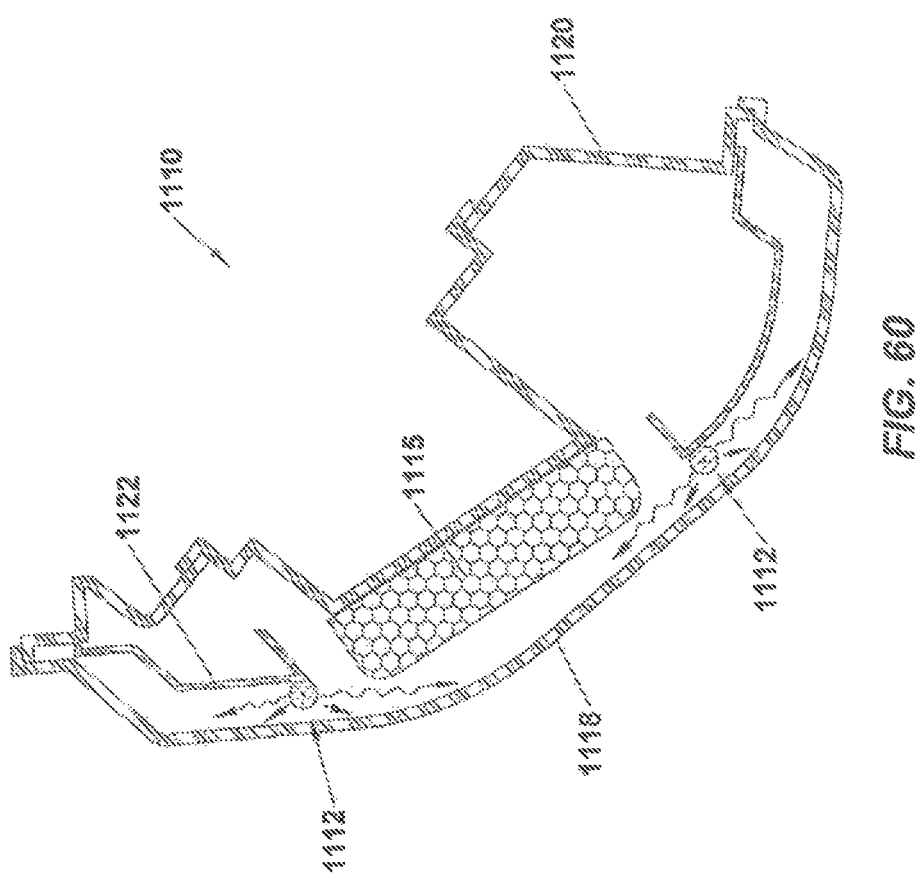
FIG. 60 is a horizontal sectional view of the tail light assembly corresponding with the view of FIG. 59 and showing radiant heat transfer from the heater to an inner surface of the lens.

FIG. 60 is a horizontal sectional view of the tail light assembly 1110 corresponding with the view of FIG. 59 and showing radiant heat transfer from the energized elongate heater tube of heater assembly 1112 to lens 1118. Structural support of radar unit 1115 and heater assembly 1112 relative to housing 1120 and inner lens 1122 is readily visible in sectional view.

FIG. 61 is a perspective view of a heated tail light assembly 1210 having a heater (not shown) provided in the assembly 1210.

FIG. 62 is an exploded perspective view of the heated tail light assembly 1210 of FIG. 61 showing the circular elongate heating element, or heater within the housing assembly having an array of LED lighting assemblies 1221 and having a heater assembly 1212 with an elongate heating element that encircles an entire LED board 1215 in a circular configuration so as to encompass a target area to surround an electromagnetic, or light emitter, or array of LED lights 1221. An inner lens 122 is affixed to housing 1220 about LED board 1215 to isolate board 1215 and LED lights 1221 from heater assembly 1212, as heater assembly 1212 extends about an outer periphery of inner lens 1222, beneath an outer lens 1218. A circumferential support groove 1219 is integrally formed in housing 1220 having an inner circumferential wall 1213 and a plurality of radially extending heater element support ribs 1217 extending radially outwardly from wall 1213. Wall 1213 in combination with inner lens 1222 isolate LED board 1215 and LED lights 1221 from direct exposure to heat emanating from heater assembly 1212. Accordingly, heat from heater assembly 1212 is better delivered to lens 1218 to remove condensate occlusion while mitigating heat buildup that might affect lifespan of LED lights 1221 and LED board 1215.

Figure 63:
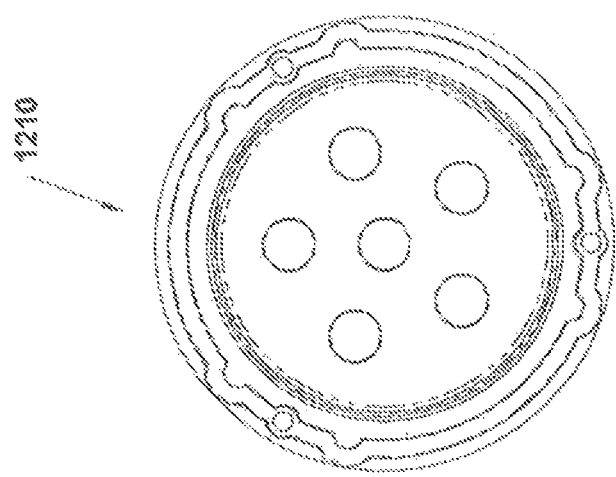
FIG. 63 is a front view of the heater tail light of FIG. 61.

FIG. 63 is a front view of the heater tail light 1210 of FIG. 61 showing the round light emitting configuration for the outer lens in need of heat delivery from a source.

Figure 64:
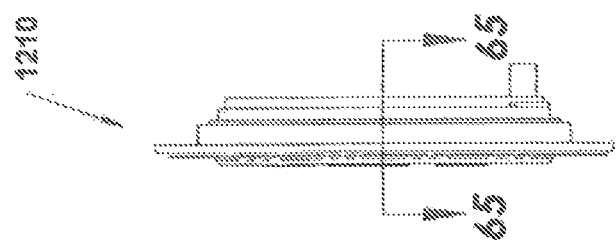
FIG. 64 is a right side view of the heated tail light of FIG. 63.

FIG. 64 is a right-side view of the heated tail light 1210 of FIG. 63 showing the assembled-together thickness.

Figure 65:
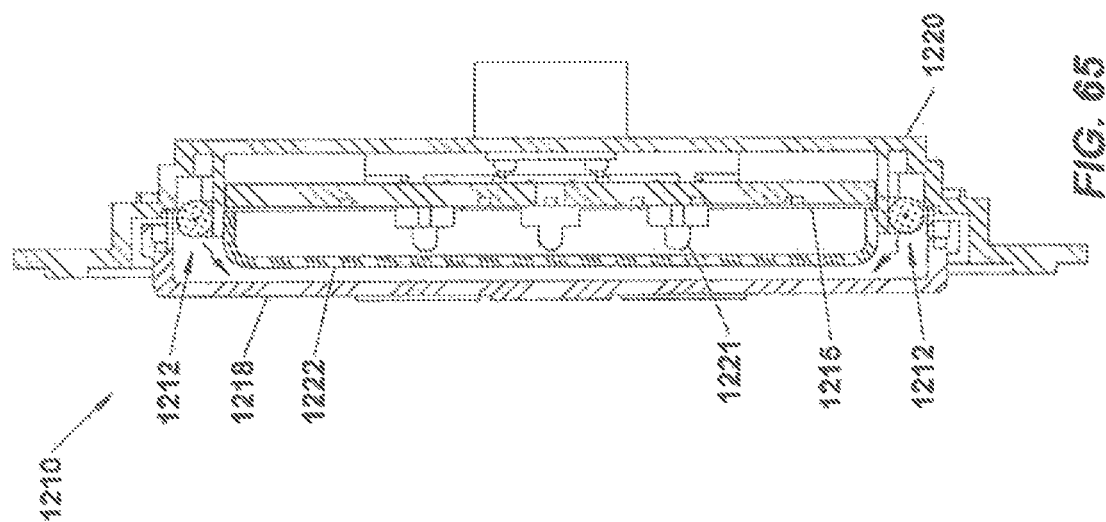
FIG. 65 is a vertical sectional view of the heated tail light assembly taken along line 65-65 of FIG. 64.

FIG. 65 is a vertical sectional view of the heated tail light assembly 1210 taken along line 65-65 of FIG. 64 showing internal positioning and spacing of the assembly. More particularly, placement of heater assembly 1212 is shown in a circumferential gap communicating with an air gap provided between inner lens 1222 and outer lens 1218. LED lights 1221 and LED board 1215 are accordingly encapsulated between inner lens 122 and housing 1220 and heater assembly 1212 is encapsulated in a separate chamber formed between inner lens 1222 and outer lens 1218 which reduces heat transfer between the two chambers and mitigates thermal life-degradation to LED lights 1221 and LED board 1215.

Figure 66:
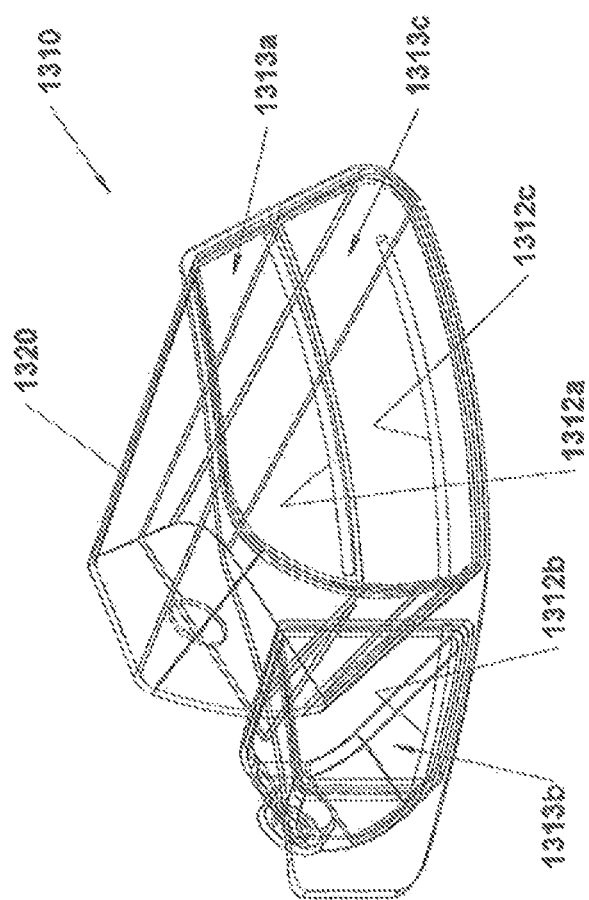
FIG. 66 is a perspective view of a heated headlight assembly having three elongate heating elements each provided in separate regions, or dedicated volumetric regions with a common light housing assembly each dedicated to one of a plurality of light assemblies within the common housing.

FIG. 66 is a perspective view of a heated headlight assembly 1310 having three elongate heating elements 1312*a*, 1312*b*, and 1312*c* each provided in separate regions, or dedicated volumetric light source cavities 1313*a*, 1313*b*, and 1313*c* with a common light housing 1320 each dedicated to one of a plurality of light sources, or LED boards (not shown) within the common housing 1320. Elements 1312*a*, 1312*b*, and 1312*c* are shown as arcuate elongate heater tubes, but they can also be L-shaped similar to a hockey stick, or have any other serpentine, linear, or arcuate shape, including closed cylinders of elongate tube including circles, ellipses, triangles, squares, or rectangles, or any other suitable shape that includes elongate elements of heater tube.

As shown in FIG. 66, elongate heating elements 1312*a*, 1312*b*, and 1312*c* are each individual heater tubes constructed using one of the techniques displayed in FIGS. 7-21 and 25-41 and controlled using the control system of FIG. 22 and the exemplary circuit layouts of FIGS. 23 and 24 for delivering electrical power [power conditioning]. In one case, elongate heating elements 1312*a*, 1312*b*, and 1312*c* each have an inner Nichrome wire segment commercially available as Nichrome 60, available from MOR ELECTRIC HEATING ASSOC., INC, 5880 Alpine Ave. NW, Comstock Park, Mich. 49321 United States. The Nichrome wire is inserted coaxially within an inner cylindrical PTFE tube, such as a blue PTFE extruded tube, ITEM #0000015700, available from Zeus Inc., Headquarters. 620 Magnolia Street, Orangeburg, S.C. 29115 United States. The resulting inner tube is then inserted within a clear outer PTFE tube, such as a larger diameter PTFE cylindrical tube from Fastenal Company, 2001 Theurer Blvd, Winona, Minn. 55987 United States. A thermally conductive and electrically insulative curable material is then inserted between the tubes while the tubes are held in a desired operating geometry (such as a rectangular or linear configuration). One suitable material is a two-part cured resign such as EP1200 Black resin available from Ellsworth adhesives, W129 N10825 Washington Drive, Germantown. Wis. 53022-8202 United States. Other suitable resins and glues can also be used such as thermally conductive epoxies and filled epoxies. Furthermore, the outer surface of the outer tube can be imparted with a high emissivity surface, such as a flat black ceramic surface that enhances radiant heat transfer from the heater to a lens surface.

Figure 67:
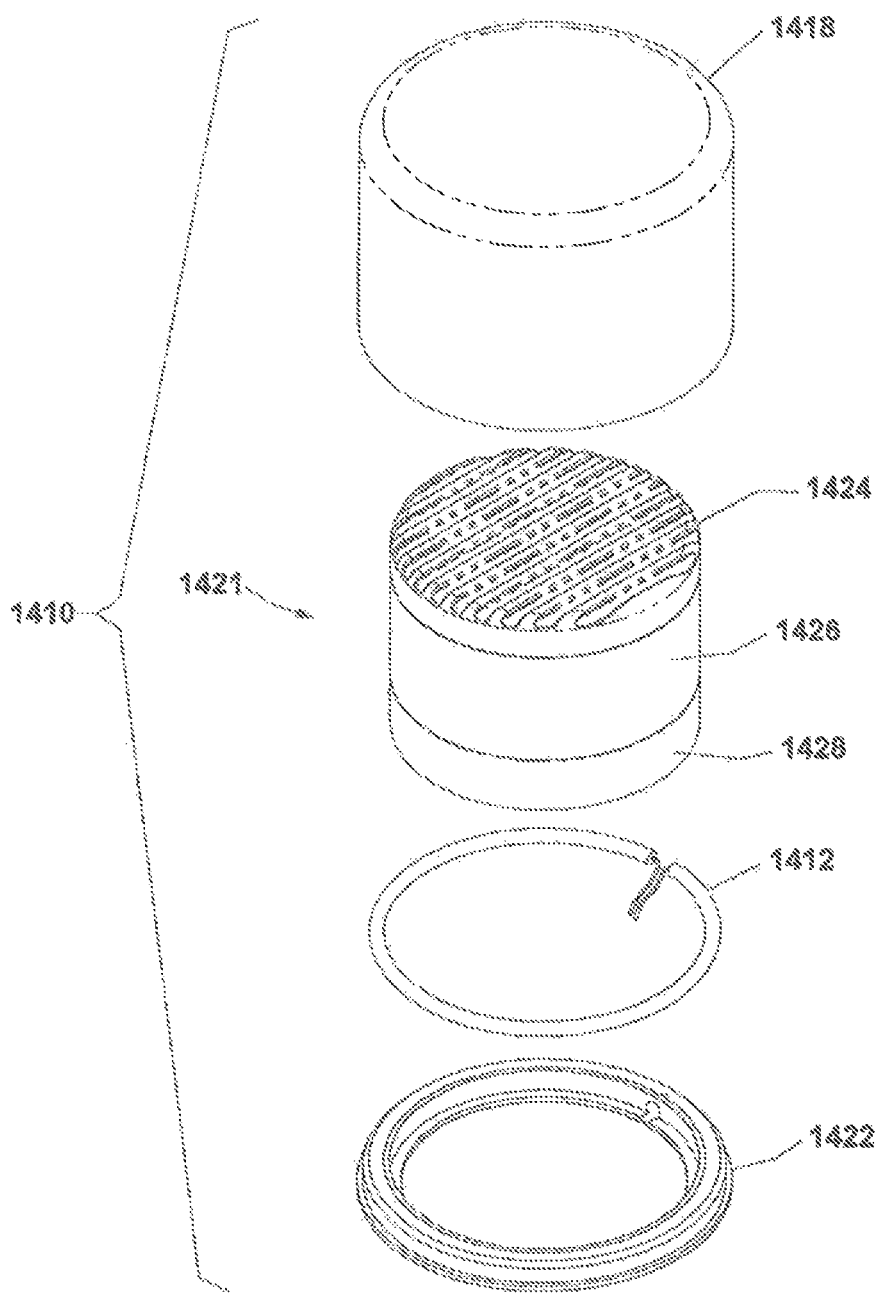
FIG. 67 is an exploded perspective view of a heated Lidar assembly having a lidar unit housing and a heater with an elongate heating element.

FIG. 67 is an exploded perspective view of a heated Lidar assembly 1410 having a lidar unit 1421, a Lidar housing, or clear dome 1418, and a cylindrical elongate heater element, or tube heater 1412. Tube heater 1412 can be constructed in any of the numerous ways detailed with reference to the embodiments taught in FIGS. 1-66, namely, a central Nichrome wire surrounded by a thermally transmissive thermal mass provided within a tube, or shaped as a cylindrical tubular or elongate element. Such thermal mass also provides electrical isolation of the Nichrome heating wire from an exterior surface of the tube heater, such as an outer surface of the tube. One suitable Lidar unit is an Alpha Puck Lidar from Velodyne LIDAR, Inc., 5521 Hellyer Ave., San Jose, Calif. 95138 capable of providing ultra-high resolution 3-dimensional point clouds of a surrounding environment using a laser emitter and a sensor. Other emitters and detectors of electromagnetic radiation can also be optionally used, such as radar or other visible light emitters and detectors.

As shown in FIG. 67, an optically clear dome 1418 is provided to enclose Lidar unit 1421 with tube heater 1412 trapped within an optically clear dome 1418 outside of Lidar unit 1421. Tube heater 1412 provides heat transmission to an inner (and outer) surface of dome 1418 via at least one of conduction, convection, and radiation heat transfer in order to mitigate and/or remove condensate from within and/or outside of dome 1418. In this manner, Laser light emitted from unit 1421 can pass unobstructed through clear dome 1418 and be received back through dome 1418 to respective sensors in order to map topology and/or objects surrounding heated Lidar assembly 1410. A relatively large, or increased thermal mass and outer surface area of tube heater 1412 combines with a readily shaped and conformable circuitous elongate tubular body to impart heat transfer to dome, or lens 1418 in order to mitigate or remove any condensate (frozen or liquid), such as moisture, frost, or snow. Assembly 1410 is affixed with fasteners and/or brackets (not shown) to a vehicle body, such as a vehicle roof.

Although FIG. 67 illustrates a Lidar, or laser emitter and detector assembly 1421 and an optically clear dome 1418, it is understood that a radar emitter and detector could be substituted for Lidar unit 1421 or any other form of electromagnetic radiation emitter and detector where dome 1418 is transmissive of electromagnetic waves passing from and returning to the unit with the dome 1418. In one case, unit 1421 can comprise a light source and dome 1418 comprises an optically transmissive material. In another case, radar comprising high frequency electromagnetic waves is generated and received by a unit within dome 1418. Optionally, dome 1418 can be constructed with some other suitable circumferential electromagnetic wave transmissible portion, such as a spherical dome, a frustoconical dome, or a partially circumferential electromagnetic wave transmissible portion on a dome. In the case of stereoscopic optical light detection, a pair of domes can be used in stereoscopic relation to capture respective stereoscopic optical conditions to generate stereoscopic visible light detection. within a single common dome having a heater, or within a pair of adjacent optical domes each having a heater.

FIG. 68 is a perspective view of the heated Lidar assembly 1410 of FIG. 67 illustrating the assembled-together view and showing a fully circumferential vertical outer electromagnetic wave transmission surface that covers a full 360 horizontal field of view for an internal laser assembly and detectors and further provides for elevational view along the 360 field of view.

FIG. 69 is a side view of the heated Lidar assembly 1410 of FIG. 68 further showing the cylindrical vertical electromagnetic wave transmission surface, and specifically the optically transmissive entire circumferential periphery for this specific construction.

FIG. 70 is a vertical centerline sectional view taken along line 70-70 of FIG. 69 of the heated Lidar housing assembly 1410 showing encasement of Lidar unit 1421 within dome 1418. More particularly, a gap, or circumferential cavity 1431 is provided within dome 1418 and an outer surface of Lidar unit 1421 that also extends across an entire distal end of Lidar unit 1421. A proximal end of Lidar unit 1421 is sealed with a circumferential synthetic rubber, or silicon grommet 1442 that forms a gasket and supports a circumferential heater 1412 along a bottom portion of cavity 1431. Lidar unit 1421 includes a top cylindrical cap 1424, a bottom cylindrical base 1428 and a cylindrical a cylindrical optically (and electromagnetically) transmissive lens 1426 that is affixed between cap 1424 and base 1428. It is understood that one or more power and data ports are provide though a bottom of base 1428 along with a plurality of fastener attachment points enabling affixation of Lidar assembly 1410 and Lidar unit 1421 to a vehicle structure or body panel (not shown).

Figure 71:
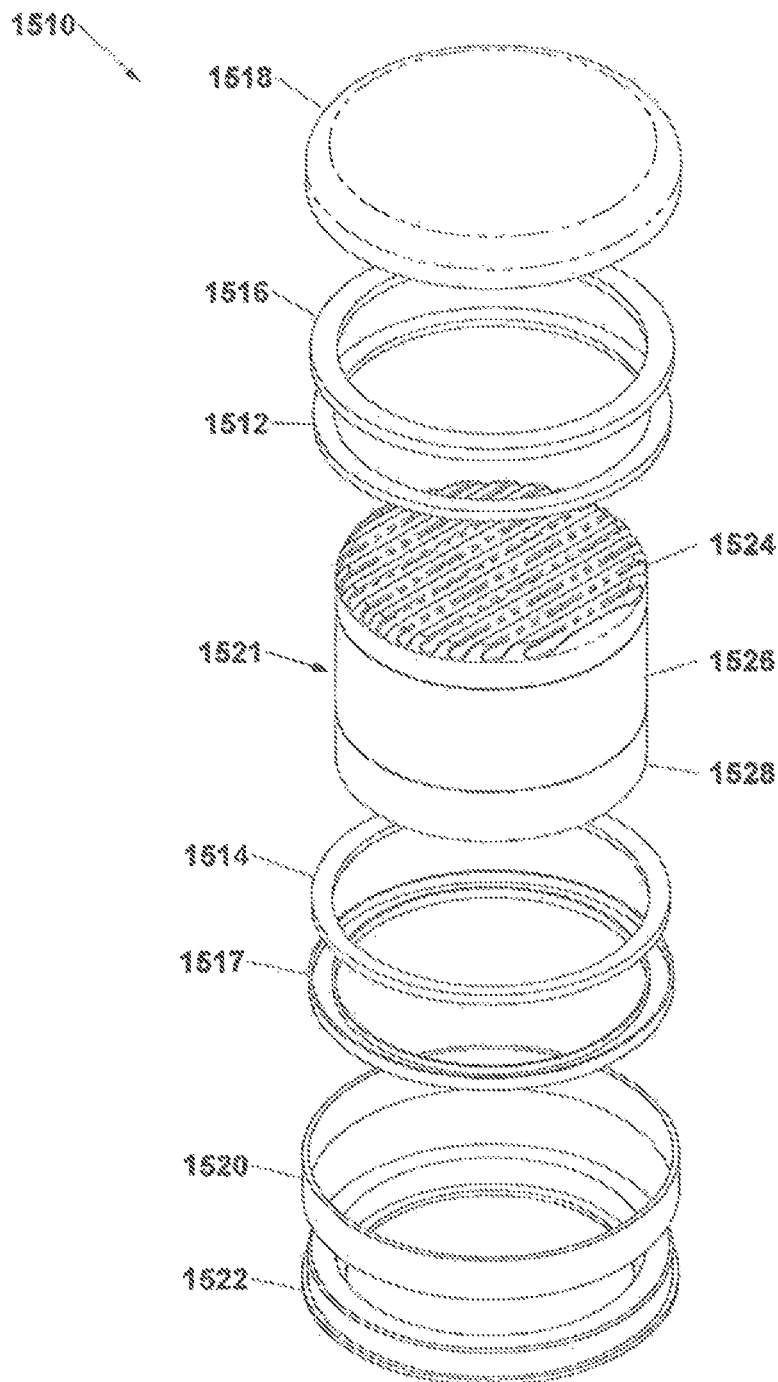
FIG. 71 is an exploded perspective view of an alternative design heated Lidar assembly over that shown in FIGS. 67-70 and having a lidar unit housing and a heater with an elongate heating element.

FIG. 71 is an exploded perspective view of an alternative design heated Lidar assembly 1510 over that shown in FIGS. 67-70 and having a lidar unit housing and a heater with an elongate heating element. More particularly, Lidar assembly 1510 includes a dome cover 1518 that has a downturned outer lip flange sized to encase a U-shaped upper insulating ring 1516 having a downwardly directed circumferential groove sized to receive a cylindrical elongate molded heating element 1512 of preferably relatively high emissivity material. A lower cylindrical support ring 1520 is sized to encase another U-shaped lower insulating ring 1517 having an upwardly directed circumferential groove sized to receive a cylindrical elongate molded heating element 1514 of preferably relatively high emissivity material. Lidar unit 1521 includes a top cap 1524, a cylindrical electromagnetic wave (or light) transmissive lens 1526, and a bottom base 1528.

FIG. 72 is a perspective view of a heated Lidar housing assembly 1510 of FIG. 71. More particularly, Lidar unit 1521 is shown affixed between lower support ring 1520 and upper support ring 1510. Each ring 1510 and 1510 has a larger diameter than an outer surface of Lidar unit 1521, extending radially outwardly of an outer electromagnetically transmissive lens, or portion of Lidar unit 1521, enabling exposure and support for each heating element, such as circular heating element 1514.

FIG. 73 is a side view of the heated Lidar assembly 1510 of FIG. 72 further showing the larger diameter of each ring 1518 and 1520 relative to an outer electromagnetic wave transmissible portion, or surface 1526 of Lidar unit 1526.

FIG. 74 is a vertical centerline sectional view taken along line 74-74 of FIG. 73 of the heated Lidar housing assembly 1510 showing placement of each heating element 1512 and 1514. carried by a synthetic rubber grommet, or circumferential insulating ring 1516 and 1517 affixed in a circumferential gap 1511 and 1513, respectively, provided between each ring 1518 and 1520 relative to an outer electromagnetic wave transmissible portion, or surface 1526 of Lidar unit 1526. According to one construction, insulating rings 1516 and 1517 are adhesively affixed within gaps 1511 and 1513 between cap 1524 and cover ring 1518 and base ring 1520, grommet 1522, and housing base 1528. Optionally, such rings 1516 and 1517 can be mechanically affixed with fasteners or dovetail joints, and rings 1516 and 1516 can include radiant reflective material proximate where each heater ring 1512 and 1514 is affixed within each ring 1516 and 1517. Each heating element 1512 and 1514 comprises an elongate, or circular heat transfer body having a large thermal mass with a single or pair of Nichrome resistive wire heating elements (such as wires 1540 and 1541 in FIG. 75) in-molded within the heat transfer body. Each heating element 1512 and 1514 has a trapezoidal cross-section with an inwardly beveled exposed surface 1530 and 1532 configured to direct radiant heat back inwardly towards cylindrical lens 1526.

FIG. 75 is an enlarged partial view taken from the encircled region 75 of FIG. 74 showing heating element 1512 affixed within hard rubber grommet, or electrically insulating ring 1516 within circumferential groove 1511 between cover 1518 and cap 1524. Heating element 1512 comprises a thermally conductive epoxy material having a high emissivity exposed outer surface 1530 that is angled toward lens 1526 in order to direct radiant heat towards lens 1526. A pair of electrically conductive resistance wires 1540 and 1541 are integrally formed within element 1512 by molding them therein in electrically insulated relation with an outer surface of element 1512. In one case, wires 1540 and 1541 are separate cylindrical loops of a same wire. In another case, wires 1540 and 1541 are separate cylindrical hoops of wire that are joined in series or in parallel and subjected to electrical current flow in order to generate heat from element 1512. Further optionally, a single loop of resistance electrically conductive heater wire can be used within insulating ring 1516.

Figure 76:
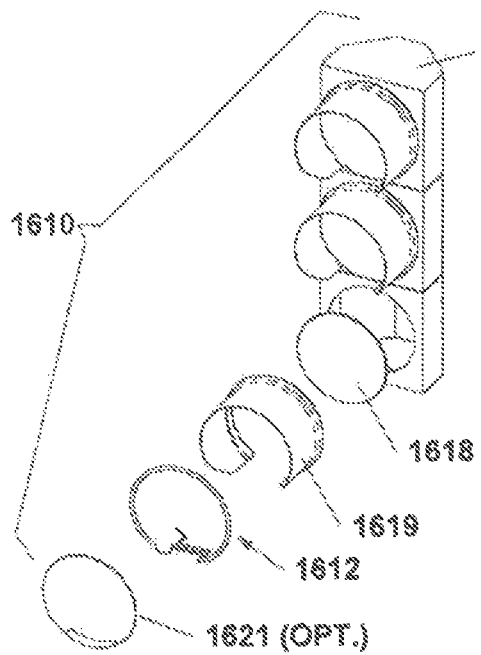
FIG. 76 is a perspective view of an overhead vehicle traffic light having three elongate heating elements in the form shown in FIGS. 39 and 40 (or optionally any other configuration shown within FIGS. 1-85).
Figure 85:
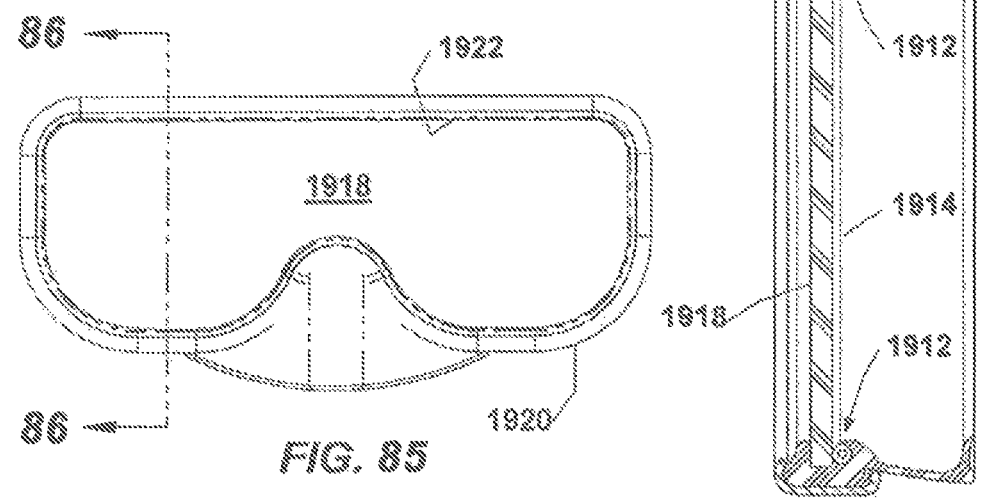
FIG. 85 is a front elevational view of the mask of FIG. 84.

FIG. 76 is a perspective view of an overhead vehicle traffic light 1610 having three elongate heating elements 1612 in the form shown in FIGS. 39 and 40 (or optionally any other configuration shown within FIGS. 1-85). More particularly, traffic light 1610 includes a housing 1620 comprising three vertically stacked sub-elements each containing an LED light having a light transmissible lens that emits electromagnetic radiation in the visible spectrum in one of green, yellow, and red. Lens 1618 is substantially encompassed about an outer periphery by a sun shade 1619 that reduces sunlight on lens 1618 that otherwise reduces visibility of light being transmitted through lens 1618 from an LED light source (not shown) inside of housing 1620. A nearly completely circumferential elongate heating element 1612 is carried within sun shade 1619 proximate lens 1618 in order to provide heat that mitigates or removes condensate from lens 1618, such as snow, ice, frost, or moisture (frozen and/or liquid). Optionally, a clear outer lens 1610 can be affixed within sun shield 1619 in a manner that creates a controlled small volume air gap adjacent heater 1612 and lens 1618 which better contains and concentrates heat output from heater 1612 onto both lenses 1612 and 1618. Further optionally, lens 1621 can be affixed to an outermost end of sun shade 1619, or can be a full cylindrical clear cover lens 1621 that fully encases sun shield 1619.

Figure 77:
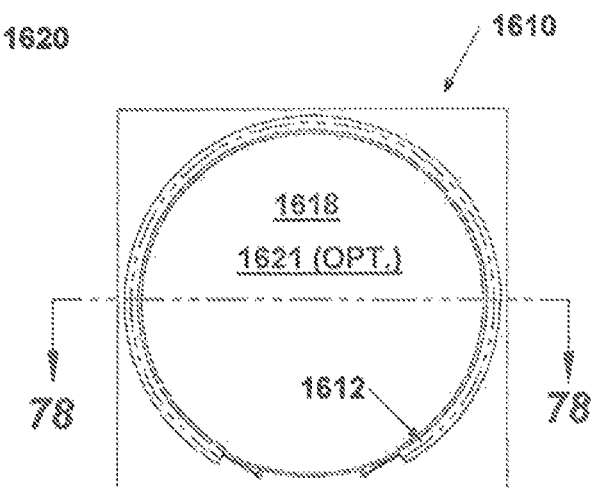
FIG. 77 is a front elevational view of the bottom light assembly for the vehicle traffic light of FIG. 76.
Figure 78:
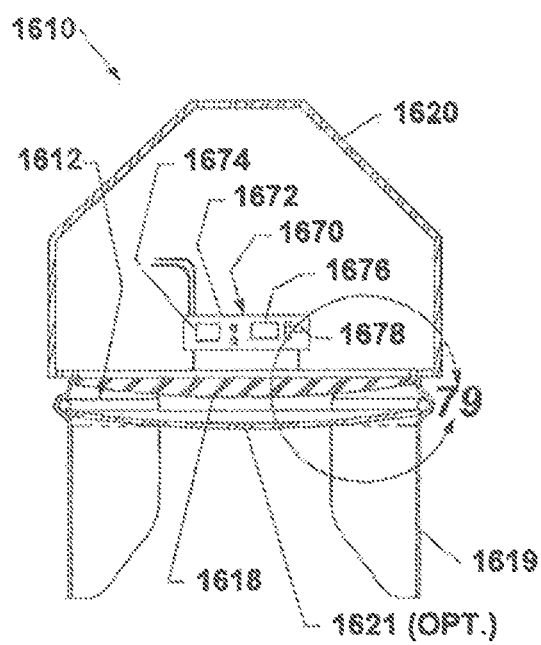
FIG. 78 is a horizontal sectional view of the vehicle traffic light and one exemplary elongate heating element of FIG. 76 showing proximate location of the heating element relative to one of the lens and sun shroud.

FIG. 77 is a front elevational view of the bottom light assembly module for the vehicle traffic light 1610 of FIG. 76. More particularly, a red lens 1618 is shown substantially encircled by cylindrical heating element 1612 configured to heat lens 1618 and 1621 (optionally) to mitigate or remove condensate from occluding such lens(es) 1612 and 1618, FIG. 78 is a horizontal sectional view of the vehicle traffic light 1610 and one exemplary elongate heating element 1612 of FIGS. 76 and 77 showing proximate location of the heating element relative to both of lenses 1618 and 1621 (optional) and sun shroud 1619. Housing 1620 houses a printed circuit (PC) board 1670 having a controller 1672 and a power supply 1674. Controller 1672 includes processing circuitry 1676 and memory 1678.

Figure 79:
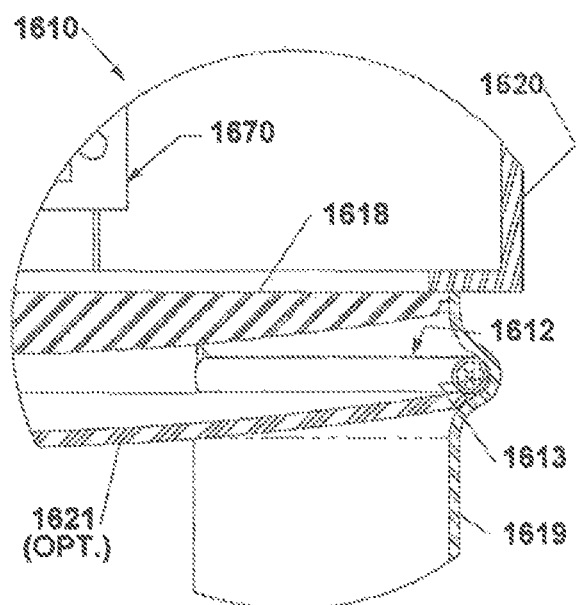
FIG. 79 is an enlarged view of the elongate heating element proximate the LED lens and sun shroud from the encircled region 79 of FIG. 78.

FIG. 79 is an enlarged view of the elongate heating element 1612 proximate the LED lens 1618 of traffic light 1610 and optional clear cover lens 1621 and sun shroud, or shield 1619 from the encircled region 79 of FIG. 78. Housing 1620 encases PC board 1670 for supplying power and operation control (on/off) for heater 1612. Elongate heating element 1612 comprises a Nichormium resistive wire heat source having a PTFE tube within a PTFE tube and the wire coaxially therein and retained within a circumferential inner groove 1613 of sun shield 1619. In close proximity with both lens 1618 and optionally lens 1621. One exemplary implementation of heating element 1612 is shown in FIGS. 39 and 40. However, and of the various constructions shown in FIGS. 1-86 can be used.

Figure 80:
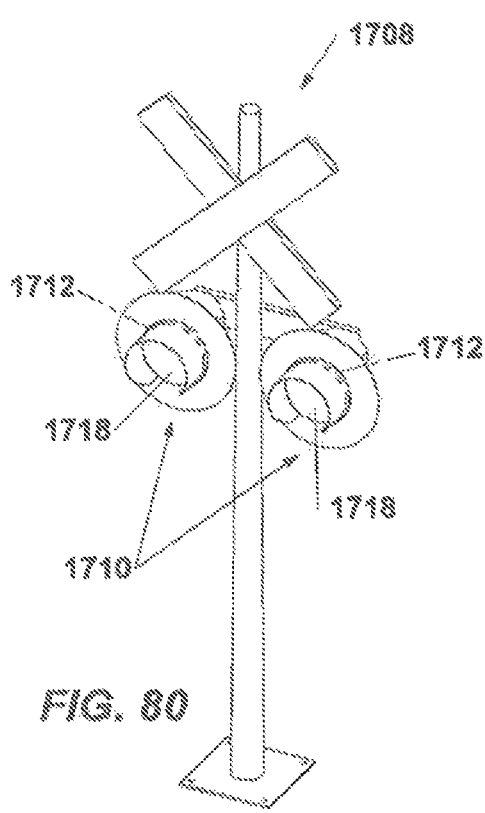
FIG. 80 is a perspective view of another traffic light for a series of connected vehicles forming a train suitable at a railroad crossing or intersection.

FIG. 80 is a perspective view of another traffic light 1708 for a series of connected vehicles forming a train suitable at a railroad crossing or intersection. Railroad traffic light 1708 includes a pair of selectively heated LED light assemblies 1710. Each heated light assembly includes and LED light source having a red lens 1718 substantially encompassed about an outer periphery by an elongate heating tube of any construction shown variously herein in FIGS. 1-86.

Figure 81:
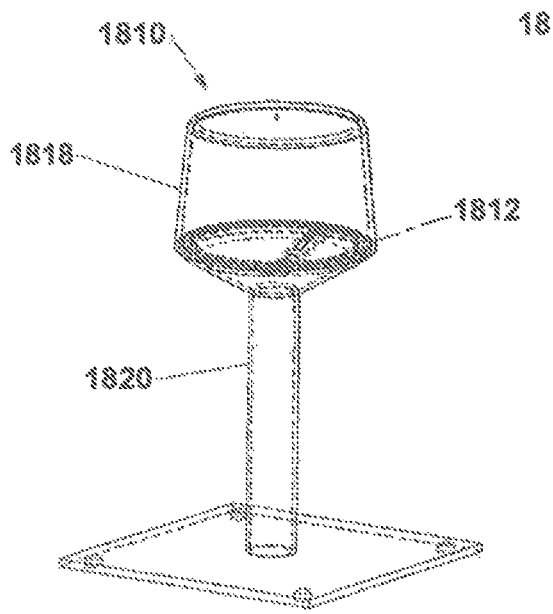
FIG. 81 is a perspective view of yet another airport runway traffic light for a flying vehicle, or plane suitable for use on an airport runway.

FIG. 81 is a perspective view of yet another traffic light comprising an airport runway traffic light 1810 for a flying vehicle, or plane suitable for use on an airport runway. More particularly, an LED light source has been omitted from FIGS. 81-83 to facilitate viewing of elongate heating element 1812, but it is understood to be present inside of lens 1818. Lens 1818 is understood to be optically transmissive and is seated atop an elevated mast plate 1820.

Figure 82:
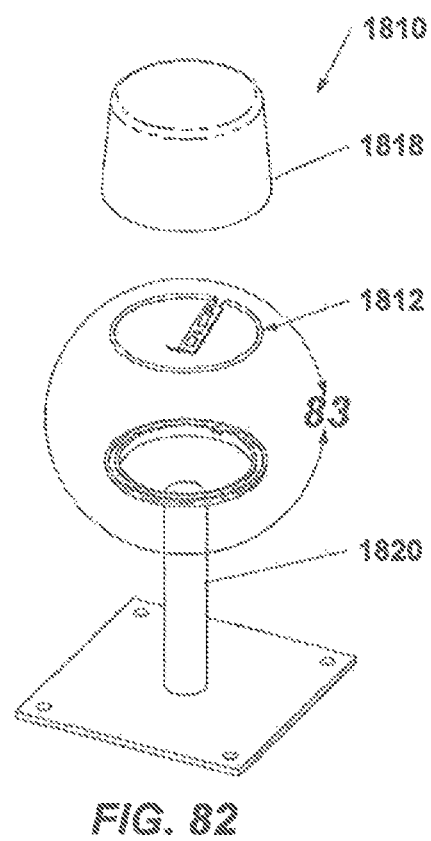
FIG. 82 is an exploded perspective view of the runway traffic light of FIG. 81.

FIG. 82 is an exploded perspective view of the runway traffic light 1810 of FIG. 81 further showing the manner in which heater 1812 is seated in a circumferential groove within a top plate of mast plate 1820. An LED light assembly (not shown) is affixed coaxially within heater 1812, beneath lens 1818, in assembly.

Figure 83:
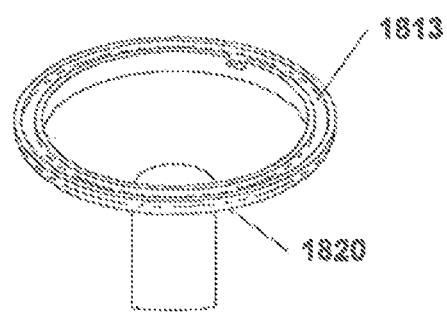
FIG. 83 is an exploded perspective view of the runway traffic light of FIG. 83 with the lens and light omitted.

FIG. 83 is an exploded perspective view of the runway traffic light 1810 of FIG. 83 with the lens 1818 (see FIG. 82) and light omitted. A cylindrical groove 1813 is provided in mast post 1820 to receive heater 1812 in assembly.

Figure 84:
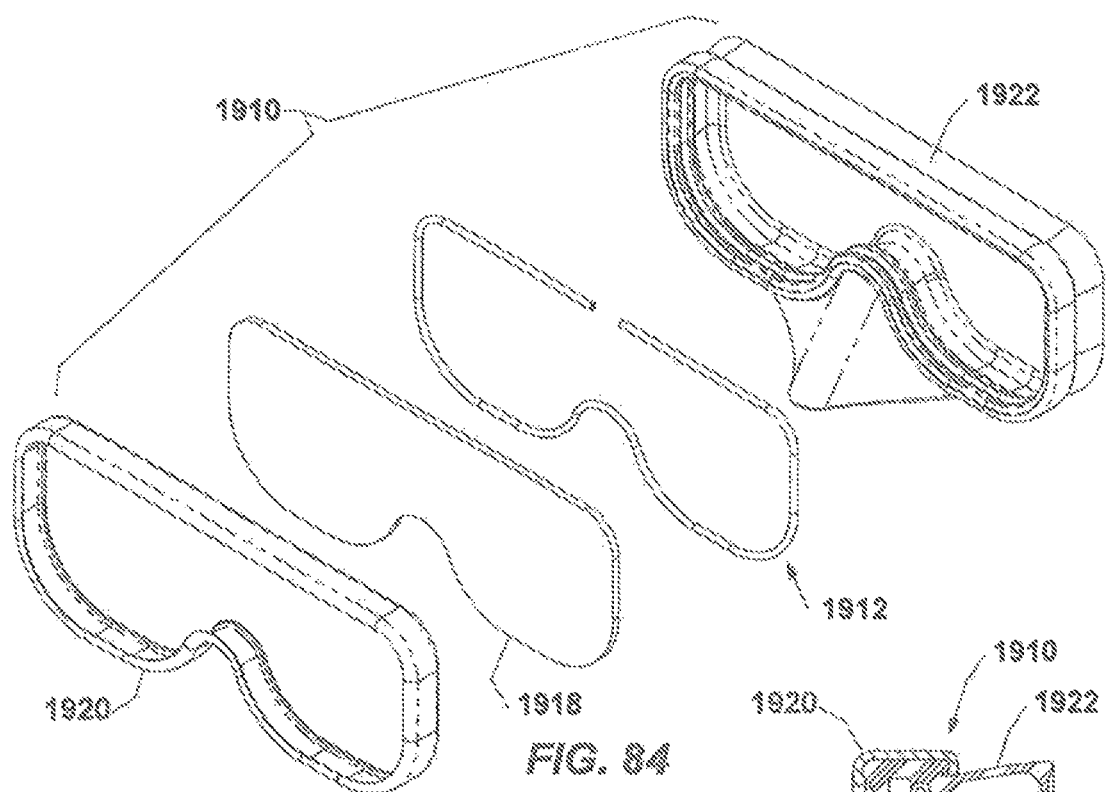
FIG. 84 is an exploded perspective view of even another elongate heating element provided in a mask, such as a scuba mask.

FIG. 84 is an exploded perspective view of even another elongate heating element provided in a mask 1910, such as a scuba mask. More particularly, mask 1910 included a circumferential bezel 1920 that entraps an optical lens 1918 within a circumferential inner groove 1924 formed within a flexible silicon rubber mask body, or frame 1922. A separate inner circumferential groove 1914 in body 1922 receives an elongate heating element, or tubular heater 1912 in abutment, or proximate glass lens 1918 operative to deliver a source of heat to lens 1918 that serves to mitigate condensate accumulation on an inner or an outer surface of lens 1918. Although mask 1910 is shown as a scuba mask, it is understood that mask 1910 can be any form of optical face protection such as goggles, ski goggles, face masks, gas masks, protective glasses, glasses, face shields, or any other form of user eye protection having an optical lens or lenses. Likewise, elongate heating element 1912 is similar to elongate heating element 12 of FIG. 9, but with a smaller inner and outer diameter and omitting the filler material 38 (see FIG. 9). Optionally, filler material can be included between the heating wire and the tube. Further optionally, elongate heating element 12 can be a tube within a tube, or any other suitable form of elongate heating element found in the various configurations disclosed in FIGS. 1-86.

FIG. 85 is a front elevational view of the mask 1918 of FIG. 84 illustrating the expansive surface area of lens 1918 that is heated with the present heat source.

Figure 86:
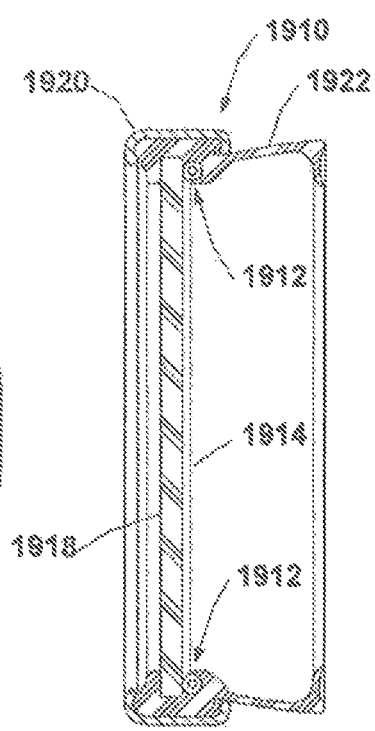
FIG. 86 is a vertical sectional view of the mask and lens heating element of FIG. 84.

FIG. 86 is a vertical sectional view of the mask 1910 and elongate heating element 1912 of FIG. 84 configured to substantially encircle, or traverse the expansive surface area of lens 1918 in order to heat lens 1918 to mitigate condensate building and occlusion. More particularly, an outer peripheral edge of lens 1918 is inserted and trapped within groove 1924 of flexible silicon rubber body 1922 by bezel 1020. Elongate heating element, or heater 1912 is retained against lens 1918 by being received and entrapped within circumferential groove 1914 of body 1922.

FIG. 87 is a partially exploded perspective view of a heated tail light assembly 2010 having a radar unit 2015 and an array of LED lighting assemblies with an electromagnetic wave lens 2018 removed from the housing 2020 and showing a further alternative design heater assembly 2012 over that shown in FIGS. 42 and 54 and having an elongate heating element affixed to an inner lens member 2022 using discrete brackets 2014 (see FIG. 91) to affix the heater assembly 2012 to the lens member and housing and encompass a target area to surround a radar unit 2015. Optionally, unit 2015 can be a light source or a LIDAR unit.

FIG. 88 is an enlarged perspective view of the heated radar unit 2015 and elongate heater assembly 2012 of FIG. 87 taken from the encircled region 88 of FIG. 87. More particularly, an elongate heating element 2016 of heater assembly 2012 is affixed to lens member 2022 and substantially encircles radar unit 2015 to impart heat to lens 2018 (see FIG. 87) in order to mitigate condensate build-up and occlusion of lens 2018 from moisture, frost, snow and/or ice.

FIG. 89 is an enlarged perspective view of a corner mounting portion of the lens member 2022 (see FIG. 88) but with the corner support bracket and mounting screw removed from the encircled region 89 of FIG. 88 to show the mounting structure. More particularly, an integrally molded mounting boss, or aperture 2011 is formed in lens member 2022 proximate each corner of radar unit 2015 (see FIG. 88) to provide an attachment point for each bracket 2014 (see FIG. 91). Boss 2011 includes an aperture for receiving a fastener, or screw 2013 (see FIG. 91).

FIG. 90 is a partially exploded perspective view of the heater assembly 2012 of FIGS. 87 and 88. More particularly, fastening hardware is shown in relation to heater assembly 2012.

FIG. 91 is an enlarged perspective view of the heater assembly 2012 of FIG. 89 taken from encircled region 91 of FIG. 91. Heater assembly comprises a PTFE tube-in-tube construction for elongate heating element 2016 which is configured in a rectangular, or square mounting configuration about a profile edge of radar unit 2015 (of FIG. 88) using spaced-apart mounting brackets 2014 placed at each corner and mounted to middle lens 2022 (of FIG. 88) using individual threaded fasteners 2013. Each mounting bracket 2014 is formed from a heat resistant structural material, such as metal or composite material. A mounting flange 2019 includes a bore, or aperture 2021 configured to receive fastener 2013 in assembly. A saddle, or channel 2017 in bracket 2014 is configured to receive and support heating element 2016 about a bend radius to hold element 2016 in a desired rectangular configuration about a target area encircling a radar unit (or optionally a light source or a LIDAR unit).

FIG. 92 is a simplified perspective view of heater assembly 2012 in FIGS. 87-91. Elongate heating element 2016 using a centered heat generating Nichrome wire 2040 carried centrally within a bore of a pre-formed elongate thermally conductive body, or tube 2055 placed coaxially within another outer tube 2054 having a helical inner and outer surface where a central heating wire is carried coaxially within the coaxial arrangement of the tube 2055 and 2054 by first inserting wire 2040 in loose-fit within an inner bore in the inner tube 2055, then coaxially inserting wire 2040 and tube 2055 within outer tube 2054 so as to align the heating wire 2040 within the inner tube 2055 and the outer tube 2054. According to one construction, tubes 2055 and 2054 are each constructed from a temperature resistant material, such as PTFE or some other suitable material capable of handling temperatures generated from electrical resistance heating of Nichrome wire 2040. Optionally, any one of the described thermally transmissive materials can be injected within inner tube 2055 about wire 2040 according to one or more of the techniques and configurations previously disclosed with reference to FIGS. 7-21 and 25-38, and/or between inner tube 2054 and outer tube 2055.

As shown in FIG. 92, elongate heater assembly 2012 is shown in a circular form comprising an elongate heating element 2016 having a sealed crimp and solder male connector 2060 and 2062 affixed at either end to wire 2040 and wire 2069. However, it is understood that such form can be retained in other shapes, such as the rectangular shape depicted in FIGS. 87-91. Wire 2069 is soldered to a first conductive lead on a thermistor 2066. Wire 2070 is soldered to a temperature sensor, or second thermistor 2067. Thermistor 2067 is also connected via another conductive lead 2068 with a first temperature sensor, or thermistor 2066. Thermistor 2066 is electrically connected via another conductive lead 2070 via another sealed crimp and solder wire connector 2064 to wire 2040. Connectors 2060, 2062 and 2064 each contain solder and an outer heat shrink tube that electrically couples together connectors and/or wires. A resin coated fiberglass sleeve, or insulating tube 2074 is provided over thermistor 2066 and inner tube 2055 to hold thermistor 2066 in proximate heat communication with tube 2054, while a PTFE heat shrink tube 2072 is provided over insulated wires 2068 and 2070 to hold the folded over configuration and keep thermistor 2066 adjacent to tube 2054. Finally, a heat shrink PTFE tube 2076 is affixed atop the resulting assembly and heat shrunk thereover, exposing male plug of connector 2062 and protecting and securing together the remaining internal components. Furthermore, another PTFE heat shrink tube 2071 is secured over thermistor, or thermal switch 2067 and insulated wires 2068 and 2079. Thermal switch 2067 is configured to detect ambient temperature of the surrounding environment while thermal switch 2066 detects temperature of the outer surface of inner tube 2055.

According to one construction, inner tube 2055 comprises an item #0000014194 PTFE extruded cylindrical cross-section black-RoHS tube having a $\frac{1}{16}$" inner diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to one construction, outer tube 2054 comprises an item #0000015561 (clear) PTFE extruded cylindrical cross-section clear-RoHS tube having a 0.27" (6.8 mm.) outer diameter, manufactured by Zeus, P.O. Box 2167, 3737

Industrial Blvd, Orangeburg, S.C. 29116-2167, and sold by Fastenal Company, 2001 Theurer Blvd., Winona, Minn. 55987. Optionally, the same tube is available in black under another item #.

According to one construction, connectors 2060 and 2062 are respectively part numbers 07009729 and 07009726 sealed crimp and solder connectors with 0.250" spade size manufactured by Power Phase and Distributed by Fastenal, 2001 Theurer Blvd., Winona, Minn. 55987.

According to one construction, connector 2064 is a sealed crimp and solder connector for end butt joining wires part number 07009714 manufactured by Power Phase and Distributed by Fastenal Company, 2001 Theurer Blvd., Winona, Minn. 55987.

According to one construction, thermistor, or cantilever bimetallic thermostat 2066 is a model number MA201 P+060F heater tube temperature switch manufactured by Portage Electrical Products, Inc., 7700 Freedom Ave NW, North Canton, Ohio. 44720. Optionally, a model number MA195+060F from Portage Electrical Products can also be used. Such thermostat 2066 is configured to turn off power to elongate heating element 2016 when an upper limit, such as 220 degree Fahrenheit is detected.

According to one construction, thermistor, or cantilever bimetallic thermostat 2067 is an ambient temperature switch manufactured by Portage Electrical Products, Inc., 7700 Freedom Ave NW, North Canton, Ohio. 44720. Such thermostat 2067 is configured to turn off power and open the circuit when the heating element is not needed because the ambient environmental temperature is above a necessary threshold value, such as above 40 degrees Fahrenheit and icing and/or moisture conditions are not expected under such conditions.

According to one construction, PTFE heat shrink tube 2072 is part no 58655 heavy wall adhesive-lined black sealed heavy wall tubing, 8-1 AWG manufactured by Power Phase and distributed by Fastenal, 2001 Theurer Blvd., Winona, Minn. 55987.

According to one construction, PTFE heat shrink tube 2076 is a similar heavy wall adhesive-lined black sealed heavy wall tubing manufactured by Power Phase and distributed by Fastenal Company, 2001 Theurer Blvd., Winona, Minn. 55987.

According to one construction, resin coated fiberglass sleeve is a ⅜" diameter black segment or braided sleeve manufactured and sold as a braided sleeving product under the trade name Insultherm by Techflex, Inc., 104 Demarest Road, Sparta, N.J. 07871. Optionally, an aluminum adhesive tape can be used in place of such sleeve.

FIG. 93 is an enlarged partial perspective view further illustrating the heater assembly thermistor 2066 of FIG. 93. Thermistor 2066 is folded into intimate contact with an outer surface of inner tube 2055 in order to provide a faster feedback from heat generation provided by Nichrome wire 2040 than would be provided if thermistor 2066 was in contact with outer tube 2054. It is understood that thermistor 2066 and wires 2068 and 2070 are shown folded with connector 2064 as they are retained by sleeves, or tubes 2072, 2074, and 2076 (see FIG. 92) in assembly.

FIG. 94 is an enlarged partial perspective view further illustrating the ambient temperature thermistor 2067 and second male connector 2062 of FIG. 93. It is understood that thermistor 2067 and wires 2068 and 2069 are shown in a folded configuration as retained underneath sleeve, or tube 2071 (see FIG. 92).

FIG. 95 is a plan view of yet another heated tail light assembly 2110 having a radar unit 2115 (see FIG. 97) and an array of LED lighting assemblies. The lens 2118 is shown removed from the housing 2120 in FIGS. 98-100 below showing an even further alternative design electromagnetic wave lens heater over that shown in FIG. 87 and having an elongate heating assembly 2112 affixed to an inner surface of lens 2118 (see FIG. 97) in a receiving groove to encompass a target area and surround a radar unit (or optionally/additionally a light emitter or LIDAR unit).

FIG. 96 is a vertical side view of the heated tail light assembly 2110 of FIG. 95 showing lens 2118 in side view.

FIG. 97 is horizontal sectional view of the heated tail light assembly 2110 of FIG. 95-95 and taken along line 97-97 of FIG. 96. More particularly, a heater assembly 2112 is affixed within outer lens 2118 about a radar unit 2115 that is supported by housing 2120. It is understood that lens 2118 is formed from a molded piece of plastic and that heater assembly 2112 is affixed within a groove 2117 (see FIGS. 101 and 102) molded within lens 2118. Optionally, such heater assembly 2112 can be molded within the actual lens, or can be adhesively affixed within a formed or machined groove within such lens. Further optionally, heater assembly 2112 can be used on glass lenses. Heater assembly 2112 also includes a wiring harness connector (not numbered) for electrically coupling to a vehicle power supply (not shown).

FIG. 98 is a perspective review of an inner surface of the outer lens 2118 of FIG. 95-97 showing the installed lens heater assembly 2112 affixed in a groove 2117 (see FIGS. 101 and 102) formed between an inner flange wall 2114 and an outer flange wall 2121.

FIG. 99 is a vertical inside view of the outer lens 2118 of FIG. 98 further showing heater assembly 2112 and flange walls 2114 and 2121.

FIG. 100 is a horizontal sectional view of the outer lens 2118 of FIG. 95-99 taken along line 100-100 of FIG. 99. More particularly, heater assembly 2112 is shown integrated within lens 2118 to provide heat to lens 2118.

FIG. 101 is an enlarged sectional view of the lens 2118 and heater assembly 2112 taken from the encircled region 101 of FIG. 100. More particularly, wall portions 2114 and 2121 are formed integrally in lens 2118 and cooperate to form a groove or trench 2117 and elongate heating element 2116 of heater assembly 2112 is received within groove 2117 where it is adhesively affixed using a thermally transmissive material 2119 similar to such materials disclosed in other embodiments herein.

FIG. 102 is another enlarged sectional view of the lens 2118 and heater assembly 2112 taken from the encircled region 102 of FIG. 100. More particularly, wall portions 2114 and 2121 are formed integrally in lens 2118 and cooperate to form a groove or trench 2117 and elongate heating element 2116 of heater assembly 2112 is received within groove 2117 where it is adhesively affixed using a thermally transmissive material 2119 similar to such materials disclosed in other embodiments herein.

FIG. 103 is simplified perspective view of the heating element, or heater of FIG. 95-102 having a central heating wire provided coaxially within a single PTFE tube 2155 and having temperature sensors. Elongate heating element 2116 using a centered heat generating Nichrome wire 2140 carried centrally within a bore of a pre-formed elongate thermally conductive body, or tube 2155 where a central heating wire is carried coaxially within the coaxial arrangement of the tube 2155 by first inserting wire 2140 within an inner bore in tube 2155 so as to align the heating wire 2140 within the tube 2055. According to one construction, tube 2155 is constructed from a temperature resistant material, such as PTFE or some other suitable material capable of handling temperatures generated from electrical resistance heating of Nichrome wire 2140. Optionally, any one of the described thermally transmissive materials can be injected within inner tube 2155 about wire 2140 according to one or more of the techniques and configurations previously disclosed with reference to FIGS. 7-21 and 25-38.

As shown in FIG. 103, elongate heater assembly 2112 is shown in a circular form comprising an elongate heating element 2116 having a sealed crimp and solder male connector 2160 and 2162 affixed at either end to wire 2140 and wire 2169. However, it is understood that such form can be retained in other shapes, such as the rectangular shape depicted in FIGS. 87-91. Wire 2169 is soldered to a first conductive lead on a thermistor 2166. Wire 2170 is soldered to a temperature sensor, or second thermistor 2167. Thermistor 2167 is also connected via another conductive lead 2168 with a first temperature sensor, or thermistor 2166. Thermistor 2166 is electrically connected via another conductive lead 2170 via another sealed crimp and solder wire connector 2164 to wire 2140. Connectors 2160, 2162 and 2164 each contain solder and an outer heat shrink tube that electrically couples together connectors and/or wires. A resin coated fiberglass sleeve, or insulating tube 2174 is provided over thermistor 2166 and PTFE tube 2155 to hold thermistor 2166 in proximate heat communication with tube 2155, while a PTFE heat shrink tube 2172 is provided over insulated wires 2168 and 2170 to hold the folded over configuration and keep thermistor 2166 adjacent to tube 2155. Finally, a heat-shrink PTFE tube 2176 is affixed atop the resulting assembly and heat shrunk thereover, exposing male plug of connector 2162 and protecting and securing together the remaining internal components. Furthermore, another PTFE heat shrink tube 2171 is secured over thermistor, or thermal switch 2167 and wires 2168 and 2179. Thermal switch 2167 is configured to detect ambient temperature of the surrounding environment while thermal switch 2166 detects temperature of the outer surface of tube 2155.

According to one construction, tube 2155 comprises an item #0000014194 PTFE extruded cylindrical cross-section black-RoHS tube having a ¹⁄₁₆" inner diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987. Optionally, tube 2155 can be filled with a heat transmissive and filled epoxy material surrounding the heat generating resistance wire 2140, numerous variations of such epoxy or thermal mass filling material described in other embodiments herein to provide beneficial heat thermal mass, storage and structural benefits.

FIG. 104 is an enlarged partial perspective view further illustrating the heater assembly thermistor 2166 of FIG. 103. Thermistor 2166 is folded into intimate contact with an outer surface of inner tube 2155 in order to provide a faster feedback from heat generation provided by Nichrome wire 2140 than would be provided if thermistor 2166 was in contact with outer tube 2154. It is understood that thermistor 2166 and wires 2168 and 2170 are shown folded with connector 2164 as they are retained by sleeves, or tubes 2172, 2174, and 2176 (see FIG. 92) in assembly.

FIG. 105 is an enlarged partial perspective view further illustrating the ambient temperature thermistor 2167 and second male connector 2162 of FIG. 103. It is understood that thermistor 2167 and wires 2168 and 2169 are shown in a folded configuration as retained underneath sleeve, or tube 2171.

FIG. 106 is an exploded perspective view of a heated camera system 2210 for removing moisture and/or condensate from a camera lens 2217 of a camera 2215. More particularly, system 2210 includes a front housing member 2220 and a rear housing member 2221 that seal together with a silicon o-ring gasket 2219 about camera 2215. A tubular, ring-shaped heater, or heater assembly 2212 encompasses lens 2217 in assembly to impart heat to the lens 2217 in order to reduce or eliminate condensate, snow and/or ice from lens 2217. Optionally, a transparent lens 2218 is affixed to housing member 2220 with a round bezel 2223 and a cylindrical silicon o-ring seal 2225. In such case, heater 2212 also imparts heat to outer lens 2218 in order to reduce or eliminate condensate, snow and/or ice from lens 2218.

FIG. 107 is an enlarged perspective view of the encircled region 107 of FIG. 106 showing tubular ring-shaped heater assembly 2212 having a first cylindrical elongate heating element 2261 and a second cylindrical elongate heating element 2263 nested, or stacked adjacent to heating element 2261 about a common central axis. Optionally, a single elongate heating element can be used and configured in a cylindrical, arcuate, or semi-cylindrical configuration positioned relative to, or proximate a camera lens or associated cover lens in order to transmit heat thereto so as to mitigate and/or eliminate condensate, ice, frost, or moisture from such a lens. Each heating element 2261 and 2263 is electrically coupled in series with a respective thermistor 2266 configured to thermally regulate current flow to supply power to heating elements 2261 and 2263. A central insulated cover power feed wire 2265 terminates in a male connector 2260. A three-way electrical connector 2271 couples feed wire 2265 to each leg, or heating element 2261 and 2263 where they each terminate in an electrical ring terminal, or connector 2262. In one case, connector 2271 is formed by joining together three ring terminals (each similar to terminal 2262 using a conductive rivet through each ring, after which an insulative cover (not shown) is affixed over such joined terminals using liquid electrical tape, or a shrink wrap (see FIG. 108).

Figure 108:
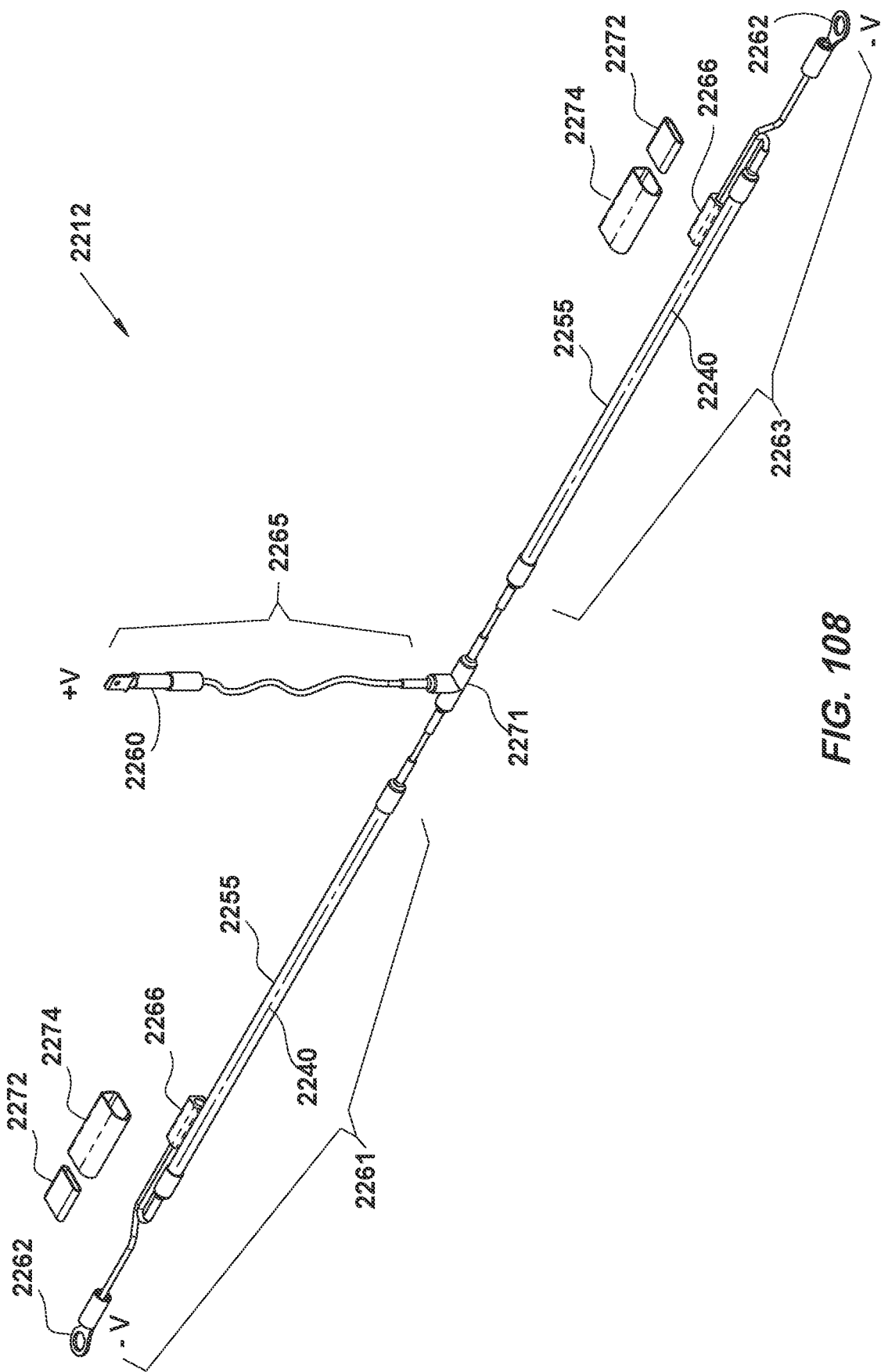
FIG. 108 is a perspective view from above of a heater assembly having a dipole, or branched elongate heating element for the heated camera system of FIG. 106 with the branches elongated from an installed round configuration.

FIG. 108 is a perspective view from above of the tubular ring-shaped heater assembly 2212 of FIG. 107 having a dipole, or branched elongate pair of heating elements 2261 and 2263 for the heated camera system of FIG. 106 with the branches 2261 and 2263 elongated, or unwound from an installed round configuration shown in FIG. 107. Each branch, or leg 2261 and 2263 comprises a central, internal resistive, or Nichrome, heating wire 2240 and an outer, high temperature plastic, or PTFE cover tube 2255 having thermally insulative properties that mitigate heat transfer from wires 2240 to an outer surrounding environment. Each branch 2261 and 2263 also includes a thermistor, or temperature regulator 2226 electrically coupled in series with wire 2240 to regulate current flow through such respective resistance heating wire 2240. Central insulated cover power feed wire 2265 terminates in a male connector 2260 forming a positive blade terminal while ring terminals, or connectors 2262 each form a negative terminal. Three-way electrical connector 2271 is shown with an insulating outer cover, or layer. Each thermistor 2266 is covered by a polytetrafluoroethylene (PTFE) shrink wrap tube 2272 configured to hold the insulated power feed wires between the ring terminal and thermistor, and the thermistor and Nichrome wire 2240 in a folded over configuration at each end, and another, larger polytetrafluoroethylene (PTFE) shrink wrap tube 2274 configured to hold each thermistor 2266 along tube 2240.

FIG. 109 is a perspective view of a heated encasement system 2310 having a fluid heater assembly 2312 with an elongate heating element 2316 with an elongate resistance heating wire and a plurality of elongate fluid flow passages configured to heat and deliver windshield washer fluid and air, respectively, to a housing having an electromagnetic transmissive portion, such as an optical lens. In one case, heated encasement system 2310 is heated air and fluid delivery system and encasement 2320 is a housing for a camera for an autonomous vehicle system. In other cases, encasement 2320 can be any of a number of electrical and/or electronic systems that requires a heated supply of fluid air and/or water, such as a medical ventilator in need of a supply of heated air. Further optionally, encasement 2320 can be a vehicle windshield and fluid heater assembly 2312 can be a windshield water fluid heater system. More particularly, elongate heating element 2316 of fluid heater assembly 2312 comprises an elongate cylindrical tube 2355 of polytetrafluoroethylene (PTFE) having a plurality of axially extending bores, or channels 2341, 2343, and 2345 configured in arcuately equally-spaced apart relation within tube 2355. A resistive heater wire 2338, such as a Nichrome wire, is provided within bore 2341 to impart heat to tube 2355 and heat bores 2343 and 2345. A fluid, such as air 2347 is delivered down bore 2343 from a fan or pressurized source (not shown) where it is heated by tube 2355 and delivered by flexible plastic nozzle tube 2353 through brass air delivery fitting 2359 inside of encasement 2320 to heat an inner region of encasement 2320. Likewise, a fluid, such as water 2349 is delivered down bore 2345 from a pump source (not shown) where it is heated by tube 2355 and delivered by brass ejection nozzle fitting 2351 onto a window surface 2321 of encasement 2320. In this manner, heated fluid and air are delivered to a respective exterior and interior of encasement 2320 by heater assembly 2310 in order to mitigate condensate buildup on inner and outer surfaces of surface 2321. Such surface 2321 can be designed to transmit light or any other form of electromagnetic radiation used for detecting an environment for an autonomous vehicle operation, such as visible field and infrared cameras, lidar, radar, or other electromagnetic radiation emitting and/or detecting devices used to assess a vehicle environment. Optionally, an array of spaced-apart radial apertures 102357 can be provided in a similar tube 102355 communicating with bore 102343 (similar to bore 2343) to provide for air flow that impinges on an exterior of surface 2321 or onto some other surface needed to be heated and cleared from one of snow, frost, condensate, or other optical, infrared, electromagnetic field of view obstructing material.

FIG. 110 is an enlarged entrance end view of the heater assembly 2312 taken from encircled region 110 of FIG. 109. More particularly, fluid (water or washer fluid) is pumped from a source (not shown) into bore 2345 of tube 2355. Similarly, pressurized air 2347 is feed from a pneumatic source, or tank into bore 2343 of tube 2355. Nichrome resistance heating wire 2340 is shown feed into bore 2341 and has an outer PTFE tube 2338 about wire 2340 and a male terminal 2360 for delivering current from one end of wire 2338 to an opposite end (see FIG. 111).

FIG. 111 is an enlarged exit end view of the heater assembly 2312 taken from encircled region 111 of FIG. 109. More particularly, a distal end of tube 2355 terminates adjacent a distal end of Nichrome wire 2338 and PTFE tube 2340 extending from bore 2341 of tube 2355 and terminating at an electrically conductive ring terminal 2362. Nozzle fitting 2359 is frictionably seated in press-fit within an exit end of bore 2345 to generate an exit spray of fluid 2349 from nozzle 2351 onto window, or lens surface 2321 to remove or mitigate condensate buildup on surface 2321. Similarly, a flexible, smaller diameter plastic tube 2353 is frictionably inserted within a terminal end of bore 2343. An opposed end of tube 2353 is flexibly urged in interference fit over a barbed entrance end of nozzle fitting 2359. Pneumatic delivery fitting 2359 extends within encasement, or housing 2320 where heated air or fluid 2347 is delivered to help clear surface, or window 2321 to mitigate or eliminate condensation or other occluding media. An optionally vent (not shown) in housing 2320 enables air and moisture to exit housing 2320. Optionally, air or fluid can be delivered on outer or inner portions of window 2321 by either of fittings 2351 or 2359.

As shown in FIGS. 109-111, one construction for tube 2355 is a 3-passage semi-flexible tube or multi-lumen comprising a manufacturer-provided (semi-clear to translucent white-RoHS PTFE tube, for example; cylindrical in cross-section with an outer diameter range of approximately $5/16$- to $7/16$", with 3 equally-spaced smaller diameter cylindrical longitudinal through passageways therein as depicted among various other example cross sections within Zeus Polymer Extrusions Catalog 11, QF7.2-012 Rev G, page 43, entitled "Special Shapes", manufactured by Zeus, P.O. Box 2167, 3737 Industrial Blvd, Orangeburg, S.C. 29116-2167, and sold by Fastenal Company, 2001 Theurer Blvd., Winona, Minn. 55987. Optional multi-lumen tubes suitable for use and available from Zeus Polymer comprise PTFE, ePTFE, FEP, PFA (perflouoroalkoxy), PEEK and other analogous relatively high temperature (melting point) materials generally over 200 degrees Fahrenheit with operating temperatures for some applications heat resistant as high as 500 degrees Fahrenheit. Such materials can also be used for any of the plastic peak temperature mitigating tubes (inner and outer) used for covering a resistance heat generating wire, or Nichrome wire as shown variously in the versions depicted in FIGS. 1-158 herein. Further optionally, tube 2355 can be made from polysulfone, a family of high performance thermoplastics, or polymers often used in medical technology and having a known toughness and stability at high temperatures including polysulfone (PSU), polyethersulfone (PES), and polyphenylene sulfone (PPSU).

Perfluoroalkoxy, or PFA, was first produced by DuPont in the early 1970's and is a well-characterized melt-processable fluoropolymer that combines many of the best traits of PTFE and FEP. At 500° F. (260° C.), PFA has a higher service temperature than does FEP and maintains its mechanical integrity in extreme temperatures even when exposed to caustic chemicals. PFA also has a greater tensile strength than PTFE, and a smoother surface finish than either PTFE or FEP.

PFA is available in high purity (HP) versions that are SEMI F-57 certified. HP PFA tubing lends itself well to critical fluid transport applications that demand a very low level of extractables. PFA can also be extruded in convoluted tubing forms in order to provide a highly flexible conduit. PFA tubing can support applications ranging from laboratory plumbing, food processing, adhesive transfer systems; to fuel, paint, and hydraulic lines, and is also available in monofilament fiber form by custom order from some suppliers.

Figure 112:
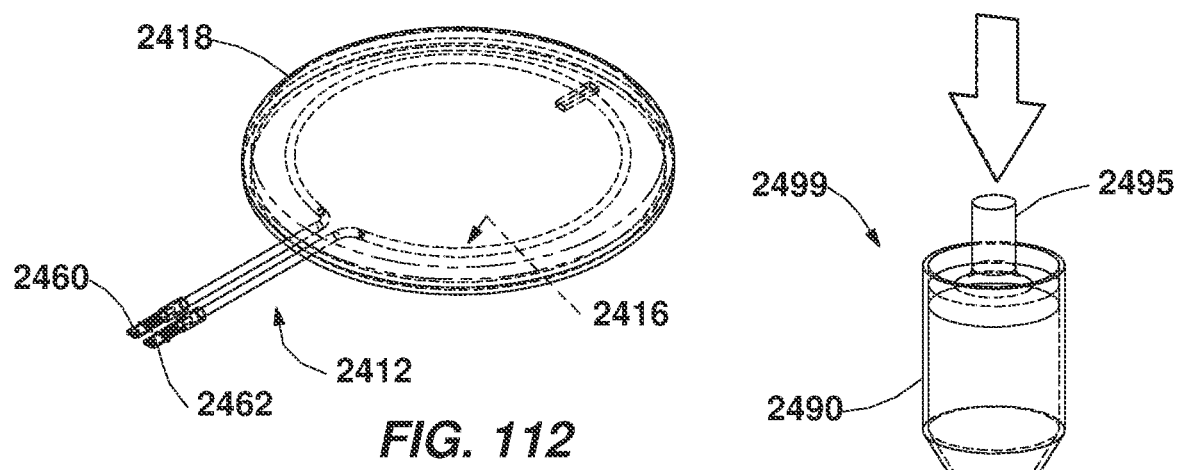
FIG. 112 is a perspective view from above of one resulting light housing lens having an internally molded, or inserted elongate heating element using the process and apparatus shown below in FIG. 113

FIG. 112 is a perspective view from above of one resulting heated light housing lens 2418 having an internally molded, or inserted elongate heater assembly 2412 having an elongate heating element 2416 provided in a circular configuration using the process and apparatus shown below in FIG. 113. More particularly, lens 2418 comprises a molded plastic material formed about elongate heating element 2416. Heater assembly 2412 comprises elongate heating element 2416 molded within lens 2418 and electrically conductive male blade terminals 2460 and 2462 that are connected to an electrical power supply (not shown), such as a vehicle wiring harness using a connector assembly (not shown). It is understood that heating element 2416 comprises a resistive electric heating material, or Nichrome wire 2440 (or other suitable electric resistance alloy) extending coaxially within a high temperature plastic, or PTFE cylindrical tube 2455 (see FIG. 113) according to one or more of the various constructions of elongate heating elements depicted variously in FIGS. 1-111.

As used herein, PTFE tube 2455 has a glass transition temperature (TG) that is higher than the glass transition temperature (TG) for the surrounding adjacent environment, or plastic material making up lens 2418. In this way, the plastic material of lens 2418 is thermally protected from peak temperatures generated by wire 2440, particularly for higher temperatures generated on inside radius bends. Tube 2455 also provides an increased thermal mass for heating element 2416 over that otherwise solely provided by wire 2440. Such benefit of using a PTFE tube, or alternate PFA, FEP, polysulfone, or other relatively high temperature plastic material can be used to benefit any of the various elongate heating element designs shown variously herein by FIGS. 1-158.

Figure 113:
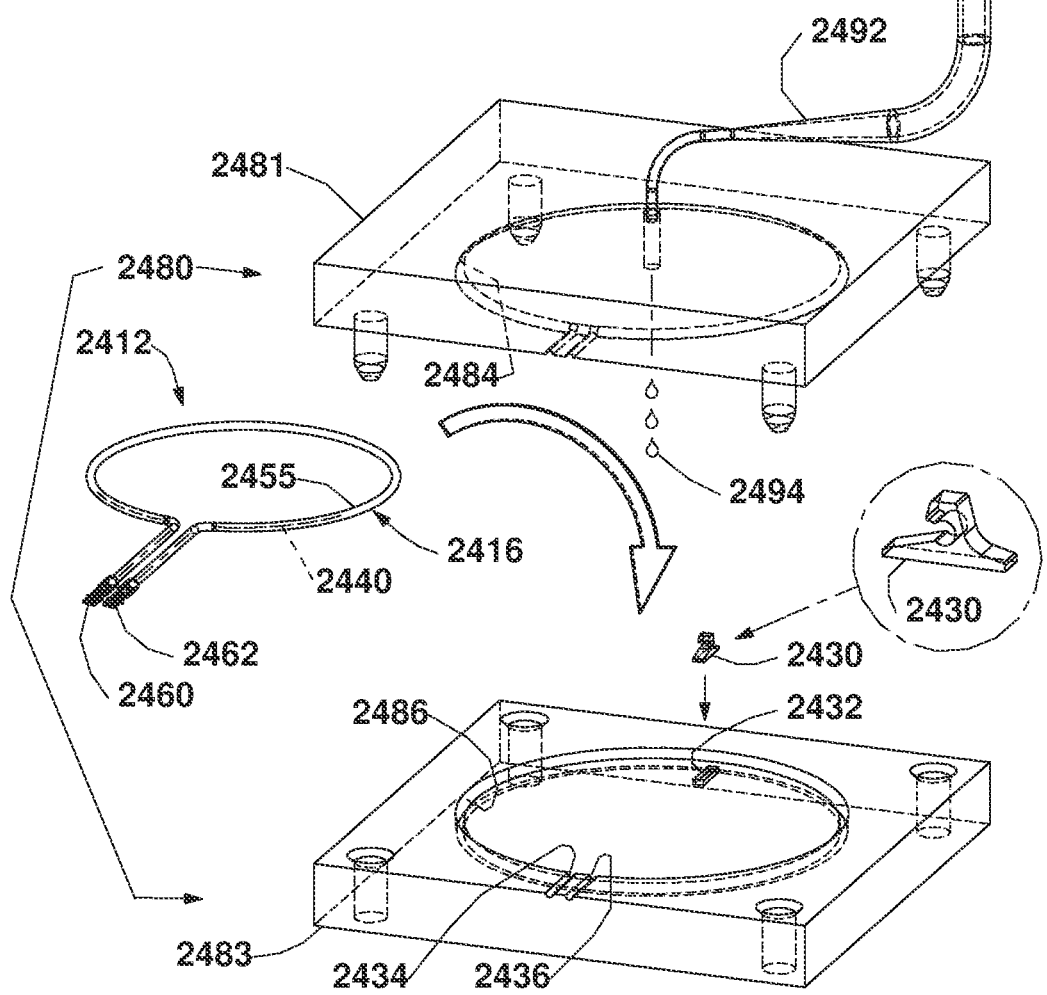
FIG. 113 is a simplified perspective view of even another technique for producing a lens of FIG. 112 having an internally molded or inserted elongate heating element using a pair of mating mold members and having a centered heat generating wire carried centrally of a polytetrafluoroethylene (PTFE) conduit, or tube where a central heating wire is carried coaxially within a length of forming tube which is held between the mold members and entrapped centrally within a light housing lens while injecting molten plastic between the mold members to encase the elongate heating element within the resulting lens spaced from an outer surface of the lens (and respective mold surfaces) using one or more mold spacers.

FIG. 113 is a simplified perspective view of even another technique for producing a heated lens 2418 (see FIG. 112) having an internally molded or inserted elongate heating element 2416 of heater assembly 2412 using a mating set 2480 of mold members, or dies 2481 and 2483 and having a centered and internally supported heat generating electrical resistance heating material (or alloy), or Nichrome wire 2440 carried centrally of a polytetrafluoroethylene PTFE conduit, or tube 2455 where a central heating wire 2440 is carried coaxially within a length of plastic tube 2455 which is held between the mold members 2481 and 2483 and entrapped centrally within a light housing lens 2418 (see FIG. 112) while injecting molten plastic 2494, such as a polycarbonate plastic, between the mold members 2481 and 2483 to encase the elongate heating element 2416 within the resulting lens 2418 (see FIG. 112) spaced apart from an outer surfaces of the lens 2418 and internal surfaces 2484 and 2486 of dies 2481 and 2483 using one or more mold spacers, such as spacer 2430. Spacer 2430 is seated in a shallow complementary recess 2432 during a molding operation. Grooves are provided in each mold member 2481 and 2483, such as grooves 2434 and 2436 in mold member 2483, to receive end legs of insulated wire leads of heating element 2416 to hold element 2416 spaced apart from internal mold surfaces 2484 and 2486 in combination with spacer 2430.

Molten plastic material 2494 is delivered under pressure during a staged molding operation from a molten delivery source 2499 having a heated supply tank, or container 2490 of molten plastic 2494 that is urged under pressure, such as by a delivery piston 2495 into a tapered, or reduced diameter delivery tube 2492 into an inlet port of upper die member 2481 while members 2481 and 2483 and mated together under force in an injection molding machine (not shown) via interdigitation of mold alignment pins on member 2481 with female receiving bores on member 2483. Mold members 2481 and 2483 are mated and demated together in reciprocation before and after molten plastic is injected between members 2481 and 2483 in order to remove a cooled end product, or heated lens assemblies 2418 (see FIG. 112) in a rapid cyclical production operation.

Figure 114:
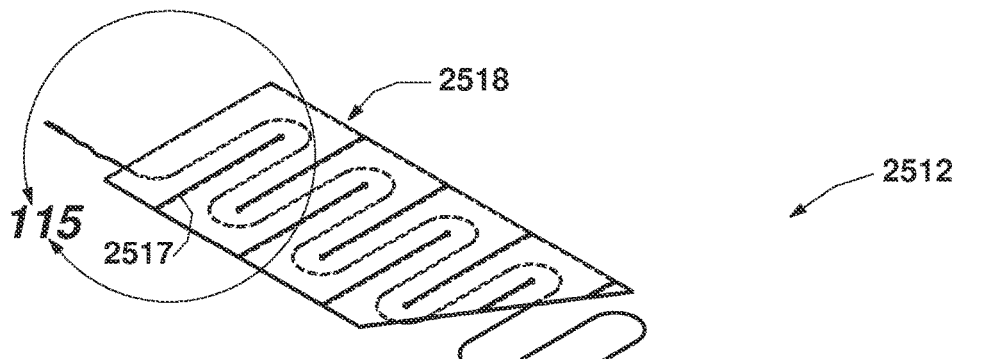
FIG. 114 is a heated back panel segment for a solar panel assembly of FIG. 116 below having a heated and insulated back panel segment with an internally molded elongate heating element after a panel and heater molding operation.
Figure 116:
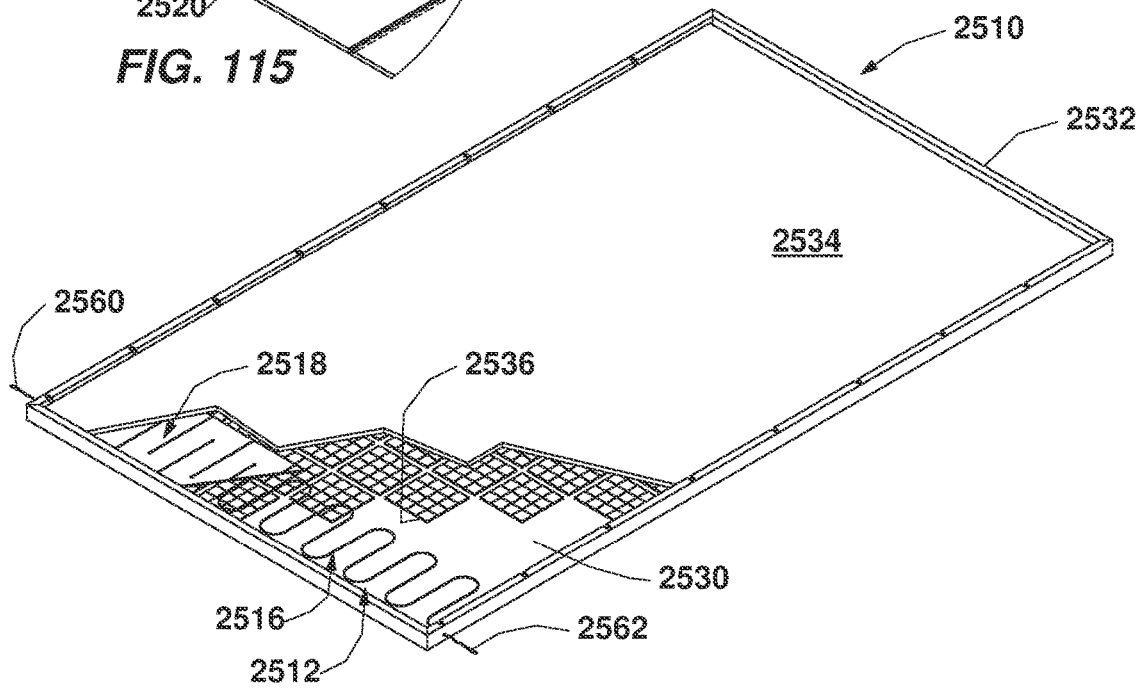
FIG. 116 is a perspective view with layer broken away of a solar panel assembly having a heated and insulated back panel with an internally molded elongate heating element after an adhesive and vacuum molding assembly operation.

FIG. 114 is a heater assembly 2512 for a solar panel assembly 2510 of FIG. 116 below having a heated and insulated back panel segment 2518 with an internally molded elongate heating element 2516 provided in panel segment 2518 by an internal molding operation similar to how heating element 2416 is encased in lens 2418 (of FIG. 112). Discrete crosscut relief cuts 2517 are provided within each bend of serpentine heating element 2516 to reduce thermal stresses in operation. Each cut 2517 ends in a stress relief hole 2520. Optionally, cuts 2517 and holes 2520 can be eliminated. Optionally, heating element 2516 can be adhesively adhered to a back surface of panel segment 2518, or element 2516 can be inserted into a serpentine groove formed in panel segment 2518 and held in place with one or more of adhesive, epoxy, fasteners, or laminated retainer segments or panels. Back panel segment 2518 can be one of a plurality of parallel elongate panel segments that nest together to form a portion or a complete back panel for a solar panel, extending horizontally or vertically. As shown in FIG. 116, a single heated lower panel segment 2518 is provided along a bottom edge of a solar panel. Such design can optionally be used as a heat source for an optional vented, or closed-loop thermal convection system shown in U.S. Pat. No. 9,605,880, herein.

Figure 115:
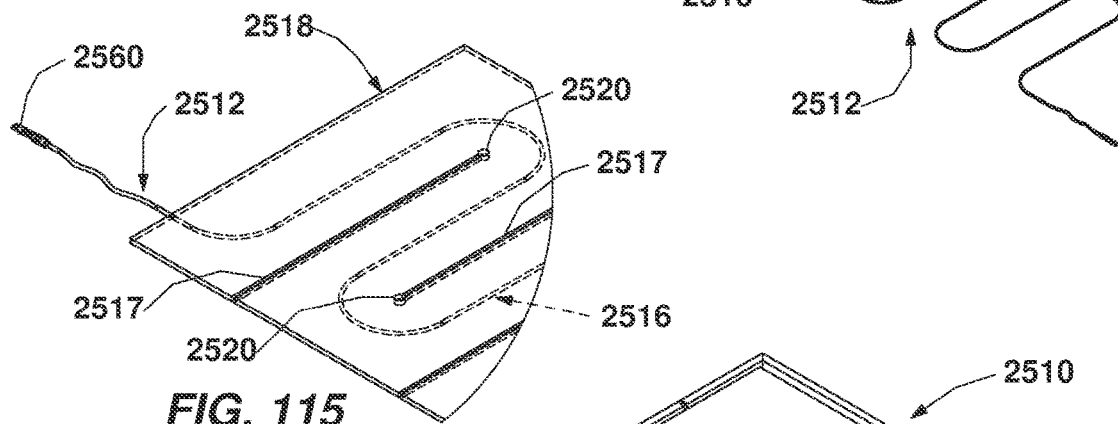
FIG. 115 is an enlarge perspective view from the encircled region 115 of FIG. 114.

FIG. 115 is an enlarged perspective view from the encircled region 115 of FIG. 114 further depicting cuts 2517 and relief holes 2520 formed through panel segment 2518 into each bend of serpentine elongate heating element 2516. Heating element 2516 of heater assembly 2512 terminates at each end in an electrically conductive blade terminal, such as terminal 2560. In one case, elongate heating element 2516 is molded internally within a polycarbonate plastic sheet and cuts 2517 and holes 2520 are machined in during a subsequent processing step.

FIG. 116 is a perspective view with layers broken away of a solar panel assembly 2510 having a heated and insulated back panel 2534 with one or more panel segments 2518 having an internally molded elongate heating element 2516 of an internal heater assembly 2512 after a heated lamination (and vacuum molding) assembly operation. An array of photovoltaic, or solar cells 2536 are supported along a front surface, or glass panel 2530 of panel assembly 2510 while heater panel segment 2518 is provided behind such cells 2536 while an insulated back panel 2534 is secured within an outer peripheral structural frame 2532. According to one construction back panel 2534 can be a Tedlar composite with an insulating layer, including a Tedlar-Polyester-Tedlar (TPT) laminate. TPT is a polymer multi-laminate, Polyvinyl fluoride (PVF), a thermoplastic fluoropolymer material available from DuPont de Nemours, Inc. headquartered in Wilmington, Del., USA. It is also understood that photovoltaic cells 2536 are encased, or laminated between one or more layers of ethylene vinyl acetate (EVA) to protect such cells 2536. Power supply blade terminals 2560 and 2562 extended from opposite ends of elongate heating element 2516 for connection to an external power supply, such as a 12-volt battery power supply.

Figure 117:
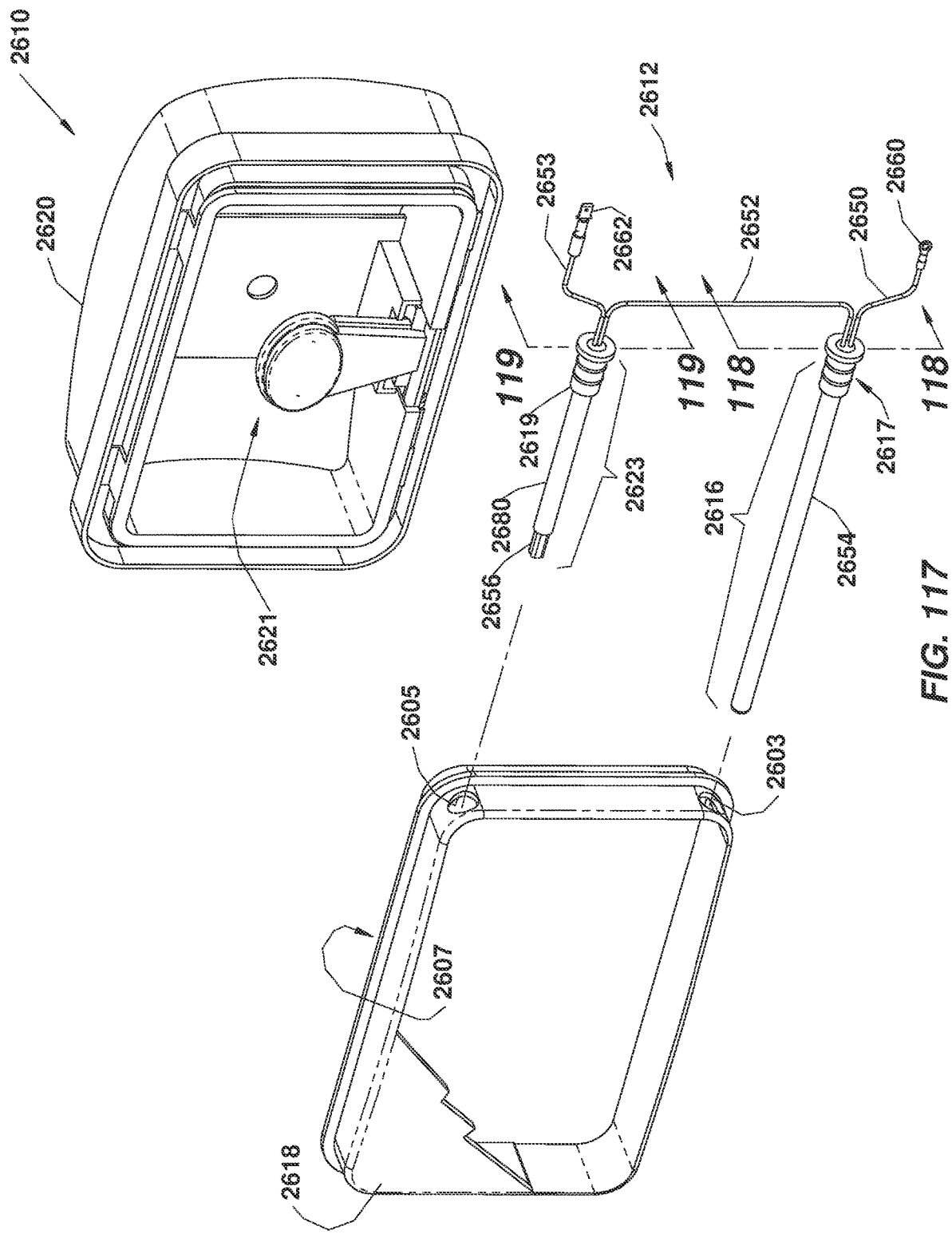
FIG. 117 is a front partially exploded perspective view from above of even another headlight assembly and heat source having an elongate heater assembly and a spaced-apart temperature switch.

FIG. 117 is front partially exploded perspective view from above of even another headlight assembly 2610 and heat source 2612 having an elongate heater 2616 and a separate temperature switch assembly 2623. Headlight assembly 2610 includes a housing 2620 and a lens 2618. Lens 2618 includes an inner well, or cavity 2607. A pair of cylindrical ports, or bores 2603 and 2605 are provided in a side flange of lens 2618 configured to receive in spaced-apart relation heater 2616 and temperature switch assembly 2623 via a press-fit or optional adhesive bond assembly. An LED light source, or light post 2621 generates light that is reflected from a reflector in housing 2620 and out through lens 2618. Temperature switch assembly 2623 is spaced-apart above elongate heater 2616 to provide an improved temperature feedback signal that is dampened from transient heat surges from heater 2616 used to regulate on and off power supply operation of heater 2616 based on realized internal temperatures within housing 2620 and behind lens 2618.

As shown in FIG. 117, heater assembly 2612 is press-fit into bores 2603 and 2605, in assembly, where a pair of plastic, or nylon end grommets 2617 and 2619 are each urged within bores 2603 and 2605 to support heater 2616 and temperature switch assembly 2623 respectively therein. Polytetrafluoroethylene (PTFE) tube 2654 of heater 2616 extends substantially across a width of lens 2618 to deliver heat along a bottom edge portion of the lens 2618 and internal volume of the light housing 2620. Polytetrafluoroethylene (PTFE) tube 2680 of temperature switch assembly 2623 holds a bimetallic temperature switch 2656 at a terminal positioned along a top medial position of lens 2618. Optionally, a thermistor can be used. According to one construction, grommets 2617 and 2619 each are either nylon, plastic, or silicone grommets. Insulated wires 2650 and 2652 extend from grommet 2617 and insulated wires 2652 and 2653 extend from grommet 2619.

According to one construction, cylindrical plastic or nylon end grommets 2617 and 2619 having part number ILT13, UPC code 31160000, comprised of black high grade plastic (LDPE), durable, shock-proof and UV resistant, having a ½" nominal diameter including ribs to facilitate friction-fit and sealing into a port or bore-hole, (a throughhole drilling operation is necessary to adapt to and receive the PTFE tube therein) manufactured by BG Parus, and available for purchase on-line for purchase from multiple stores including Amazon.com or Aliexpress.com. A series of optional nominal diameters are available in ¹⁄₁₆" standard increments under various corresponding part numbers for desired or preferred applications.

Figure 118:
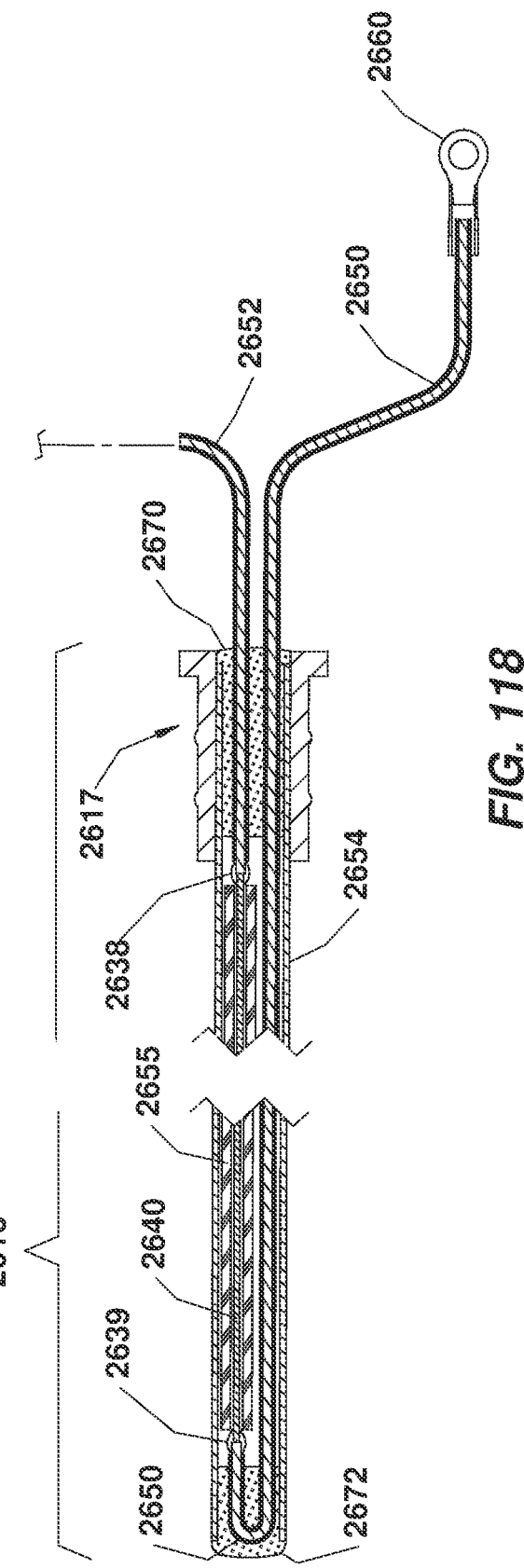

FIG. 118 is vertical sectional view of the elongate heater 2616 taken along line 118-118 of FIG. 117. Insulated wires 2650 and 2652 are affixed with solder 2639 and 2638, respectively, at opposite ends with an electrically resistive heating material wire, or Nichrome wire 2640. An electrically conductive ring terminal 2660 is affixed to a proximal end of insulated conductive wire 2650 with the inner conductive core. Wire 2640 is carried coaxially within a bore of a polytetrafluoroethylene (PTFE) tube 2655 that served to provide electrical insulation and thermal mitigation of heat transfer from wire 2640 to a surrounding immediate environment. Wires 2650 and 2652 are encased in a thermally transmissive potting material, or epoxy 2670 within an inner bore of grommet 2617. Tube 2654 is also inserted within grommet 2617 and bonded and secured with an adhesive and is further filled with material 2670 at one end. Wire 2650 is secured at an opposite end within tube 2654 by another plug of thermally transmissive potting material, or epoxy 2672 where wire 2650 is folded over at a terminal end of elongate heating element 2616. Optionally, a small hole or orifice (not shown) may be drilled or otherwise provided through epoxy 2677 to allow equalization of air pressure inside during thermal cycling of the heater assembly 2616.

Figure 119:
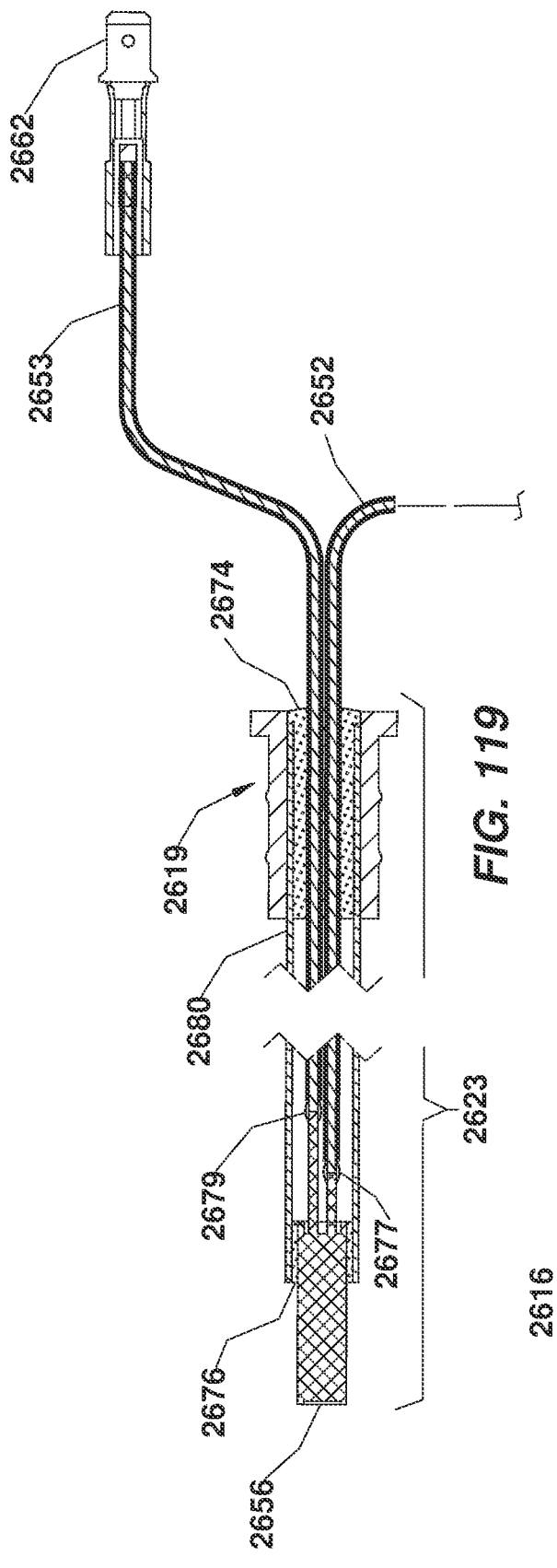

FIG. 119 is a vertical sectional of the temperature switch assembly 2623 taken along line 119-119 of FIG. 117. Insulated wires 2652 and 2653 are affixed with solder 2677 and 2679 to respective conductive leads on a bimetallic temperature switch 2656. An electrically conductive blade terminal 2662 is affixed to a proximal end of wire 2650 with the inner conductive core. Temperature switch 2656 (or optionally a thermistor) is affixed within an inner bore of a polytetrafluoroethylene (PTFE) tube 2680 using a plug of thermally transmissive potting material, or epoxy 2676. Furthermore, another plug of thermally transmissive potting material, or epoxy 2674 is injected or inserted within an inner bore of grommet 2619 and a proximal end of tube 2680 to impart affixation there between. Tube 2680 is inserted within grommet 2619 and is affixed and secured with a suitable adhesive sealant.

As shown in FIGS. 118 and 119, one suitable construction for grommet 2617 and 2619 is a plastic, urethane, rubber, or silicone rubber grommet.

FIG. 120 is vertical front view of the heated headlight assembly 2610 of FIG. 117. Temperature switch assembly 2623 is affixed via grommet 2619 spaced vertically above elongate heater 2616 and grommet 2617 by distance "D" within lens 2618. Temperature switch assembly 2623 is electrically coupled in series with elongate heater 2616 and is fed DC power from a 12 volt power supply via ring terminal 2660 and blade terminal 2662. Bimetallic temperature switch 2656 is carried centrally or supported within lens 2618 above LED light source 2621.

FIG. 121 is a vertical sectional view of the heated headlight assembly 2610 of FIG. 120 taken along line 121-121 of FIG. 120 and showing airflow induced by a moving vehicle and heat transfer relative to the headlight assembly 2610 caused by vehicle motion. More particularly, as air flows over and around lens 2618 some of the heat generated by heating element 2616 is transmitted by conduction, convection, and/or radiation into the airflow and outward from housing 2620. Provision of temperature switch assembly 2623 near a top edge of lens 2618 and spaced from heating element 2616 ensures that thermal loss from housing 2020 and lens 2618 is accounted for in any control scheme to properly regulate power delivery (on/off) to improve regulation and operation of heating element 2616. Accordingly, such resulting heat delivery from heating element 2616 sufficiently mitigates or eliminates condensate including snow, ice and/or moisture from inner and/or outer surfaces of lens 2618 to enable light from LED light source 2621 to transmit outwardly through lens 2618.

FIG. 122 is perspective view partially broken away from above of yet another heated headlight assembly 2710 having a heater assembly 2712 with an elongate heating element 2716 and a separate temperature switch assembly 2723. Elongate heating element 2716 has a plurality of vertical heat convection ports 2736 equal distance spaced-apart along a polytetrafluoroethylene (PTFE) tube 2754 and an air delivery source 2742 (see FIG. 123). A forced air delivery tube 2742 provides a positive pressure supply of airflow to heating element 2716 where it passes longitudinally through heated tube 2754, warming air inside of tube that exits vertically in up and down directions via vertical ports 2736. Optionally, a source of airflow can be eliminated and natural convection can be used to generate airflow via ports 2736 that enters along a bottom port 2736 and exits from a top corresponding port 2736 along tube 2754. Housing 2720, lens 2718, insulated conductive wires 2750, 2752, and 2753, blade terminals 2760 and 2762, grommets 2717 and 2719, LED light source 2721, and bimetallic temperature switch 2756 are constructed and arranged essentially the same as housing 2620, lens 2618, insulated wires 2650, 2652, and 2653, blade terminals 2660 and 2662, grommets 2617 and 2619, LED light source 2621, and thermistor 2656, as shown and described variously with reference to FIGS. 117-121.

FIG. 123 is a perspective view from above of the elongate heating element 2716 for the heater assembly 2712 of the heated headlight assembly of FIG. 122 and further showing the vertical heat convection ports 2736 provided vertically in tube 2754 and the air delivery source 2744. Air delivery source 2744 is shown as a fan air supply or compressor. However, it is understood that any form of air pump, ducted forced air supply, or compressed air source can also be used, including a vehicle HVAC system. An air source delivery tube, or duct 2742 (shown in partial breakaway view) delivers air inside of tube 2754 as shown below in great detail in FIG. 124. Insulated conductive wires 2750 and 2752 and tube 2742 extend through an end of grommet 2717 and into tube 2754 affixed and secured with adhesive and/or potting material. Ring terminal 2760 is connected to a negative voltage source (−V) and wire 2752 is connected to a positive voltage source (+V). Reserved voltage polarity can optionally be used.

FIG. 124 is a vertical sectional view of the elongate heating element 2716 taken along line 124-124 of FIG. 123 and showing the vertical heat convection ports 2736 that intersect one longitudinal cylindrical inner cavity, or cylindrical inner bore 2730 formed within tube 2754. A source of pressurized air flows from a source, such as source 2744 (see FIG. 123), delivers a flow of air via tube 2742 in both upward and downward directions via each top and bottom end of port 2736 and such air is heated as it passes along bore 2730 from tube 2754. Another longitudinal cylindrical inner cavity, or cylindrical inner bore 2732 is filled an entire length with a ceramic-filled epoxy material 2770 (or other suitable filled epoxy) that provides both mechanical support, as well as a thermal mass for storing heat received from tube 2754 and distributing heat back to tube 2754 for heating air flowing through bores 2730 and port 2736. Finally, a longitudinal cylindrical inner cavity, or cylindrical inner bore 2734 contains an electric heat source in the form of an elongate electric heating element, or Nichrome wire 2740 surrounded by polytetrafluoroethylene (PTFE) tube 2754 electrically coupled with insulation covered conductive wire 2750. Current is delivered through wire 2740 to generate heat within bore 2734 that heats tube 2754 where some heat is stored in material 2770 and as heat is further distributed and exchanged to air flowing through bore 2730 and onto inner surface of lens 2718 and inner volume of light housing 2720. A small orifice or vent (not shown) is provided in housing 2720 to relieve any excess air pressure that might build up inside of housing 2720 caused by introduction of the air flow source. Optionally, ports 2736 can be sized with increasing diameter moving away from the air flow source in order to generate equivalent volumetric flow rates at each of the plurality of ports 2736 along the tube 2742.

Figure 125:
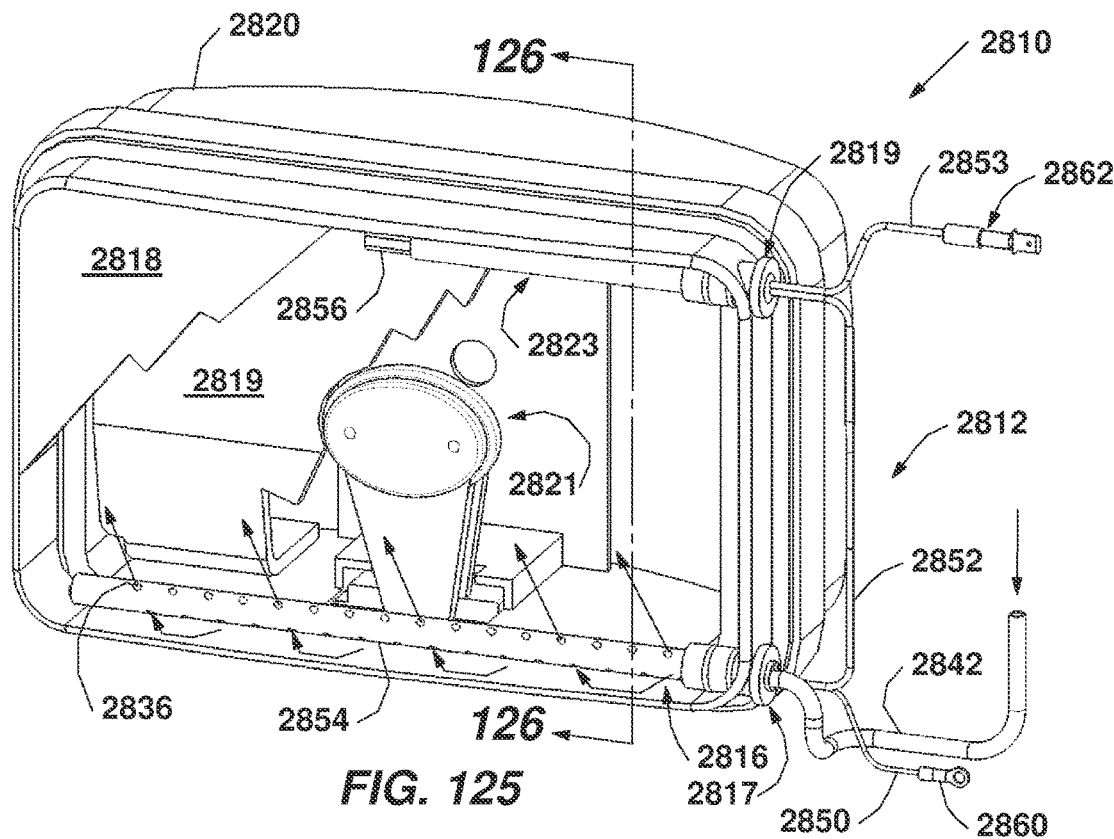

FIG. 125 is a perspective view from above of yet even another heated headlight assembly 2810 similar to that depicted in FIG. 122-124. However, assembly 2810 further includes an inner lens 2819 configured behind the outer lens 2818 both affixed to a housing 2820 to provide a reduced-volume heated lens chamber 2809 (see FIG. 126) in comparison to the entire internal volume between the lens 2818 and light housing 2920. In addition, a positive air pressure source is provided via tube 2842 for the heat source within tube 2836 with a plurality of vertically angled heat convection ports 2836. Operation and construction of elongate heating element 2816 and temperature switch assembly 2823 and associated components; namely, insulated conductive wires 2850, 2852, and 2853, terminals 2860 and 2862, air flow tube 2842, bimetallic temperature switch 2856, LED light source 2821, and grommets 2817 and 2819 are essentially the same as components insulated conductive wires 2750, 2752, and 2753, terminals 2760 and 2762, air flow tube 2742, bimetallic temperature switch 2756, LED light source 2721, and grommets 2717 and 2719 associated with elongate heating element 2716 and temperature switch assembly 2723 shown variously in FIGS. 122-124, save for angled ports 2836 and inner lens 2819. Angled ports 2836 can provide less flow resistance and improved efficiency toward convective heat transfer to lens 2818.

Figure 126:
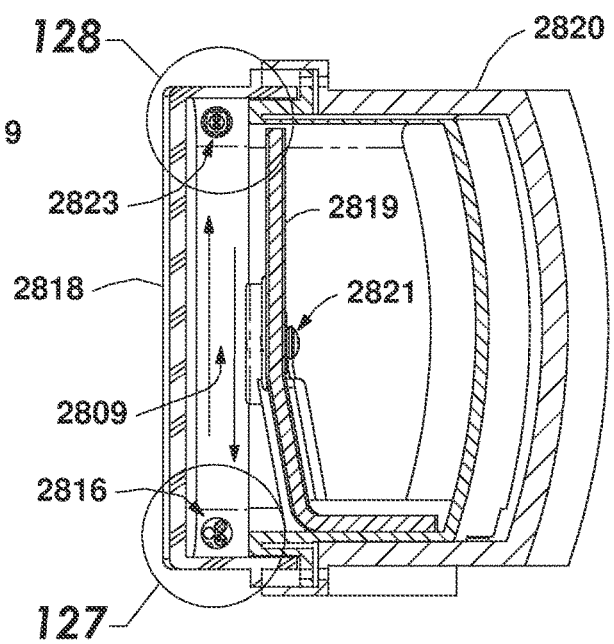

FIG. 126 is a vertical sectional view of the heated headlight assembly 2810 showing the reduced volume heated air chamber 2809 formed between outer lens 2818 and inner lens 2819 taken along line 126-126 of FIG. 125. More particularly, heated airflow from elongate heater assembly 2816 provided along a bottom portion of air chamber 2809 supplies a flow of heated air that rises within reduced volume chamber 2809 while heating lens 2818 and 2819 which enables mitigation of condensate on lenses 2818 and 2819 to enable transmission of light from an LED light source 2821 reflected from a light reflector in housing 2820. Temperature switch assembly 2823 monitors temperature in a top portion of chamber 2809 and shuts off heater 2816 at a designed threshold temperature detected at the top of chamber 2816. Heat transfers within the chamber 2809 as a result of the heated forced air flow, as well as convection currents with chamber 2809. A housing vent (not shown) can also be optionally provided.

Figure 127:
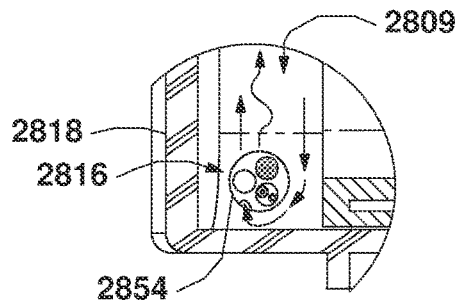

FIG. 127 is an enlarged sectional view taken within encircled region 127 of FIG. 126 showing the elongate heating element 2816 mounted and supported in a bottom portion of reduced volume chamber 2809 behind outer lens 2818.

Figure 128:
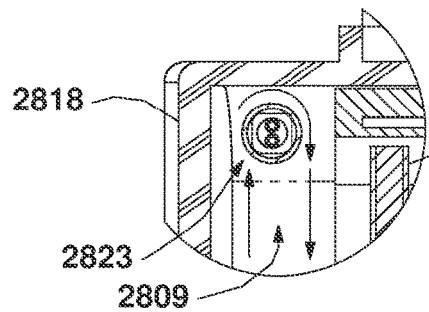

FIG. 128 is an enlarged sectional view taken through encircled region 128 of FIG. 126 showing the heat sensor, or temperature switch assembly 2823 mounted within chamber 2809 between outer lens 2818 and inner lens 2819.

FIG. 129 is a perspective view from above of the elongate heating element 2816 for the headlight assembly 2810 of FIG. 125 showing the vertically angled heat convection ports 2836 equally spaced-apart along tube 2854 and the air delivery duct 2842. Insulated conductive wires 2850 and 2852 and air flow tube 2842 enter a proximal end of grommet 2817 into bore 2830 of tube 2854. Ring terminal 2860 is coupled to a negative voltage source (−V) and wire 2852 is coupled to a positive voltage source (+V). Optionally, polarity can be reversed.

FIG. 130 is a plan view from above of the elongate heating element 2816 of FIG. 129 and showing the angled heat convection ports 2836 from above. Grommet 2817 receives wires 2850 and 2852 and air flow tube 2842 from a source (not shown) where they enter tube 2854. Wire 2850 terminates in ring terminal 2860.

FIG. 131 is a vertical sectional view of a broken away segment of the elongate heating element 2816 taken along line 131-131 of FIG. 130. The flow of air as it is being heated in bore 2830 and ports 2836 is shown. In some cases, air can enter the bottom portions of ports 2836 if the force air flow is low through bore 2830. In other cases, air can be ejected downwardly from the bottom portions of ports 2836 when air flow is large through bore 2830 of tube 2854.

FIG. 132 is a front view of the elongate heating element 2816 of FIG. 130 and further showing the angled heat convection ports 2836 from in front. Grommet 2817 receives wires 2850 and 2852 and air flow tube 2842 from a source (not shown) where they enter tube 2854. Conductive wire 2850 terminates in ring terminal 2860. Tube 2854 is bonded and secured to grommet 2817 using a suitable adhesive epoxy filler (not shown).

FIG. 133 is a vertical sectional view of the elongate heating element 2816 taken along line 133-133 of FIG. 132 and showing a portion of the angled heat convection ports 2836 that intersect one longitudinal cylindrical inner cavity, or cylindrical inner bore 2830 formed within tube 2854. A source of pressurized air flows from a source, such as source 2744 (see FIG. 123), delivers a flow of air via tube 2842 (see FIG. 132) in an upward direction, or optionally, both upward and downward directions (depending on source air flow volume) via each top and bottom end of port 2836 and such air is heated as it passes along bore 2830 from tube 2854. Another longitudinal cylindrical inner cavity, or cylindrical inner bore 2832 is filled with a ceramic-filled epoxy material 2870 that provides both mechanical support and a thermal mass for storing heat received from tube 2854 and distributing heat back to tube 2854 for heating air flowing through bore 2830. Finally, a longitudinal cylindrical inner cavity, or cylindrical inner bore 2834 receives an electric heat source in the form of an elongate electric heating element, or Nichrome wire 2840 surrounded by a polytetrafluoroethylene tube 2855 electrical coupled with electrical insulation covered conductive wire 2850. Current is delivered through wire 2840 to generate heat within bore 2834 that heats tube 2854 where some heat is stored and transferred within material 2870 and heat is further distributed to air flowing through bore 2830

FIG. 134 is an exploded perspective view of the elongate heating element 2816 of FIGS. 125-133. More particularly, a cylindrical, cured full length plug of filled epoxy, or black epoxy encapsulant 2870 having a high thermal mass and high thermal conductivity is provided in tube 2854 in assembly. One suitable source is ResinLab EP1200 black epoxy encapsulant, medium viscosity casting resin available from available from ResinLab L.L.C., (an Ellsworth Adhesives Company), N109 W13300 Ellsworth Drive, Germantown, Wis. 53022 USA. Another suitable source is Ellsworth Adhesives NovaGard Solutions 2-part epoxy encapsulant FE1-099 A&B, a two-component flowable thermal gap filler available from NovaGard, 5109 Hamilton Ave., Cleveland, Ohio 44114 USA. Filled epoxy plugs 2805 and 2806 fill the distal ends of the air delivery bore 2830 and the heater bore 2834 of tube 2854. An inlet fitting 2807 fills the proximal end of the air delivery bore 2834 having circumferential ribs that secure in the bore and within a distal end of air delivery tube 2842. Heat is supplied by the resistance heating circuit provided by an length of electrically resistive heating material, or wire 2840, such as Nichrome wire that is affixed via solder 2877 and 2879 at opposed ends to electrically insulated conductive wires 2852 and 2854, with wire 2852 terminating in a ring terminal to a power supply (not shown) through temperature switch 2823 (see FIG. 125). The resulting heater assembly is inserted within a bore 2834 of tube 2854 where another filled epoxy plug 2808 seals exit of wires 2852 and 2854 from tube 2854, opposite of plug 2806 at the opposed end of bore 2834 of tube 2854. Air is delivered into bore 2830 of tube 2854 and heated, as tube 2854 is heated by wire 2840, and such heated air exits via ports 2836 along tube 2854 in order to mitigate condensate on surfaces such as lenses. Grommet 2817 is also fitted about tube 2854 in assembly and is affixed and secured with adhesive and/or potting material provided to support the resulting elongate heating element 2816 within a receiving bore of a lens housing or mounting structure.

FIG. 135 is a perspective view from above of a heated lens assembly 2910 for a vehicle light assembly suitable for use optionally on the light housing 2720 of FIG. 122. More particularly, heated lens assembly 2910 is a double lens with a heater assembly 2912 including an elongate heating element 2916 and a temperature switch assembly 2923 mounted in an outer peripheral sidewall flange of an outer lens 2918.

FIG. 136 is a vertical sectional view taken along line 136-136 of FIG. 135 showing the elongate heating element 2916 and the sensor, or thermistor 2956 of temperature switch assembly 2923 (see FIG. 137) mounted within reduced volume space 2909 between outer lens 2918 and inner lens 2919. A bead of adhesive sealant 2915 is provided about an entire outer periphery on an inner surface of inner lens 2919 to bond and seal lens 2919 within outer lens 2918.

FIG. 137 is an exploded perspective and partially broken away view from above of the heated lens assembly 2910 of FIG. 135 showing the heater assembly 2912 including the elongate heating element 2916 and the sensor, or temperature switch assembly 2923. A polytetrafluoroethylene (PTFE) tube 2954 of heating element 2916 extends between bores 2901 and 2903 across a bottom edge of outer lens 2918. Polytetrafluoroethylene (PTFE) tube 2980 and thermistor 2956 of temperature switch assembly 2923 mount within bore 2905 of outer lens 2918, externally of inner lens 2919. Adhesive bead 2915 affixes inner lens 2919 within an inner surface of the peripheral flange on outer lens 2918.

FIG. 138 is a perspective view from above of the elongate heating element 2916 of FIG. 135-137. A resilient plastic, or urethane grommet 2817 and 2919 is affixed at each end of tube 2954 and a Nichrome wire 2940 extends internally through an inner bore of tube 2954. Insulated conductive wires 2950 and 2952 are soldered at opposed ends to Nichrome wire 2940.

FIG. 139 is an exploded perspective view from above of the elongate heating element 2916 of FIG. 138. Tube 2954 is shown separated from internal resistance heating wire 2940. Grommets 2917 and 2919 are received over tube 2954 inside of right angle bends on tube 2954 and wire 2940. Wire 2979 is affixed with solder joints 2977 and 2979 to insulated conductive wires 2950 and 2952, respectively. A polytetrafluoroethylene heat-shrink tube 2974 and 2976 is fit over each resulting connections, or solder joint 2977 and 2979 providing both electrical insulation and a weather-tight seal.

FIG. 140 is an exploded perspective view from above of a vehicle headlight assembly 3010 having an array of spaced-apart discrete region and elongate, encircling heater assemblies 3012, 3013, 3014, and 3015, and further showing one optional semi-circular heater assembly 10313. Heater assemblies 3012, 3013, 3014, and 3015 each affixed to lens 3018 at locations that correspond respectively optically in front of LED light 3021, LED light 3031, radar (or sensor) unit 3033, and camera 3035 affixed in housing 3020 such that condensate buildup can be mitigated or eliminated from lens 3016 from local regions of lens 3018 without having to provide heat and electrical energy to sufficiently clear an entire surface area of lens 3018. This reduces overall power otherwise needed from a vehicle electrical system and power supply.

FIG. 141 is a perspective view from above and behind of the vehicle headlight assembly 3018 of FIG. 140 further showing the array of elongate, discrete regions encircling heater assemblies 3012, 3013, 3014, and 3015 affixed to the interior surface of lens 3018 relative to housing 3020.

FIG. 142 is a front view of the lens 3018 and the vehicle headlight assembly 3010 and showing the array of heater assemblies 3012, 3013, 3014, and 3015 of FIGS. 140-141 spaced apart and defining discrete regions having a total surface area relatively much smaller than the substantially larger geographic surface region of lens 3018.

FIG. 143 is a local encircled sectional view of a portion of one heater assembly 3012 taken from a local encircled section taken along line 143-143 of FIG. 142. A heater retention ring 3022 of plastic, or polycarbonate is affixed to an inner surface of lens 3018 with adhesive and/or threaded fasteners (not shown) to entrap heater assembly 3012 against an inner surface of lens 3018 to optimize heat transfer to lens 3018 from heater assembly 3012. Ring 3022 is configured with a radial inner gap when affixed to lens 3018 in order to facilitate insertion and removal of heater assembly 3012 from between ring 3022 and lens 3018 during assembly, as well as repair. The diameter and placement of heater assembly 3012 on lens 3018 is selected to avoid interference with essential light transmission through lens 3018.

FIG. 144 is a local encircled sectional view of another heater assembly 3014 taken from an encircled section taken along line 144-144 of FIG. 142. A heater retention ring 2023 of plastic, or polycarbonate is affixed to an inner surface of lens 3018 with adhesive and/or threaded fasteners (not shown) to entrap a pair of concentric round elongate heater assemblies 3024 and 3026 affixed within an inner edge of retention ring 2023 against an inner surface of lens 3018.

FIG. 145 is a perspective view from above of the heater assembly 3012 of FIGS. 140-143. Retention ring 3022 is affixed to a lens surface, such as an inner lens surface. Optionally, ring 3022 can be affixed to an outer lens surface. A wire harness 3065 containing a pair of insulated conductive wires extends from ring 3022 and terminates to a two-terminal plug 3060 used to connect/disconnect with a power supply in a vehicle wiring harness.

FIG. 146 is an exploded perspective view from above of the heater assembly 3012 of FIG. 145. In assembly, resistance heating wire 3040 is received coaxially within tube 3054 to form an encircling, elongate heating element 3016 and heating element 3016 is entrapped between ring 3022 and a surface of a vehicle lens in assembly. Solder joints 3077 and 3079 are used to affix opposed ends of Nichrome resistance heating wire 3040 to each of two conductive wires within wire harness 3065.

FIG. 147 is an enlarged partial perspective view of electrical connections from the encircled region 147 of FIG. 145 comprising solder joints 3077 and 3079 that electrically couple together elongate heating element 3016 and conductive wires within wire harness 3065. Solder joints 3077 and 3079 are seated radially inwardly within a groove of retention ring 3022. Optionally, solder joints 3077 and 3079 may be coated with electrically insulating liquid resin and allowed to cure to protect and secure the connections.

FIG. 148 is a perspective view from above of the heater assembly 3014 of FIGS. 140-142 and 144. Heater assembly 3014 includes a generally rectangular retaining ring 3023 housing a pair of complementary rectangular elongate heating elements 3024 and 3026 that are electrically coupled together in series with a thermostatic switch, such as a bimetallic temperature switch 3066. Optionally, a thermistor can be used. Switch 3066 shuts off, or interrupts current flow through each heating element 3024 and 3026 when switch 3066 turns off in response to reaching a design peak threshold temperature. Opposite ends of heating elements 3024 and 3026 are electrically coupled to each of two conductive wires within wiring harness 3065 and to a two-terminal plug 3060.

FIG. 149 is an exploded perspective view from above of the heater assembly 3014 of FIG. 148 showing in greater detail elongate heater tubes 3024 and 3026, each constructed from a resistance heating wire, or Nichrome wire 3040 received coaxially within a polytetrafluoroethylene (PTFE) tube 3054. Solder joints 3077 and 3079 affixed one end of each heating element 3024 and 3026 to individual terminals on thermostatic switch 3066. Opposite ends of heating elements 3024 and 3026 are affixed with solder joints 3081 and 3083 to individual wires within wiring harness 3065 and to two-terminal plug 3060. Heating elements 3024 and 3026 and thermostatic switch 3066 are assembled together and mated into grooves in rectangular retaining ring 3023.

FIG. 150 is a partial assembly end view of the elongate, generally rectangular encircling heaters 3024 and 3026 for the heater assembly of FIGS. 148-149. Solder joints 3081 and 3083 are provided at one end of heaters 3024 and 3026, while solder joints 3077 and 3079 are provided at another end of heaters 3024 and 3026 for electrically connecting with the bimetallic temperature switch 3066. Optionally, electrically insulating curable liquid resin and allowed to cure to protect and secure the connections.

FIG. 151 is a vertical sectional view through a simplified heated lens 3118 used with a vehicle or structure encasement 3110 for a light, radar, lidar, camera or other electromagnetic emitter and/or detector assembly showing a first construction with an integrally molded elongate heater assembly 3112 molded within an integral ring of the lens 3118. In one case, lens 3118 comprises a polycarbonate, or plastic lens. A thickened ring 3122 is integrally formed in lens 3118 into which a circular, elongate heating element of heater assembly 3112 is integrally molded. Heating assembly comprises a plastic, or polytetrafluoroethylene (PTFE) cylindrical tube having a coaxial central resistance heating material, or Nichrome wire configured to receive current flow to generate heat into lens 3118 to mitigate condensation and eliminate occlusion of lens 3118 from condensation, moisture, snow, and/or frost.

FIG. 152 is an alternate simplified heated lens 3218 for an encasement 3210, such as a light housing, over that shown in FIG. 151 with a heater retention ring 3222 that is adhesively bonded or fastened to the lens 3218. A circular, elongate heating element of a heater assembly 3212 is entrapped against an inner surface of lens 3218 with a cylindrical receiving groove in retention ring 3222. Heating assembly comprises a plastic, or polytetrafluoroethylene (PTFE) cylindrical tube having a coaxial central resistance heating material, or Nichrome wire configured to receive current flow to generate heat into lens 3218.

FIG. 153 is another alternative simplified heated lens 3318 for an encasement 3310 similar to that shown in FIG. 143, but having the heater retention ring 3322 integrally molded with the lens 3318. In one case, lens 3318 and integral ring 3322 are formed from a plastic, such as a polycarbonate. Other suitable materials can be used including composite materials, glass, or any other suitable lens material. The elongate heating element of heater assembly 3312 is received in a circumferential groove within ring 3322 to facilitate assembly, repair and replacement of heater assembly 3312 with lens 3318. Heating assembly comprises a plastic, or polytetrafluoroethylene (PTFE) cylindrical tube having a coaxial central resistance heating material, or Nichrome wire configured to receive current flow to generate heat into lens 3318.

FIG. 154 is even another alternative simplified heated double lenses 3418 and 3419 for an encasement 3410 similar to that shown in FIGS. 143 and 153 with a heater retention ring 3422 is integrally formed with an inner lens 3419 that is adhesively or mechanical affixed, or fastened to the outer lens 3418 to hold and secure heater assembly 3412.

FIG. 155 is yet even another alternative simplified heated double lenses 3518 and 3519 for an encasement 3510 similar to FIG. 154, but with the addition of a foil heat reflector 3523 and insulation 3525 about the heater retention ring 3522 integrally formed with inner lens 3519 that is adhesively or mechanical affixed, or fastened to the outer lens 3518 to hold and secure heater assembly 3512.

FIG. 156 is a perspective view of the optional semi-circular heater assembly 103012 of FIG. 140. More particularly, a pair of insulated electrical wires extend through wiring harness 103065 from a two-terminal connector 103060 to a heater assembly 103012 having a bimetallic thermostat switch 103066 encased in a plastic semi-circular retainer ring 103022 that is affixed to an inner or an outer surface of a lens using adhesive and/or fasteners.

FIG. 157 is an exploded perspective view of the heater assembly 103012 of FIG. 156 showing in greater details elongate heater tubes 103061 and 103063, each constructed from a resistance heating wire, or Nichrome wire 103040 received coaxially within a polytetrafluoroethylene (PTFE) tube 103054. Solder joints 103077 and 103079 affixed one end of each heating element 103061 and 103063 to individual terminals on thermostatic switch 103066. Opposite ends of heating elements 103061 and 103063 are affixed with solder joints 103081 and 103083 to individual wires within wiring harness 103065 and to two-terminal plug 103060. Heating elements 103061 and 103063 and switch 103066 are assembled together and mated into grooves in semicircular retaining ring 103022. Optionally, electrically insulating curable liquid resin and allowed to cure to protect and secure the connections.

FIG. 158 is a partial assembly end view of the elongate, semi-encircling heaters 103024 and 103026 for the heater assembly of FIGS. 156-157. Solder joints 103081 and 103083 are provided at one end of heaters 103061 and 103063, while solder joints 103077 and 103079 are provided at another end of heaters 103061 and 103063 for electrically connecting with the bimetallic temperature switch 103066.

Although bimetallic thermostatic switches are used in the variations taught variously in FIGS. 1-158, it is understood that other temperature control devices or switches can be used such as thermistors, temperature sensors, as long as they are somehow associate in thermal communication with the environment being heated by the associated heater assembly.

As shown variously by the embodiments depicted in FIGS. 1-158, the resistance heating wire used in one form is solid bare (non-insulated) nickel chromium steel wire. Optionally, any other suitable resistance wire or element that generates heat responsive to current flow can alternatively be used. Either of two diameters or gages of preferred solid nickel chromium wire may be selected based upon the desired heating and power consumption characteristics and typically include AWG gages 28 and 30 which are commercially available from Consolidated Wire & Cable, 11044 King St., Franklin Park Ill. 60131 as product part numbers BNC 28 and BNC 30 respectively. These materials are typically provided as 4 oz spools of bare (non-insulated) solid nickel chromium wire. Very similar and functionally equivalent wire is also available from Arcor Electronics, 5689 W. Howard Street, Niles Ill. 60714 under product description 30 BNC, 4 oz spool, of bare (non-insulated) nickel chromium wire as part number B88800270. It is also understood that multi-stranded or otherwise braided nickel chromium wire of various other AWG gage sizes may be also utilized. The various configurations and types of wire may be optionally further comprised of various ratios of alloying elements within the wire composition to achieve the desired electrical resistance, current amperage, voltage rating and heating power characteristics in when either solid or multi-strand nickel chromium resistance wire is used. These selections are foreseen as necessary to satisfy the requirements of specific heating applications and embodiment configurations as preferred for selectively optimized heating performance characteristics, power consumption, production manufacturing according to customized design heater and heating applications.

Additionally, with respect to the various embodiments of FIGS. 1-158, the use of various types of flexible, semi-flexible and generally rigid extruded polymer PTFE plastic tubing is preferred depending upon the requirements, specifications and the nature of each specific heating application. Optionally, any suitable temperature resistant tube can be used including metal tubes, plastic tubes, or composite tubes, including electrically conductive and insulative tubes. PTFE extruded tubing is commercially available in a considerable range of dimensional sizes and extruded configurations from Zeus, 2759 Belleville Road, St. Matthews, S.C. 29135. The extruded polymer PTFE plastic tubing used in the preceding heater embodiments is available in various types including a considerable range of characteristics including combinations of physical, mechanical, electrical and thermal property characteristics. One example of a preferred extruded tubing material used for the exemplary heater embodiments disclosed herein is PTFE as supplied by Zeus according to PTFE test report specification ASTM-D-4895. For example, this PTFE has a physical density range (specific gravity) of approximately 2.13 to 2.24 (g/cc) (ASTM D792), a mechanical elongation at point of breaking of approximately 200 min. to 550 max. (percent) (ASTM D638), an electrical volume resistivity of approximately 1e14 to 1e19 (ohm-cm) (ASTM D257), a thermal conductivity of approximately 0.167 to 0.3 (W/m-K), and a melt temperature of 327+/−10 (degrees C.) [621+/−18 degrees F.]. The melt temperature of the PTFE tubing in this case is generally ideal for having the extruded tubing in direct physical contact with the nickel-chromium resistance heating wire such that it both electrically insulates and mechanically supports the resistance heating wire at the preferred approximate maximum heater operating temperatures in the preferred range of operating temperatures, in one example range of between 30 to 100 (degrees C.) [86 to 212 degrees F.]. In addition to PTFE, additionally optional extruded tubing materials are available from Zeus including FEP, PFA, THV, PVDF, EFEP, ETFE and PEEK. Each of these extruded polymer tubing materials are characterized by their particular property characteristics and attribute advantages which may be selected for suitability when applied to a particular heating application as shown by example in the preceding embodiments. Additionally, Zeus offers a variety of extruded polymer tubing shapes and geometries with some further including multiple internal longitudinal passageways throughout the length of the extrusion, further including a variety of cross-sectional internal sizes and uniquely customized external and internal geometric shapes. These "multiple-cavity PTFE extrusions" offer the option to design and install multiple nickel chromium resistance heating wires within a single extrusion member for customized, special or unique heating or heater applications.

According to one alternative construction, one encasement tube for a resistive wire comprises an item #0000014194 PTFE extruded cylindrical cross-section black-RoHS tube having a ¹⁄₁₆" inner diameter and a ⅛" outer diameter, manufactured by Zeus, P.O. Box 2167, 3737

Industrial Blvd, Orangeburg, S.C. 29116-2167, and sold by Fastenal Company, 2001 Theurer Blvd., Winona, Minn. 55987.

According to a second alternative construction, another encasement tube for a resistive wire comprises an item #0000015700 PTFE extruded cylindrical cross-section blue-RoHS tube having a 1/16" inner diameter and 1/8" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a third alternative construction, yet another encasement tube for a resistive wire comprises an item #0000015798 PTFE extruded cylindrical cross-section translucent white-RoHS tube having a 1/16" inner diameter and 1/8" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a fourth alternative construction, yet even another encasement tube for a resistive wire comprises an item #00000165338 PTFE extruded cylindrical cross-section black-RoHS tube having a 3/16" inner diameter and 5/16" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a fifth alternative construction, yet a further encasement tube for a resistive wire comprises an item #0000050291 PTFE extruded cylindrical cross-section translucent white-RoHS tube having a 3/16" inner diameter and 5/16" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a sixth alternative construction, yet even a further encasement tube for a resistive wire comprises an item #0000015730 PTFE extruded cylindrical cross-section translucent white-RoHS tube having a 1/8" inner diameter and 3/16" outer diameter, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a seventh alternative construction, even a further encasement tube for a resistive wire comprises an item #0000043851 PTFE extruded cylindrical cross-section translucent white-RoHS tube having a 0.042" (AWG size 18) nominal inner diameter and a 0.016" nominal wall thickness, where the outer diameter is approximately 0.072", manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to an eight alternative construction, yet another encasement tube for a resistive wire comprises a part/item #ZCT-TS-012 (0000043851) PTFE convoluted tubing generally cylindrical in cross-section translucent white-RoHS tube having a 0.188" nominal inner diameter and a maximum outer diameter of 0.32", and having a nominal wall material thickness of 0.023", where the number of convolutions per inch is approximately 8, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a ninth alternative construction, yet even a further encasement tube for a resistive wire comprises a part/item #ZCT-TS-012 (0000049476) PTFE convoluted tubing generally cylindrical in cross-section, black-RoHS tube having a 0.188" nominal inner diameter and a maximum outer diameter of 0.32", and having a nominal wall material thickness of 0.023", where the number of convolutions per inch is approximately 8, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

According to a tenth alternative construction, a suitable heat shrink tube for use with the various constructions depicted in FIGS. 1-158 comprises an item #0000017800 a semi-clear to translucent white-RoHS PTFE tube, cylindrical in cross-section, having a 1/8" nominal minimum expanded inside diameter and a 4 to 1 shrink ratio, manufactured by Zeus, P.O. Box 2167, 3737 Industrial Blvd, Orangeburg, S.C. 29116-2167, and sold by Fastenal Company, 2001 Theurer Blvd., Winona, Minn. 55987.

Even further, with respect to the various embodiments of FIGS. 1-158, the use of various types of thermally transmissive (conductive/convective/radiant) as well as electrically insulating liquid polymer curable resins, encapsulants, and potting materials may be applied in assembled combination with the materials and components previously described to produce a wide variety of nickel chromium heater and heating apparatus geometries, configurations and embodiments. For example, a two-part liquid resin part number EP1200-Black is commercially available from Ellsworth Adhesives, Resin Lab, W129 10825 Washington Dr, Germantown, Wis. 53022. This two-part resin is dispensed from two simultaneously pressurized cartridges (Lot A, EIL 2805A & Lot B, EJA1706B) in a 1:1 evenly mixed ratio through a mixing-tube dispensing tube (part number EDS250-20LL) onto or into the components to be encapsulated, bonded or otherwise permanently mechanically and joined in thermal communication with one another. In particular, this two-part resin is used with success to encapsulate or otherwise fill-up the airspace or void between the small diameter (either 28 AWG (0.013 inch diameter) or 30 AWG (0.010 inch diameter) for example) nickel chromium resistance heating wire and the relatively larger internal diameter of the extruded PTFE tubing (5/16 inch outside diameter, 3/16 inch inside diameter) which together generally comprises several of the various examples of the heater assembly embodiments previously shown herein. Once fully cured, the two-part resin provides substantial mechanical support and electrical insulation properties to the assembled "tube heater assembly" including the nickel chromium resistance wire and surrounding PTFE tubing, as well as a providing a preferred thermally conductive path for heat energy to travel from the higher temperature nickel chromium wire energized by electrical current outward to the outer surface area of the PTFE tubing. Additionally, the cured two-part resin including the surrounding extruded polymer PTFE tubing exhibits the desired characteristic of providing increased specific heat capacity or thermal mass storage capabilities over and beyond that of a nickel chromium resistance heating wire alone. In this way heat energy is not only conducted, but also evenly stored within and throughout the various thermally conductive materials of the heat-tube assembly for more even and consistent surface heat dissipation outward and into the desired surrounding areas and spaces proximate to the heat tube or heater assembly.

Other thermally transmissive (conductive/convective/radiant) and generally electrically insulative resins that are optionally used in the preceding embodiments is Loctite AA 3526 Light Cure Adhesive, part number 30756, which is an ultra-violet (UV) light curing adhesive resin and/or liquid potting material and Loctite HY 4090 GY, part number 2205827, 2-part liquid structural hybrid adhesive (grey), high strength combined with fast fixture, applied using a pressurized cartridge applicator with mixing-tube dispenser nozzle, which are both commercially available from Henkel Corporation, 10 Finderne Avenue, Bridgewater, N.J. 08807 USA.

Another series of thermally transmissive (conductive/convective/radiant) materials optionally used in the embodiments of FIGS. 1-158 are commercially available from Dow Corning, Corporate Headquarters 2211 H.H. Dow Way, Midland, Mich. 48674. The series of thermally conductive materials are generally divided into five application groups; adhesives, gap fillers, dispensable pads, compounds, and encapsulants/gels. Four further thermal performance classifications of these five application groups further sub-divide these products into thermal conductivity performance range characteristics based upon ranges of less than 1 W/mK, 1 to 2 W/mK, 2 to 3 W/mK and 3 to 4.5 W/mK.

Dow Corning thermally transmissive (conductive/convective/radiant) materials within a thermally conductive range of less than 1 W/Mk are available as follows: Adhesives; DOWSIL SE4420, DOWSIL EA-9189 H, DOWSIL Q1-9226. Compounds; DOWSIL SC-102. Encapsulants/gels; SYLGARD Q3-360 Encapsulant, SYLGARD 160 Elastomer, DOWSIL EE-3200 Encapsulant. These products are commercially available from Dow Corning, Corporate Headquarters 2211 H.H. Dow Way, Midland, Mich. 48674.

Dow Corning thermally transmissive (conductive/convective/radiant) materials within the thermally conductive range of 1 to 2 W/Mk are available as follows: Adhesives; DOWSIL 1-4173, DOWSIL TC-2022, DOWSIL SE4486, DOWSIL 3-6753. Gap Fillers; DOWSIL TC-4515. Dispensable pads; DOWSIL TC-4015, DOWSIL TC-4016. Compounds; DOWSIL SE-4490CV, DOWSIL TC-5080. Encapsulants/gels; DOWSIL SE-4445 CV Gel, DOWSIL 3-6651 Elastomer, DOWSIL TC-4605 HLV Encapsulant, DOWSIL TC-4605 Encapsulant. These products are commercially available from Dow Corning, Corporate Headquarters 2211 H.H. Dow Way, Midland, Mich. 48674.

Dow Corning thermally transmissive (conductive/convective/radiant) materials within the thermally conductive range of 2 to 3 W/Mk are available as follows: Adhesives; DOWSIL TC2030. Gap fillers; DOWSIL TC-4525. Dispensable pads; DOWSIL TC4025 LV, DOWSIL TC-4026, and compounds; DOWSIL TC-5026, DOWSIL TC-5121 C LV. These products are commercially available from Dow Corning, Corporate Headquarters 2211 H.H. Dow Way, Midland, Mich. 48674.

Dow Corning thermally transmissive (conductive/convective/radiant) materials within the thermally conductive range of 3 to 4.5 W/Mk are available as follows: Adhesives; DOWSIL TC-2035. This adhesive is the preferred thermally conductive material with respect to the embodiments shown herein where the mechanical bonding of two components is required and the best likelihood of effective thermal heat transfer is desired. Compounds; DOWSIL TC-5622, DOWSIL TC 5351. These products are commercially available from Dow Corning, Corporate Headquarters 2211 H.H. Dow Way, Midland, Mich. 48674.

Regarding these previously listed examples of commercially available thermally transmissive (conductive/convective/radiant) materials, the following thermal properties related to each given material will offer various performance advantages when applied to a specific application. These for example are and not limited to; Specific Heat Capacity, example units of (BTU (IT)/Pound/Deg. F), Thermal Conductivity, example units of (BTU (IT) Inch/Second/Sq. Foot/Deg. F), Heat Flux Density, BTU (th)/Second/Square Inch and Thermal Resistance, Deg. F/Second/BTU (IT).

Identifying one or a series of suitable thermally transmissive (conductive/convective/radiant) components and identifying the method and material to join them together can be based upon the evaluation of the performance criteria for each of the example thermal properties listed above for each thermal component. In this way it is preferable to initially and theoretically optimize the overall performance and efficient heat output of a given heating apparatus embodiment for a specific practical application. Actual performance testing and evaluation of a heating system embodiment, arrangement or apparatus can be used to confirm the level of performance achieved and show results for further optimization through materials selection and implementation.

Another aspect of the present invention involving nickel chromium resistance heating wire is that the effectively exposed and heated surface area of a relatively thin length of resistance wire is rather small and limited. For example, given a 1-inch length of 28 gage AWG solid nickel chromium resistance wire of 0.013 inches in diameter, the exposed surface area of the wire is; the circumference times the length; (Pi×0.013 in.)×1.00 in.=0.0408 in.^2 (per inch of wire length). Optionally, the PTFE (or other high temperature plastic) tube can be coated on an inner bore surface with Indium Tin Oxide to provide an alternative elongate electrically powered heating element that is a tubular inner-wall segment of Indium Tin Oxide within the tube.

By slipping or otherwise encasing the 0.013 diameter nickel chromium wire into a length of 1/16" (0.0625") diameter extruded PTFE tubing for example, which is then in thermal communication with the nickel chromium wire, the effective exposed surface area (of the first tube heater assembly) becomes; (Pi×0.0625 in.)×1.00 in.=0.1963 in^2 (per inch of wire length). This first increase in the effective surface area for the dissipation of heat energy represents an increase of effective and available surface area by a factor of 4.81 over that of the original nickel chromium wire alone.

By next slipping the above second combination of nickel chromium wire and 1/16' diameter extruded tubing into yet another even larger diameter of extruded PTFE tubing, for example of 5/16" (0.3125") outside diameter, the effective exposed surface area (of the second tube heater assembly) becomes; (Pi×0.3125 in)×1.00 in=0.9817 in^2 (per inch of wire length). This second increase in the effective surface area for the dissipation of heat energy represents an increase of effective surface area represents an increase of effective and available surface area by a factor of 24.06 over that of the original nickel chromium wire alone.

In this example, the overall ratios between the effectively exposes surface areas of the nickel chromium resistance wire, the first PTFE extruded tube, and the second PTFE extruded tube is represented by the ratio; 1.00 to 4.81 to 24.06. It should be understood that other ratios are possible by selection of different outside diameters of the respective extruded PTFE components.

It should also be understood that the heater assembly should not be limited to PTFE extruded tubing or similar materials. For example, thermally conductive metal tubing may be utilized with various inside and outside diameters including the use of thermally conductive non-electrically conductive curable resins and filler materials that exhibit the characteristics of providing effective thermal conductivity from the nickel chromium resistance wire to the outer surfaces of the tube heater assembly.

Another aspect involving nickel chromium resistance heating wire is that the effective volume and therefor the mass, and the specific heat capacity of a relatively thin length of resistance wire is relatively small and compared to that of the extruded PTFE polymer tubing and/or the thermally conductive cured resin or filler material that surrounds it. For example, given a 28 gage AWG solid nickel chromium resistance wire of 0.013 inches in diameter, compared to a 1/16 inch outside diameter of a first extruded PTFE tube and then yet another or second 5/16 inch outside diameter extruded PTFE tube, the approximate comparative ratio of diameters is 1.0 for the nickel chromium wire to 4.8 for the first 1/16 inch PTFE tube, to 24.0 for the second 5/16" diameter tube. This generally represents increases in both surface area for effectively dissipating heat from a given surface as well as increased ability to store and distribute heat within a the comparatively larger volume of thermal materials compared to that of the nickel chromium resistance wire alone.

A thermal control component can be added to any of the embodiments depicted in FIGS. 1-158. One exemplary thermal control component that can be place in-line with a power supply and heater is a PEPI creep action thermostat/thermal protector with conductive bimetal construction. Such a device has a low internal resistance and is available with gold diffused contacts for use with low voltage/low current applications. There is no built-in differential between the opening and closing temperature on such a device. Such device has a case that is electrically active. An insulating sleeve is available for this device. This device has a preset calibration temperature, and it is not adjustable in the field. This device is available to open circuit on rise of temperature (normally closed), model C. Such a device is a pre-assembled sub-assembly provided by PEPI, Model: C (000+ 060F) "MA-195", Calibration: 60 Deg C.+/−5 Deg C., Sleeve: Mylar "P-115", Case Lead: 6.00" Strip 0.50" "P-611", Other Lead: Same, and available from Portage Electric Products, Inc., 7700 Freedom, Avenue N.W., North Canton, Ohio 44720, U.S.A. Furthermore, such temperature switches can operate using creep action as PEPI Model A, B, C, K, or N device) and comprise cantilever thermostatic metal thermal control devices. Optionally, PEPI makes a snap action (Model STO1, V, P2D, VST, F, J device) and comprise snap-action thermostatic metal thermal control devices. Any of such devices can be used to implement thermal switching or control on any of the heating systems variously disclosed in FIGS. 1-158 herein, and are generally referred to as thermostatic metal thermal control devices.

Furthermore, the subject matter of this application is intended to apply to other forms of housings, encasements, dividers, and casings having an form or combination of electromagnetic wave emitters and/or detectors, for example, an optically transmissible portion or a light transmissible portion, such as weatherproof/waterproof housings for cameras, video cameras, masks and goggles, such as scuba masks and industrial masks, and other encasements having a need to clear condensate from an optical/light transmissible portion (inside or outside surface), such as housings and cover plates for sensors, such as sensors used to provide input for artificial intelligence systems used on autonomous and self-driving vehicles including Lidar units and radar units, or cars/trucks/buses or other vehicles and conveyors of animate and/or inanimate objects.

As understood by one of ordinary skill in the art, a light source, such as an LED is an emitter that provides an electromagnetic wave source in the form of light waves. Furthermore, a transmitter for a radar system is also an emitter that produces an electromagnetic wave source. Even further, a laser (such as for a LIDAR system) is also an emitter that produces electromagnetic radiation. A lens, or light transmissible portion of a housing is an electromagnetic wave transmission portion. In addition to heating LED lighting systems, it is understood that the various heater designs disclosed herein can be used to provide increased heat even for incandescent lighting, Laser LED lighting, and halogen lighting systems.

According to one aspect, an electromagnetic illuminator heater is provided having an elongate heating element and a tubular encasement. The tubular encasement envelopes the elongate heating element imparted with structural integrity sufficient to retain the element in a desired geometry.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

I claim:

1. An optical face protection apparatus, comprising:
    a support body configured to be supported on a user;
    at least one lens carried by the support body and configured to hold the at least one lens over an eye facial region of a user; and
    an elongate heating element having an elongate tube and a heat source provided in the tube, carried by the body and configured to traverse an expansive surface area of the at least one lens.

2. The optical face protection apparatus of claim 1, wherein the support body is a scuba mask body including a circumferential bezel and a groove configured to receive at least one lens.

3. The optical face protection apparatus of claim 1, wherein the support body is a goggle frame configured to receive a lens.

4. The optical face protection apparatus of claim 1, wherein the support body is face mask having a frame configured to receive a lens.

5. The optical face protection apparatus of claim 1, wherein the support body is a protective glasses frame configured to receive the at least one lens.

6. The optical face protection apparatus of claim 1, further comprising a bezel provided about the support body configured to support the at least one lens.

7. The optical face protection apparatus of claim 1, wherein the heat source of the elongate heating element comprises an electrically resistive heating element.

8. The optical face protection apparatus of claim 7, wherein the elongate tube comprises a polytetrafluoroethylene (PTFE) tube having an inner surface configured to receive the electrically resistive heating element.

9. The optical face protection apparatus of claim 7, wherein the electrically resistive heating element comprises a layer of electrically conductive heat generating film.

10. The optical face protection apparatus of claim 9, wherein the layer of electrically conductive heat generating film comprises a coating of indium tin oxide.

11. The optical face protection apparatus of claim 7, wherein the electrically resistive heating element comprises a nichrome heating wire.

12. The optical face protection apparatus of claim 1, wherein the support body includes a groove proximate the lens traversing an expansive surface area of the lens configured to receive the elongate heating element.

13. A face protection apparatus, comprising:
a frame configured to be worn on a user;
at least one lens carried by the frame and configured to hold the at least one lens over an eye facial region of a user; and
an elongate electrically resistive heating element carried in thermally transmissive, temperature mitigating, and electrically insulative relation relative to the lens and an environment about the lens and configured to extend across a portion of the at least one lens.

14. The face protection apparatus of claim 13, wherein the frame is an eyeglass frame and a pair of lenses are carried by the frame, the elongate heating element configured to span each of the pair of lenses.

15. The face protection apparatus of claim 13, further comprising an elongate tube encompassing the elongate electrically resistive heating element.

16. The face protection apparatus of claim 15, wherein the elongate tube is a peak temperature mitigating, thermally transmissive and electrically insulative cover and the elongate electrically resistive heating element is encased in the cover.

17. The face protection apparatus of claim 16, wherein the cover is a tube of polytetrafluoroethylene (PTFE) having a bore configured to encase the electrically resistive heating element.

18. The face protection apparatus of claim 17, wherein the electrically resistive heating element is a nichrome wire.

19. The face protection apparatus of claim 18, wherein the electrically resistive heating element comprises a layer of electrically conductive heat generating film.

20. The face protection apparatus of claim 19, wherein the layer of electrically conductive heat generating film comprises a coating of indium tin oxide (ITO).

21. The face protection apparatus of claim 13, wherein the elongate electrically resistive heating element comprises an electrically conductive resistive heating wire.

22. The face protection apparatus of claim 21, further comprising an electrically insulative cover configured to encompass and insulate the wire from an adjacent environment.

23. The face protection apparatus of claim 22, wherein the cover has a round cross-sectional shape.

24. The face protection apparatus of claim 22, wherein the cover increases thermal mass of the heating element.

25. The face protection apparatus of claim 22, wherein the cover increases outer surface area of the heating element over that provided solely by the heating wire.

* * * * *